(12) United States Patent
Seol et al.

(10) Patent No.: US 12,500,331 B2
(45) Date of Patent: Dec. 16, 2025

(54) ELECTRONIC DEVICE COMPRISING ANTENNA

(71) Applicant: Samsung Electronics Co., Ltd., Suwon-si (KR)

(72) Inventors: Kyungmoon Seol, Suwon-si (KR); Minkyung Lee, Suwon-si (KR); Jiho Kim, Suwon-si (KR); Kyihyun Jang, Suwon-si (KR); Hyeonuk Kang, Suwon-si (KR); Seunghwan Kim, Suwon-si (KR); Gyubok Park, Suwon-si (KR); Seongyong An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 135 days.

(21) Appl. No.: 18/488,573

(22) Filed: Oct. 17, 2023

(65) Prior Publication Data

US 2024/0063528 A1 Feb. 22, 2024

Related U.S. Application Data

(63) Continuation of application No. PCT/KR2022/018081, filed on Nov. 16, 2022.

(30) Foreign Application Priority Data

| Nov. 16, 2021 | (KR) | 10-2021-0157659 |
| Dec. 9, 2021 | (KR) | 10-2021-0175992 |
| Nov. 16, 2022 | (KR) | 10-2022-0153369 |

(51) Int. Cl.
*H01Q 1/24* (2006.01)
*G09G 3/00* (2006.01)
*H04M 1/02* (2006.01)

(52) U.S. Cl.
CPC ............ *H01Q 1/243* (2013.01); *G09G 3/035* (2020.08); *H04M 1/0216* (2013.01); *H04M 1/0237* (2013.01); *H04M 1/0269* (2022.02)

(58) Field of Classification Search
CPC  H01Q 1/24; H01Q 1/243; H01Q 1/38; H01Q 1/44; G09G 3/035; H04M 1/18;
(Continued)

(56) References Cited

U.S. PATENT DOCUMENTS 7,852,424 B2    12/2010  Sugawara
7,920,225 B2     4/2011  Nishikawa et al.
(Continued)

FOREIGN PATENT DOCUMENTS

EP    4089503         11/2022
EP    4089503  A1 *   11/2022   ............... C09J 9/00
(Continued)

OTHER PUBLICATIONS

Extended European Search Report dated Jan. 31, 2025 issued in European Patent Application No. 22896053.0.
(Continued)

*Primary Examiner* — Thai Pham
(74) *Attorney, Agent, or Firm* — Nixon & Vanderhye P.C.

(57) ABSTRACT

According to an example embodiment of the present disclosure, an electronic device may comprise: a display module comprising a display, a conductive part comprising a conductive material, a wireless communication circuit, and a dielectric. The conductive part may be included in a housing forming the external appearance of the electronic device. The conductive part may include a conductive region which may face and overlap a portion of the front surface of the display module to cover a portion of the front surface of the display module. The wireless communication circuit may be configured to transmit and/or receive a signal in a
(Continued)

selected or designated frequency band through the conductive part. The dielectric may be disposed between a portion of the front surface of the display module and the conductive region of the conductive part. An air gap may be provided between the dielectric and a portion of the front surface of the display module or between the dielectric and the conductive region.

20 Claims, 50 Drawing Sheets

(58) Field of Classification Search
CPC .. H04M 1/0216; H04M 1/0235; H04M 1/026; H04M 1/0268; H04M 1/0269; G06F 1/1624; G06F 1/1652; G06F 1/1637; G06F 1/1698
See application file for complete search history.

(56) References Cited

U.S. PATENT DOCUMENTS

| | | | |
|---|---|---|---|
| 9,872,408 | B2 | 1/2018 | Choi et al. |
| 10,134,540 | B2 | 11/2018 | Choi et al. |
| 10,201,102 | B2 | 2/2019 | Lee et al. |
| 10,903,445 | B2 | 1/2021 | Baek et al. |
| 11,147,171 | B2 | 10/2021 | Kim et al. |
| 11,159,660 | B2 | 10/2021 | Choi et al. |
| 11,212,379 | B2 | 12/2021 | Baek et al. |
| 11,216,094 | B2 | 1/2022 | Ahn et al. |
| 11,270,635 | B2 | 3/2022 | Luo et al. |
| 2020/0252492 | A1* | 8/2020 | Choi ............... H05K 5/04 |
| 2021/0149515 | A1 | 5/2021 | Park et al. |
| 2021/0185833 | A1 | 6/2021 | Wang et al. |
| 2021/0352813 | A1* | 11/2021 | Cho ............... G06F 1/1656 |
| 2021/0407389 | A1* | 12/2021 | Luo ............... G06F 1/1658 |
| 2022/0376380 | A1 | 11/2022 | Park et al. |
| 2023/0085200 | A1 | 3/2023 | Oh et al. |
| 2023/0099802 | A1* | 3/2023 | An ............... H04M 1/0237 455/566 |

FOREIGN PATENT DOCUMENTS

| | | | |
|---|---|---|---|
| EP | 4152121 | A1 | 3/2023 |
| EP | 4235958 | A1 | 8/2023 |
| KR | 20060012965 | A | 2/2006 |
| KR | 20160019248 | A | 2/2016 |
| KR | 20170040082 | A | 4/2017 |
| KR | 20180013436 | A | 2/2018 |
| KR | 20180138252 | A | 12/2018 |
| KR | 20190101605 | A | 9/2019 |
| KR | 20190112535 | A | 10/2019 |
| KR | 20200094950 | A | 8/2020 |
| KR | 102262991 | B1 | 6/2021 |
| KR | 20210101781 | A | 8/2021 |
| KR | 20210116380 | A | 9/2021 |
| KR | 10-2306982 | | 10/2021 |
| KR | 20210141185 | A | 11/2021 |
| KR | 20220056627 | A | 5/2022 |
| KR | 20230139268 | A | 10/2023 |
| WO | 2021016848 | A1 | 2/2021 |
| WO | 2021/162322 | | 8/2021 |
| WO | WO-2021162322 | A1 * | 8/2021 ............... C09J 9/00 |

OTHER PUBLICATIONS

International Search Report for PCT/KR2022/018081 mailed Feb. 24, 2023, 4 pages.

Written Opinion of the ISA for PCT/KR2022/018081 mailed Feb. 24, 2023, 4 pages.

* cited by examiner

ELECTRONIC DEVICE COMPRISING ANTENNA

CROSS-REFERENCE TO RELATED APPLICATIONS

This application is a continuation of International Application No. PCT/KR2022/018081 designating the United States, filed on Nov. 16, 2022, in the Korean Intellectual Property Receiving Office and claiming priority to Korean Patent Application Nos. 10-2021-0157659, filed on Nov. 16, 2021, 10-2021-0175992, filed on Dec. 9, 2021, and 10-2022-0153369, filed on Nov. 16, 2022, in the Korean Intellectual Property Office, the disclosures of each of which are incorporated by reference herein in their entireties.

BACKGROUND

Field

The disclosure relates to an electronic device including an antenna.

Description of Related Art

An electronic device may include multiple antennas for supporting various communication technologies.

With the increase of available applications, the number of antennas included in an electronic device has been increasing. Electronic devices are getting slimmer, and thus it is difficult to design, in a limited space, an antenna for securing antenna radiation performance in a desired frequency band or securing coverage (communication range) while reducing electromagnetic effects caused by various elements in the electronic device. An electronic device may include a foreign material introduction prevention structure for reducing or preventing introduction of an external foreign material, such as dust or moisture, inside the electronic device. If an antenna is implemented to be at least partially adjacent to the foreign material introduction prevention structure, the foreign material introduction prevention structure may have an electromagnetic effect on the antenna.

SUMMARY

Various embodiments of the disclosure may provide an electronic device including an antenna for improving or securing antenna radiation performance or securing coverage against a foreign material introduction prevention/reduction structure.

According to an example embodiment of the disclosure, an electronic device may include: a display module including a display, a conductive part comprising a conductive material, a wireless communication circuit, and a dielectric. The conductive part may be included in a housing configuring an exterior of the electronic device. The conductive part may include a conductive region facing and overlapping a part of a front surface of the display module and covering the part of the front surface of the display module. The wireless communication circuit may be configured to transmit and/or receive a signal in a selected or designated frequency band through the conductive part. The dielectric may be disposed between the part of the front surface of the display module and the conductive region of the conductive part. An air gap may be provided between the dielectric and the part of the front surface of the display module, or between the dielectric and the conductive region.

An electronic device including an antenna according to various example embodiments of the disclosure may reduce the electromagnetic effect of a foreign material introduction prevention/reduction structure on the antenna, so as to secure antenna radiation performance or coverage.

Other effects obtainable by various example embodiments of the disclosure may be directly or implicitly described in detailed description for the embodiments of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the disclosure disclosed herein will be described in greater detail with reference to the accompanying drawings.

Figure 1:
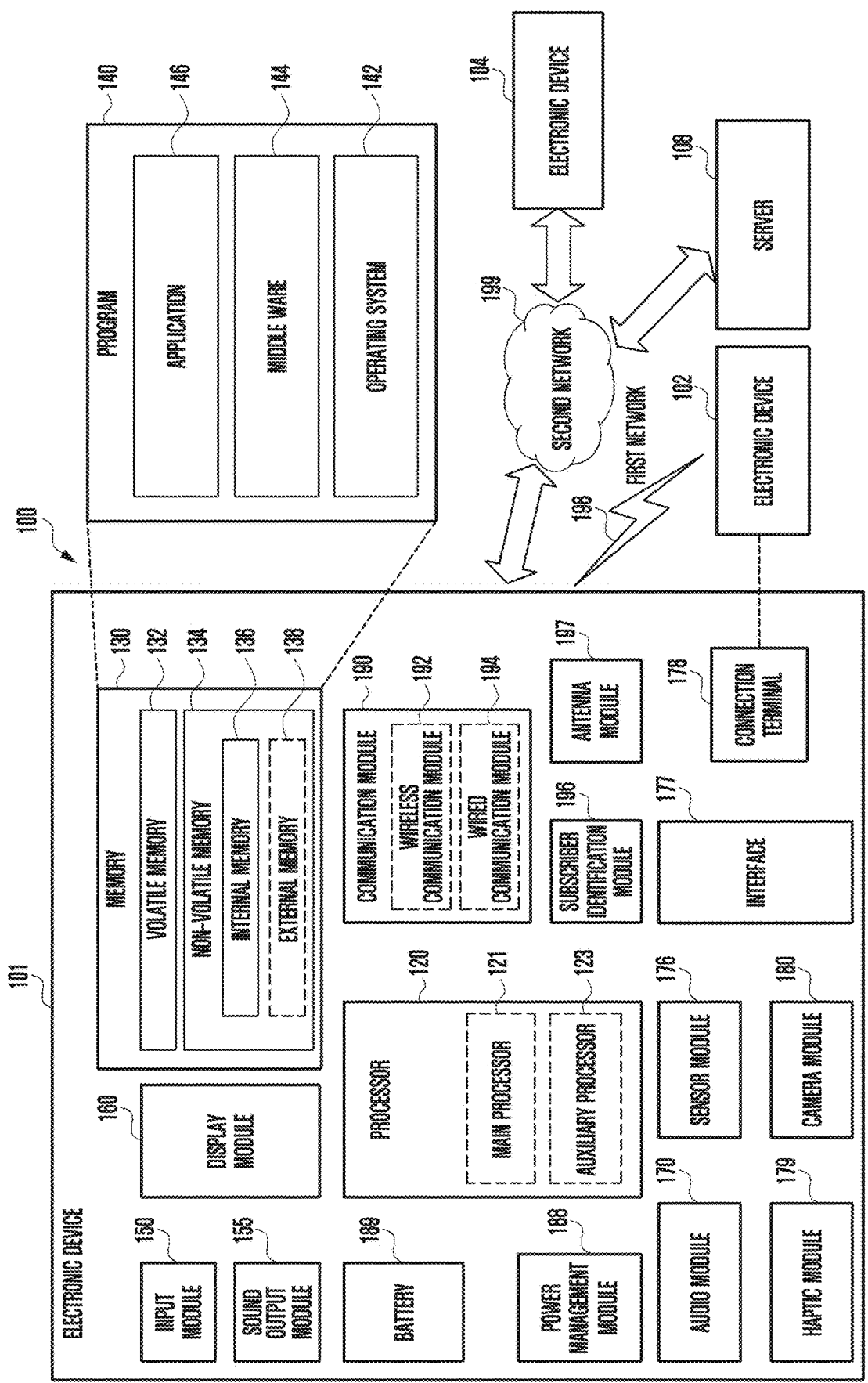
FIG. 1 is a block diagram illustrating an example electronic device in a network environment according to various embodiments.

FIG. 1 is a block diagram illustrating an example electronic device 101 in a network environment 100 according to an embodiment.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In various embodiments of the disclosure, at least one (e.g., the connection terminal 178) of the components may be omitted from the electronic device 101, or one or more other components may be added in the electronic device 101. In various embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the external electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a 5th generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support high-speed transmission of high-capacity data (e.g., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mmWave band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., external the electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In an embodiment of the disclosure, the external electronic device 104 may include an internet of things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, a home appliance, or the like. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), the element may be coupled with the other element directly (e.g., wiredly), wirelessly, or via a third element.

The term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAY-STORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
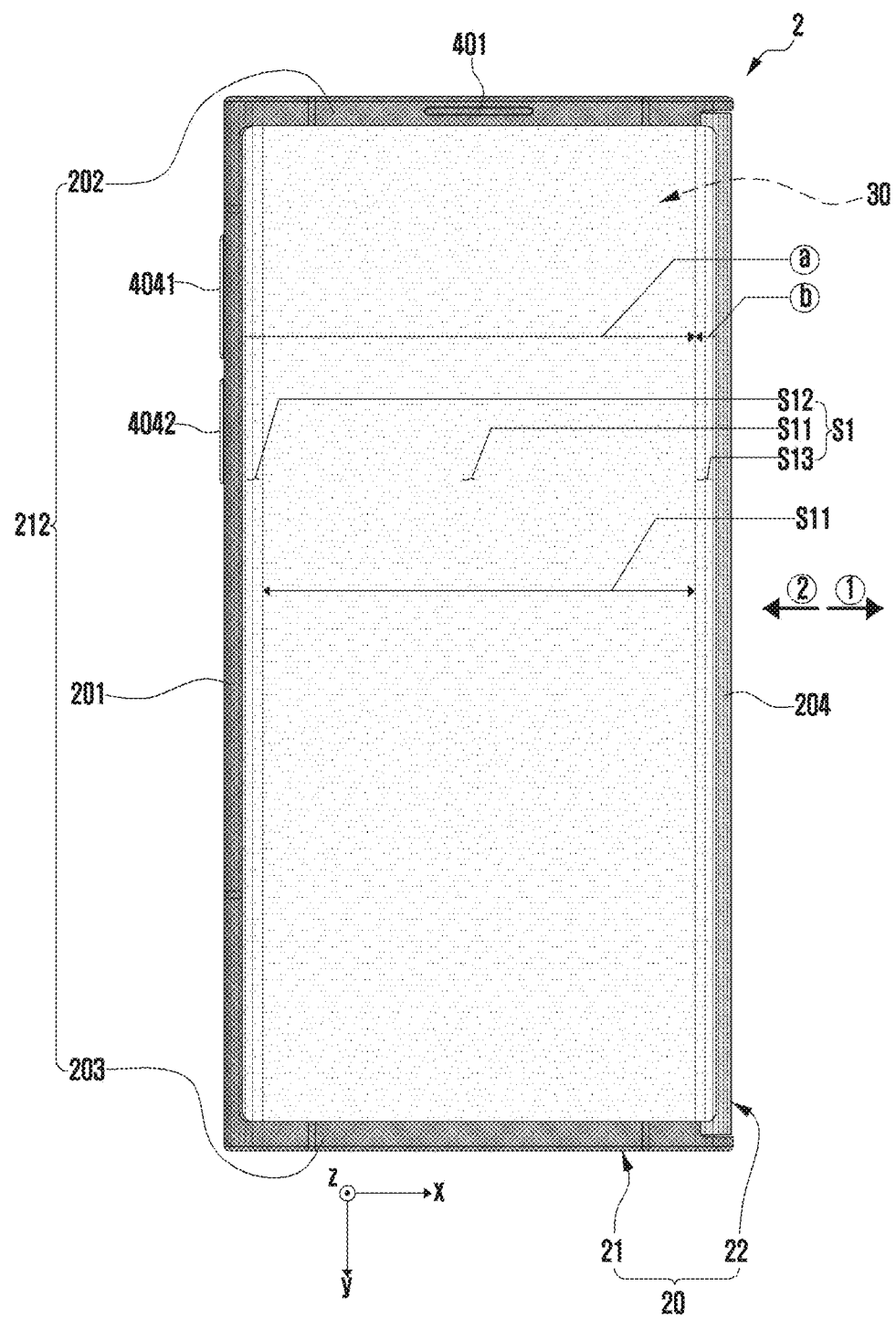
FIG. 2 and FIG. 3 are diagrams illustrating a slidable electronic device in a closed state according to various embodiments.
Figure 3:
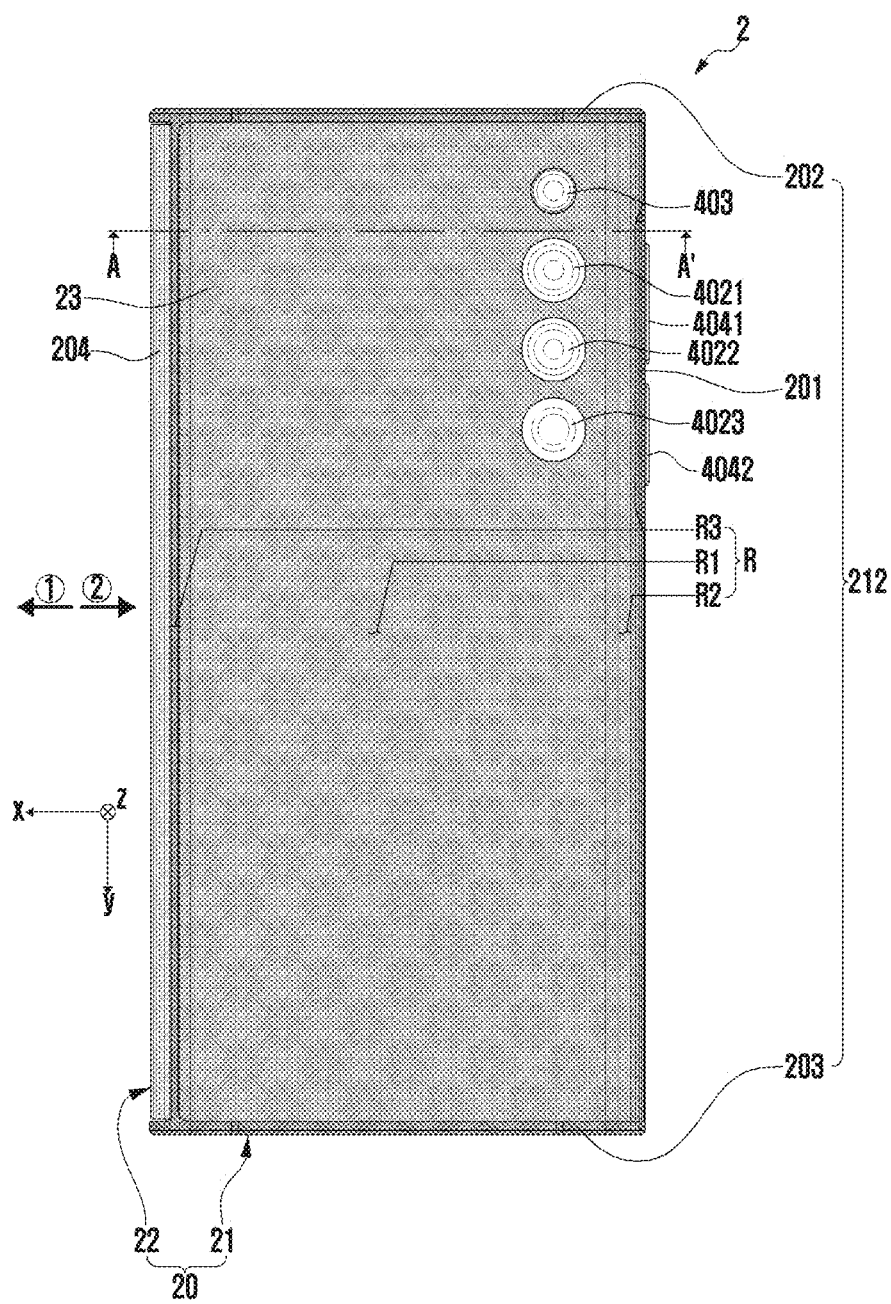
Figure 4:
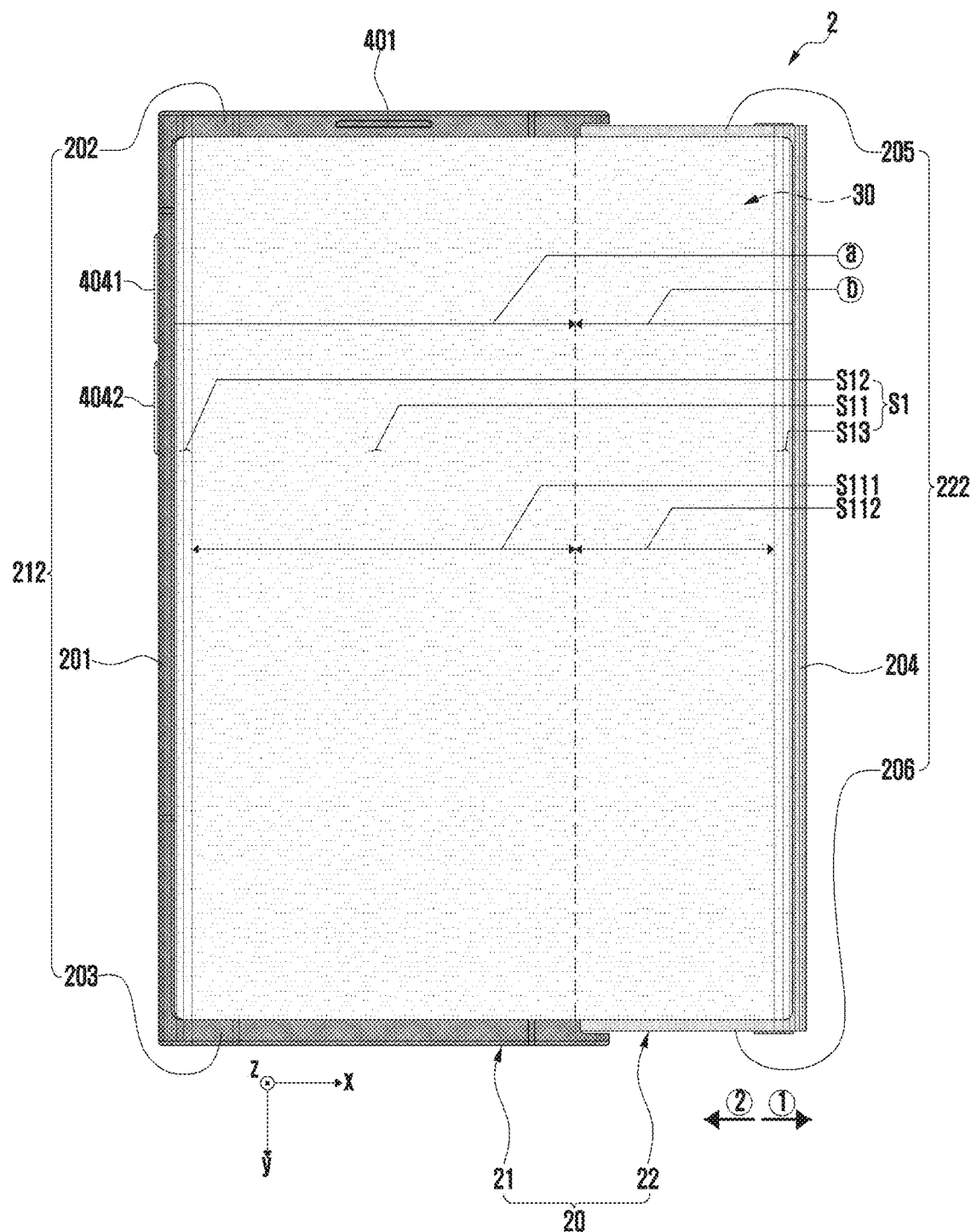
FIG. 4 and FIG. 5 are diagrams illustrating a slidable electronic device in an open state according to various embodiments.
Figure 5:
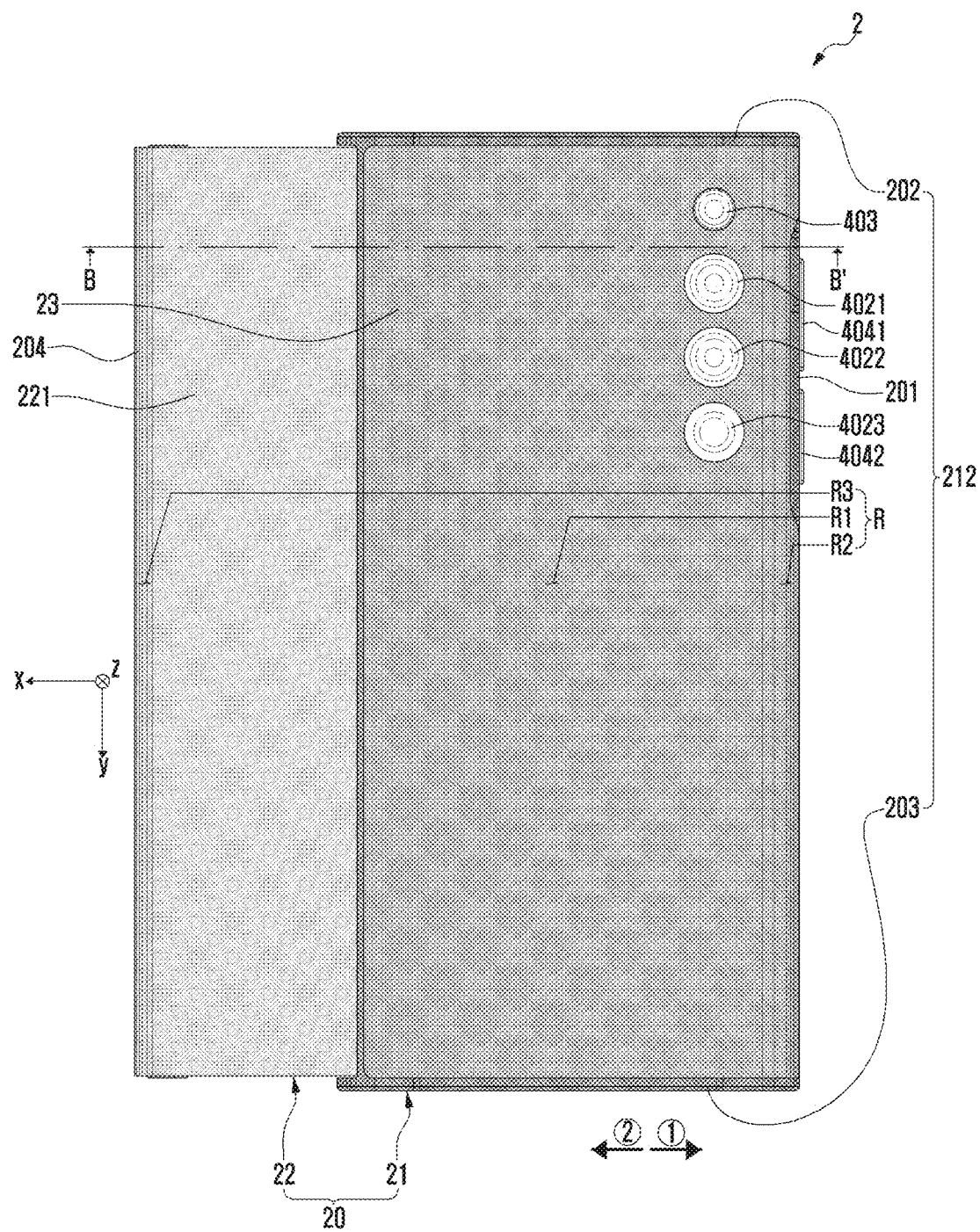

FIG. 2 and FIG. 3 are diagrams illustrating a slidable electronic device 2 in a closed state according to various embodiments. FIG. 4 and FIG. 5 are diagrams illustrating the slidable electronic device 2 in an open state according to various embodiments.

In various embodiments of the disclosure, for convenience of explanation, a direction (e.g., the +z-axis direction) in which a screen S1 (a display region or an active region of a flexible display module 30, which is seen to the outside) is visually exposed (or seen) is interpreted and used as a direction which a front surface of the slidable electronic device 2 faces, and the opposite direction (e.g., the −z-axis direction) is interpreted and used as a direction which a rear surface R of the slidable electronic device 2 faces.

Referring to FIGS. 2, 3, 4, and 5, the slidable electronic device 2 may include a slidable housing 20 and the flexible display module 30.

According to an embodiment, the slidable housing 20 may include a first housing (or a first housing part or a first housing structure) 21 and a second housing (or a second housing part or a second housing structure) 22. The second housing 22 may be connected to the first housing 21 to be slidable with respect to the first housing 21. Sliding of the second housing 22 with respect to the first housing 21 corresponds to a change in the relative position between the first housing 21 and the second housing 22, and may be interpreted as sliding of the first housing 21 with respect to the second housing 22 or mutual sliding between the first housing 21 and the second housing 22.

According to an embodiment, the flexible display module 30 may include a first region ⓐ positioned to correspond to the first housing 21, and a second region ⓑ extending from the first region ⓐ and positioned to correspond to the second housing 22. When the second housing 22 slides in a first direction ① (e.g., the +x-axis direction) with respect to the first housing 21, at least a part of the second region ⓑ may be ejected from a space of the second housing 22 to the outside (e.g., a position on the slidable electronic device 2, which is seen from the outside) and then be visible. When the second housing 22 slides in a second direction ② (e.g., the −x-axis direction) opposite to the first direction ① with respect to the first housing 21, at least a part of the second region ⓑ may be introduced into the space of the second housing 22 and then be hidden. A ratio of a part of the second region ⓑ, which is ejected to the outside, and the size of the screen S1 corresponding thereto may be changed according to a position to which the second housing 22 is slid with respect to the first housing 21, or a distance of the sliding.

According to an embodiment, FIG. 2 and FIG. 3 illustrate the slidable electronic device 2 in a closed state, the screen S1 of which has not been expanded. FIG. 4 and FIG. 5 illustrate the slidable electronic device 2 in an open state, the screen S1 of which has been expanded. The open state of the slidable electronic device 2 may be a state where the second housing 22 has been maximally moved and is unable to be moved any more in the first direction ①. The open state may include a completely open state (see FIG. 4 and FIG. 5) or an intermediate state (not illustrated separately). The intermediate state may indicate a state between a closed state and the completely open state. A case where the second housing 22 is at least partially moved with respect to the first housing 21 in the first direction ① may be called a "slide out" of the second housing 22 or the flexible display module 30. A case where the second housing 22 is at least partially moved with respect to the first housing 21 in the second direction ② may be called a "slide in" of the second housing 22 or the flexible display module 30.

According to various embodiments, the first direction ① may be called a "slide-out direction", and the second direction ② may be called a "slide-in direction".

According to various embodiments, in the slidable electronic device 2 having the screen S1 expandable to correspond to a slide out of the second housing 22, the flexible display module 30 may be called a different term, such as an "expandable display module", a "slidable display module", or a "slide-out display module".

The disclosure includes "a slide out or slide in of the second housing 22" or "sliding of the second housing 22 with respect to the first housing 21", but is not limited thereto. In various embodiments, this may also be described using a slide out or slide in of the first housing 21 with respect to the second housing 22, sliding of the first housing 21 with respect to the second housing 22, mutual sliding between the first housing 21 and the second housing 22, or a relative position change between the first housing 21 and the second housing 22.

According to an embodiment, the second region ⓑ may be disposed to have a bending part so as to be moved in a switched direction when the second region ⓑ is ejected from the space of the second housing 22 to the outside or introduced into the space of the housing 22 from the outside at the time of sliding of the second housing 22 with respect to the first housing 21. Regarding the bending part of the second region ⓑ, the second region ⓑ may be disposed to have a bending part (not illustrated separately) so as to be moved in a switched direction when the second region ⓑ is ejected from the space of the second housing 22 to the outside or introduced into the space of the housing 22 from the outside at the time of sliding of the second housing 22 with respect to the first housing 21. The bending part may be a part of the second region ⓑ, which is disposed and maintained to be bent so that the second region ⓑ is moved in a switched direction at the time of sliding of the second housing 22 with respect to the first housing 21. The part of the second region ⓑ, which provides the bending part, may change according to a position to which the second housing 22 is slid with respect to the first housing 21, or a distance of the sliding, but the shape of the bending part may be substantially the same. The size of a part of the second region ⓑ between the bending part and the first region ⓐ may be increased at the time of a slide out of the second housing 22, and may be reduced at the time of a slide in of the second housing 22.

According to an embodiment, the part of the second region ⓑ between the bending part and the first region ⓐ is smoothly connected to the first region ⓐ without lifting, and may be disposed to be substantially flat. In an embodiment, the slidable electronic device 2 may include a tension device (not illustrated separately) that enables the part of the second region ⓑ between the bending part and the first region ⓐ to be disposed to be substantially flat while reducing lifting thereof caused by elasticity of the flexible display module 30 in an open state of the slidable electronic device 2.

According to an embodiment, the screen S1 may include a first flat part S11, a first curved part S12, and/or a second curved part S13. When viewed from above the first flat part S11 (e.g., when viewed in the −z-axis direction), the first flat part S11 may be positioned between the first curved part S12 and the second curved part S13. The first curved part S12 and the second curved part S13 may be bent from the first flat part S1 toward the rear surface R of the slidable electronic device 2.

According to an embodiment, the first curved part S12 and the second curved part S13 may be substantially symmetrical with respect to the first flat part S11.

According to an embodiment, the first flat part S11 may be expanded or reduced according to a state change (e.g., switching between a closed state and an open state) of the slidable electronic device 2. A part of the second region ⓑ, which provides the second curved part S13, may be changed according to a state change of the slidable electronic device 2, and the shape of the second curved part S13 may be substantially the same even with a state change of the slidable electronic device 2. The first curved part S12 is positioned opposite to the second curved part S13 in a closed state or an open state of the slidable electronic device 2 so as to improve the aesthetics of the screen S1.

According to an embodiment, the slidable housing 20 may provide the rear surface R of the slidable electronic device 2, which is positioned opposite to the screen S1. The rear surface R of the slidable electronic device 2 may include, for example, a second flat part R1, a third curved part R2, and/or a fourth curved part R3. When a closed state of the slidable electronic device 2 is viewed, the second flat part R1 may be positioned to correspond to the first flat part S11 of the screen S1, and may be substantially parallel to the first flat part S11. The third curved part R2 may be bent from the second flat part R1 toward the first curved part S12, to correspond to the first curved part S12 of the screen S1. The fourth curved part R3 may be bent from the second flat part R1 toward the second curved part S13, to correspond to the second curved part S13 of the screen S1.

According to various embodiments, the first flat part S11 may be expanded without the first curved part S12.

According to an embodiment, the first housing 21 may include a first plate 211 (see FIG. 6 and FIG. 7), a first side wall part 212 extending from the first plate, and/or a back cover 23 (or a rear plate).

According to an embodiment, when viewed from above the screen S1 (e.g., when viewed in the −z-axis direction), the first plate 211 (see FIG. 6 or FIG. 7) may overlap with the screen S1.

According to an embodiment, the first side wall part 212 may include a first side wall 201, a second side wall 202, and/or a third side wall 203. The first side wall 201 may be positioned to correspond to the first curved part S12 of the screen S1. The second side wall 202 may extend from one end of the first side wall 201 to be positioned to correspond to a border region of one side of the screen S1, which connects one end of the first curved part S12 and one end of the second curved part S13. The third side wall 203 may extend from the other end of the first side wall 201 to be positioned to correspond to a border region of the other side of the screen S1, which connects the other end of the first curved part S12 and the other end of the second curved part S13. The first housing 21 may have a first space 214 (see FIG. 6) provided by a combination of the first plate 211 (see FIG. 6 and FIG. 7) and the first side wall 212.

According to an embodiment, at least one of the first plate 211 (see FIG. 6 and FIG. 7), the first side wall 201, the second side wall 202, or the third side wall 203 may include, for example, a metallic material and/or a non-metallic material.

According to an embodiment, the first housing 21 may include a conductive structure (e.g., a metal part) including a metallic material and a non-conductive structure (e.g., a non-metal part) including a non-metallic material and connected to the conductive structure. The first plate 211 (see FIG. 6 and FIG. 7), the first side wall 201, the second side wall 202, or the third side wall 203 may be provided by the conductive structure and/or the non-conductive structure. In various embodiments, the first plate 211 (see FIG. 6 and FIG. 7), the first side wall 201, the second side wall 202, and the third side wall 203 may be provided by an integrated metal part, and may include the same material (e.g., a metallic material such as aluminum, stainless steel (STS), or a magnesium, or a non-metallic material, such as polymer).

According to an embodiment, at least a part of the conductive structure included in the first housing 21 may be used as an antenna radiator.

According to an embodiment, the back cover 23 may provide a part of the rear surface of the slidable electronic device 2 by being disposed on or coupled to a seating structure provided to the first plate 211 (see FIG. 6 and FIG. 7) or a seating structure provided by a combination of the first plate 211 (see FIG. 6 and FIG. 7) and the first side wall part 212. The seating structure may include, for example, a fitting structure (e.g., a recess providing a space enabling the back cover 23 to be fitted therein) (not illustrated separately) enabling the back cover to be stably positioned in the housing 21 without shaking. In an embodiment, the back cover 23 may be disposed in the seating structure through screw fastening. In various embodiments, the back cover 23 may be disposed in the seating structure through snap-fit fastening (e.g., a fastening structure using a hook) (not illustrated separately).

According to an embodiment, an amount by which the second housing 22 is inserted in the first space 214 (see FIG. 6) of the first housing 21 may increase at the time of a slide in of the second housing 22, and decrease at the time of a slide out of the second housing 22.

According to an embodiment, the second housing 22 may include a second plate 221 and a second side wall part 222 extending from the second plate 221.

According to an embodiment, when viewed from above the screen S1 (e.g., when viewed in the −z-axis direction), the second plate 221 may overlap with the screen S1. When viewed from above the screen S1, a region in which the first plate 211 (see FIG. 6 and FIG. 7) and the second plate 221 overlap with each other may decrease at the time of a slide out of the second housing 22, and increase at the time of a slide in of the second housing 22.

According to an embodiment, the second side wall part 222 may include a fourth side wall 204, a fifth side wall 205, and/or a sixth side wall 206. The fourth side wall 204 may be positioned to correspond to the second curved part S13 of the screen S1. The fourth side wall 204 may be positioned to be spaced apart from the first side wall 201 of the first housing 21 in the slide-out direction (e.g., the first direction ①), when viewed from above the screen S1. The fifth side wall 205 may extend from one end of the fourth side wall 204 to be positioned to correspond to a border region of one side of the screen S1, which connects one end of the first curved part S12 and one end of the second curved part S13. When viewed in the direction orthogonal to the slide-out direction and orthogonal to the direction (e.g., the +z-axis direction) which the screen S1 faces (when viewed in a y-axis direction), the fifth side wall 205 may overlap with the second side wall 202 of the first housing 21. The sixth side wall 206 may extend from the other end of the fourth side wall 204 to be positioned to correspond to a border region of the other side of the screen S1, which connects the other end of the first curved part S12 and the other end of the second curved part S13. When viewed in the direction orthogonal to the slide-out direction and orthogonal to the direction which the screen S1 faces, the sixth side wall 206 may overlap with the third side wall 203 of the first housing 21.

According to an embodiment, at least one of the second plate 221, the fourth side wall 204, the fifth side wall 205, or the sixth side wall 206 may include, for example, a metallic material and/or a non-metallic material.

According to an embodiment, the second housing 22 may include a conductive structure (e.g., a metal part) including a metallic material and a non-conductive structure (e.g., a non-metal part) including a non-metallic material and connected to the conductive structure. The second plate 221, the fourth side wall 204, the fifth side wall 205, or the sixth side wall 206 may be provided by the conductive structure and/or the non-conductive structure.

According to various embodiments, the second plate 221, the fourth side wall 204, the fifth side wall 205, and the sixth side wall 206 may be provided by an integrated metal part, and may include the same material (e.g., a metallic material such as aluminum, stainless steel (STS), or a magnesium, or a non-metallic material, such as polymer).

According to an embodiment, at least a part of the conductive structure included in the second housing 22 may be used as an antenna radiator.

According to an embodiment, the second plate 221, the fifth side wall 205, and the sixth side wall 206 may not be substantially exposed to the outside in a closed state of the slidable electronic device 2. The second plate 221, the fifth side wall 205, and the sixth side wall 206 may be seen to the outside in an open state of the slidable electronic device 2. The distance by which the fourth side wall 204 is spaced from the first side wall 201 in the slide-out direction (e.g., the first direction (D) may increase at the time of a slide out of the second housing 22 and decrease at the time of a slide in of the second housing 22. When viewed in the direction orthogonal to the slide-out direction and orthogonal to the direction which the screen S1 faces, a region in which the second side wall 202 and the fifth side wall 205 overlap with each other and a region in which the third side wall 203 and the sixth side wall 206 overlap with each other may decrease at the time of a slide out of the second housing 22, and increase at the time of a slide in of the second housing 22.

According to an embodiment, when viewed from above the screen S1 (e.g., when viewed from the −z-axis direction), a combination of the first side wall part 212 of the first housing 21 and the second side wall part 222 of the second housing 22 may provide a bezel (or a bezel structure, a screen bezel, or a screen bezel structure) surrounding the screen S1. The second housing 22 may have a first space (e.g., a second space 224 in FIG. 6) configured by a combination of the second plate 221 and the second side wall part 222.

According to an embodiment, the slidable housing 20 may have a recessed space due to a combination of the first housing 21 and the second housing 22. The recessed space of the slidable housing 20 may be expanded at the time of a slide out of the second housing 22 and reduced at the time of a slide in of the second housing 22 according to the relative position between the first space 214 (see FIG. 6) of the first housing 21 and the second space 224 (see FIG. 6) of the second housing 22. Elements accommodated in the recessed space of the slidable housing 20, elements accommodated in the first space 214 (see FIG. 6) of the first housing 21, or elements accommodated in the second space 224 (see FIG. 6) of the second housing 22 may be positioned not to interfere with sliding of the second housing 22.

According to an embodiment, the slidable housing 20 may have a sliding structure enabling the second housing 22 to be slid with respect to the first housing 21. The sliding structure may be provided between the first plate 211 (see FIG. 6 and FIG. 7) of the first housing 21 and the second plate 221 of the second housing 22, between the second side wall 202 of the first housing 21 and the fifth side wall 205 of the second housing 22, and/or between the third side wall 203 of the first housing 21 and the sixth side wall 206 of the second housing 22. The sliding structure may be implemented such that the second housing 22 is stably moved in the slide-out direction or slide-in direction without shaking while preventing/reducing escape from the first housing 21. For example, the sliding structure may include a guide rail including a groove or a recess corresponding to a sliding path of the second housing 22.

According to an embodiment, in order to reduce the frictional force between the first housing 21 and the second housing 22, a lubricating agent (e.g., grease) may be positioned between the first housing 21 and the second housing 22, or lubricant coating may be applied to a frictional surface between the first housing 21 and the second housing 22.

According to various embodiments, in order to reduce the frictional force between the first housing 21 and the second housing 22, a rolling member (not illustrated separately), such as a roller or a bearing, may be interposed between the first housing 21 and the second housing 22.

According to various embodiments, the slidable electronic device 2 may include a first support member 721 (see FIG. 6 and FIG. 7) coupled to the first housing 21 or at least partially integrated with the first housing 21. The first region ⓐ of the flexible display module 30 may be disposed on or coupled to the first support member 721 (see FIG. 6 and FIG. 7). The slidable electronic device 2 may include a second support member 722 (see FIG. 6 and FIG. 7) coupled to the second housing 22 or at least partially integrated with the second housing 22 so as to correspond to the second region ⓑ of the flexible display module 30. At the time of sliding of the second housing 22, the second region ⓑ may be ejected from an inner space of the sliding housing 20 or introduced into the inner space of the sliding housing 20 while being supported by the second support member 722 (see FIG. 6 and FIG. 7). For example, during a slide out of the second housing 22, at least a part of the second region ⓑ may be ejected from the inner space of the sliding housing 20 to the outside through the gap between the fourth side wall 204 and the second support member 722 (see FIG. 6 and FIG. 7) due to the relative position between the first support member 721 (see FIG. 6 and FIG. 7) coupled to the first region ⓐ and the second support member 722 (see FIG. 6 and FIG. 7) corresponding to at least a part of the second region ⓑ. For example, during a slide in of the second housing 22, at least a part of the second region ⓑ may be introduced from the inner space of the sliding housing 20 through the gap between the fourth side wall 204 and the second support member 722 (see FIG. 6 and FIG. 7) due to the relative position between the first support member 721 (see FIG. 6 and FIG. 7) coupled to the first region ⓐ and the second support member 722 (see FIG. 6 and FIG. 7) corresponding to at least a part of the second region ⓑ. One surface of the first support member 721 (see FIG. 6 and FIG. 7), which is coupled to the first region ⓐ of the flexible display module 30, may include, for example, a flat region and a curved region. The flat region of the first support member 721 (see FIG. 6) may contribute to formation of the first flat part S11 of the screen S1. The curved region of the first support member 721 (see FIG. 6) may contribute to formation of the first curved part S12 of the screen S1. The second curved part S13 of the screen S1 may be configured to correspond to a curved part of the second support member 722 (see FIG. 6 and FIG. 7). In an embodiment, in a closed state of the slidable electronic device 2, the first flat part S1 of the screen S1 may include a first flat region S11, and in an open state of the slidable electronic device 2, the first flat part S11 of the screen S1 may include the first flat region S111 and a second flat region S112. The first flat region S111 may be supported by the first support member 721 (see FIG. 6 and FIG. 7). The second flat region S112 may be supported by the second support member 722 (see FIG. 6 and FIG. 7) at the time of a slide out of the second housing 22.

According to various embodiments, in a state where the second region ⓑ of the flexible display module 30 has been at least partially introduced in the inner space of the slidable housing 20 (e.g., in a closed state of the slidable electronic device 2), at least a part of the second region ⓑ may be visually seen from the outside through the back cover 23. In this case, at least a partial region of the back cover 23 may be implemented to be transparent or semi-transparent. In various embodiments, in a case where there is a member positioned between the back cover 23 and at least a part of the second region ⓑ in a closed state of the slidable electronic device 2, at least a partial region of the member may include an opening or may be transparent or semi-transparent.

According to an embodiment, the slidable electronic device 2 may include at least one of one or more sound input modules, one or more sound output modules (e.g., the sound output module 155 in FIG. 1), one or more sensor modules (e.g., the sensor module 176 in FIG. 1), one or more camera modules (e.g., the camera module 180 in FIG. 1), one or more light emitting modules, one or more key input modules (e.g., the input module 150 in FIG. 1), and/or one or more connection terminals (e.g., the connection terminal 178). In various embodiments, the slidable electronic device 2 may omit at least one of the elements or additionally include a different element. The position or the number of elements may be various.

One of the one or more sound output modules may include, for example, a microphone (not illustrated separately) positioned in the slidable electronic device 2 to correspond to a microphone hole (not illustrated separately) provided on an exterior of the slidable electronic device 2.

One of the one or more sound output modules may include, for example, a speaker (not illustrated separately) positioned in the slidable electronic device 2 to correspond to a speaker hole (not illustrated separately) provided on the exterior of the slidable electronic device 2. The speaker may include a multimedia reproduction or recording reproduction speaker or a call speaker (e.g., a receiver corresponding to a speaker hole 401).

According to various embodiments, the microphone hole and the speaker hole may be implemented as one hole (not illustrated separately). In various embodiments, the slidable electronic device 2 may include a speaker (e.g., a piezo speaker) (not illustrated separately) requiring no speaker hole.

One of the one or more sensor modules may include, for example, an optical sensor (not illustrated separately) positioned in the inner space of the slidable housing 20 to correspond to the screen S1. The optical sensor may include, for example, a proximity sensor or an illuminance sensor. The optical sensor may be aligned with an opening (not illustrated separately) provided on the first region ⓐ of the flexible display module 30 or may be at least partially inserted in the opening. External light may arrive at the optical sensor through a transparent cover and the opening of the first region ⓐ. The transparent cover functions to protect a flexible display (or a flexible display panel) of the flexible display module 30 from the outside, and for example, may be implemented by a flexible member such as a plastic film (e.g., a polyimide film) or ultra-thin glass (UTG).

According to various embodiments, the optical sensor may be positioned on a back surface of the first region ⓐ of the flexible display module 30, or below or beneath the first region ⓐ. In an embodiment, the optical sensor may be aligned with a recess provided on the back surface of the first region ⓐ or may be at least partially inserted in the recess. The optical sensor may be disposed to overlap with at least a part of the screen S1, and thus perform a sensing function while not being exposed to the outside. In various embodiments, a partial region of the first region ⓐ, which at least partially overlaps with the optical sensor, may include a different pixel structure and/or wiring structure compared to the other regions. For example, the partial region of the first region ⓐ, which at least partially overlaps with the optical sensor, may have a different pixel density (e.g., the number of pixels per unit area) compared to the other regions. In an embodiment, the partial region of the first region ⓐ, which at least partially overlaps with the optical sensor, may not include multiple pixels arranged therein.

According to various embodiments, the slidable electronic device 2 may include a biometric sensor (e.g., a fingerprint sensor) (not illustrated separately) positioned on the back surface of the first region ⓐ of the flexible display module 30, or below the first region ⓐ. The biometric sensor may be implemented to be an optical type, a capacitive type, or an ultrasonic type, and the position or number thereof may be various.

One of the one or more camera modules may include, for example, multiple rear camera modules 4021, 4022, and 4023 positioned to correspond to the back cover 23. For example, the back cover 23 may include multiple openings (e.g., camera holes) configured to correspond to the multiple rear camera modules 4021, 4022, and 4023, and the multiple rear camera modules 4021, 4022, and 4023 may be exposed to the outside through the multiple openings. In an embodiment, the back cover 23 may include a light transmission region corresponding to the multiple rear camera modules 4021, 4022, and 4023 without camera holes.

According to an embodiment, the multiple rear camera modules 4021, 4022, and 4023 may have different attributes (e.g., angles of view) or functions. The multiple rear camera modules 4021, 4022, and 4023 may include lenses having different angles of view. The slidable electronic device 2 may change the angles of view of the multiple rear camera modules 4021, 4022, and 4023 performed in the slidable electronic device 2, based on a user's selection. The rear camera modules 4021, 4022, and 4023 may include a wide-angle camera, a telephoto camera, a color camera, a monochrome camera, or an infrared (IR) camera (e.g., a time-of-flight (TOF) camera, or a structured light camera). In various embodiments, a rear camera module including an IR camera may be operated as at least a part of a sensor module. The number or position of the rear camera modules may be various without being limited to the illustrated example.

According to an embodiment, a first light emitting module 403 (e.g., flash) among the one or more light emitting modules may be exposed to the outside through an opening (e.g., a flash hole) provided on the back cover 23. In an embodiment, the back cover 23 may include a light transmission region corresponding to the first light emitting module 403 without a flash hole. The first light emitting module 403 may include a light source for the rear camera modules 4021, 4022, and 4023. The first light emitting module 403 may include, for example, a light emitting diode (LED) or a xenon lamp.

According to various embodiments, a second light emitting module (e.g., an LED, an IR LED, or a xenon lamp) (not illustrated separately) among the one or more light emitting modules may visually provide state information of the slidable electronic device 2.

According to various embodiments, the slidable electronic device 2 may include, for example, a front camera module (not illustrated separately) positioned in the inner space of the slidable housing 20 to correspond to the screen S1. The first region ⓐ of the flexible display module 30 may include an opening (not illustrated separately) aligned with the front camera module. External light may arrive at the front camera module through a transparent cover (e.g., a flexible film functioning to protect the flexible display module 30 from the outside) and the opening of the first region ⓐ. The opening of the first region ⓐ aligned with or overlapping with the front camera module may be provided in a through hole type or a notch type.

According to various embodiments, the front camera module may be positioned on the back surface of the first region ⓐ of the flexible display module 30, or below or beneath the first region ⓐ. The front camera module or the position of the front camera module may not be substantially visually distinguished (or exposed). The front camera module may include, for example, a hidden display back camera (e.g., an under display camera (UDC)).

According to various embodiments, the front camera module may be aligned with a recess positioned on the back surface of the first region ⓐ of the flexible display module 30, or may be at least partially inserted in the recess. The front camera module may be disposed to overlap with at least a part of the screen S1, and thus obtain an image an external subject while not being exposed to the outside. In various embodiments, a partial region of the first region (a), that at least partially overlaps with the front camera, module may include a different pixel structure and/or wiring structure compared to the other regions. For example, the partial region of the first region (a), which at least partially overlaps with the front camera module, may have a different pixel density (e.g., the number of pixels per unit area) compared to the other regions. A pixel structure and/or wiring structure disposed in the partial region of the first region (a), which at least partially overlaps with the front camera module, may reduce light loss between the outside and the front camera module. In an embodiment, the partial region of the first region (a), which at least partially overlaps with the front camera module, may include no pixel disposed therein.

According to various embodiments, the front camera module may be positioned to correspond to the second side wall 202 of the first housing 21.

The one or more key input modules may include, for example, a first key input module 4041 or a second key input module 4042. The first key input module 4041 may include, for example, a first key positioned on the first side wall 201 and a key signal generator (not illustrated separately) that generates a key signal in response to a push or a touch on the first key. The second key input module 4042 may include, for example, a second key positioned on the first side wall 201 and a key signal generator (not illustrated separately) that generates a key signal in response to a push or a touch on the second key. The position or number of the key input modules may be various without being limited to the illustrated example.

According to various embodiments, the slidable electronic device 2 may not include some or all of the key input modules, and a key input module not included may be implemented as a soft key using a screen.

One of the one or more connection terminals (or connector modules or interface terminal modules) may include a connector (or interface terminal) positioned inside the slidable electronic device 2 to correspond to a connector hole (not illustrated separately) provided on the exterior of the slidable electronic device 2. The slidable electronic device 2 may transmit and/or receive power and/or data with an external electronic device electrically connected to the connector. The connector may include, for example, a USB connector or an HDMI connector.

Figure 6:
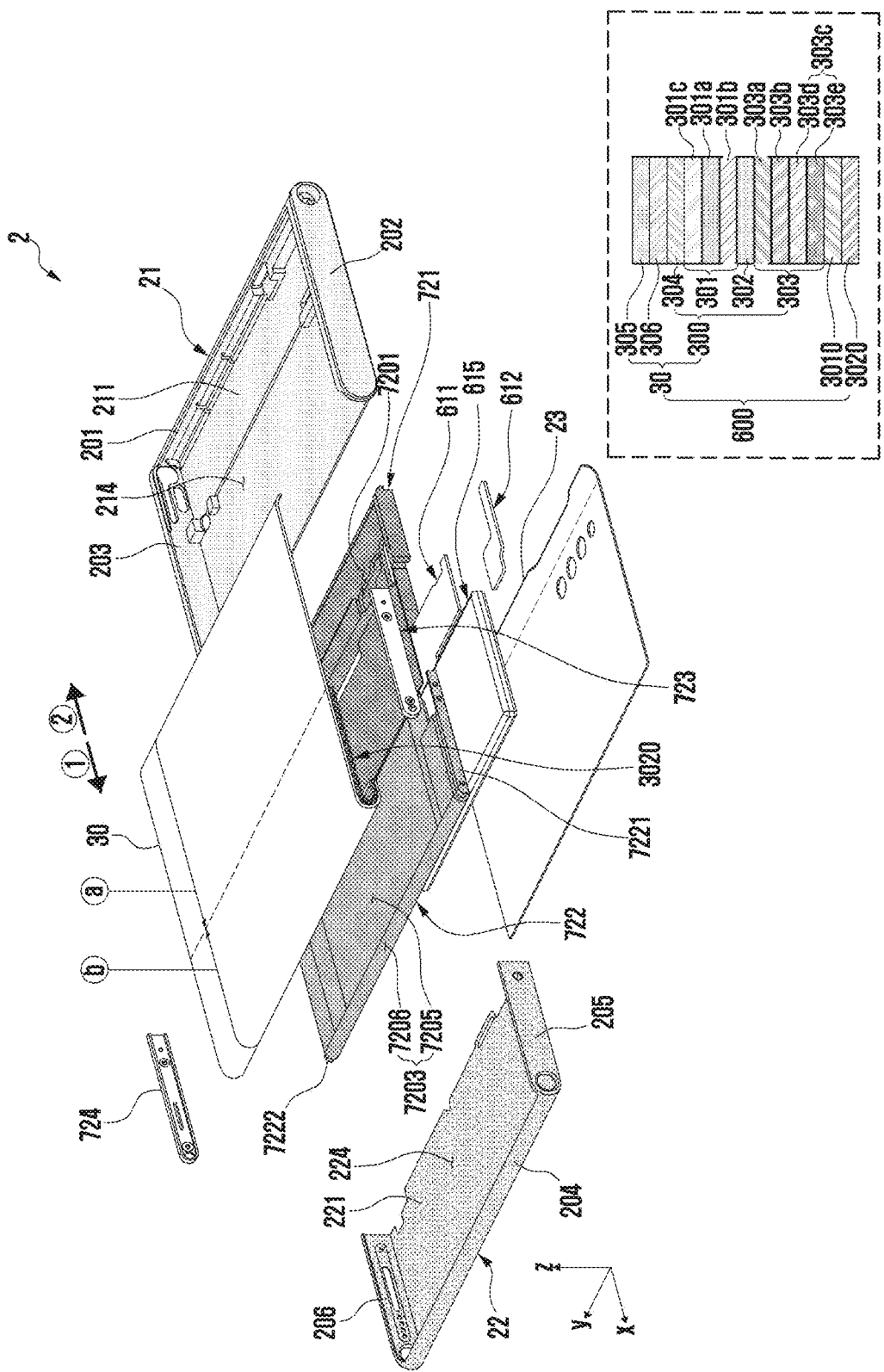
FIG. 6 and FIG. 7 are exploded perspective views of a slidable electronic device and a display assembly according to various embodiments.
Figure 7:
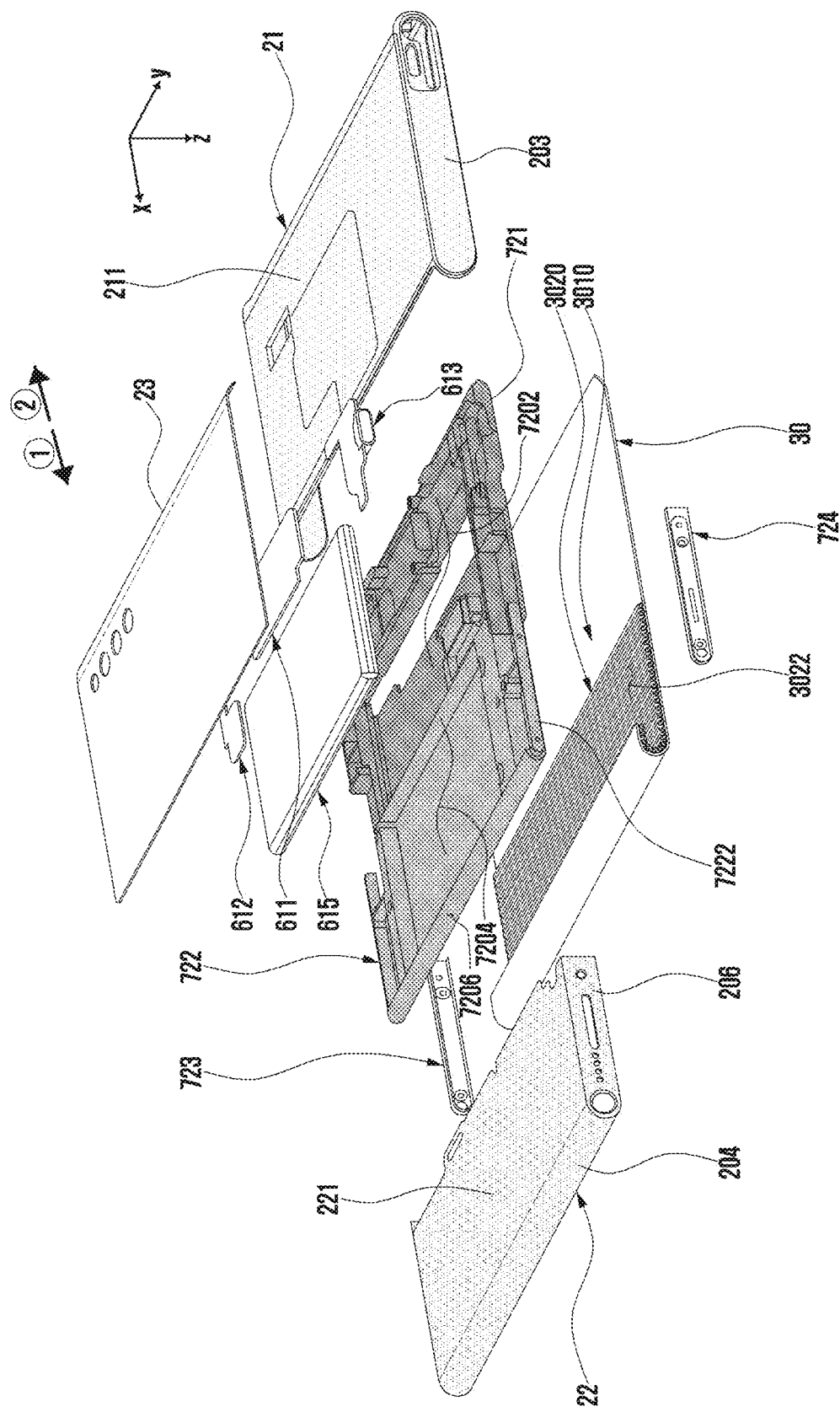
Figure 8:
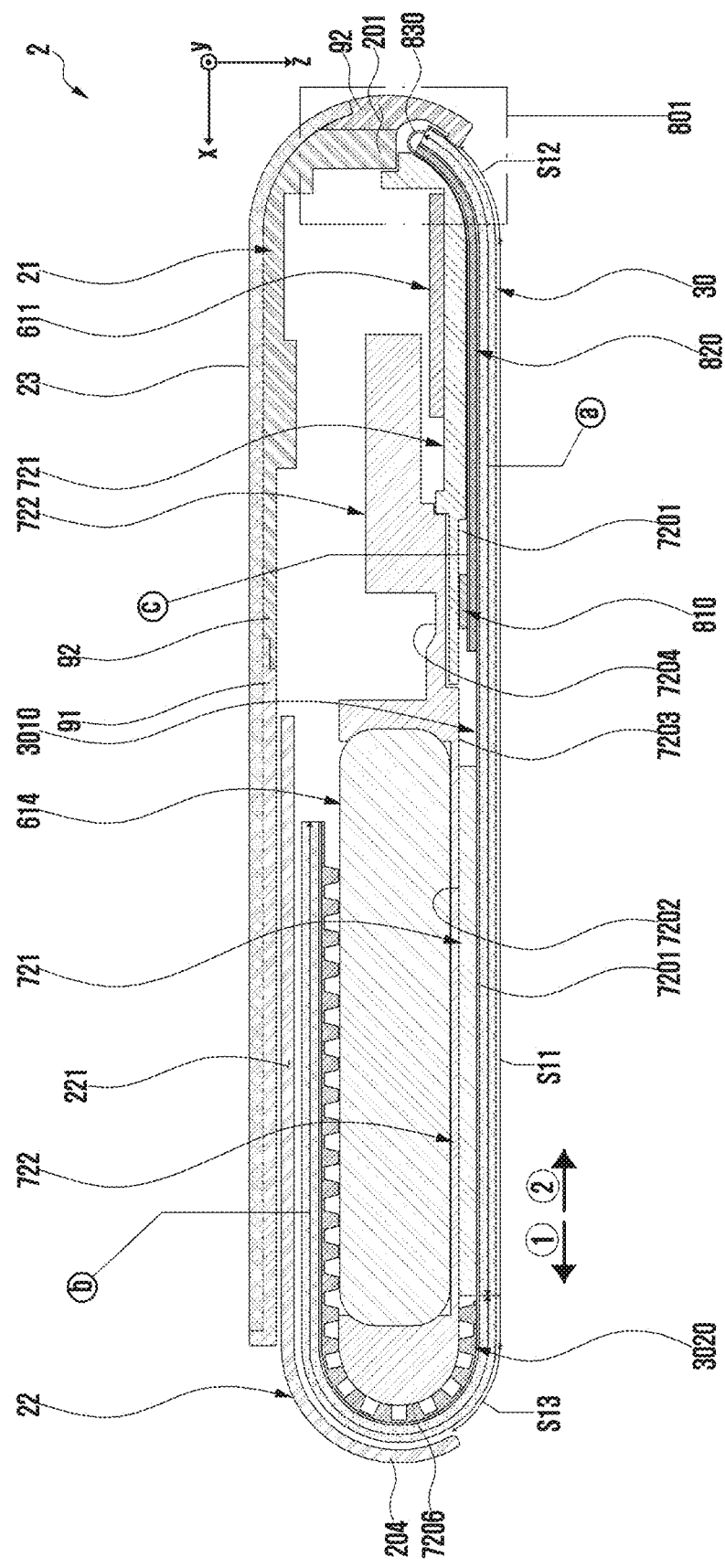
FIG. 8 is a cross-sectional view of a slidable electronic device taken along line A-A' in FIG. 3 according to various embodiments.
Figure 9:
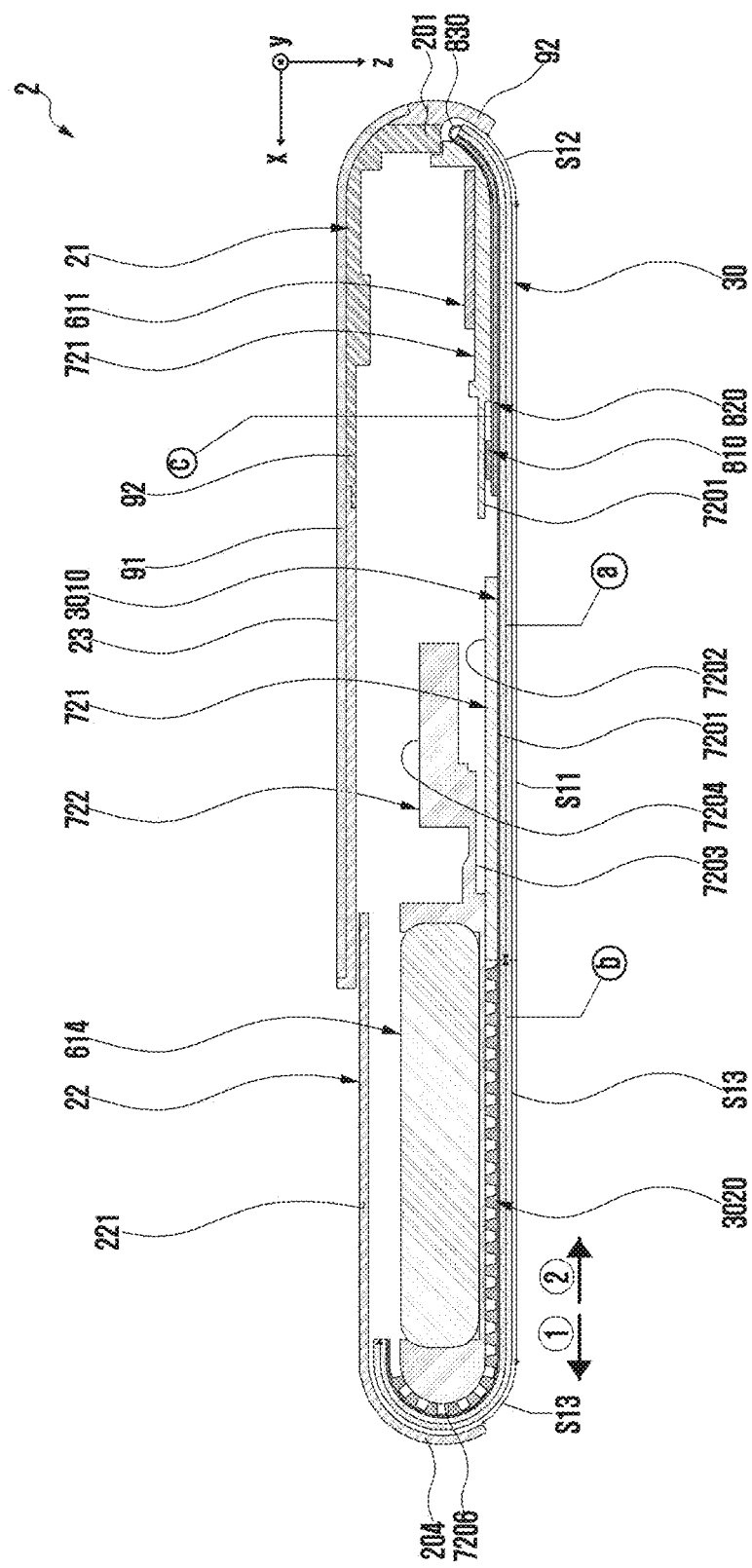
FIG. 9 is a cross-sectional view of a slidable electronic device taken along line B-B' in FIG. 5 according to various embodiments.

FIG. 6 and FIG. 7 are exploded perspective views of the slidable electronic device 2 and a sectional view of a display assembly 600 according to various embodiments. FIG. 8 is a cross-sectional view of the slidable electronic device 2 taken along line A-A' in FIG. 3 according to various embodiments. FIG. 9 is a cross-sectional view of the slidable electronic device 2 taken along line B-B' in FIG. 5 according to various embodiments.

Referring to FIGS. 6, 7, 8, and 9, the slidable electronic device 2 may include the first housing 21, the second housing 22, the display assembly 600, a first printed circuit board 611, a second printed circuit board 612, a third printed circuit board 613, a fourth printed circuit board 614, a battery 615, the first support member 721, the second support member 722, a third support member 723, a fourth support member 724, a display driver circuit 810, and/or an adhesive member (or a bonding member) 820.

According to an embodiment, the first support member 721 may be positioned inside the slidable electronic device 2 to correspond to the first housing 21. The first support member 721 may be connected to the first housing 21, or at least a part of the first support member 721 may be integrated with the first housing 21. The first housing 21 may have the first space 214 provided by a combination of the first plate 211, the first side wall 201, the second side wall 202, and the third side wall 203. The first support member 721 may be at least partially positioned in the first space 214, and may be connected to the first plate 211, the first side wall 201, the second side wall 202, or the third side wall 203 or may be at least partially integrated therewith. The first housing 21 may include a first seating structure enabling the first support member 721 to be stably positioned. The first seating structure may include, for example, a fitting structure or a recess structure enabling the first support member 721 to be stably positioned on the housing 21 without shaking. In an embodiment, the first support member 721 positioned in the first seating structure may be coupled to the first housing 21 through screw fastening. In an embodiment, the first support member 721 may be coupled to the first housing 21 through snap-fit fastening. The snap-fit fastening may include a hook (or a hook structure) and a hook fastening structure (or an engagement structure) to which the hook is able to be fastened. For example, the hook may be disposed on the first support member 721, and the hook fastening structure may be disposed on the first housing 21. As another example, the hook may be disposed on the first housing 21, and the hook fastening structure may be disposed on the first support member 721. In an embodiment, the first seating structure may be interpreted as including a structure for screw fastening or a structure for snap-fit fastening. In an embodiment, the first support member 721 may be coupled to the first housing 21 through bonding using an adhesive material (or a bonding material). A combination of the first housing 21 and the first support member 721 configures a first frame (or a first frame structure or a first framework) capable of bearing a load, and thus contribute to the durability or rigidity of the slidable electronic device 2. Electronic components or various members related to the electronic components may be arranged on the first frame or supported by the first frame. The first support member 721 is a first internal structure positioned in an inner space of the slidable electronic device 2 to correspond to the first housing 21, and in an embodiment, may be called various other terms, such as a "first bracket" or a "first support structure". In an embodiment, the first support member 721 may be interpreted as a part of the first housing 21.

According to an embodiment, the second support member 722 may be positioned inside the slidable electronic device 2 to correspond to the second housing 22. The second support member 722 may be connected to the second housing 22, or at least a part of the second support member 722 may be integrated with the second housing 22. The second housing 22 may have the second space 224 provided by a combination of the second plate 221, the fourth side wall 204, the fifth side wall 205, and the sixth side wall 206. The second support member 722 may be at least partially positioned in the second space 224, and may be connected to the second plate 221, the fourth side wall 204, the fifth side wall 205, or the sixth side wall 206 or may be at least partially integrated therewith. The second housing 22 may include a second seating structure enabling the second support member 722 to be stably positioned. The second seating structure may include, for example, a fitting structure or a recess structure enabling the second support member 722 to be stably positioned in the housing 22 without shaking. In an embodiment, the second support member 722 positioned in the second seating structure may be coupled to the second housing 22 through screw fastening. In an embodiment, the second support member 722 may be coupled to the second housing 22 through snap-fit fastening. For example, in snap-fit fastening, a hook may be disposed on the second support member 722, and a hook fastening structure may be disposed on the second housing 22. As another example, in snap-fit fastening, the hook may be disposed on the second housing 22, and the hook fastening structure may be disposed on the second support member 722. In an embodiment, the second seating structure may be interpreted as including a structure for screw fastening or a structure for snap-fit fastening. In an embodiment, the second support member 722 may be coupled to the second housing 22 through bonding using an adhesive material (or a bonding material). A combination of the second housing 22 and the second support member 722 configures a second frame (or a second frame structure or a second framework) capable of bearing a load, and thus contribute to the durability or rigidity of the slidable electronic device 2. Electronic components or various members related to the electronic components may be arranged on the second frame or supported by the frame. The second support member 722 is a second internal structure positioned in an inner space of the slidable electronic device 2 to correspond to the second housing 22, and in an embodiment, may be called various other terms, such as a "second bracket" or a "second support structure". In an embodiment, the second support member 722 may be interpreted as a part of the second housing 22.

According to an embodiment, the first support member 721 and/or the second support member 722 may include a metallic material. The first support member 721 and/or the second support member 722 may include, for example, magnesium, magnesium alloy, aluminum, aluminum alloy, zinc alloy, or copper alloy. As another example, the first support member 721 and/or the second support member 722 may include titanium, amorphous alloy, metal-ceramic composite material (e.g., cermet), or stainless steel. In an embodiment, the first support member 721 and the second support member 722 may include the same metallic material. In an embodiment, the first support member 721 may include a first metallic material, and the second support member 722 may include a second metallic material different from the first metallic material.

In an embodiment, the first support member 721 or the second support member 722 may include a conductive structure (not illustrated separately) including a metallic material and a non-conductive structure (not illustrated separately) including a non-metallic material and connected to the conductive structure.

According to an embodiment, the first support member 721 or the second support member 722 may include a first conductive structure (not illustrated separately) including a metallic material and a second conductive structure (not illustrated separately) including a metallic material different from that of the first conductive structure and connected to the first conductive structure.

According to an embodiment, the first support member 721 may include a first support region 7201, and a second support region 7202 positioned opposite to the first support region 7201. The second support region 7202 may face the first plate 211 of the first housing 21. The first region ⓐ of the flexible display module 30 may be disposed on the first support region 7201. The first region ⓐ of the flexible display module 30 may be disposed on the first support member 721, for example, through various materials, such as a thermoresponsive adhesive material (or a thermoresponsive bonding material), a photoresponsive adhesive material (or a photoresponsive bonding material), a normal adhesive agent (or a normal bonding agent), double-sided tape, or an organic adhesive material (or an organic bonding material). A flat region included in the first support region 7201 may contribute to formation of the first flat region S111 (see FIG. 2 or FIG. 4) of the screen S1. A curved region included in the first support region 7201 may contribute to formation of the first curved part S12 (see FIG. 2 or FIG. 4).

According to an embodiment, the second support region 7202 may include a seating structure for positioning electronic components. For example, the first printed circuit board 611, the second printed circuit board 612, and the third printed circuit board 613 may not overlap with each other when viewed from above the second support region 7202 (e.g., when viewed in the −z-axis direction), and the seating structure may include a fitting structure or a recess structure enabling the first printed circuit board 611, the second printed circuit board 612, and the third printed circuit board 613 to be positioned on the first support member 721 without shaking. The first printed circuit board 611, the second printed circuit board 612, and the third printed circuit board 613 may be disposed in the seating structure through screw fastening. In an embodiment, the seating structure for the first printed circuit board 611, the second printed circuit board 612, or the third printed circuit board 613 may include a hook structure for snap-fit fastening.

According to an embodiment, the second printed circuit board 612 may be positioned closer to the second side wall 202 of the first housing 21 than to the third side wall 203, and the third printed circuit board 613 may be positioned closer to the third side wall 203 of the first housing 21 than to the second side wall 202. The first printed circuit board 611 may be positioned between the second printed circuit board 612 and the third printed circuit board 613. The first printed circuit board 611 may be electrically connected to the second printed circuit board 612 and the third printed circuit board 613 through an electrical path such as a cable or a flexible printed circuit board (FPCB). The first printed circuit board 611, the second printed circuit board 612, or the third printed circuit board 613 may include, for example, a printed circuit board (PCB), a flexible PCB (FPCB), or a rigid-flexible PCB (RFPCB). In an embodiment, in replacement of the first printed circuit board 611, the second printed circuit board 612, and the third printed circuit board 613, two printed circuit boards or an integrated printed circuit board may be implemented.

According to an embodiment, the second support member 722 may include a third support region 7203 and a fourth support region 7204. The third support region 7203 may support the second region ⓑ of the flexible display module 30. The fourth support region 7204 may face the second plate 221 of the second housing 22. At the time of sliding of the second housing 22, the second region ⓑ of the flexible display module 30 may be ejected from the inner space of the sliding housing 20 or introduced into the inner space of the sliding housing 20 while being supported by the third support region 7203 of the second support member 722.

According to an embodiment, the third support region 7203 may include a flat region 7205 and a curved region 7206. The flat region 7205 of the third support region 7203 may support a part of the second region ⓑ of the flexible display module 30, which includes the second flat region S112 (see FIG. 4) of the screen S1 in an open state of the slidable electronic device 2 or sliding of the second housing 22. At the time of a slide out of the second housing 22, an area of the flat region 7205 of the third support region 7203, which is not covered by the first support member 721 and thus supports the flexible display module 30, may be increased. The curved region 7206 of the third support region 7203 may be positioned to correspond to the fourth side wall 204 of the second housing 22. During a slide out or slide in of the second housing 22, the second region ⓑ of the flexible display module 30 may be moved in a curved space between the curved region 7206 of the third support region 7203 and the fourth side wall 204 of the second housing 22. The curved region 7206 of the third support region 7203 may support a part of the second region ⓑ of the flexible display module 30, which includes the second curved part S13 (see FIG. 2 or FIG. 4) of the screen S1. The curved region 7206 of the third support region 7203 may contribute to formation of the second curved part S13 (see FIG. 2 or FIG. 4) of the screen S1.

According to an embodiment, the fourth support region 7204 of the second support member 722 may include a seating structure for positioning electronic components. For example, the battery 615 may be positioned on the second support member 722, and the seating structure of the second support member 722 may include a fitting structure or a recess structure enabling the battery 615 to be positioned on the second support member 722 without shaking.

According to an embodiment, the battery 615 is a device configured to supply power to at least one element of the slidable electronic device 2, and may include, for example, a non-rechargeable primary battery, a rechargeable secondary battery, or a fuel cell. In an embodiment, the slidable electronic device 2 may further include an additional battery positioned in the seating structure of the first support member 721.

According to an embodiment, the display assembly 600 may include the flexible display module 30, a support sheet 3010, and/or a display support structure 3020.

According to an embodiment, the flexible display module 30 may include a flexible display 300, a transparent cover 305, and an optical transparent adhesive member 306 (or an optical transparent bonding member). For example, the flexible display 300 may be coupled to the transparent cover 305 through the optical transparent adhesive member 306 (e.g., optical clear adhesive (OCA), optical clear resin (OCR), or super view resin (SVR)). The transparent cover 305 (e.g., a window) may protect the flexible display 300 from the outside by covering the flexible display 300. The transparent cover 305 may be implemented as a thin film type (e.g., a thin film layer) having flexuosity. The transparent cover 305 may include, for example, a plastic film (e.g., a polyimide film) or thin glass (e.g., ultra-thin glass).

According to various embodiments, the transparent cover 305 may include multiple layers (not illustrated separately). For example, the transparent cover 305 may be configured such that multiple coating layers are arranged on a plastic film or thin glass. The transparent cover 305 may be configured such that at least one protective layer or coating layer including, for example, a polymer material (e.g., poly ethylene terephthalate (PET), polyimide (PI), or thermoplastic polyurethane (TPU)) is disposed on a plastic film or thin glass.

According to various embodiments, the transparent cover 305 and the optical transparent adhesive member 306 may include a part of the flexible display 300.

According to an embodiment, the flexible display 300 may include a display panel 301, a base film 302, a lower panel 303, and/or an optical layer 304. The display panel 301 may be positioned between the optical layer 304 and the base film 302. The base film 302 may be positioned between the display panel 301 and the lower panel 303. The optical layer 304 may be positioned between the optical transparent adhesive member 306 and the display panel 301. An adhesive member (or bonding member) (not illustrated separately) which is a type of various polymers may be disposed between the display panel 301 and the base film 302, between the base film 302 and the lower panel 303, and/or between the display panel 301 and the optical layer 304.

According to an embodiment, the display panel 301 may include a light emitting layer 301a, a thin film transistor (TFT) film (or TFT substrate) 301b, and/or an encapsulation layer (encapsulation) (e.g., thin-film encapsulation (TFE)) 301c. The light emitting layer 301a may include, for example, multiple pixels implemented by a light emitting element such as an organic light emitting diode (OLED) or a micro LED. The light emitting layer 301a may be disposed on the TFT film 301b through organic material deposition (evaporation). The TFT film 301b may be positioned between the light emitting layer 301a and the base film 302. The TFT film 301b may indicate a film structure in which at least one TFT is disposed on a flexible substrate (e.g., a PI film) through a series of processes, such as deposition, patterning, and/or etching. The at least one TFT may control a current for a light emitting element of the light emitting layer 301a to adjust on/off of a pixel or the brightness of the pixel. The at least one TFT may be implemented as, for example, an amorphous silicon (a-Si) TFT, a liquid crystalline polymer (LCP) TFT, a low-temperature polycrystalline oxide (LTPO) TFT, or a low-temperature polycrystalline silicon (LTPS) TFT.

According to an embodiment, the display panel 301 may include a storage capacitor, and the storage capacitor may maintain a voltage signal to the pixel, maintain the voltage applied to the pixel within one frame, or reduce a change of the gate voltage of the TFT caused by current leakage during a light emission time. The storage capacitor may maintain the voltage applied to the pixel at regular time intervals using a routine (e.g., initialization and data write) for controlling the at least one TFT.

According to an embodiment, the display panel 301 may be implemented based on an OLED, and the encapsulation layer 301c may cover the light emitting layer 301a. An organic material emitting light and an electrode included in the OLED may lose a light emission characteristic due to its very sensitive responsiveness to oxygen and/or moisture, and thus in order to reduce and/or prevent the loss, the encapsulation layer 301c may hermetically encapsulate the light emitting layer 301a to prevent and/or reduce penetration of oxygen and/or moisture into the OLED. The encapsulation layer 301c may act as a pixel protection layer for protecting the multiple pixels of the light emitting layer 301a.

According to an embodiment, the base film 302 may include a flexible film made of plastic or polymer, such as polyimide or polyester (PET). The base film 302 may function to support and protect the display panel 301. In various embodiments, the base film 302 may be called a protective film, a back film, or a back plate.

According to an embodiment, the lower panel 303 may include multiple layers for various functions. An adhesive member (or bonding member) (not illustrated separately) which is a type of various polymers may be disposed between the multiple layers included in the lower panel 303. The lower panel 303 may include, for example, a light blocking layer 303a, a buffering layer 303b, or a lower layer 303c. The light blocking layer 303a may be positioned between the base film 302 and the buffering layer 303b. The buffering layer 303b may be positioned between the light blocking layer 303a and the lower layer 303c. The light blocking layer 303a may at least partially block the light incident from the outside. For example, the light blocking layer 303a may include an embossed layer. The embossed layer may be a black layer including an uneven pattern. The buffering layer 303b may alleviate the external impact applied to the flexible display 300. For example, the buffering layer 303b may include a sponge layer or a cushion layer. The lower layer 303c may diffuse, dissipate, or release the heat generated from the slidable electronic device 2 or the flexible display 300. The lower layer 303c may absorb or shield electromagnetic waves. The lower layer 303c may alleviate the external impact applied to the slidable electronic device 2 or the flexible display 300.

According to an embodiment, the lower layer 303c may include a complex sheet 303d or a copper sheet 303e. The complex sheet 303d may be a sheet obtained by combining and processing layers or sheets having different properties. For example, the complex sheet 303d may include at least one of polyimide or graphite. The complex sheet 303d may be replaced with a single sheet including one material (e.g., polyimide or graphite). The complex sheet 303d may be positioned between the buffering sheet 303b and the copper sheet 303e. The copper sheet 303e may be replaced with various other metal sheets.

According to various embodiments, at least a part of the lower layer 303c may include a conductive member (e.g., a metal plate). The conductive member of the lower layer 303c may assist in reinforcing the rigidity of the slidable electronic device 2. The conductive member of the lower layer 303c may shield ambient noise. The conductive member of the lower layer 303c may be used to dissipate the heat radiated from a surrounding heat radiation component (e.g., the display driver circuit 810 in FIG. 8). The conductive member of the lower layer 303c may include, for example, at least one of copper (Cu), aluminum (Al), stainless steel (SUS), or CLAD (e.g., a stacked member in which SUS and Al are alternately arranged).

According to various embodiments, the lower layer 303c may include multiple layers for various other functions.

According to various embodiments, at least one an additional polymer layer (e.g., a layer including PI, PET, or TPU) other than the base film 302 may be further disposed on a back surface of the display panel 301.

According to various embodiments, at least one of the multiple layers (e.g., the light blocking layer 303a, the buffering layer 303b, the complex sheet 303d, and the copper sheet 303e) included in the lower panel 303 may be omitted.

According to various embodiments, the order of arrangement of the multiple layers included in the lower panel 303 may be variously changed without being limited to the illustrated embodiment.

According to an embodiment, the optical layer 304 may include, for example, a polarizing layer (or polarizer) or a phase retarding layer (retardation layer or retarder). The optical transparent adhesive member 306 may be positioned between the transparent cover 305 and the optical layer 304. The polarizing layer and the phase retarding layer may improve outdoor visibility of the screen. The optical layer 304 may selectively transmit, for example, the light generated from a light source of the display panel 301 and vibrating in a predetermined direction. In various embodiments, a single layer which the polarizing layer and the phase retarding layer are combined into may be provided, and this layer may include a "circular polarizing layer".

According to various embodiments, the polarizing layer (or circular polarizing layer) may be omitted, and in this case, a black pixel define layer (PDL) and/or a color filter may be provided in replacement of the polarizing layer.

According to an embodiment, the slidable electronic device 2 may include a touch sensing circuit (e.g., a touch sensor) (not illustrated separately). The touch sensing circuit may be implemented by a transparent conductive layer (or film) based on various conductive materials, such as indium tin oxide (ITO).

According to an embodiment, the touch sensing circuit (not illustrated separately) may be disposed between the transparent cover 305 and the optical layer 304 (e.g., add-on type).

According to various embodiments, the touch sensing circuit (not illustrated separately) may be disposed between the optical layer 304 and the display panel 301 (e.g., on-cell type).

According to various embodiments, the display panel 301 may include a touch sensing circuit or a touch sensing function (e.g., in-cell type).

According to an embodiment, the display panel 301 may be based on an OLED, and the encapsulation layer 301c of the display panel 301 may be disposed between the light emitting layer 301a and the optical layer 304. In an embodiment, the flexible display 300 may include a conductive pattern (not illustrated separately), such as a metal mesh (e.g., an aluminum metal mesh), as a touch sensing circuit disposed on the encapsulation layer 301c between the encapsulation layer 301c and the optical layer 304. For example, the metal mesh may have a durability larger than that of a transparent conductive layer implemented by ITO, so as to correspond to bending of the flexible display 300.

According to various embodiments, the flexible display 300 may further include a pressure sensor (not illustrated separately) capable of measuring the strength (pressure) of a touch.

According to various embodiments, the display assembly 600 or the flexible display 300 may include an electromagnetic induction panel (e.g., a digitizer) (not illustrated separately) that detects a pen input device (e.g., an electronic pen or a stylus pen) employing a magnetic field type.

According to various embodiments, the display panel 301 or the multiple layers included in the lower panel 303, and the stacked structure or the stacking order thereof may be various. The flexible display 300 may be implemented to omit some of elements or add a different element according to the provided type thereof or the trend of convergence.

According to an embodiment, the support sheet 3010 (or support plate or support layer) may be disposed on a back surface of the flexible display module 30. The back surface of the flexible display module 30 may indicate a surface positioned opposite to a surface through which light is emitted from the display panel 301 including multiple pixels. For example, the support sheet 3010 may cover at least a part of the lower panel 303 of the flexible display module 30 and be attached to a back surface of the lower panel 303. The support sheet 3010 may be coupled to the lower panel 303 through an adhesive material (or a bonding material) (not illustrated separately). The support sheet 3010 may be positioned between the lower panel 303 and the display support structure 3020, and may be coupled to the display support structure 3020.

According to an embodiment, the flexible display 300 and the support sheet 3010 may be coupled through a thermo-responsive adhesive material (or a thermoresponsive bonding material), a photoresponsive adhesive material (or a photoresponsive bonding material), a normal adhesive agent (or a normal bonding agent), or a material like double-sided tape (not illustrated separately). The support sheet 3010 and the support structure 3020 may be coupled through a thermoresponsive adhesive material (or a thermoresponsive bonding material), a photoresponsive adhesive material (or a photoresponsive bonding material), a normal adhesive agent (or a normal bonding agent), or a material like double-sided tape (not illustrated separately).

According to various embodiments, the flexible display 300 and the support sheet 3010 may be coupled through various polymers such as triazine thiol, dithio pyridine, or silane-based compounds, or organic adhesive materials (or organic bonding materials) such as sealants. The support sheet 3010 and the support structure 3020 may be coupled through various polymers such as triazine thiol, dithio pyridine, or silane-based compounds, or organic adhesive materials (or organic bonding materials) such as sealants.

According to an embodiment, the support sheet 3010 may contribute to the durability (e.g., rigidity reinforcement) of the flexible display module 30. The support sheet 3010 may reduce the effect of, on the flexible display module 30, the load or stress which may occur in sliding of the second housing 22 with respect to the first housing 21. The support sheet 3010 may reduce or prevent damage of the flexible display module 30 caused by the force transferred at the time of sliding of the second housing 22 with respect to the first housing 21.

According to an embodiment, the support sheet 3010 may include a metallic material. The support sheet 3010 may include, for example, stainless steel. The support sheet 3010 may include various other metallic materials.

According to various embodiments, the support sheet 3010 may include engineering plastic.

According to an embodiment, the support sheet 3010 may include a lattice structure (not illustrated separately) at least partially overlap with the second region ⓑ of the flexible display module 30. The lattice structure may include, for example, multiple openings (or slits) extending between one surface of the support sheet 3010, which faces the display support structure 3020, and the other surface of the support sheet 3010, which faces the lower panel 303 of the flexible display module 30. The lattice structure may indicate a pattern structure in which the multiple openings are regularly arranged. The multiple openings may be periodically formed, and may be repeatedly arranged with substantially the same shape and regular intervals. The lattice structure may contribute to the flexuosity of the second region ⓑ of the flexible display module 30, and the second region ⓑ may be more flexible than the first region ⓐ due to the lattice structure. In various embodiments, the lattice structure including the multiple openings may be called a different term, such as an "opening pattern", a "hole pattern", or a "lattice pattern".

According to various embodiments, the support sheet 3010 may include a recess pattern (not illustrated) including multiple recesses in replacement of the lattice structure. The recess pattern may indicate, for example, a pattern structure in which multiple depressed recesses are regularly arranged on a surface of the support sheet 3010, which faces the display support structure 3020, or a surface of the support sheet 3010, which faces the lower panel 303 of the flexible display module 30.

According to various embodiments, the lattice structure or the recess pattern may be expanded to the first region ⓐ of the flexible display module 30.

According to various embodiments, the lattice structure or the recess pattern may be provided to correspond to the first curved part S12 (see FIG. 2 or 4) of the screen S1.

According to various embodiments, the support sheet 3010 including the lattice structure or the recess pattern, or a conductive member corresponding thereto may be configured by multiple layers.

According to an embodiment, the support sheet 3010 may reduce or prevent vision of elements (e.g., the display support structure 3020) from the outside of the slidable electronic device 2 through the flexible display module 30, the elements positioned in the slidable electronic device 2. The lattice structure of the support sheet 3010 corresponding to the second region ⓑ of the flexible display module 30 includes multiple openings, but may transmit, therethrough, the light by which the display support structure 3020 is not substantially visible through the flexible display module 30.

According to various embodiments, the support sheet 3010 may reduce electromagnetic interference (EMI) related to the flexible display module 30.

According to various embodiments, the support sheet 3010 may diffuse or dissipate the heat radiated from a heat radiation component (e.g., the display driver circuit 810 in FIG. 8).

According to an embodiment, the display support structure 3020 (or display support member) may be disposed on or coupled to the support sheet 3010. The display support structure 3020 may be coupled to the support sheet 3010 through, for example, an adhesive material (or a bonding material) (not illustrated separately). In a case where the support sheet 3010 is omitted, the display support structure 3020 may be disposed on or coupled to the back surface of the flexible display module 30.

According to an embodiment, the display support structure 3020 may contribute in providing the smooth screen S1 by reducing lifting of the screen S1 (see FIG. 2 or 4) due to the elasticity of the flexible display module 30 or the elasticity of the display assembly 600.

According to an embodiment, the display support structure 3020 may support the second region ⓑ of the flexible display module 30 so that the second region ⓑ is maintained to be smoothly connected to the first region ⓐ of the flexible display module 30. The display support structure 3020 may support the second region ⓑ of the flexible display module 30 to prevent/reduce lifting of the second region ⓑ caused by the elasticity of the flexible display module 30 or the elasticity of the display assembly 600 so as to contribute in maintaining the second region ⓑ to be smoothly connected to the first region ⓐ of the flexible display module 30.

According to an embodiment, in a closed state of an open state of the slidable electronic device 2, a part of the display support structure 3020 may support the second region ⓑ of the flexible display module 30 between the curved region 7206 of the second support member 722 and the second region ⓑ of the flexible display module 30.

According to an embodiment, in an open state of the slidable electronic device 2, a part of the display support structure 3020 may support the second flat region S112 (see FIG. 4) of the first flat part S11 of the screen S1.

According to an embodiment, the display support structure 3020 may contribute to smooth movement of the flexible display module 30 at the time of sliding of the second housing 22 with respect to the first housing 21. The display support structure 3020 may, for example, contribute in enabling the second region ⓑ of the flexible display module 30 to be moved while maintaining smooth connection with the first region ⓐ of the flexible display module 30 during switching between a closed state (see FIG. 2) and an open state (see FIG. 4) of the slidable electronic device 2.

According to an embodiment, the display support structure 3020 may include a multi-bar structure (or a multi-bar assembly). The display support structure 3020 may include one surface (not illustrated) facing the second region ⓑ of the flexible display module 30 and another surface 3022 positioned opposite to the one surface. The multi-bar structure may include, for example, multiple support bars, arranged on the one surface 3012 and extending in a direction (e.g., y-axis direction) orthogonal to the first direction ① (e.g., the +x-axis direction) of a slide out and orthogonal to the direction (e.g., the +z-axis direction) which the screen S1 (see FIG. 2 or 4) faces. In various embodiments, the multi-bar structure may be called a different term such as a "flexible track".

According to an embodiment, the multi-bar structure may have flexuosity due to parts having a relatively small thickness between the multiple support bars.

According to various embodiments, the multi-bar structure may be implemented without parts connecting the multiple support bars.

According to an embodiment, the display support structure 3020 may include a metallic material such as stainless steel and/or a non-metallic material such as polymer.

According to an embodiment, vision of, through the flexible display module 30, protruding of the multiple support bars of the display support structure 3020 may be reduced or prevented by the support sheet 3010.

According to an embodiment, the display support structure 3020 may support the flexible display module 30 between the flexible display module 30 and the third support region 7203 of the second support member 722. At the time of a slide out of the second housing 22, an area of the flat region 7205 of the third support region 7203 included in the second support member 722, the area being not covered by the first support member 721 and thus supporting the display support structure 3020 may be increased. During a slide out or a slide in of the second housing 22, the display support structure 3020 may be moved while being rubbed with the third support region 7203 of the second support member 722. During a slide out or a slide in of the second housing 22, the second support member 722 may be moved while rubbing with the display support structure 3020.

According to an embodiment, in order to reduce the frictional force between the third support region 7203 of the second support member 722 and the display support structure 3020, a lubricating agent (e.g., grease) may be positioned (or applied) between the third support region 7203 and the display support structure 3020. In an embodiment, a surface of the display support structure 3020 or the third support region 7203 may be formed by lubricant coating (e.g., coating using various lubricating materials such as Teflon coating).

According to various embodiments, the display support structure 3020 may act as the support sheet 3010, and in this case, the support sheet 3010 may be omitted.

In various embodiments, the support sheet 3010 may include a display support structure different from the display support structure 3020.

According to an embodiment, in order to reduce lifting of the screen S1 (see FIG. 2 or 4), a tension device (or tension structure) (not illustrated separately) for the flexible display module 30 or the display assembly 600 may be provided. The tension device may be connected to the flexible display module 30, the support sheet 3010, and/or the display support structure 3020. The tension device may contribute to smooth sliding while maintaining the tension acting on the flexible display module 30, the support sheet 3010, and/or the display support structure 3020. The tension device may apply a tension to the flexible display module 30, the support sheet 3010, and/or the display support structure 3020 using, for example, a belt (e.g., a wire type belt or a chain type belt). As another example, the tension device may apply a tension to the flexible display module 30, the support sheet 3010, and/or the display support structure 3020 using an elastic member such as a spring.

According to an embodiment, when the tension applied by the tension device is within a threshold range, the second region ⓑ of the flexible display module 30 may be maintained to be smoothly connected to the first region ⓐ of the flexible display module 30 without lifting in a closed state of FIG. 2 or an open state of FIG. 4. When the tension applied by the tension device is within the threshold range, the second region ⓑ may be moved while maintaining smooth connection to the first region ⓐ without lifting during switching between a closed state of FIG. 2 and an open state of FIG. 4. When the tension applied by the tension device is within the threshold range, sliding may be smoothly performed during switching between a closed state of FIG. 2 and an open state of FIG. 4. For example, in a comparative example in which the tension applied by the tension device is lower than the threshold range, the second region ⓑ may be lifted or not smoothly continue to the first region ⓐ due to the elasticity of the flexible display module 30 and/or the elasticity of the support sheet 3010. As another example, in a comparative example in which the tension applied by the tension device is higher than the threshold range, the second region ⓑ may be smoothly connected to the first region ⓐ without lifting, but sliding may not be smoothly or softly performed during switching between a closed state of FIG. 2 and an open state of FIG. 4.

According to an embodiment, the slidable electronic device 2 may include a rail part (or a guide rail) for guiding movement of the display support structure 3020. The third support member (or the third support structure) 723 may be positioned in the second space 224 of the second housing 22, and may be coupled to the fifth side wall 205 of the second housing 22. The fourth support member (or the fourth support structure) 724 may be positioned in the second space 224 of the second housing 220, and may be coupled to the sixth side wall 206 of the second housing 22. In an embodiment, the slidable electronic device 2 may include a first guide rail (not illustrated separately) on which one side of the display support structure 3020 is positioned and which guides the movement thereof, and a second guide rail (not illustrated separately) on which the other side of the display support structure 3020 is positioned and which guides the movement thereof. The first guide rail and the second guide rail may be symmetrical with respect to a central line (e.g., a line provided as a criterion of symmetry on the screen S1 of FIG. 2) of the slidable electronic device 2, which extends in the slide-out or slide-in direction (e.g., x-axis direction) of the second housing 22.

According to an embodiment, the first guide rail may be provided by a combination of the second support member 722 and the third support member 723, and the second guide rail may be provided by a combination of the second support member 722 and the fourth support member 724. The second support member 722 may include a first insert structure 7221 that is inserted in a first recess structure (not illustrated separately) included in the third support member

723. The first recess structure may include, for example, a first recess depressed in a third direction (e.g., the +y-axis direction) orthogonal to the slide-out direction of the second housing 22 and orthogonal to the direction which the screen S (see FIG. 2 or 4) faces. The first insert structure 7221 may include, for example, a first insert protruding in the third direction (e.g., the +y-axis direction) and inserted in the first recess. The first guide rail may include the first insert structure 7221 and the first recess structure. The first guide rail may have a rail-shaped first space (hereinafter, a "first rail part") disposed between the first insert of the first insert structure 7221 and the first recess of the first recess structure to correspond to a designated movement path of the display support structure 3020. One side of the display support structure 3020 may be positioned in the first rail part of the first guide rail. The second guide rail may include a second insert structure 7222 of the second support member 722 and a second recess structure (not illustrated separately) of the fourth support member 724 in the manner substantially the same as that of the first guide rail. The second recess structure may include, for example, a second recess depressed in a fourth direction (e.g., the −y-axis direction) opposite to the third direction. The second insert structure may include, for example, a second insert protruding in the fourth direction and inserted in the second recess. The second guide rail may have a rail-shaped second space (hereinafter, a "second rail part") disposed between the second insert of the second insert structure 7222 and the second recess of the second recess structure to correspond to a designated movement path of the display support structure 3020. The other side of the display support structure 3020 may be positioned in the second rail part of the second guide rail. At the time of sliding of the second housing 22, the display support structure 3020 may be moved by being guided by the first guide rail and the second guide rail. In an embodiment, the first guide rail may be configured by the fifth side wall 205 of the second housing 22, and the third support member 723 may be omitted. In an embodiment, the second guide rail may be configured by the sixth side wall 206 of the second housing 22, and the fourth support member 724 may be omitted.

According to an embodiment, in order to reduce the frictional force between the one side of the display support structure 3020 and the first guide rail, and the frictional force between the other side of the display support structure 3020 and the second guide rail, a lubricating agent (e.g., grease) may be positioned on (or applied to) the first guide rail and the second guide rail. In various embodiments, a surface of the one side included in the display support structure 3020 to correspond to the first guide rail and a surface of the other side included in the display support structure 3020 to correspond to the second guide rail may be formed by lubricant coating (e.g., coating using various lubricating materials such as Teflon coating). As another example, a surface of the first guide rail and a surface of the second guide rail may be formed by lubricant coating (e.g., coating using various lubricating materials such as Teflon coating).

According to various embodiments, the one side of the display support structure 3020 positioned on the first guide rail may be modified to include a first rotation member such as a roller and a shaft positioned to enable the first rotation member to be rotatable (not illustrated separately). The other side of the display support structure 3020 positioned on the second guide rail may be modified to include a second rotation member such as a roller and a shaft positioned to enable the second rotation member to be rotatable (not illustrated separately). At the time of sliding of the second housing 22, the first rotation member may be moved by being guided by the first guide rail and be rotated by friction with the first guide rail. At the time of sliding of the second housing 22, the second rotation member may be moved by being guided by the second guide rail and be rotated by friction with the second guide rail.

According to various embodiments, a rotation member (not illustrated separately) such as a roller or pulley may be positioned in replacement of the curved region 7206 of the third support region 7203 of the second support member 722. For example, one end of a rotation shaft related to the rotation member may be rotatably coupled to the third support member 723 (see FIG. 6), and the other end of the rotation shaft related to the rotation member may be rotatably coupled to the fourth support member 724 (see FIG. 6). In an embodiment, the rotation member may be interpreted as a curved surface member, a curved surface support member, or a curved surface support structure implemented to be rotatable based on friction with the display support structure 3020 (e.g., a multi-bar structure).

According to an embodiment, the display driver circuit 810 may be disposed on the flexible display module 30 in a chip-on panel (COP) scheme. The display driver circuit 810 may include, for example, a display drive integrated circuit (DDI) or a DDI chip. The flexible display module 30 may include a third region (or extension part) ⓒ extending from the first region ⓐ. In an embodiment, the third region ⓒ may be bent from the first region ⓐ at the side of the first curved part S12 (see FIG. 2) of the screen S1 and coupled to the support sheet 3010 while overlapping with same. The third region ⓒ may include, for example, a bent part 830 bend at a corresponding radius of curvature at the side of the first curved part S12 (see FIG. 2). The adhesive member (or bonding member) 820 may be positioned between the third region ⓒ of the flexible display module 30 and the support sheet 3010.

According to an embodiment, the support sheet 3010 and the adhesive member (or bonding member) 820 may reduce the stress of the bent part 830 while allowing the third region ⓒ of the flexible display module 30 to be bent at the corresponding radius of curvature. The display driver circuit 810 may be disposed on the third region ⓒ. In an embodiment, the display driver circuit 810 may be disposed on the third region ⓒ through tape automated bonding (TAB).

According to an embodiment, the third region ⓒ of the flexible display module 30 may be extended from the display panel 301 (see FIG. 6). The third region ⓒ may be, for example, a part of the TFT film (or TFT substrate) 301*b* (see FIG. 6). The third region ⓒ may be electrically connected to the first printed circuit board 611 through a flexible printed circuit board (not illustrated separately). The third region ⓒ may include electrical paths (e.g., wires implemented into a conductive pattern) electrically connecting at least one TFT and a flexible printed board.

According to an embodiment, the third region ⓒ of the flexible display module 30 may be electrically connected to the flexible printed circuit board through anisotropic conductive film bonding (ACF bonding). The third region ⓒ is a part not included in the screen S1 (see FIG. 2 or 4), and thus may include no pixels implemented by light emitting elements. In an embodiment, the light emitting layer 301*a* and the encapsulation layer 301*c* of FIG. 6 may not be expanded to the third region ⓒ. The TFT film 301*b* of FIG. 6 may be implemented to be expanded to the third region ⓒ, but include no TFT in the third region ⓒ. The electrical paths included in the third region ⓒ may be arranged on the TFT film 301*b*. In an embodiment, the light emitting layer 301a may be implemented to be expanded to the third region ⓒ without multiple pixels substantially in the third region ⓒ. In an embodiment, the encapsulation layer 301c may be expanded to the third region ⓒ.

According to an embodiment, a signal commanded by a processor (e.g., the processor 120 in FIG. 1) may be transferred to the display driver circuit 810 disposed on the third region ⓒ of the flexible display module 30 through the flexible printed circuit board. The display driver circuit 810 may act as a signal passage between the flexible display module 30 and the processor to control pixels through TFTs in the flexible display module 30. For example, the display driver circuit 810 may have a function of turning on or off the pixels included in the flexible display module 30, and may be electrically connected to a gate electrode of the TFT. The display driver circuit 810 may have a function of adjusting the amount of red, green, and blue (RGB) signals of a pixel to make a color difference, and be electrically connected to a source electrode of the TFT. The TFT may include a gate line electrically connecting the display driver circuit 810 and the gate electrode of the TFT, and a source line (or data line) electrically connecting the display driver circuit 810 and the source electrode of the TFT. In an embodiment, the display driver circuit 810 may operate to correspond to a red, green, blue, and white (RGBW) scheme in which a white pixel is added to an RGB pixel.

According to an embodiment, the display driver circuit 810 may include a DDI package. The DDI package may include a DDI (or DDI chip), a timing controller (T-CON), a graphic RAM (GRAM), or a power driving unit (power generating circuit). In an embodiment, the graphic RAM may be omitted, or a memory provided separately from the display driver circuit 810 may be used. The timing controller may convert a data signal input from the processor to a signal required by the DDI. The timing controller may function to adjust input data information to a signal suitable for a gate driver (or gate IC) and a source driver (or source IC) of the DDI. The graphic RAM may act as a memory that temporarily stores data to be input to a driver (or IC) of the DDI. The graphic RAM may store an Input signal and export same to a driver of the DDI again, and at this time, may interwork with the timing controller to process the signal. The power driving unit may generate a voltage for driving the flexible display module 30 and supply a required voltage to the gate driver and the source driver of the DDI.

According to an embodiment, the display driver circuit 810 may be disposed on the flexible display module 30 in a chip-on film (COF) scheme. For example, the third region ⓒ of the flexible display module 30 may be a flexible film substrate connecting the display panel 301 (see FIG. 6) and the flexible printed circuit board electrically connected to the first printed circuit board 611. The film substrate may include, for example, a plastic substrate or a polymer substrate (e.g., polyimide substrate) which is flexible and has a circuit or a wire disposed thereon. One end of the film substrate may be electrically connected to the display panel 301 (or the TFT film 301b) (see FIG. 6), and the other end of the film substrate may be electrically connected to the flexible printed circuit board electrically connected to the first printed circuit board 611. In an embodiment, the display driver circuit 810 may be disposed on the film substrate through TAB. In an embodiment, the film substrate may be electrically connected to the display panel 301 and/or the flexible printed circuit board through ACF bonding.

According to an embodiment, the first housing 21 may include a conductive structure (e.g., a metal part) 91 including a metallic material and a non-conductive structure (e.g., a non-metal part) 92 including a non-metallic material and connected to the conductive structure 91. The conductive structure 91 may be formed, for example, through various processing methods such as computer numerical control (CNC), die casting, or pressing. The non-conductive structure 92 may be formed, for example, to be coupled to the conductive structure 91 through insert injection molding.

According to an embodiment, the first plate 211, the first side wall 201, the second side wall 202 (see FIG. 2 or 4), or the third side wall 203 (see FIG. 2 or 4) may be provided by the conductive structure 91 and/or the non-conductive structure 92. For example, as illustrated in the sectional view of FIG. 8, the first plate 211 and the first side wall 201 may be configured by the conductive structure 91 and the non-conductive structure 92. The sectional view of FIG. 8 shows an example in which the second housing 22 is configured by an integrated conductive structure or an integrated non-conductive structure including the same material. However, the second housing 22 is not limited thereto and may be configured by a combination of a conductive structure and a non-conductive structure.

According to an embodiment, at least a part of the conductive structure 91 included in the first housing 21 and/or at least a part of a conductive structure included in the second housing 22 may be used as an antenna radiator. For example, at least a part of the first side wall structure 212 (see FIG. 2 or 4) included in the first housing 21 and/or at least a part of the second side wall structure 222 (see FIG. 2 or 4) included in the second housing 22 may be used as an antenna radiator.

Figure 10:
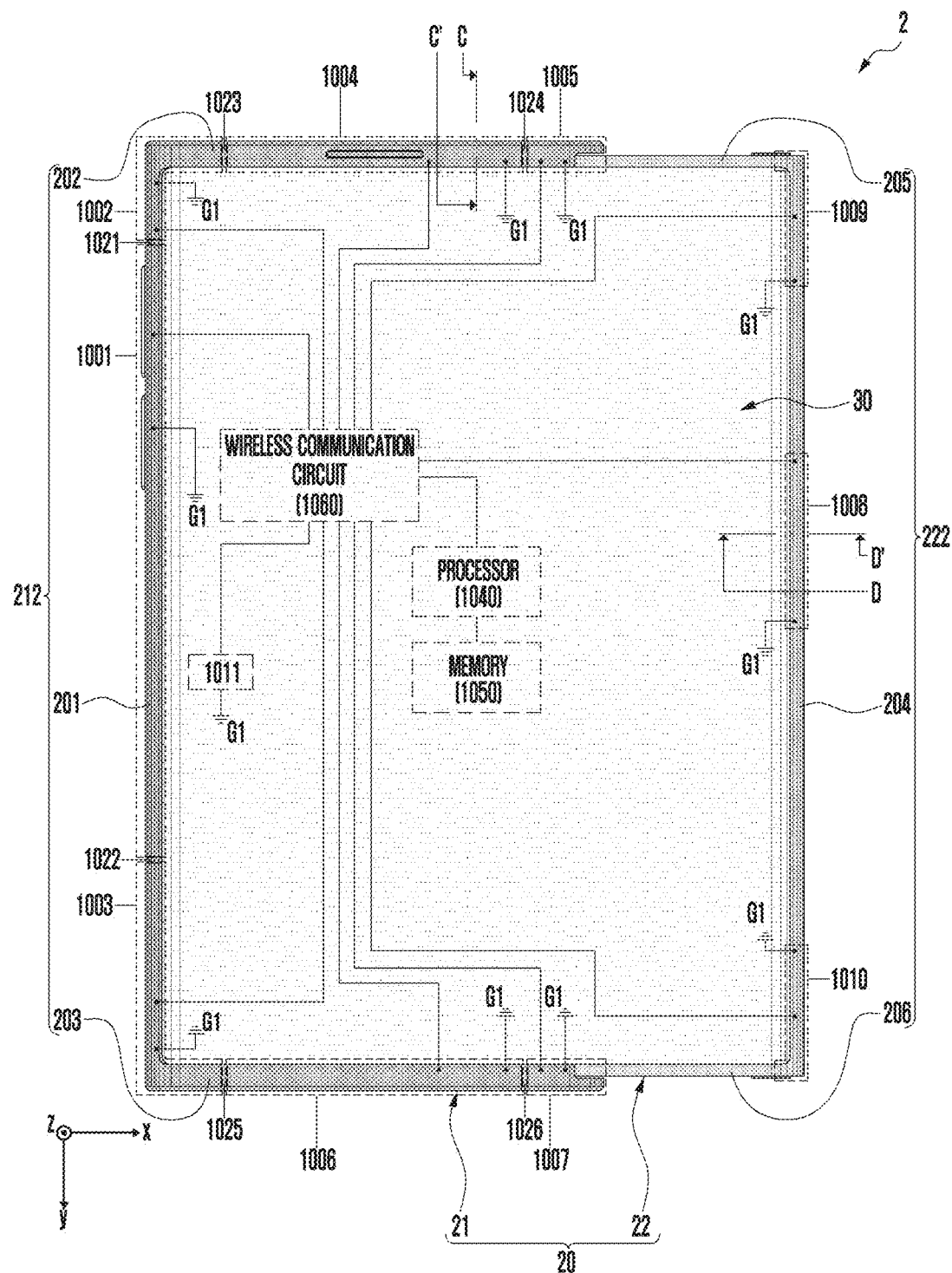
FIG. 10 is a diagram illustrating a slidable electronic device in an open state according to various embodiments.

FIG. 10 is a diagram illustrating the slidable electronic device 2 in an open state according to various embodiments.

Referring to FIG. 10, in an embodiment, the slidable electronic device 2 may include the first housing 21, the second housing 22, a processor (e.g., including processing circuitry) 1040 (e.g., the processor 120 in FIG. 1), a memory 1050 (e.g., the memory 130 in FIG. 1), a wireless communication circuit 1060 (e.g., the wireless communication module 192 in FIG. 1), one or more antenna radiators (or antennas), and/or a ground G1.

According to an embodiment, the first housing 21 may include the first side wall part 212. The first side wall part 212 may include the first side wall 201, the second side wall 202, and/or the third side wall 203. The second housing 22 may include the second side wall part 222. The second side wall part 222 may include the fourth side wall 204, the fifth side wall 205, and/or the sixth side wall 206.

According to an embodiment, the wireless communication circuit 1060 may be configured to transmit and/or receive a signal in a selected or designated frequency band through the one or more antenna radiators. The one or more antenna radiators may include, for example, at least one conductive part included in the first side wall part 212 of the first housing 21, at least one conductive part included in the second side wall part 222 of the second housing 22, at least one conductive part positioned in an inner space of the first housing 21, and/or at least one conductive part positioned in an inner space of the second housing 22.

According to an embodiment, the slidable electronic device 2 may include one or more transmission lines electrically connecting the one or more antenna radiators and the wireless communication circuit 1060. The one or more transmission lines may transfer a radio frequency (RF) signal (e.g., voltage or current) between the wireless communication circuit 1060 and the one or more antenna radiators. The transmission line may include, for example, an electrical path (e.g., a conductive path of a printed circuit board, a conductive path of a flexible printed circuit board, a flexible conductive member, a cable, or a combination of two or more thereof) implemented by various types of conductive structures or wires connecting the wireless communication circuit 1060 and the antenna radiator.

According to an embodiment, the ground G1 may operate as an antenna ground capable of securing antenna radiation performance, securing coverage, and/or reducing electromagnetic interference (EMI) with respect to multiple antenna radiators. The ground G1 may include, for example, a first ground region (e.g., a first ground plane) (not illustrated separately) included in the first printed circuit board 611 (see FIG. 7) on which the processor 1040, the memory 1050, and/or the wireless communication circuit 1060 are arranged. The ground G1 may include a second ground region (e.g., a second ground plane) (not illustrated separately) included in the second printed circuit board 612 (see FIG. 7). The ground G1 may include a third ground region (e.g., a second ground plane) (not illustrated separately) included in the third printed circuit board 613 (see FIG. 7).

According to an embodiment, at least one antenna radiator may be electrically connected to the ground G1 through various electrical paths provided by a conductive path of a printed circuit board, a conductive path of a flexible printed circuit board, a flexible conductive member (e.g., a conductive clip (e.g., a conductive structure including an elastic structure), a pogo pin, a spring, conductive Poron, conductive rubber, conductive tape, or a conductive connector), a cable, or a combination of two or more thereof.

According to an embodiment, the first side wall part 212 may include a first conductive part 1001 operating as a first antenna radiator, a second conductive part 1002 operating as a second antenna radiator, a third conductive part 1003 operating as a third antenna radiator, a fourth conductive part 1004 operating as a fourth antenna radiator, a fifth conductive part 1005 operating as a fifth antenna radiator, a sixth conductive part 1006 operating as a sixth antenna radiator, and/or a seventh conductive part 1007 operating as a seventh antenna radiator. The first conductive part 1001 may provide a part of the first side wall 201. The second conductive part 1002 may provide a first corner connecting the first side wall 201 and the second side wall 202, a part of the first side wall 201, extending from the first corner, and/or a part of the second side wall 202, extending from the first corner. The third conductive part 1003 may provide a second corner connecting the first side wall 201 and the third side wall 203, a part of the first side wall 201, extending from the second corner, and/or a part of the third side wall 203, extending from the second corner. The fourth conductive part 1004 may provide a part of the second side wall 202. The fifth conductive part 1005 may provide a part of the second side wall 202. The sixth conductive part 1006 may provide a part of the third side wall 203. The seventh conductive part 1007 may provide a part of the third side wall 203. The first side wall 201 may include a first insulation part 1021 positioned between the first conductive part 1001 and the second conductive part 1002. The first conductive part 1001 and the second conductive part 1002 may be physically separated from each other by the first insulation part 1021. The first side wall 201 may include a second insulation part 1022 positioned between the first conductive part 1001 and the third conductive part 1003. The first conductive part 1001 and the third conductive part 1003 may be physically separated from each other by the second insulation part 1022. The second side wall 202 may include a third insulation part 1023 positioned between the second conductive part 1002 and the fourth conductive part 1004. The second conductive part 1002 and the fourth conductive part 1004 may be physically separated from each other by the third insulation part 1023. The second side wall 202 may include a fourth insulation part 1024 positioned between the fourth conductive part 1004 and the fifth conductive part 1005. The fourth conductive part 1004 and the fifth conductive part 1005 may be physically separated from each other by the fourth insulation part 1024. The third side wall 203 may include a fifth insulation part 1025 positioned between the third conductive part 1003 and the sixth conductive part 1006. The third conductive part 1003 and the sixth conductive part 1006 may be physically separated from each other by the fifth insulation part 1025. The third side wall 203 may include a sixth insulation part 1026 positioned between the sixth conductive part 1006 and the seventh conductive part 1007. The sixth conductive part 1006 and the seventh conductive part 1007 may be physically separated from each other by the sixth insulation part 1026. The first conductive part 1001, the second conductive part 1002, the third conductive part 1003, the fourth conductive part 1004, the fifth conductive part 1005, the sixth conductive part 1006, the seventh conductive part 1007, the first insulation part 1021, the second insulation part 1022, the third insulation part 1023, the fourth insulation part 1024, the fifth insulation part 1025, and the sixth insulation part 1026 may substantially provide a lateral surface of the slidable electronic device 2.

According to an embodiment, the first insulation part 1021, the second insulation part 1022, the third insulation part 1023, the fourth insulation part 1024, the fifth insulation part 1025, and/or the sixth insulation part 1026 may be included in a non-conductive structure (e.g., the non-conductive structure 92 in FIG. 8 or 9) included in the first housing 21.

According to an embodiment, the first conductive part 1001, the second conductive part 1002, the third conductive part 1003, the fourth conductive part 1004, the fifth conductive part 1005, the sixth conductive part 1006, and the seventh conductive part 1007 may be arranged at a peripheral part of the slidable electronic device 2 so as to contribute to electromagnetic isolation from other elements of the slidable electronic device 2, which may affect antenna radiation performance.

According to various embodiments, the shape, position, or number of the conductive parts or insulation parts included in the first side wall structure 212 is not limited to the illustrated example, and may be various (not illustrated separately). The shape, position, or number of the conductive parts of the first side wall structure 212, operating as antenna radiators, is not limited to the illustrated example, and may be various. The position (e.g., a feeding point) or number of feeding parts electrically connected to the wireless communication circuit 1060, in the conductive part included in the first side wall part 212 is not limited to the illustrated example, and may be various (not illustrated separately). The position (e.g., a grounding point) or number of ground parts electrically connected to the ground G1, in the conductive part included in the first side wall part 212 is not limited to the illustrated example, and may be various (not illustrated separately).

According to an embodiment, the second side wall part 222 may include an eighth conductive part 1008 operating as an eighth antenna radiator, a ninth conductive part 1009 operating as a ninth antenna radiator, and/or a tenth conductive part 1010 operating as a tenth antenna radiator. The eighth conductive part 1008 may provide a part of the fourth side wall 204. The ninth conductive part 1009 may provide a third corner connecting the fourth side wall 204 and the fifth side wall 205, a part of the fourth side wall 204, extending from the third corner, and/or a part of the fifth side wall 205, extending from the third corner. The tenth conductive part 1010 may provide a fourth corner connecting the fourth side wall 204 and the sixth side wall 206, a part of the fourth side wall 204, extending from the fourth corner, and/or a part of the sixth side wall 206, extending from the fourth corner. The eight conductive part 1008, the ninth conductive part 1009, and the tenth conductive part 1010 may substantially provide a part of a lateral surface of the slidable electronic device 2 to correspond to the second housing 22. The eight conductive part 1008, the ninth conductive part 1009, and the tenth conductive part 1010 may be arranged at a peripheral part of the slidable electronic device 2 so as to contribute to electromagnetic isolation from other elements of the slidable electronic device 2, which may affect antenna radiation performance. The shape, position, or number of the conductive parts of the second side wall structure 222, operating as antenna radiators, is not limited to the illustrated example, and may be various. The position or number of feeding parts electrically connected to the wireless communication circuit 1060, in the conductive part included in the second side wall part 222 is not limited to the illustrated example, and may be various. The position or number of ground parts electrically connected to the ground G1, in the conductive part included in the second side wall part 222 is not limited to the illustrated example, and may be various.

According to various embodiments (not illustrated separately), the second side wall part 222 may include multiple conductive parts and multiple insulation parts in a manner substantially the same as or at least partially similar to that of the first side wall part 212, and at least some of the multiple conductive parts included in the second side wall part 222 may be used as antenna radiators.

According to an embodiment, the slidable electronic device 2 may include at least one eleventh conductive part 1011 positioned in the inner space of the first housing 21 or the inner space of the second housing 22. The at least one eleventh conductive part 1011 may be electrically connected to the wireless communication circuit 1060 and the ground G1 and operate as at least one eleventh antenna radiator.

According to various embodiments, referring to FIG. 6 or 7, the at least one eleventh conductive part 1011 may include a conductive pattern included in or disposed on the first support member 721, the back cover 23, the first printed circuit board 611, the second printed circuit board 612, the third printed circuit board 613, or the second support member 722.

According to various embodiments, the at least one eleventh conductive part 1011 may include a conductive pattern disposed on a non-conductive member (or a non-conductive part) (not illustrated separately) in various methods such as laser direct structuring (LDS), plating, or printing.

According to various embodiments, the at least one eleventh conductive part 1011 may be a conductive pattern included in a flexible printed circuit board implemented as an antenna structure.

According to various embodiments, the wireless communication circuit 1060 may provide a radiation current (or a wireless signal) to at least one antenna radiator (e.g., the first conductive part 1001, the second conductive part 1002, the third conductive part 1003, the fourth conductive part 1004, the fifth conductive part 1005, the sixth conductive part 1006, the seventh conductive part 1007, the eight conductive part 1008, the ninth conductive part 1009, the tenth conductive part 1010, or the eleventh conductive part 1011), and the flow path and/or distribution of the radiation current in the at least one antenna radiator may transmit and/or receive a signal having at least one frequency in a corresponding frequency band. The wireless communication circuit 1060 may process a transmission signal or a reception signal through the at least one antenna radiator in at least one designated frequency band. For example, the designated frequency band may include at least one of a low band (LB) (about 600 MHz-about 1 GHz), a middle band (MB) (about 1 GHz-about 2.3 GHz), a high band (HB) (about 2.3 GHz-about 2.7 GHz), or an ultra-high band (UHB)(about 2.7 GHz-about 6 GHz). The designated frequency band may include various other frequency bands.

According to an embodiment, the processor 1040 or the wireless communication circuit 1060 may transmit or receive data through a MIMO technique using multiple antenna radiators in a communication mode (e.g., at a frequency used by an application (or program)) using a corresponding frequency band. The memory 1050 may store instructions causing the processor 1040 or the wireless communication circuit 1060 to transmit or receive data through a MIMO technique by selectively using a plurality of antenna radiators among multiple antenna radiators, based on a communication mode. The MIMO technique may include, for example, a "beamforming" scheme of adjusting phase information of each antenna radiator to adjust a signal strength according to a positional angle between a base station (or transmitter) and a user so as to remove ambient interference and improve performance. For example, the MIMO technique may include a "diversity" scheme of spacing antenna radiators apart from each other to make signals between the antenna radiators be independent so as to improve performance. For example, the MIMO technique may include a "multiplexing" scheme of generating a virtual auxiliary channel between transmission and reception antenna radiators to transmit different data through each transmission antenna so as to increase a transmission speed. In an embodiment, a technique in which a base station transmits different data through each transmission antenna and the slidable electronic device 2 distinguishes between pieces of transmission data through proper signal processing may be used. For example, a 4×4 MIMO technique may use four antenna radiators for each of a base station (or transmitter) and the slidable electronic device 2 (or receiver).

According to various embodiments, the processor 1040 or the wireless communication circuit 1060 may be configured to selectively use an antenna radiator according to a frequency used by an application (or program) and/or a closed state (see FIG. 2) or an open state (see FIG. 4) of the slidable electronic device 2. The memory 1050 may store instructions causing the processor 1040 or the wireless communication circuit 1060 to selectively use at least one of multiple antenna radiators, based on a frequency used by an application (or program) and/or a closed state or an open state of the slidable electronic device 2.

According to various embodiments, the processor 1040 or the wireless communication circuit 1060 may be configured to, based on instructions stored in the memory, detect a dielectric positioned close to the slidable electronic device 2, and selectively use an antenna radiator, based on the position thereof. For example, at least one antenna radiator which is spaced apart from the position held by a user's hand and thus is advantageous to ensure antenna radiation performance may be selected and operated.

According to an embodiment, the slidable electronic device 2 may include a matching circuit (e.g., a frequency adjustment circuit) (not illustrated separately) connected to a transmission line between the at least one antenna radiator and the wireless communication circuit 1060. The matching circuit may include an electrical element having a component, such as inductance, capacitance, or conductance acting on the transmission line. For example, the matching circuit may include various elements such as a lumped element or a passive element.

According to an embodiment, the matching circuit may adjust the impedance of the transmission line or the impedance of the antenna radiator, and accordingly, the impedance of the transmission line and the impedance of the antenna radiator may be matched (e.g., impedance matching). When the impedance of the transmission line and the impedance of the antenna radiator are matched, a reflection amount of a connection part between the transmission line and the antenna radiator may be reduced, and thus maximum power transfer (or minimization of power loss) or effective signal transfer through the antenna radiator may be possible.

According to various embodiments, the matching circuit may move the resonant frequency of the at least one antenna radiator to a designated frequency or by a designated amount.

According to various embodiments, the matching circuit may, in a closed state (see FIG. 2) or an open state (see FIG. 4) of the slidable electronic device 2, reduce the electromagnetic effects of surrounding elements of the slidable electronic device 2 so as to enable the at least one antenna radiator to have a designated isolation.

Figure 11:
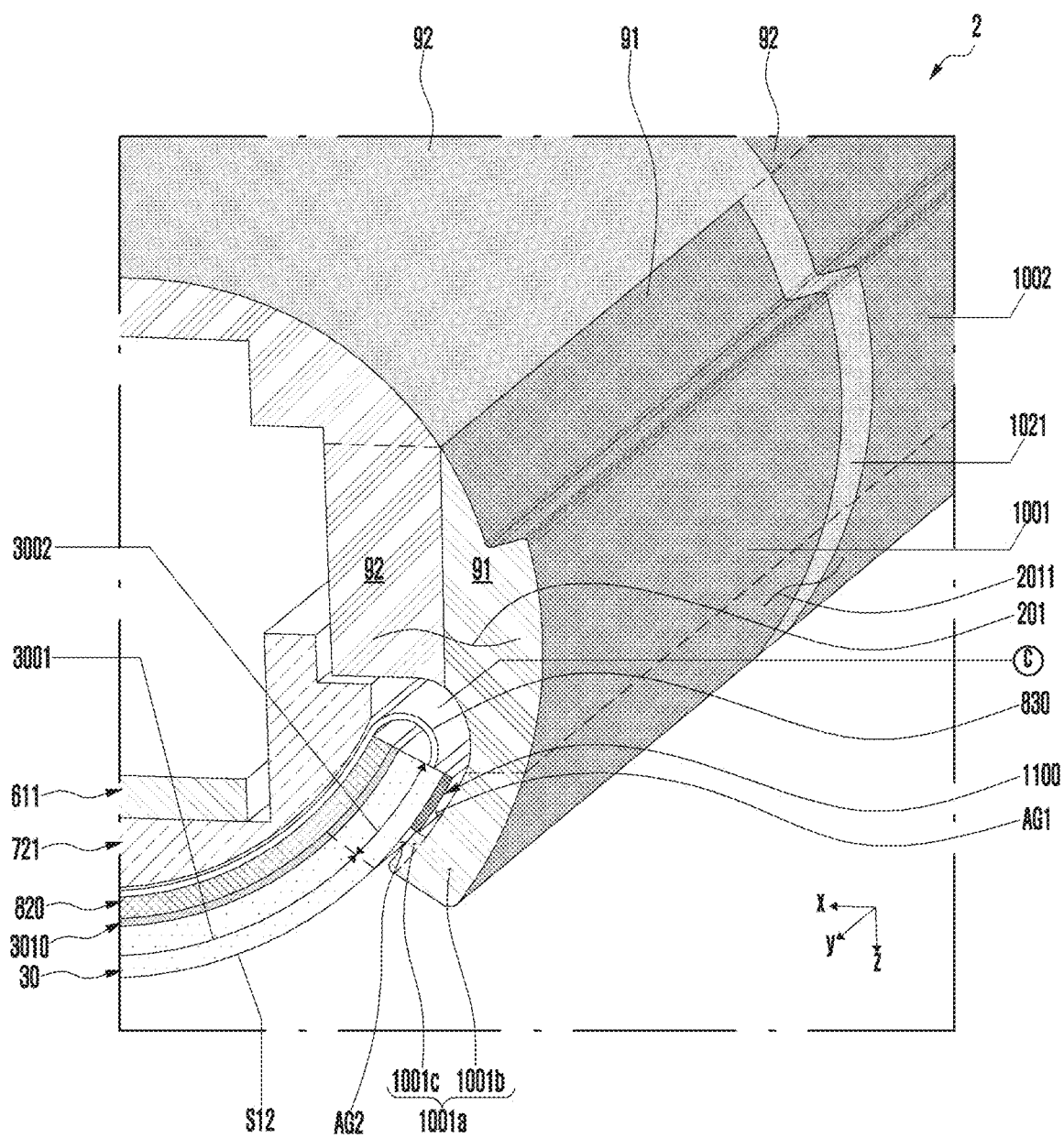
FIG. 11 is a partial sectional perspective view of a slidable electronic device according to various embodiments.
Figure 12:
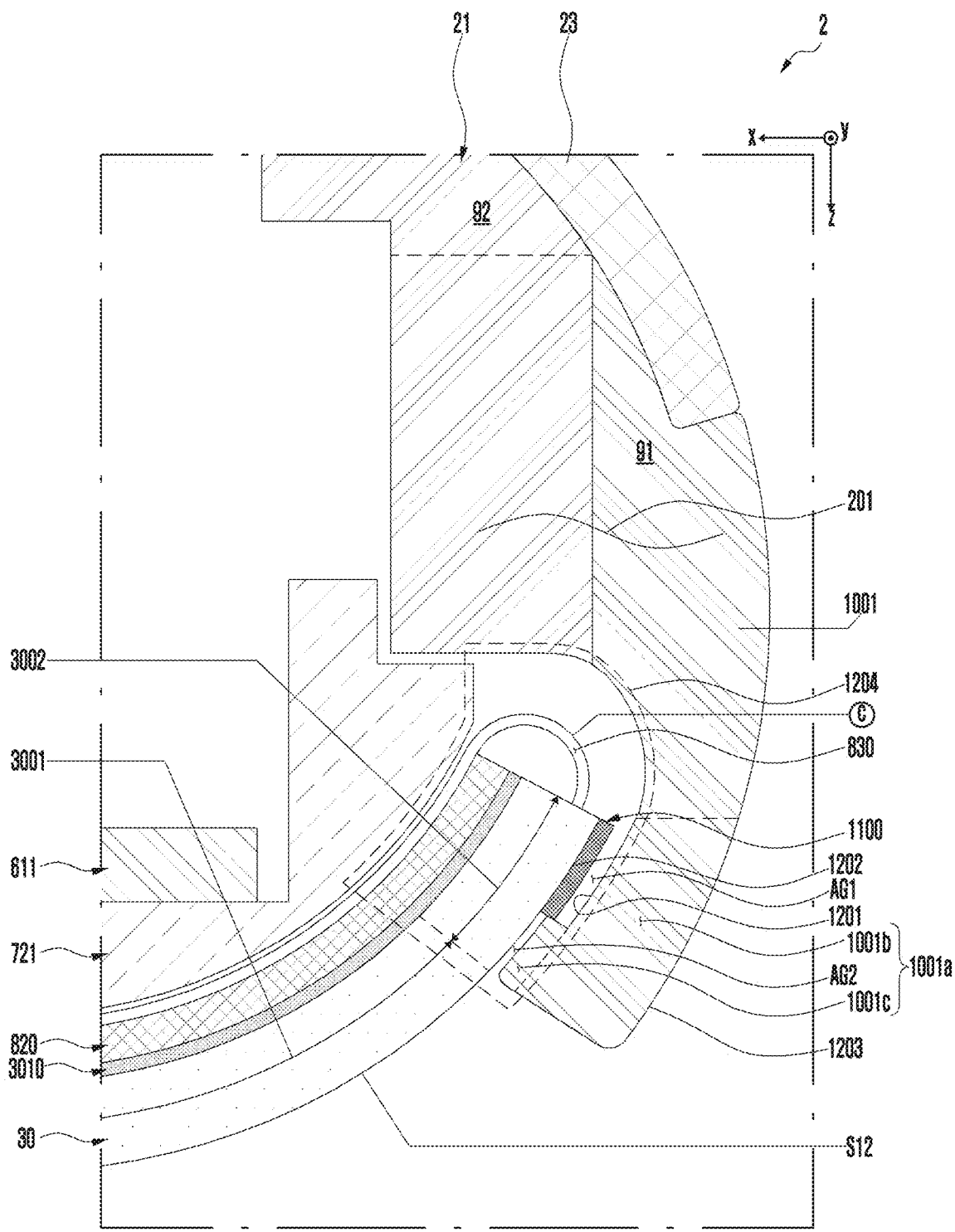
FIG. 12 is an enlarged view of a part indicated by reference numeral "801" in the sectional view of FIG. 8 according to various embodiments.
Figure 13:
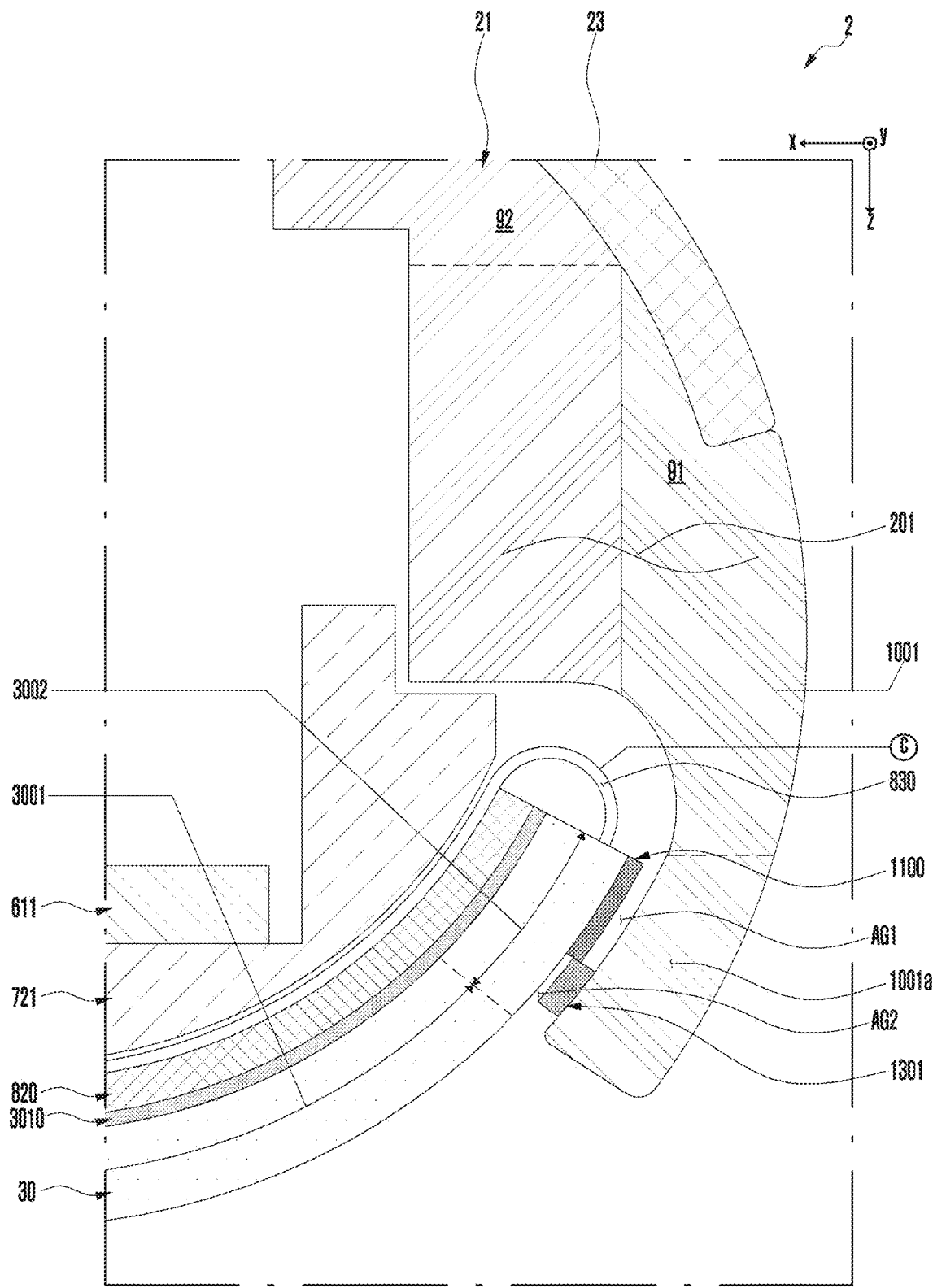
FIG. 13 is a partial cross-sectional view of a slidable electronic device that is a modification of the embodiment of FIG. 12 according to various embodiments.

FIG. 11 is a partial sectional perspective view of the slidable electronic device 2 according to various embodiments. FIG. 12 is an enlarged cross-sectional view of a part indicated by reference numeral "801" in the sectional view of FIG. 8 according to various embodiments. FIG. 13 is a cross-sectional view of the slidable electronic device 2 that is a modification of the embodiment of FIG. 12 according to various embodiments.

Referring to FIGS. 11 and 12, in an embodiment, the flexible display module 30 may include a first part 3001 and a second part 3002 extending from the first part 3001. The first part 3001 may be seen to the outside of the slidable electronic device 2. The second part 3002 may not be substantially seen to the outside of the slidable electronic device 2 by overlapping with the first side wall 201 and thus being covered thereby. The first part 3001 may be included in the first region ⓐ (see FIG. 6) and the second region ⓑ (see FIG. 6) of the flexible display module 30. The first part 3001 may provide the screen S1 in FIG. 2 or 4. For example, in a closed state (see FIG. 2) of the slidable electronic device 2, the first part 3001 of the flexible display module 30 may provide the screen S1 illustrated in FIG. 2. For example, in an open state (see FIG. 4) of the slidable electronic device 4, the first part 3001 of the flexible display module 30 may provide the screen S1 illustrated in FIG. 4.

According to an embodiment, the second part 3002 may be a border region of the first region ⓐ (see FIG. 6) of the flexible display module 30, the border region corresponding to the first side wall 201. The first region ⓐ (see FIG. 6) of the flexible display module 30 may include a curved region providing the first curved part S12 (see FIG. 4) of the screen S1, and the second part 3002 may be a curved border region of the curved region, corresponding to the first side wall 201.

According to an embodiment, the third region ⓒ of the flexible display module 30, on which the display driver circuit 810 is disposed, may extend from the second part 3002 of the flexible display module 30, corresponding to the first side wall 201, or may be connected to the second part 3002.

According to an embodiment, the second part 3002, a part of the support sheet 3010, corresponding to the second part 3002, a part of the adhesive member 820, corresponding to the second part 3002, a part of the third region ⓒ, corresponding to the second part 3002, and the bent part 830 of the third region ⓒ may be inserted in a recess type space 1204 configured by a combination of the first side wall 201 and the first support member 721.

According to an embodiment, the second part 3002 of the flexible display module 30 may have substantially the same staked structure as the first part 3001 of the flexible display module 30. The second part 3002 may have, for example, a stacked structure including the display panel 301, the base film 302, the lower panel 303, the optical layer 304, the transparent cover 305, and the optical transparent adhesive member 306 illustrated in FIG. 6.

According to an embodiment, the slidable electronic device 2 may be configured to control at least one TFT included in the second part 3002 to turn off at least one pixel included in the second part 3002. In an embodiment, the slidable electronic device 2 may be configured to display a designated color, such as black, through the second part 3002.

According to various embodiments, the second part 3002 of the flexible display module 30 may have a staked structure different from that of the first part 3001 of the flexible display module 30. For example, the light emitting layer 301a and the encapsulation layer 301c of FIG. 6 may not be expanded to the second part 3002, and the second part 3002 may include no pixel. As another example, the TFT film 301b of FIG. 6 may be implemented to be expanded to the second part 3002, but include no TFT in the second part 3002.

According to an embodiment, the second part 3002 may include wires (or electrical paths) electrically connecting the first part 3001 and the third region ⓒ, and the wires may be disposed on the TFT film 301b of FIG. 6.

According to various embodiments, the light emitting layer 301a of FIG. 6 is expanded to the second part 3002, but the second part 3002 may substantially not include multiple pixels.

According to various embodiments, the encapsulation layer 301c of FIG. 6 may be expanded to the second part 3002.

According to various embodiments, the lower panel 303 of FIG. 6 or at least some of multiple layers (e.g., the light blocking layer 303a, the buffering layer 303b, or the lower layer 303c) included in the lower panel 303 may not be expanded to the second part 3002.

According to various embodiments, the second part 3002 may have various other stacked structure which is at least partially different from that of the first part 3001 while including wires electrically connecting the first part 3001 and the third region ⓒ.

According to an embodiment, a part 2011 of the first side wall 201 may face and overlap with the second part 3002 of the flexible display module 30. The part 2011 (hereinafter, referred to as a "display overlapping part") of the first side wall 201, which faces and overlaps with the second part 3002 may include, for example, a part 1001a of the first conductive part 1001, a part of the second conductive part 1002, a part of the third conductive part 1003 (see FIG. 10), a part of the first insulation part 1021, and/or a part of the second insulation part 1022 (see FIG. 10).

The part 1001a of the first conductive part 1001, included in the display overlapping part 2011 of the first side wall 201, faces and overlaps with the second part 3002 of the flexible display module 30. Therefore, there may be a possibility that electromagnetic coupling (e.g., capacitive coupling) may occur between the second part 3002 and the part 1001*a* (hereinafter, referred to as a "first display-overlapping conductive region") of the first conductive part 1001. The first display-overlapping conductive region 1001*a* may have a possibility of being electromagnetically coupled to a conductive material included in the second part 3002. For example, a conductive material (e.g., the copper sheet 303*e*) included in the lower panel 303 of FIG. 6 in the second part 3002 may have a possibility of being electromagnetically coupled to the first display-overlapping conductive region 1001*a*. For example, a conductive material, such as an electrode or a wire, included in the display panel 301 of FIG. 6 in the second part 3002 may have a possibility of being electromagnetically coupled to the first display-overlapping conductive region 1001*a*.

For example, the part of the support sheet 3010, corresponding to the second part 3002, may have a possibility of being electromagnetically coupled to the first display-overlapping conductive region 1001*a*. In various embodiments, the support sheet 3010 may be interpreted as a part of the flexible display module 30.

According to an embodiment, the first display-overlapping conductive region 1001*a* may include a part of the first conductive part 1001, having a possibility of substantially being electromagnetically coupled to the flexible display module 30 due to a relative positional relationship with the flexible display module 30.

According to an embodiment, the first display-overlapping conductive region 1001*a* may include a part of the first conductive part 1001, having a possibility that a frequency characteristic may be substantially changed due to electromagnetic coupling with the flexible display module 30 caused by a relative position with the flexible display module 30.

According to various embodiments, the first display-overlapping conductive region 1001*a* may indicate a part having the maximum strength or a relatively large strength of an electric field when a radiation current is supplied to the first conductive part 1001.

Due to the electromagnetic coupling between the first display-overlapping conductive region 1001*a* and the second part 3002, for example, an electromagnetic effect of the second part 3002 on the first conductive part 1001 operating as an antenna radiator, there may be a possibility of degradation of the antenna radiation performance or coverage of the first conductive part 1001. For example, there may be a possibility that a frequency characteristic of an antenna device using the first conductive part 1001 may be changed due to an electromagnetic effect of the second part 3002. The electromagnetic effect of the second part 3002 on the first conductive part 1001 may be reduced by increasing the distance by which the first display-overlapping conductive region 1001*a* is spaced apart from the second part 3002. However, an external foreign material, such as dust or moisture, may be introduced into the slidable electronic device 2 through the gap between the first display-overlapping conductive region 1001*a* and the second part 3002. Therefore, there may be a limitation to increasing the distance between the first display-overlapping conductive region 1001*a* and the second part 3002. The electromagnetic effect of the second part 3002 on the first conductive part 1001 may be reduced by increasing the distance by which the first display-overlapping conductive region 1001*a* is spaced apart from the second part 3002. However, the distance increase may degrade the aesthetics of the slidable electronic device 2 or make it difficult to slim the slidable electronic device 2. Therefore, there may be a limitation to increasing the distance between the first display-overlapping conductive region 1001*a* and the second part 3002. There may be a comparative example in which a member for preventing/reducing introduction of an external foreign material is interposed between the first display-overlapping conductive region 1001*a* and the second part 3002 to implement no substantial air gap between the first display-overlapping conductive region 1001*a* and the second part 3002. However, no spacing between the first display-overlapping conductive region 1001*a* and the second part 3002 and the permittivity of the member may make it difficult to ensure the antenna radiation performance or coverage of the first conductive part 1001.

Hereinafter, an example indicated by a "comparative example" is merely provided for comparison with an embodiment of the disclosure, and has no precedence over various embodiments of the disclosure. Various embodiments of the disclosure may be implemented, in consideration of the above limitations and comparative examples, to not only reduce degradation of the antenna radiation performance or coverage of the first conductive part 1001 in a relative positional relationship between the flexible display module 30 and the first conductive part 1001, but also reduce the introduction of an external foreign material through the gap between the flexible display module 30 and the first conductive part 1001. Hereinafter, these embodiments will be described.

According to an embodiment, the first display-overlapping conductive region 1001*a* may include a first conductive region 1001*b* and a second conductive region 1001*c* extending from the first conductive region 1001*b*. The first conductive region 1001*b* may include a first surface 1201 facing and spaced apart from the second part 3002 of the flexible display module 30, and a third surface 1203 disposed opposite to the first surface 1201 to provide a part (e.g., a part of a lateral surface) of an outer surface of the slidable electronic device 2.

According to an embodiment, the first surface 1201 may be substantially parallel to a second surface 1202 (or a part of a front surface of the flexible display module 30) (e.g., a curved surface having a correspond radius of curvature) of the second part 3002, which faces and is spaced apart from the first display-overlapping conductive region 1001*a*. In an embodiment, the distance by which a partial region of the first surface 1201 is spaced apart from the second surface 1202 and the distance by which another partial region of the first surface 1201 is spaced apart from the second surface 1202 may be different from each other.

According to an embodiment, the second conductive region 1001*c* may protrude in a direction from the first surface 1201 to the second surface 1202.

According to an embodiment, the slidable electronic device 2 may include a dielectric 1100 positioned between (e.g., in an air gap between) the first display-overlapping conductive region 1001*a* and the second part 3002. The dielectric 1100 may be disposed on the second surface 1202 of the second part 3002. The dielectric 1100 may be, for example, directly disposed on or coupled (or attached) to the second part 3002. The dielectric 1100 may be, as another example, indirectly coupled to the second part 3002 through various materials (not illustrated separately), such as a thermoresponsive adhesive material (or a thermoresponsive bonding material), a photoresponsive adhesive material (or a photoresponsive bonding material), a normal adhesive agent (or a normal bonding agent), and/or double-sided tape.

According to an embodiment, the dielectric 1100 may at least partially face and be spaced apart from a region different from a region of the first surface 1201 on which the second conductive region 1001c is disposed. For example, a first air gap (AG1) may be provided between the dielectric 1100 and the region of the first surface 1201, facing the dielectric 1100.

According to an embodiment, the second conductive region 1001c may at least partially face and be spaced apart from a region different from a region of the second surface 1202 on which the dielectric 1100 is disposed. For example, a second air gap (AG2) may be provided between the second conductive region 1001c and the region of the second surface 1202, facing the second conductive region 1001c.

According to an embodiment, the second conductive region 1001c and the dielectric 1100 may reduce the introduction of an external foreign material, such as dust or moisture, into the slidable electronic device 2 by reducing the gap between the first display-overlapping conductive region 1001a and the second part 3002. For example, the second conductive region 1001c and the dielectric 1100 may be in contact with each other, and an external foreign material may have difficulty in entering the slidable electronic device 2 through the gap between the first display-overlapping conductive region 1001a and the second part 3002.

According to an embodiment, the dielectric 1100 may include a flexible material. The dielectric 1100 including a flexible material may be elastically in contact with the second conductive region 1001c and thus contribute to airtightness not to allow an external foreign material to enter into the slidable electronic device 2. The dielectric 1100 may include Poron for example, but may be various without being limited thereto.

According to various embodiments, the dielectric 1100 may include a substantially rigid material.

In an embodiment in which the first air gap AG1 and the second air gap AG2 are configured between the first display-overlapping conductive region 1001a and the second part 3002, the electromagnetic effect of the second part 3002 on the first display-overlapping conductive region 1001a may be reduced compared to a comparative example in which a member for preventing/reducing (the term "prevent" or "preventing" as used herein will be understood as "preventing and/or reducing", "prevent and/or reduce", or the like) introduction of an external foreign material is interposed between the first display-overlapping conductive region 1001a and the second part 3002 to implement no substantial air gap between the first display-overlapping conductive region 1001a and the second part 3002.

According to various embodiments, the first air gap AG1 and the second air gap AG2 may include dielectrics having the permittivity of air.

According to various embodiments (not illustrated separately), when viewed from above the second surface 1202 (or when viewed toward the second surface 1202), the second conductive region 1001c may partially overlap with the dielectric 1100, and the first air gap AG1 and the second air gap AG2 may be configured.

According to various embodiments, the slidable electronic device 2 is not limited to the illustrated embodiment, and may be implemented in various other types having one or more dielectrics and one or more air gaps between the first display-overlapping conductive region 1001a and the second part 3002.

According to an embodiment, the sum between the distance (e.g., the thickness of the second air gap AG2) between the second conductive region 1001c and the second surface 1202, and the distance (e.g., the thickness of the first air gap AG1) between the dielectric 1100 and the first surface 1201 may be less than the distance between the first surface 1201 and the second surface 1202.

According to various embodiments, the distance (e.g., the thickness of the first air gap AG1) between the dielectric 1100 and the first surface 1201 may be different from or substantially the same as the distance (e.g., the thickness of the second air gap AG2) between the second conductive region 1001c and the second surface 1202.

According to an embodiment, the dielectric 1100 may have a permittivity enabling reduction of degradation of the antenna radiation performance of the first conductive part 1001. The permittivity of the dielectric 1100 may be, for example, a value contributing in preventing/reducing the antenna radiation performance of the first conductive part 1001 from degrading to be equal or lower than a threshold level. The permittivity of the dielectric 1100 may be, for example, a value enabling reduction of the electromagnetic effect on the first conductive part 1001.

According to an embodiment, the permittivity of the dielectric 1100 may be a value (e.g., a low permittivity) which is less than the permittivity of the first conductive part 1001 and has a small difference from the permittivity of the first air gap AG1 and the second air gap AG2.

According to an embodiment, the dielectric 1100 may include a non-conductive material (e.g., Poron).

According to various embodiments, the dielectric 1100 may include a conductive material.

According to various embodiments, one of the dielectric 1100 and the air gap (e.g., the first air gap AG1 and the second air gap AG2) and the other one thereof may include a "first dielectric" and a "second dielectric", respectively.

According to various embodiments, the disclosure is not limited to the example in which the first conductive region 1001b and the second conductive region 1001c are integrated, and the second conductive region 1001c may be disposed on or coupled to the first conductive region 1001b through mechanical fastening such as screw fastening or bonding using an adhesive material (or a bonding material). The second conductive region 1001c may be electrically connected to the first conductive region 1001b. In an embodiment, the second conductive region 1001c may be electrically separated from the first conductive region 1001b. The second conductive region 1001c may include a metallic material identical to or different from that of the first conductive region 1001b. The permittivity of the second conductive region 1001c may be, for example, less than that of the first conductive region 1001b. In an embodiment, the second conductive region 1001c may be interpreted as a separate element (e.g., a conductive member) different from the first display-overlapping conductive region 1001a, and the first display-overlapping conductive region 1001a may substantially indicate the first conductive region 1001b. In an embodiment, the second conductive region 1001c may include a dielectric including a conductive material.

Referring to FIG. 13, in various embodiments, the first display-overlapping conductive region 1001a may be configured without the second conductive region 1001c, and a dielectric 1301 (e.g., a non-conductive member) that is made of a non-conductive material and replaces the second conductive region 1001c may be directly or indirectly disposed on or coupled to the first display-overlapping conductive region 1001a. For example, the dielectric 1301 may be disposed on or coupled to the first display-overlapping conductive region 1001a through mechanical fastening such as screw fastening or bonding using an adhesive material (or a bonding material). In an embodiment (not illustrated separately), the dielectric 1301 may have substantially the same shape of the second conductive region 1001c of FIG. 12, and be disposed on the first display-overlapping conductive region 1001a.

According to an embodiment, the dielectric 1301 may include a flexible material, and be elastically in contact with the other dielectric 1100 to contribute to airtightness not to allow an external foreign material to enter into the electronic device 2. The dielectric 1301 may include Poron for example, but may be various without being limited thereto.

According to various embodiments, the dielectric 1301 may include a substantially rigid material.

According to various embodiments, the dielectric 1301 may include a material identical to or different from that of the other dielectric 1100.

According to various embodiments, the permittivity of the dielectric 1301 may be identical to or different from that of the other dielectric 1100.

According to an embodiment, the dielectric 1301 may have a permittivity enabling reduction of degradation of the antenna radiation performance of the first conductive part 1001.

According to various embodiments, one of the two dielectrics 1100 and 1301, and the air gap (e.g., the first air gap AG1 and the second air gap AG2), another one, and the other one may include a "first dielectric", a "second dielectric", and a "third dielectric", respectively.

According to an embodiment, a structure (not illustrated separately) in which a part of the second conductive part 1002 (see FIG. 10 or 11) included in the first side wall 201 is disposed with respect to the second part 3002 of the flexible display module 30 may be substantially the same as or similar to a structure in which the first conductive part 1001 is disposed with respect to the second part 3002 of the flexible display module 30. In a case where the second conductive part 1002 is used as an antenna radiator, substantially identically to the embodiment illustrated in FIG. 12 or 13, one or more dielectrics and one or more air gaps may be implemented between the second part 3002 of the flexible display module 30 and a part of the second conductive part 1002, included in the display overlapping part 2011 of the first side wall 201.

According to an embodiment, a structure (not illustrated separately) in which a part of the third conductive part 1003 (see FIG. 10) included in the first side wall 201 is disposed with respect to the second part 3002 of the flexible display module 30 may be substantially the same as or similar to a structure in which the first conductive part 1001 is disposed with respect to the second part 3002 of the flexible display module 30. In a case where the third conductive part 1003 is used as an antenna radiator, substantially identically to the embodiment illustrated in FIG. 12 or 13, one or more dielectrics and one or more air gaps may be implemented between the second part 3002 of the flexible display module 30 and a part of the third conductive part 1003, included in the display overlapping part 2011 of the first side wall 201.

According to various embodiments, the support sheet 3010 may not be expanded to the second part 3002 of the flexible display module 30. In this case, the support sheet 3010 may not substantially affect electromagnetic effects on an antenna radiator using the first side wall 201.

According to various embodiments (not illustrated separately), the screen S1 (see FIG. 2 or 4) may be provided to have the expanded first flat part S11 (see FIG. 2 or 4) without the first curved part S12. In this case, the one or more elements included in the embodiment of FIG. 12 or 13 may be modified so that the display overlapping part 2011 of the first side wall 201 overlaps with the second part 3002 of the flexible display module 30 when viewed from above the first flat part S1 (see FIG. 2 or 4) (when viewed in the −z-axis direction).

Figure 14:
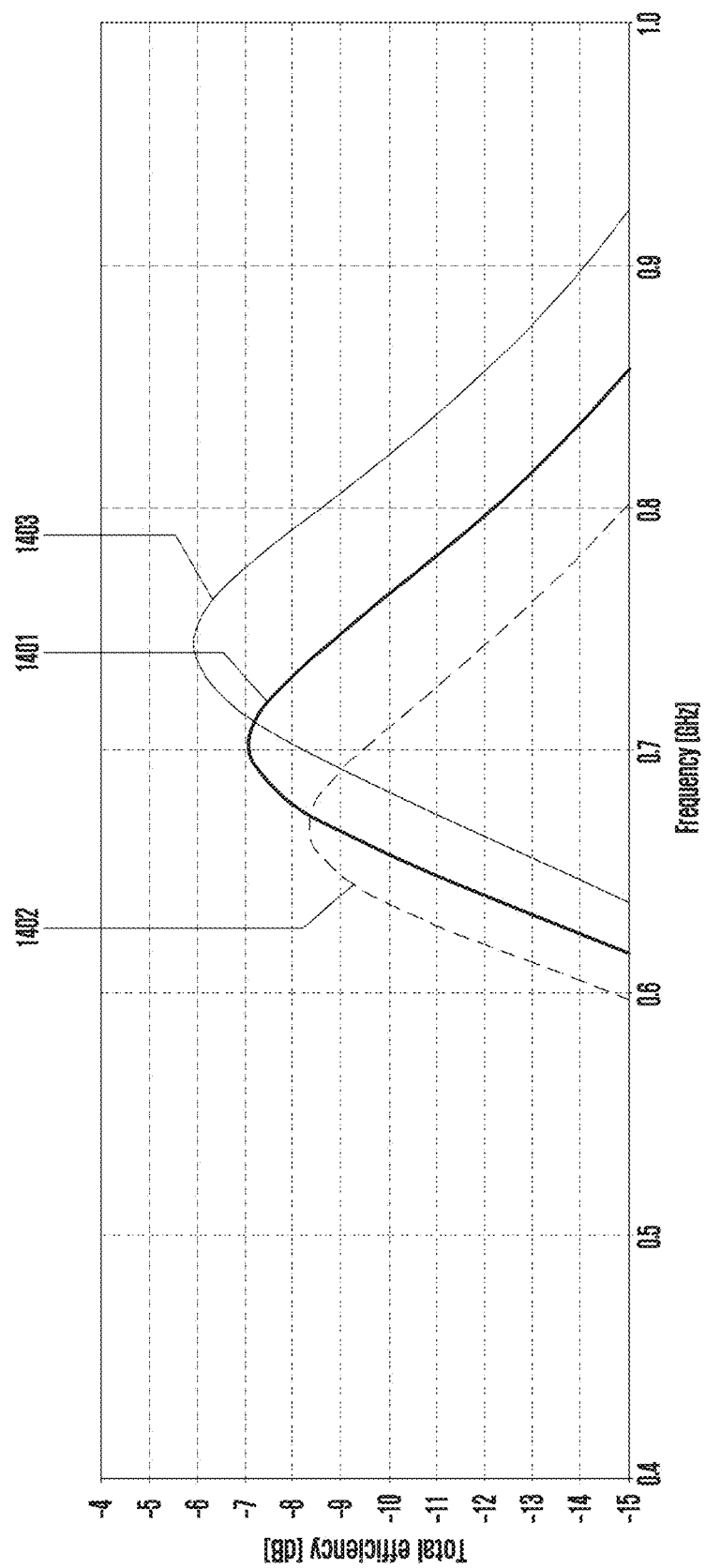
FIG. 14 is a graph showing an antenna radiation performance of a first conductive part in a slidable electronic device according to the embodiment of FIG. 12 or FIG. 13, an antenna radiation performance of a first conductive part in a slidable electronic device according to a first comparative example, and an antenna radiation performance of a first conductive part in a slidable electronic device according to a second comparative example.
Figure 15:
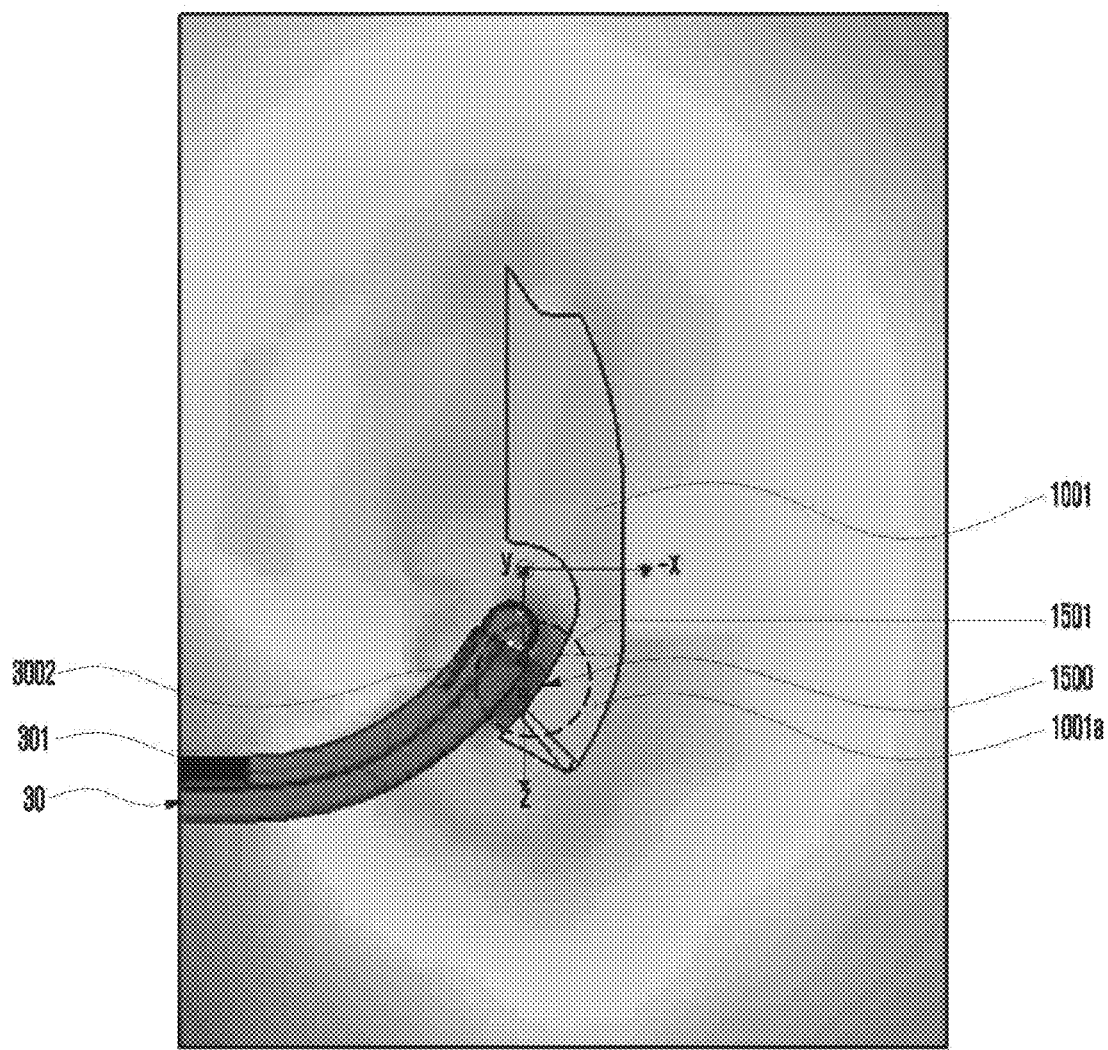
FIG. 15 is a diagram illustrating an electric field distribution when a radiation current is provided to the first conductive part in the slidable electronic device according to the first comparative example.

FIG. 14 illustrates graphs showing the antenna radiation performance of the first conductive part 1001 in the slidable electronic device 2 according to the embodiment of FIG. 12 or FIG. 13, the antenna radiation performance of the first conductive part 1001 in a slidable electronic device according to a first comparative example, and the antenna radiation performance of the first conductive part 1001 in a slidable electronic device according to a second comparative example. FIG. 15 is a diagram illustrating an electric field distribution when a radiation current is provided to the first conductive part 1001 in the slidable electronic device according to the first comparative example.

Referring to FIG. 15, in the slidable electronic device of the first comparative example, a member (or dielectric) 1500 for preventing/reducing introduction of an external foreign material may be interposed between the first display-overlapping conductive region 1001a of the first conductive part 1001 and the second part 3002 of the flexible display module 30. In the slidable electronic device of the first comparative example, there may be no substantial air gap between the first display-overlapping conductive region 1001a and the second part 3002.

In the slidable electronic device of the second comparative example (not illustrated separately), a member (or dielectric), for preventing/reducing introduction of an external foreign material, interposed between the first display-overlapping conductive region 1001a and the second part 3002 may be omitted. In the slidable electronic device of the second comparative example, there may be an air gap between the first display-overlapping conductive region 1001a and the second part 3002.

Reference numeral "1401" of FIG. 14 indicates a graph showing the antenna radiation performance of the first conductive part 1001 in the slidable electronic device 2 according to the embodiment of FIG. 12 or 13. Reference numeral "1402" of FIG. 14 indicates a graph showing the antenna radiation performance of the first conductive part 1001 in the slidable electronic device of the first comparative example. Reference numeral "1403" of FIG. 14 indicates a graph showing the antenna radiation performance of the first conductive part 1001 in the slidable electronic device of the second comparative example. The slidable electronic device 2 according to the embodiment of FIG. 12 or 13 may reduce the degradation of antenna radiation performance in a selected or designated frequency band (e.g., LB) due to the air gap (e.g., the first air gap AG1 and the second air gap AG2 in FIG. 12 or 13) between the first display-overlapping conductive region 1001a and the second part 3002, compared to the slidable electronic device of the first comparative example. The slidable electronic device of the first comparative example does not include an air gap between the first display-overlapping conductive region 1001a and the second part 3002. Therefore, coupling energy is focused on apart (see reference numeral "1501") including the first display-overlapping conductive region 1001a, the second part 3002, and the member 1500, and thus it may be difficult to ensure the antenna radiation performance of the first conductive part 1001. The slidable electronic device 2 according to the embodiment of FIG. 12 or 13 may reduce the introduction of an external foreign material into the slidable electronic device 2 through the gap between the display-overlapping conductive region 1001a and the second part 3002, compared to the slidable electronic device of the second comparative example.

Figure 16:
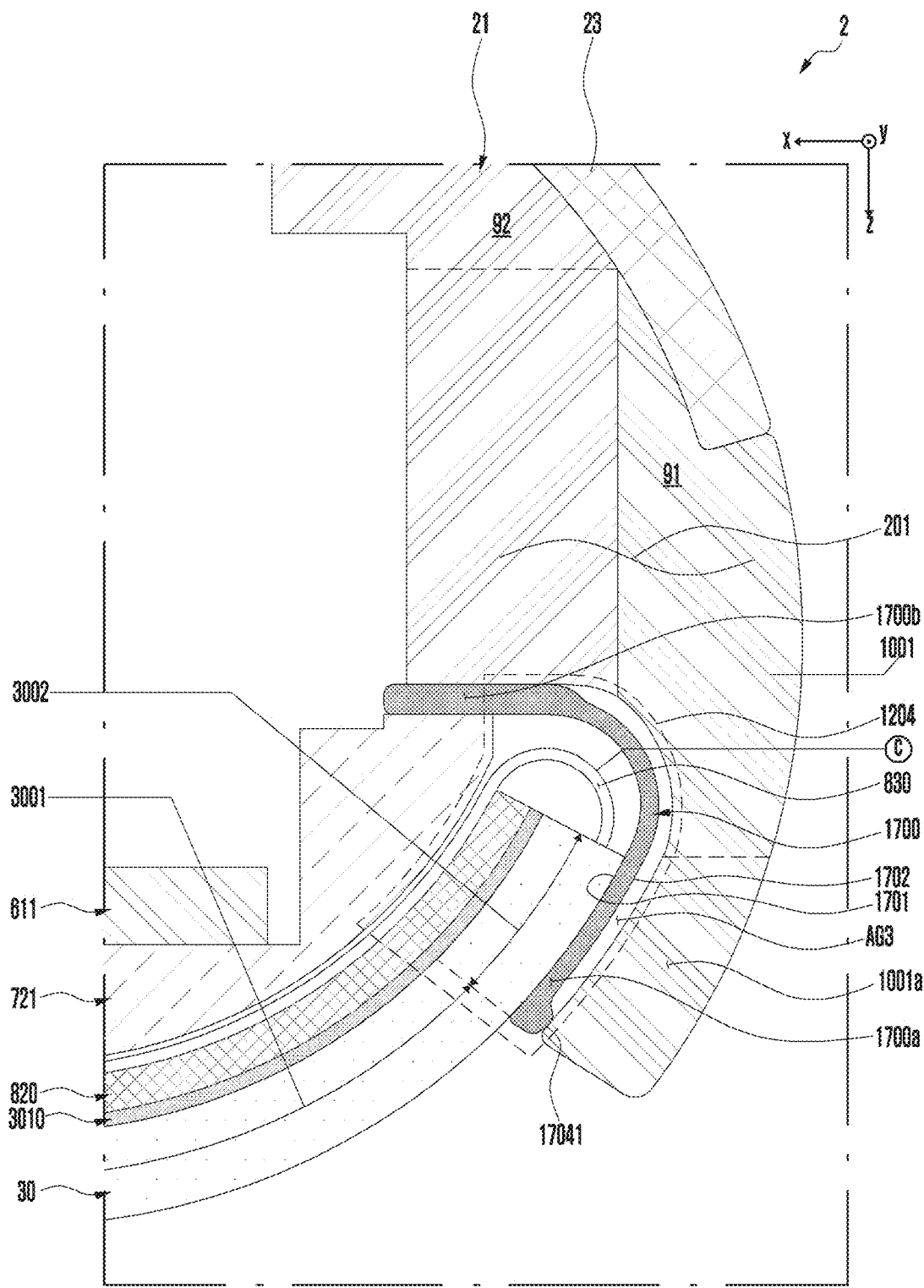
FIG. 16 is a partial cross-sectional view of a slidable electronic device that is a modification of the embodiment of FIG. 13 according to various embodiments.
Figure 17:
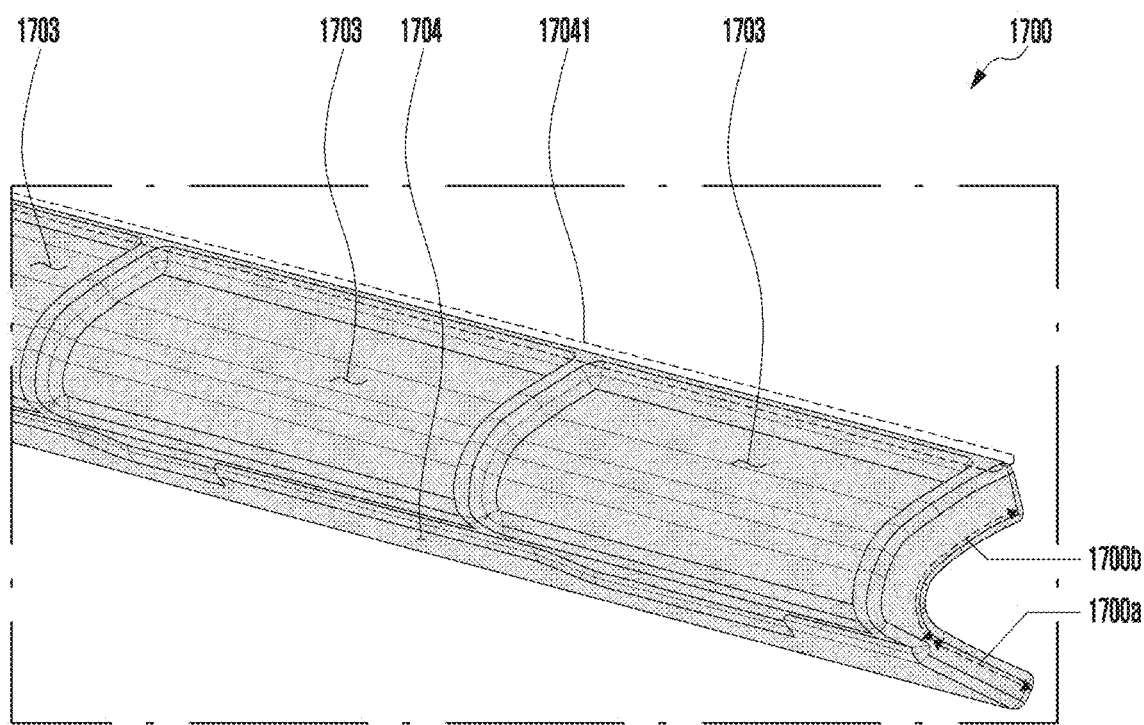
FIG. 17 is a perspective view of a dielectric illustrated in FIG. 16 according to various embodiments.

FIG. 16 is a cross-sectional view of the slidable electronic device 2 that is a modification of the embodiment of FIG. 13 according to various embodiments. FIG. 17 is a perspective view of a dielectric 1700 illustrated in FIG. 16 according to various embodiments.

Referring to FIGS. 16 and 17, in an embodiment, the slidable electronic device 2 may include an integrated dielectric (or dielectric structure) 1700 replacing the dielectrics 1100 and 1301 according to the embodiment of FIG. 13.

According to an embodiment, the dielectric 1700 may include a first structure part (or a first part) 1700a and a second structure part (or a second part) 1700b. The first structure part 1700a may be positioned between the first display-overlapping conductive region 1001a of the first conductive part 1001 and the second part 3002 of the flexible display module 30. The second structure part 1700b may extend from the first structure part 1700a to the gap between the first support member 721 and the first side wall 201. The second structure part 1700b may be positioned, for example, to cross the recess type space 1204 in which the bent part 830 of the third region ⓒ of the flexible display module 30 is positioned. The second structure part 1700b may act as, for example, a cover for protecting the bent part 830 of the third region ⓒ.

According to an embodiment, the second structure part 1700b may be coupled to the first support member 721 or the first side wall 201 through mechanical connection such as screw fastening or bonding using an adhesive material (or a bonding material).

According to an embodiment, the first structure part 1700a may be supported by the second structure part 1700b coupled to the first support member 721 or the first side wall 201 and thus be stably positioned between the second part 3002 of the flexible display module 30 and the first display-overlapping conductive region 1001a of the first conductive part 1001.

According to an embodiment, the dielectric 1700 may include a fourth surface 1701, and a fifth surface 1702 positioned opposite to the first surface 1701. The fourth surface 1701 may be positioned to face the second part 3002 of the flexible display module 30. The fifth surface 1702 may be positioned to face the first side wall 201. The fourth surface 1701 may be in contact with the second part 3002 to be supported by the second part 3002.

According to various embodiments, an adhesive material or a bonding material may be disposed between the fourth surface 1701 and the second part 3002.

According to an embodiment, the dielectric 1700 may include one or more recesses 1703 arranged on the fifth surface 1702. An air gap AG3 between the dielectric 1700 and the first display-overlapping conductive region 1001a of the first conductive part 1001 may be substantially configured by the one or more recesses 1703. An embodiment in which the third air gap AG3 is configured may ensure the antenna radiation performance of the first conductive part 1001 by reducing the electromagnetic effect of the second part 3002 on the first display-overlapping conductive region 1001a, compared to a comparative example in which a member for preventing/reducing introduction of an external foreign material is interposed between the first display-overlapping conductive region 1001a and the second part 3002 to implement no substantial air gap between the first display-overlapping conductive region 1001a and the second part 3002. The shape or number of recesses arranged on the fifth surface 1702 of the dielectric 1700 may be various without being limited to the illustrated example.

According to an embodiment, the dielectric 1700 may reduce the introduction of an external foreign material, such as dust or moisture, into the slidable electronic device 2 by reducing the gap between the first display-overlapping conductive region 1001a of the first conductive part 1001 and the second part 3002 of the flexible display module 30. For example, a region 1704 remaining after excluding a region including the one or more recesses 1703 from the fifth surface 1702 of the dielectric 1700 may be in contact with the first display-overlapping conductive region 1001a, and an external foreign material, such as dust or moisture, may have difficulty in entering the slidable electronic device 2 through the gap between the first display-overlapping conductive region 1001a and the dielectric 1700.

According to an embodiment, a part 17041 of the region 1704 remaining after excluding the region including the one or more recesses 1703 from the fifth surface 1702 of the dielectric 1700 may face the first display-overlapping conductive region 1001a and is positioned adjacent to the first part 3001 of the flexible display module 30, and thus make it difficult for an external foreign material to enter through the gap between the dielectric 1700 and the first display-overlapping conductive region 1001a.

According to an embodiment, the fourth surface 1701 of the dielectric 1700 may be in contact with the second part 3002 of the flexible display module 30 or may be coupled to the second part 3002 through an adhesive material or a bonding material. The external foreign material, such as dust or moisture, may have difficulty in entering the slidable electronic device 2 through the gap between the second part 3002 and the dielectric 1700.

According to an embodiment, the dielectric 1700 may have a permittivity enabling reduction of degradation of the antenna radiation performance of the first conductive part 1001. The permittivity of the dielectric 1700 may be a value contributing in preventing/reducing the antenna radiation performance of the first conductive part 1001 from degrading to be equal or less than a threshold level. The permittivity of the dielectric 1700 may be a value enabling reduction of the electromagnetic effect on the first conductive part 1001.

According to an embodiment, the permittivity of the dielectric 1700 may be a value (e.g., a low permittivity) which is less than the permittivity of the first conductive part 1001 and has a small difference from the permittivity of the air gap AG3.

According to an embodiment, the dielectric 1700 may include a non-conductive material.

According to various embodiments, the dielectric 1700 may include a conductive material.

According to an embodiment (not illustrated separately), the dielectric 1700 may be expanded to correspond to the second conductive part 1002 (see FIG. 10 or 11) of the first side wall 201. In a case where the second conductive part 1002 is used as an antenna radiator, in a manner substantially the same as the embodiment illustrated in FIG. 16, the electromagnetic effect of the second part 3002 of the flexible display module 30 on the second conductive part 1002 may be reduced due to the air gap between the dielectric 1700 and the second conductive part 1002, so as to ensure the antenna radiation performance of the second conductive part 1002. The dielectric 1700 may reduce the introduction of an external foreign material, such as dust or moisture, into the slidable electronic device 2 by reducing the gap between the second conductive part 1002 and the second part 3002 in a manner substantially the same as the embodiment illustrated in FIG. 16.

According to an embodiment (not illustrated separately), the dielectric 1700 may be expanded to correspond to the third conductive part 1003 (see FIG. 10) of the first side wall 201. In a case where the third conductive part 1003 is used as an antenna radiator, in a manner substantially the same as the embodiment illustrated in FIG. 16, the electromagnetic effect of the second part 3002 of the flexible display module 30 on the third conductive part 1003 may be reduced due to the air gap between the dielectric 1700 and the third conductive part 1003, so as to ensure the antenna radiation performance of the third conductive part 1003. The dielectric 1700 may reduce the introduction of an external foreign material, such as dust or moisture, into the slidable electronic device 3 by reducing the gap between the second conductive part 1003 and the second part 3002 in a manner substantially the same as the embodiment illustrated in FIG. 16.

Figure 18:
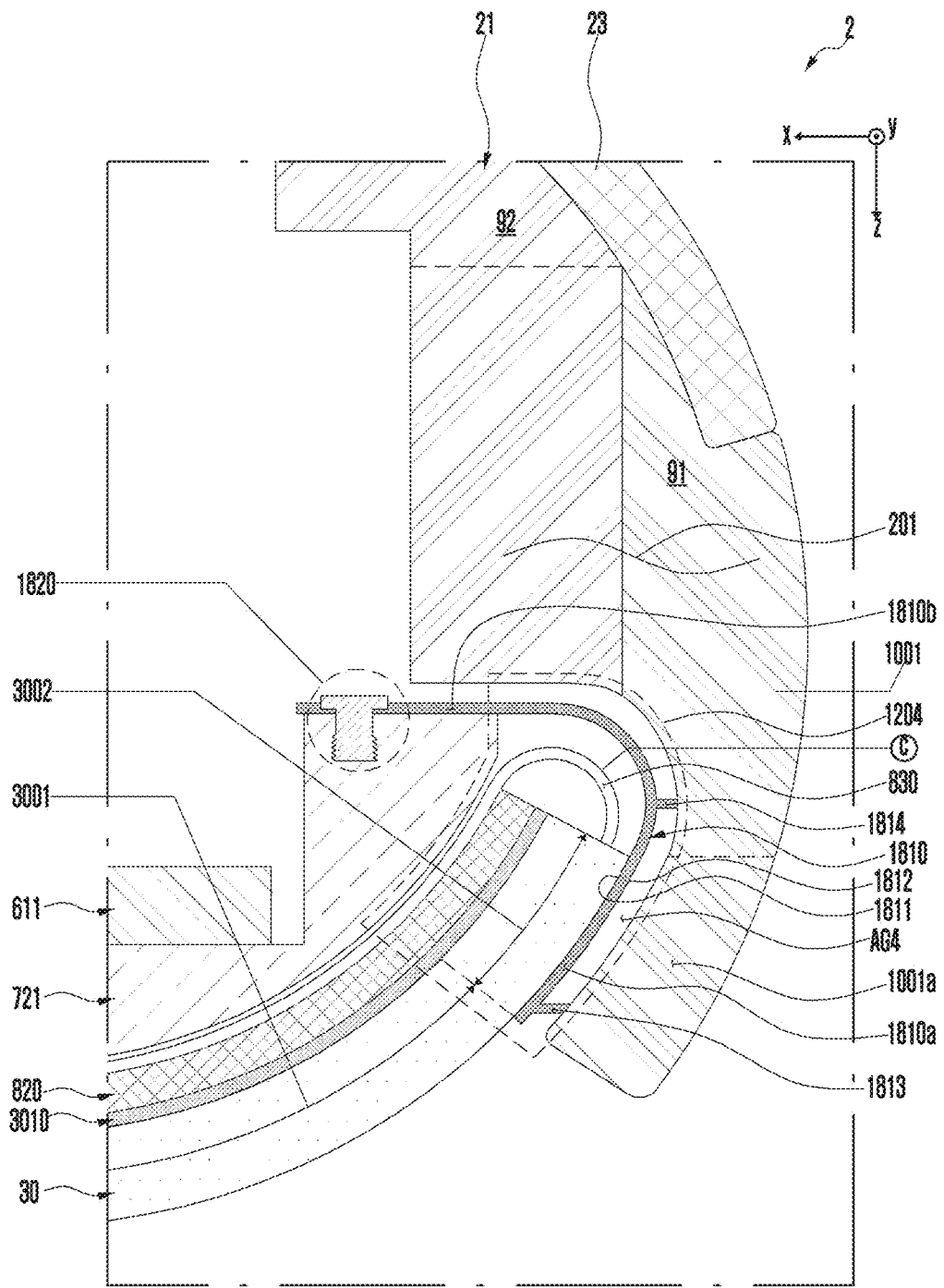
FIG. 18 is a sectional view of a slidable electronic device that is a modification of the embodiment of FIG. 16 according to various embodiments.

FIG. 18 is a cross-sectional view of the slidable electronic device 2 that is a modification of the embodiment of FIG. 16 according to various embodiments.

Referring to FIG. 18, in an embodiment, a dielectric (or dielectric structure) 1810 may include a first structure part 1810a and a second structure part 1810b. The first structure part 1810a may be positioned between the first display-overlapping conductive region 1001a and the second part 3002 of the flexible display module 30. The second structure part 1810b may extend from the first structure part 1810a to the gap between the first side wall 201 and the first support member 721 through the recess type space 1204 in which the bent part 830 of the flexible display module 30 is positioned.

According to an embodiment, the second structure part 1810b may be coupled to the first support member 721 screw fastening 1820.

According to various embodiments, the second structure part 1810b may be coupled to the first support member 721 through bonding using an adhesive material (or a bonding material) (not illustrated separately).

According to an embodiment, the first structure part 1810a may be supported by the second structure part 1810b coupled to the first support member 721 and thus be stably positioned between the second part 3002 and the first display-overlapping conductive region 1001a.

According to an embodiment, the dielectric 1810 may include a fourth surface 1811 facing the second part 3002, and a fifth surface 1812 positioned opposite to the first surface 1811 to face the first side wall 201. The fourth surface 1811 may be in contact with the second part 3002 or may be coupled to the second part 3002 through an adhesive material (or a bonding material)(not illustrated separately). The external foreign material, such as dust or moisture, may have difficulty in entering the slidable electronic device 2 through the gap between the second part 3002 and the dielectric 1810. The fifth surface 1812 may be positioned to be at least partially spaced apart from the first side wall 201.

According to an embodiment, the dielectric 1810 may include a first support part 1813 and/or a second support part 1814 protruding in a direction from the fifth surface 1812 to the first side wall 201. The first support part 1813 and the second support part 1814 may support the first side wall 201 so that the first display-overlapping conductive region 1001a is not positioned close to the fifth surface 1812 within a configured distance.

According to an embodiment, the first support part 1813 may face the first display-overlapping conductive region 1001a and is positioned adjacent to the first part 3001 of the flexible display module 30, and thus make it difficult for an external foreign material to enter through the gap between the dielectric 1810 and the first display-overlapping conductive region 1001a.

According to an embodiment, an air gap AG4 may be provided between the dielectric 1800 and the first display-overlapping conductive region 1001a of the first conductive part 1001. An embodiment in which the air gap AG4 is configured may ensure the antenna radiation performance of the first conductive part 1001 by reducing the electromagnetic effect of the second part 3002 on the first display-overlapping conductive region 1001a, compared to a comparative example in which a member for preventing/reducing introduction of an external foreign material is interposed between the first display-overlapping conductive region 1001a and the second part 3002 of the flexible display module 30 to implement no substantial air gap between the first display-overlapping conductive region 1001a and the second part 3002.

According to an embodiment, the dielectric 1810 may have a permittivity enabling reduction of degradation of the antenna radiation performance of the first conductive part 1001. The permittivity of the dielectric 1810 may be a value contributing in preventing/reducing the antenna radiation performance of the first conductive part 1001 from degrading to be equal or lower than a threshold level. The permittivity of the dielectric 1810 may be a value enabling reduction of the electromagnetic effect on the first conductive part 1001.

According to an embodiment, the permittivity of the dielectric 1810 may be a value (e.g., a low permittivity) which is less than the permittivity of the first conductive part 1001 and has a small difference from the permittivity of the air gap AG4.

According to an embodiment, the dielectric 1810 may include a non-conductive material.

According to various embodiments, the dielectric 1810 may include a conductive material.

According to an embodiment (not illustrated separately), the dielectric 1810 may be expanded to correspond to the second conductive part 1002 (see FIG. 10 or 11) of the first side wall 201. In a case where the second conductive part 1002 is used as an antenna radiator, in a manner substantially the same as the embodiment illustrated in FIG. 18, the electromagnetic effect of the second part 3002 of the flexible display module 30 on the second conductive part 1002 may be reduced due to the air gap between the dielectric 1810 and the second conductive part 1002, so as to ensure the antenna radiation performance of the second conductive part 1002. The dielectric 1810 may reduce the introduction of an external foreign material, such as dust or moisture, into the slidable electronic device 2 by reducing the gap between the second conductive part 1002 and the second part 3002 in a manner substantially the same as the embodiment illustrated in FIG. 18.

According to an embodiment (not illustrated separately), the dielectric 1810 may be expanded to correspond to the third conductive part 1003 (see FIG. 10) of the first side wall 201. In a case where the third conductive part 1003 is used as an antenna radiator, in a manner substantially the same as the embodiment illustrated in FIG. 18, the electromagnetic effect of the second part 3002 of the flexible display module 30 on the third conductive part 1003 may be reduced due to the air gap between the dielectric 1810 and the third conductive part 1003, so as to ensure the antenna radiation performance of the third conductive part 1003. The dielectric 1810 may reduce the introduction of an external foreign material, such as dust or moisture, into the slidable electronic device 3 by reducing the gap between the second conductive part 1003 and the second part 3002 in a manner substantially the same as the embodiment illustrated in FIG. 18.

According to various embodiments, the shape or number of the support parts included in the dielectric 1810 to support the first side wall 201 so that the first display-overlapping conductive region 1001*a* is not positioned close to the fifth surface 1812 of the dielectric 1810 within a configured distance may be various without being limited to the illustrated example (not illustrated separately).

According to various embodiments (not illustrated separately), the dielectric 1810 may be implemented without the second support part 1814. In this case, the first support part 1813 may function to not only support the first side wall 201 so that the first display-overlapping conductive region 1001*a* is not positioned close to the fifth surface 1812 of the dielectric 1910 within a corresponding distance, but also reduce the introduction of an external foreign material, such as dust or moisture, into the slidable electronic device 2.

Figure 19:
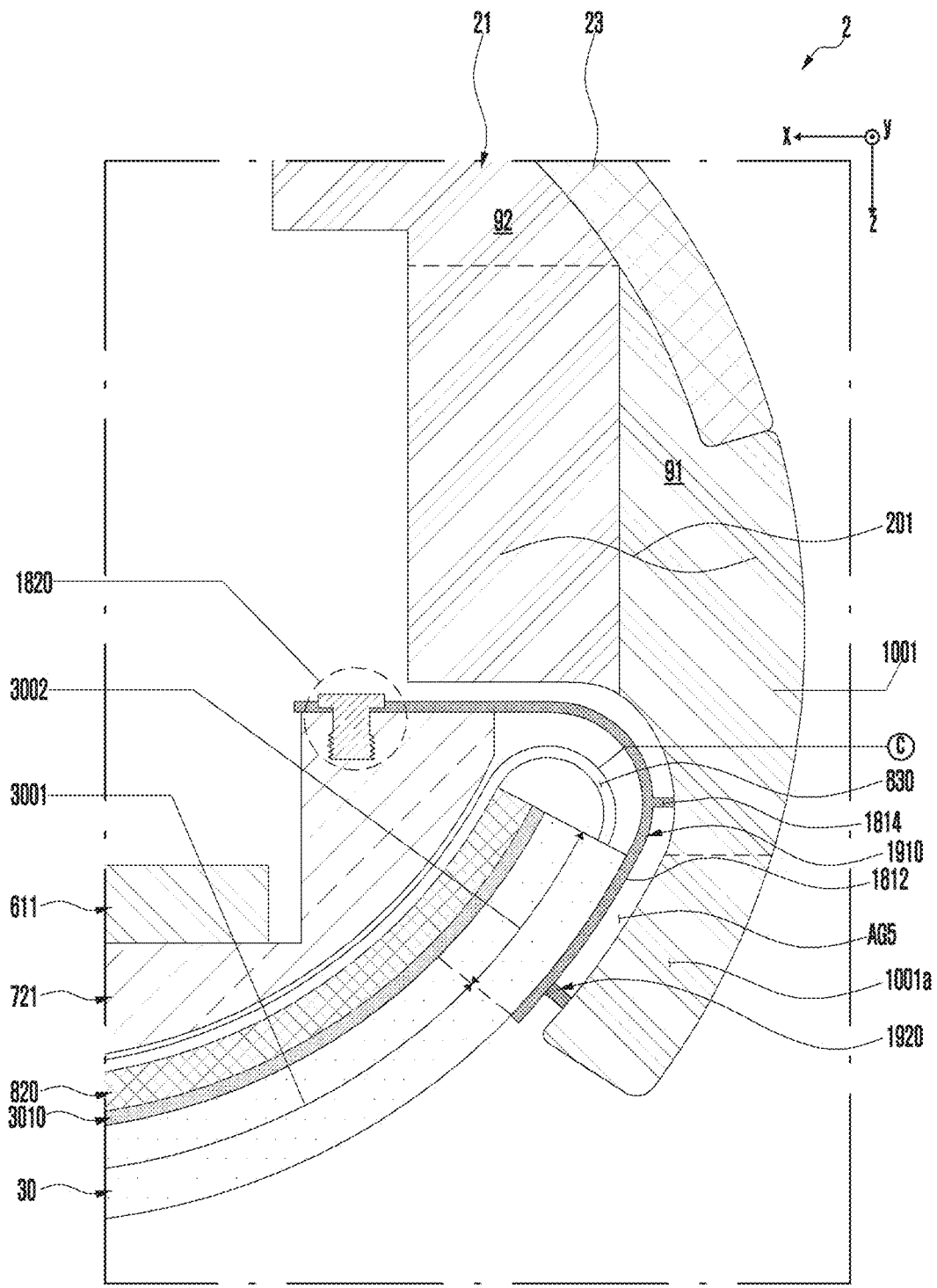
FIG. 19 is a sectional view of a slidable electronic device that is a modification of the embodiment of FIG. 18 according to various embodiments.

FIG. 19 is a cross-sectional view of the slidable electronic device that is a modification of the embodiment of FIG. 18 according to various embodiments.

Referring to FIG. 19, in an embodiment, a dielectric 1910 may be substantially the same as the dielectric 1810 of FIG. 18 not including the first support part 1813 of FIG. 18. The slidable electronic device 2 may include a non-conductive member 1920 replacing the first support part 1813 of FIG. 18.

According to an embodiment, the non-conductive member 1920 may be disposed on or coupled to the dielectric 1910 through bonding (not illustrated separately) using an adhesive material (or a bonding material) or mechanical fastening (not illustrated separately) such as screw fastening.

According to various embodiments, the non-conductive member 1920 may be disposed on or coupled to the first display-overlapping conductive region 1001*a* of the first conductive part 1001 through bonding (not illustrated separately) using an adhesive material (or a bonding material) or mechanical fastening (not illustrated separately) such as screw fastening.

According to an embodiment, the non-conductive member 1920 and the second support part 1814 may support the first side wall 201 so that the first display-overlapping conductive region 1001*a* is not positioned close to the fifth surface 1812 of the dielectric 1910 within a corresponding distance.

According to various embodiments, the non-conductive member 1920 may include a flexible material which is able to be elastically disposed between the first display-overlapping conductive region 1001*a* and the dielectric 1910, and contribute to airtightness not to allow an external foreign material to enter into the electronic device 2.

According to various embodiments, the non-conductive member 1920 may include a substantially rigid material.

According to various embodiments, the non-conductive member 1920 may include a material identical to or different from that of the dielectric 1910.

According to various embodiments (not illustrated separately), the first display-overlapping conductive region 1001*a* may be implemented to include the second conductive region 1001*c* of FIG. 12 in replacement of the non-conductive member 1920.

According to various embodiments (not illustrated separately), the dielectric 1910 may be implemented without the second support part 1814.

Figure 20:
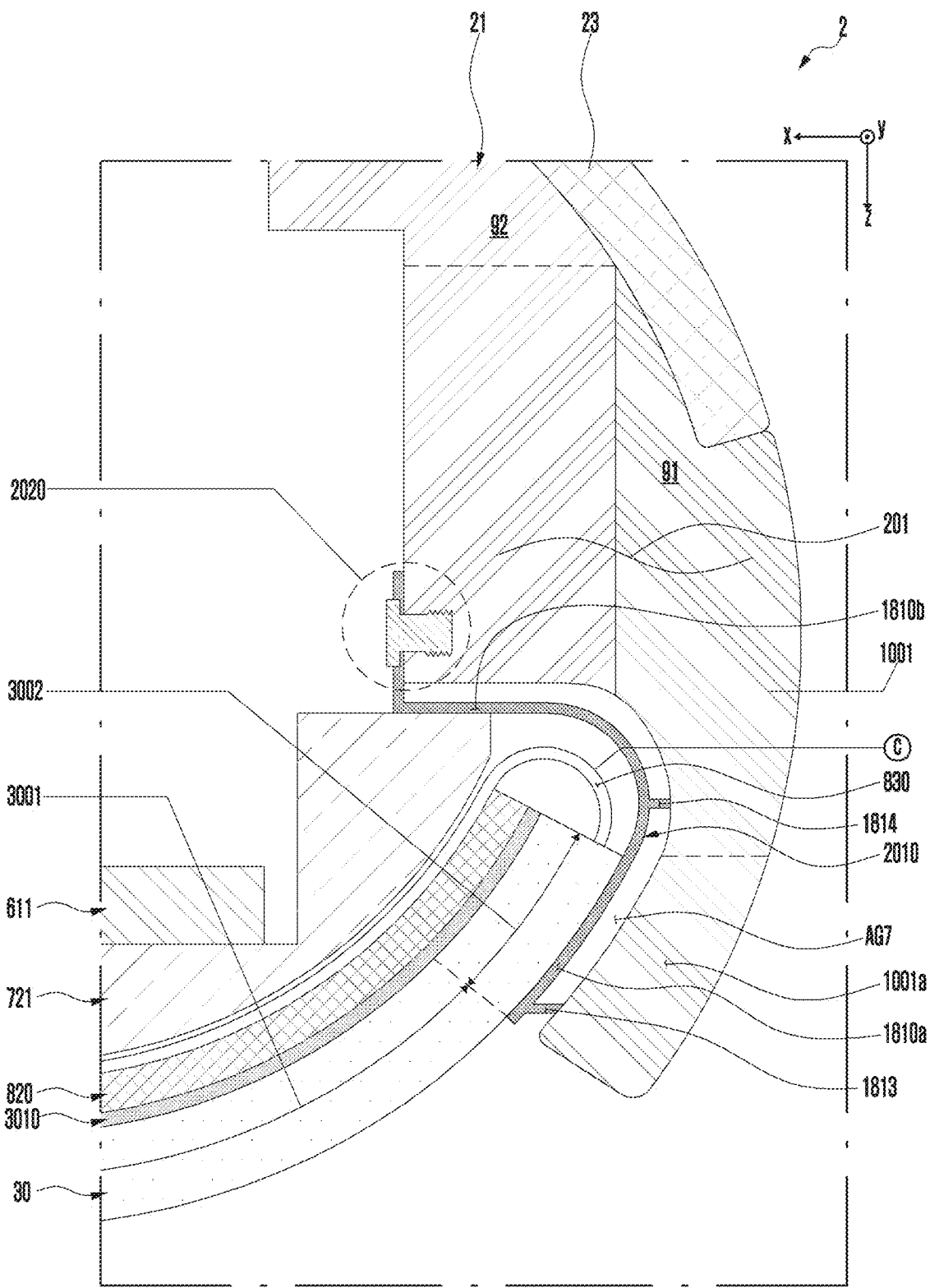
FIG. 20 is a sectional view of a slidable electronic device that is a modification of the embodiment of FIG. 18 according to various embodiments.

FIG. 20 is a cross-sectional view of the slidable electronic device 2 that is a modification of the embodiment of FIG. 18 according to various embodiments.

Referring to FIG. 20, in an embodiment, in comparison with the second structure part 1810*b* of the dielectric 1810 of FIG. 18 being coupled to the first support member 721 through screw fastening, the second structure part 1810*b* of a dielectric 2010 may be coupled to the first side wall 201 through screw fastening 2020.

According to various embodiments, the second structure part 1810*b* of the dielectric 2010 may be coupled to the first side wall 201 through an adhesive material (or a bonding material) (not illustrated separately).

According to various embodiments (not illustrated separately), the dielectric 2010 may be implemented without the second support part 1814.

According to various embodiments (not illustrated separately), the dielectric 2010 may be configured without the first support part 1813. In this case, the slidable electronic device 2 may include a non-conductive member (e.g., the non-conductive member 1920 of FIG. 19) replacing the first support part 1813.

According to various embodiments (not illustrated separately), the first display-overlapping conductive region 1001*a* of the first conductive part 1001 may be implemented to include the second conductive region 1001*c* of FIG. 12 in replacement of the first support part 1813.

Figure 21:
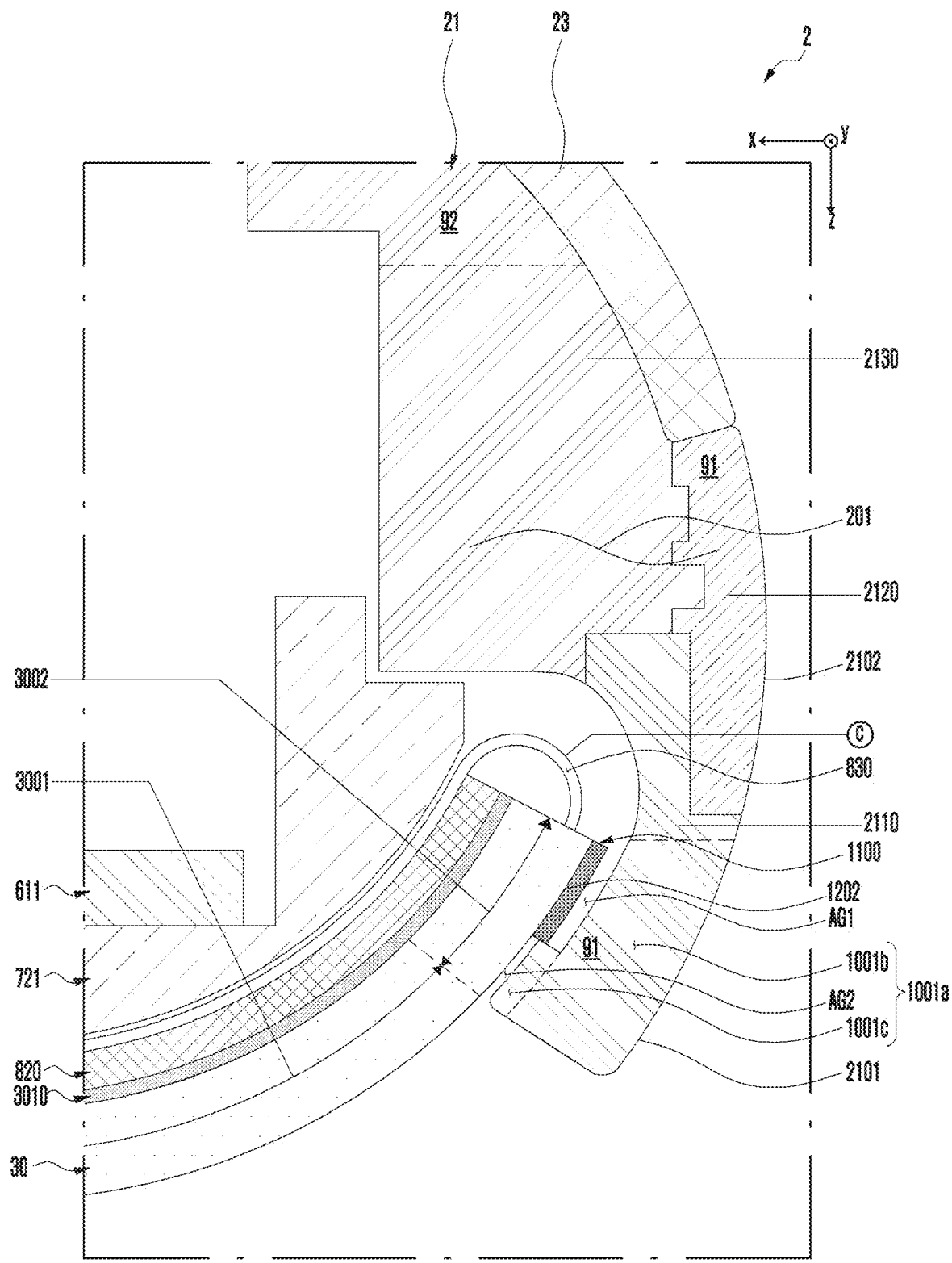
FIG. 21 is a sectional view of a slidable electronic device that is a modification of the embodiment of FIG. 12 according to various embodiments.

FIG. 21 is a cross-sectional view of the slidable electronic device that is a modification of the embodiment of FIG. 12 according to various embodiments.

Referring to FIG. 21, in an embodiment, the first side wall 201 may include a first side wall structure part 2110, a second side wall structure part 2120, and/or a third side wall structure part 2130.

According to an embodiment, the first side wall structure part 2110 may include a metallic material, as a part of the conductive structure 91. The first side wall structure part 2110 may include a first lateral region 2101 of a lateral surface of the slidable electronic device 2, provided by the first side wall 201. The first lateral region 2101 may include, for example, the third surface 1203 illustrated in FIG. 12.

According to an embodiment, the second side wall structure part 2120 may include a metallic material, as apart of the conductive structure 91. The second side wall structure part 2120 may be coupled to the first side wall structure part 2110. The second side wall structure part 2120 may include a second lateral region 2102 of the lateral surface of the slidable electronic device 2, provided by the first side wall 201. The second lateral region 2102 may be positioned between a rear surface of the slidable electronic device 2, provided by the back cover 23, and the first lateral region 2101 of the slidable electronic device 2, provided by the first side wall structure part 2110.

According to an embodiment, the first lateral region 2101 provided by the first side wall structure part 2110 and the second lateral region 2102 provided by the second side wall structure part 2120 may be substantially smoothly connected without a step therebetween.

According to an embodiment, the second lateral region 2102 provided by the second side wall structure part 2120 and the rear surface of the slidable electronic device 2, provided by the back cover 23, may be substantially smoothly connected without a step therebetween.

According to an embodiment, the first side wall structure part 2110 and the second side wall structure part 2120 may include different metallic materials.

According to various embodiments, the first side wall structure part 2110 and the second side wall structure part 2120 may include the same metallic material.

According to an embodiment, the third side wall structure part 2130 may include a non-metallic material, as a part of the non-conductive structure 92. The third side wall structure part 2130 may be coupled to the first side wall structure part 2110 and/or the second side wall structure part 2120.

According to an embodiment, the first side wall structure part 2110 may include the first display-overlapping conductive region 1001a that faces and overlaps with the second part 3002 of the flexible display module 30. The first display-overlapping conductive region 1001a may include the first conductive region 1001b and the second conductive region 1001c extending from the first conductive region 1001b.

According to an embodiment, the slidable electronic device 2 may include, in a manner substantially the same as or similar to the embodiment of FIG. 12, the dielectric 1100 positioned between the first display-overlapping conductive region 1001a of the first side wall structure part 2110 and the second surface 1202 of the second part 3002 included in the flexible display module 30. The slidable electronic device 2 may include the first air gap AG1 between the dielectric 1100 and the first display-overlapping conductive region 1001a. The slidable electronic device 2 may include the second air gap AG2 between the second part 3002 and the second conductive region 1001c. The dielectric 1100 and the second conductive region 1001c may reduce the introduction of an external foreign material, such as dust or moisture, into the electronic device 2 by reducing the gap between the second part 3002 and the first display-overlapping conductive region 1001a.

According to an embodiment, the slidable electronic device 2 may provide a radiation current to the second side wall structure part 2120. The first side wall structure part 2110 is at least partially and physically in contact with the second side wall structure part 2120, or is positioned adjacent to the second side wall structure part 2120. The electromagnetic coupling between the first side wall structure part 2110 and the second side wall structure part 2120 may occur. An electromagnetic field having a frequency characteristic (e.g., a resonance characteristic) corresponding to a selected or designated frequency band may be generated through the electromagnetic coupling between the first side wall structure part 2110 and the second side wall structure part 2120. The first air gap AG1 and the second air gap AG2 may reduce the electromagnetic effect of the second part 3002 of the flexible display module 30 on the first side wall structure part 2110 so as to contribute in ensuring antenna radiation performance.

According to various embodiments (not illustrated separately), the embodiment of FIG. 21 may be modified to include the dielectrics 1100 and 1301 according to the embodiment of FIG. 13, include the dielectric 1700 according to the embodiment of FIG. 16, include the dielectric 1810 according to the embodiment of FIG. 18, include the dielectric 1910 according to the embodiment of FIG. 19, or include the dielectric 2010 according to the embodiment of FIG. 20.

Figure 22:
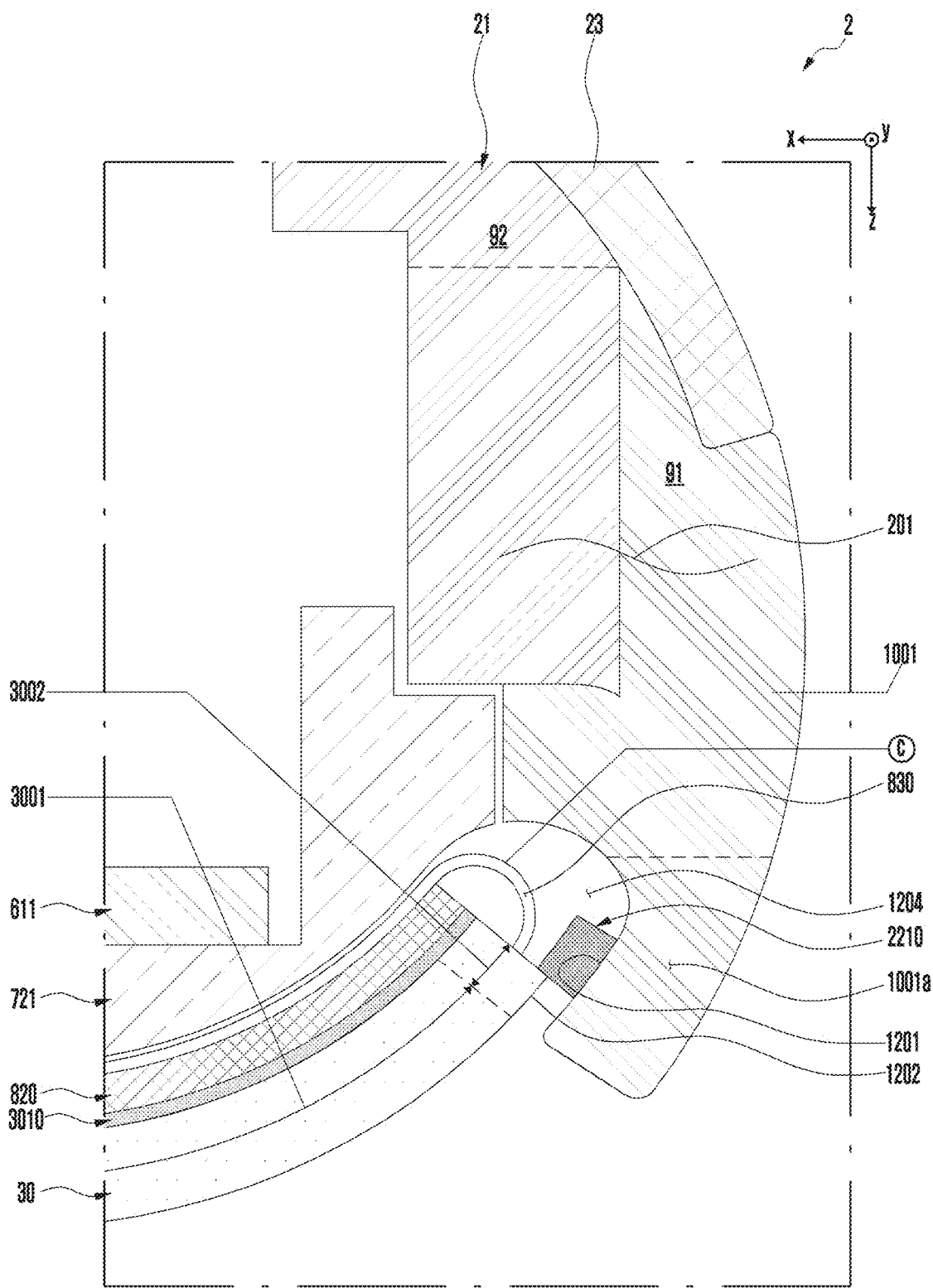
FIG. 22 is a sectional view of a slidable electronic device that is a modification of the embodiment of FIG. 12 according to various embodiments.

FIG. 22 is a cross-sectional view of the slidable electronic device 2 that is a modification of the embodiment of FIG. 12 according to various embodiments.

Referring to FIG. 22, in an embodiment, a dielectric 2210 may be disposed on the first surface 1201 of the first display-overlapping conductive region 1001a included in the first conductive part 1001. The dielectric 2210 may not substantially face the second surface 1202 of the second part 3002 included in the flexible display module 30, or not overlap with the second surface 1202.

According to an embodiment, the dielectric 2210 may be positioned in the recess type space 1204 in which the bent part 830 of the third region ⓒ of the flexible display module 30 is positioned.

According to an embodiment, the dielectric 2210 may be physically in contact with the second part 3002, and an external foreign material, such as dust or moisture, may have difficulty in entering the slidable electronic device 2 through the gap between the second part 3002 and the first display-overlapping conductive region 1001a.

According to an embodiment, the dielectric 2210 may have a thickness greater than the distance between the first surface 1201 and the second surface 1202.

According to an embodiment, the dielectric 2210 may include a flexible material, and be elastically in contact with the second part 3002 to contribute to airtightness not to allow an external foreign material to enter into the electronic device 2.

According to various embodiments, the dielectric 2210 may include a substantially rigid material.

Figure 23:
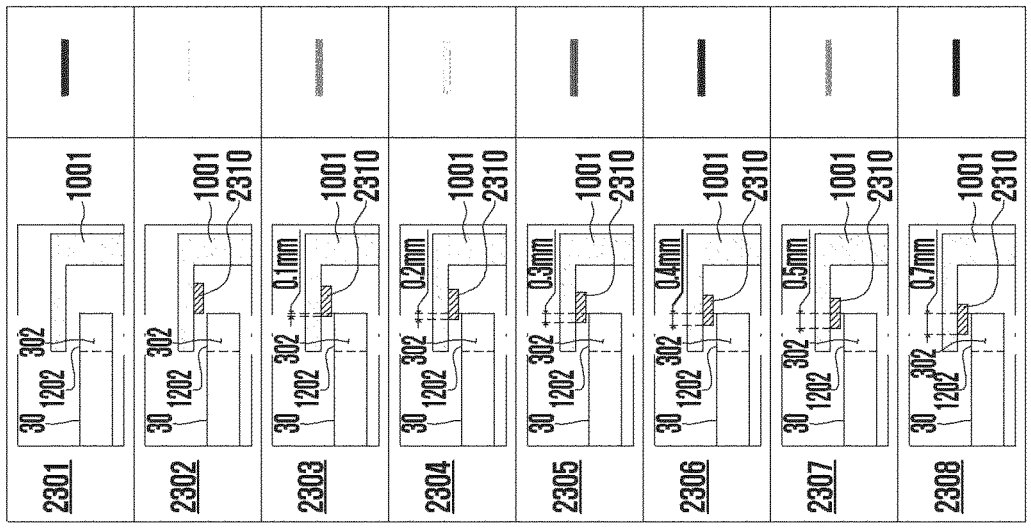
FIG. 23 illustrates various examples of using, as an antenna radiator, a first conductive part positioned to correspond to a second part of a flexible display module, and graphs showing antenna radiation performance therefor according to various embodiments.
Figure 23:
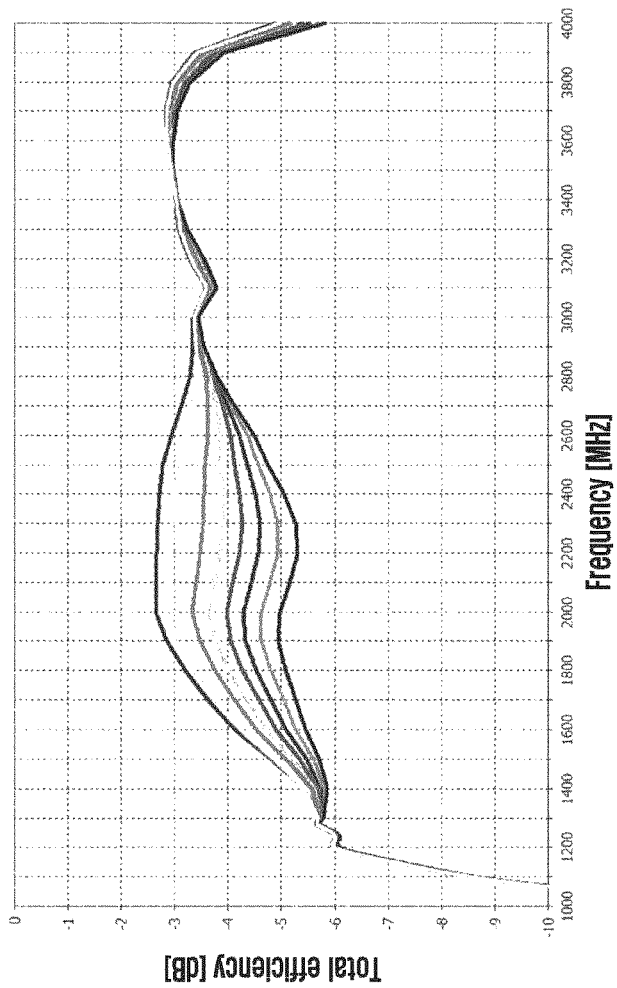

FIG. 23 includes diagrams illustrating various examples of using, as an antenna radiator, the first conductive part 1001 positioned to correspond to the second part 3002 of the flexible display module 30, and graphs showing antenna radiation performance therefor according to various embodiments.

Referring to FIG. 23, the first example 2301 may indicate a case where there is no dielectric between the first conductive part 1001 and the second surface 1202 of the second part 3002 included in the flexible display module 30. The second example 2302 (e.g., the embodiment of FIG. 22) may indicate a case where the dielectric 2310 is disposed on the first conductive part 1001 not to overlap with (or not to face) the second surface 1202. The third example may indicate a case where the dielectric 2310 is disposed on the first conductive part 1001 to overlap with the second surface 1202 by about 0.1 mm. The fourth example may indicate a case where the dielectric 2310 is disposed on the first conductive part 1001 to overlap with the second surface 1202 by about 0.2 mm. The fifth example may indicate a case where the dielectric 2310 is disposed on the first conductive part 1001 to overlap with the second surface 1202 by about 0.3 mm. The sixth example may indicate a case where the dielectric 2310 is disposed on the first conductive part 1001 to overlap with the second surface 1202 by about 0.4 mm. The seventh example may indicate a case where the dielectric 2310 is disposed on the first conductive part 1001 to overlap with the second surface 1202 by about 0.5 mm. The eighth example may indicate a case where the dielectric 2310 is disposed on the first conductive part 1001 to overlap with the second surface 1202 by about 0.7 mm. The second example 2302, the third example 2303, the fourth example 2304, the fifth example 2305, the sixth example 2306, the seventh example 2307, or the eighth example 2308 may reduce introduction of an external foreign material into the electronic device 2 through the gap between the second part 3002 and the first conductive part 1001, compared to the first example 2301.

According to an embodiment, as the size by which the dielectric 2310 overlaps with the second surface 1202 grows smaller, the degradation of antenna radiation performance in a selected or designated frequency band (e.g., MB or HB) may become smaller.

Figure 24:
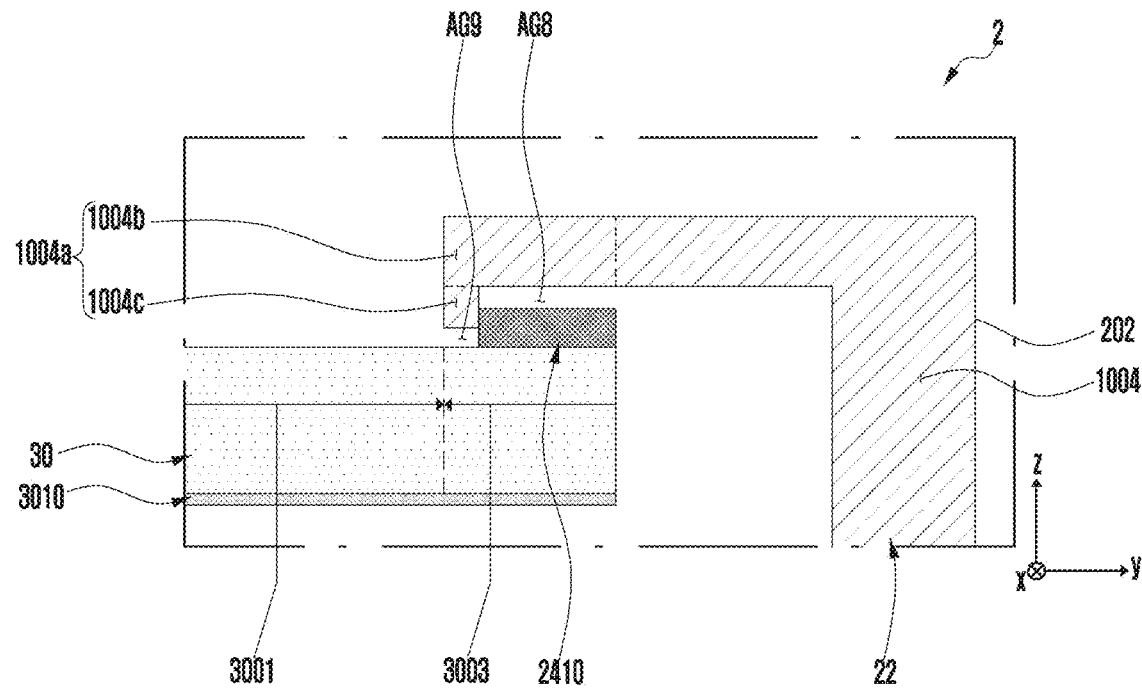
FIG. 24 is a sectional view of a slidable electronic device taken along line C-C' in FIG. 10 according to various embodiments.

FIG. 24 is a cross-sectional view of the slidable electronic device 2 taken along line C-C' in FIG. 10 according to various embodiments.

Referring to FIG. 24, in an embodiment, the flexible display module 30 may include the first part 3001 which is seen to the outside of the slidable electronic device 2, and a third part 3003 which extends from the first part 3001, and is substantially not seen to the outside of the electronic device 2 by overlapping with the second side wall 202 and thus being covered by the second side wall 202.

According to an embodiment, a part of the second side wall 202 may face and overlap with the third part 3003. The part (e.g., a "display overlapping part") of the second side wall 202, which faces and overlaps with the third part 3003, may include, for example, a part of the second conductive part 1002 (see FIG. 10), a part 1004a of the fourth conductive part 1004, a part of the fifth conductive part 1005 (see FIG. 10), a part of the third insulation part 1023 (see FIG. 10), and/or a part of the fourth insulation part 1024 (see FIG. 10). The sectional view of FIG. 24 relates to the fourth conductive part 1004.

The part 1004a of the fourth conductive part 1004 faces and overlaps with the third part 3003 of the flexible display module 30. Therefore, there may be a possibility that electromagnetic coupling may occur between the third part 3003 and the part 1004a (hereinafter, referred to as a "second display-overlapping conductive region") of the fourth conductive part 1004. The second display-overlapping conductive region 1004a may have a possibility of being electromagnetically coupled to a conductive material included in the third part 3003. For example, a conductive material (e.g., the copper sheet 303e) included in the lower panel 303 of FIG. 6 in the third part 3003 may have a possibility of being electromagnetically coupled to the second display-overlapping conductive region 1004a. For example, a conductive material, such as an electrode or a wire, included in the display panel 301 of FIG. 6 in the third part 3003 may have a possibility of being electromagnetically coupled to the second display-overlapping conductive region 1004a. In an embodiment, a part of the support sheet 3010, corresponding to the third part 3003, may have a possibility of being electromagnetically coupled to the second display-overlapping conductive region 1004a.

According to an embodiment, the second display-overlapping conductive region 1004a may include a part of the fourth conductive part 1004, having a possibility of substantially being electromagnetically coupled to the flexible display module 30 due to a relative positional relationship with the flexible display module 30.

According to an embodiment, the second display-overlapping conductive region 1004a may include a part of the fourth conductive part 1004, having a possibility that a frequency characteristic may be substantially largely changed due to electromagnetic coupling with the flexible display module 30 caused by a relative position with the flexible display module 30.

According to various embodiments, the second display-overlapping conductive region 1004a may indicate a part having the maximum strength or a relatively large strength of an electric field when a radiation current is supplied to the fourth conductive part 1004.

Due to the electromagnetic coupling between the second display-overlapping conductive region 1004a and the third part 3003, for example, an electromagnetic effect of the third part 3003 on the fourth conductive part 1004 operating as an antenna radiator, there may be a possibility of degradation of the antenna radiation performance or coverage of the fourth conductive part 1004. For example, there may be a possibility that a frequency characteristic of an antenna device using the fourth conductive part 1004 may be changed due to an electromagnetic effect of the third part 3003. The electromagnetic effect of the third part 3003 on the fourth conductive part 1004 may be reduced by increasing the distance by which the second display-overlapping conductive region 1004a is spaced apart from the third part 3003. However, an external foreign material, such as dust or moisture, may be introduced into the slidable electronic device 2 through the gap between the second display-overlapping conductive region 1004a and the third part 3003. Therefore, there may be a limitation to increasing the distance between the second display-overlapping conductive region 1004a and the third part 3003. The electromagnetic effect of the third part 3003 on the fourth conductive part 1004 may be reduced by increasing the distance by which the second display-overlapping conductive region 1004a is spaced apart from the third part 3003. However, the distance increase may degrade the aesthetics of the slidable electronic device 2 or make it difficult to slim the slidable electronic device 2. Therefore, there may be a limitation to increasing the distance between the second display-overlapping conductive region 1004a and the third part 3003. There may be a comparative example in which a member for preventing/reducing introduction of an external foreign material is interposed between the second display-overlapping conductive region 1004a and the third part 3003 to implement no substantial air gap between the second display-overlapping region 1004a and the third part 3003. However, no spacing between the second display-overlapping conductive region 1004a and the third part 3003 and the permittivity of the member may make it difficult to ensure the antenna radiation performance or coverage of the fourth conductive part 1004. An embodiment may be implemented, in consideration of the above limitations and comparative examples, to not only reduce degradation of the antenna radiation performance or coverage of the fourth conductive part 1004 in a relative positional relationship between the flexible display module 30 and the fourth conductive part 1004, but also reduce the introduction of an external foreign material through the gap between the flexible display module 30 and the fourth conductive part 1004. Hereinafter, this embodiment will be described in greater detail.

According to an embodiment, the second display-overlapping conductive region 1004a may include a third conductive region 1004b and a fourth conductive region 1004c extending from the third conductive region 1004b. The slidable electronic device 2 may include a dielectric 2410 positioned between (e.g., in an air gap between) the second display-overlapping conductive region 1004a and the third part 3003. The dielectric 2410 may be disposed on the third part 3003 of the flexible display module 30.

According to an embodiment, the dielectric 2410 may be coupled to the third part 3003 through various materials (not illustrated separately), such as a thermoresponsive adhesive material (or a thermoresponsive bonding material), a photoresponsive adhesive material (or a photoresponsive bonding material), a normal adhesive agent (or a normal bonding agent), and/or double-sided tape.

According to an embodiment, the dielectric 2410 may be disposed on the third part 3003 between the third conductive region 1004b and the third part 3003. The dielectric 2410 may not be disposed between the fourth conductive region 1004c and the third part 3003.

According to an embodiment, the slidable electronic device 2 may include an air gap AG8 provided between the dielectric 2140 and the third conductive region 1004b, and an air gap AG9 provided between the fourth conductive region 1004c and the third part 3003.

According to an embodiment, the fourth conductive region 1004c and the dielectric 2410 may reduce the introduction of an external foreign material, such as dust or moisture, into the slidable electronic device 4 by reducing the gap between the second display-overlapping conductive region 1004a and the third part 3003. For example, the fourth conductive region 1004c and the dielectric 2410 may be in contact with each other, and an external foreign material may have difficulty in entering the slidable electronic device 2 through the gap between the second display-overlapping conductive region 1004a and the third part 3003.

According to an embodiment, the dielectric 2410 may include a flexible material, and be elastically in contact with the fourth conductive region 1004c to contribute to airtightness not to allow an external foreign material to enter into the slidable electronic device 2. The dielectric 2410 may include Poron for example, but may be various without being limited thereto.

According to various embodiments, the dielectric 2410 may include a substantially rigid material.

According to an embodiment, in an embodiment in which the air gaps AG8 and AG9 are configured between the second display-overlapping conductive region 1004a and the third part 3003, the electromagnetic effect of the third part 3003 on the second display-overlapping conductive region 1004a may be reduced compared to a comparative example (not illustrated separately) in which a member for preventing/reducing introduction of an external foreign material is interposed between the second display-overlapping conductive region 1004a and the third part 3003 to implement no substantial air gap between the second display-overlapping conductive region 1004a and the third part 3003.

According to various embodiments (not illustrated separately), when viewed from above the screen S1 (see FIG. 2 or 4) (or when viewed in the −z-axis direction), the fourth conductive region 1004c may partially overlap with the dielectric 2410, and the air gaps AG8 and AG9 may be provided.

According to various embodiments, the slidable electronic device 2 is not limited to the illustrated embodiment, and may be implemented in various other types having one or more dielectrics and one or more air gaps between the second display-overlapping conductive region 1004a and the third part 3003.

According to an embodiment, the dielectric 2410 may have a permittivity enabling reduction of degradation of the antenna radiation performance of the fourth conductive part 1004. The permittivity of the dielectric 2410 may be a value contributing in preventing/reducing the antenna radiation performance of the fourth conductive part 1004 from degrading to be equal or lower than a threshold level. The permittivity of the dielectric 2410 may be a value enabling reduction of the electromagnetic effect on the fourth conductive part 1004.

According to an embodiment, the permittivity of the dielectric 2410 may be a value (e.g., a low permittivity) which is less than the permittivity of the fourth conductive part 1004 and has a small difference from the permittivity of the air gaps AG8 and AG9.

According to an embodiment, the dielectric 2410 may include a non-conductive material (e.g., Poron).

According to various embodiments, the dielectric 2410 may include a conductive material.

According to various embodiments (not illustrated separately), the embodiment of FIG. 24 may be modified to include the dielectrics 1100 and 1301 according to the embodiment of FIG. 13, include the dielectric 1700 according to the embodiment of FIG. 16, include the dielectric 1810 according to the embodiment of FIG. 18, include the dielectric 1910 according to the embodiment of FIG. 19, include the dielectric 2010 according to the embodiment of FIG. 20, include the first side wall structure part 2110, the second side wall structure part 2120, and the third side wall structure part 2130 according to the embodiment of FIG. 21, or include the dielectric 2210 according to the embodiment of FIG. 22.

According to an embodiment, a structure (not illustrated separately) in which a part of the second conductive part 1002 (see FIG. 10) included in the second side wall 202 is disposed with respect to the third part 3003 of the flexible display module 30 may be substantially the same as or similar to a structure in which the fourth conductive part 1004 is disposed with respect to the third part 3003 of the flexible display module 30. In a case where the second conductive part 1002 is used as an antenna radiator, substantially identically to the embodiment illustrated in FIG. 24, one or more dielectrics and one or more air gaps may be implemented between the third part 3003 of the flexible display module 30 and a part of the second conductive part 1002, included in a display overlapping part of the second side wall 202.

According to an embodiment, a structure (not illustrated separately) in which the fifth conductive part 1005 (see FIG. 10) included in the second side wall 202 is disposed with respect to the third part 3003 of the flexible display module 30 may be substantially the same as or similar to a structure in which the fourth conductive part 1004 is disposed with respect to the third part 3003 of the flexible display module 30. In a case where the fifth conductive part 1005 is used as an antenna radiator, substantially identically to the embodiment illustrated in FIG. 24, one or more dielectrics and one or more air gaps may be implemented between the third part 3003 of the flexible display module 30 and a part of the fifth conductive part 1005, included in the display overlapping part of the second side wall 202.

According to an embodiment, a structure (not illustrated separately) in which a part of the third conductive part 1003 (see FIG. 10) included in the third side wall 203 is disposed with respect to the third part 3003 of the flexible display module 30 may be substantially the same as or similar to a structure in which the fourth conductive part 1004 is disposed with respect to the third part 3003 of the flexible display module 30. In a case where the third conductive part 1003 is used as an antenna radiator, substantially identically to the embodiment illustrated in FIG. 24, one or more dielectrics and one or more air gaps may be implemented between the third part 3003 of the flexible display module 30 and a part of the third conductive part 1003, included in a display overlapping part of the third side wall 203.

According to an embodiment, a structure (not illustrated separately) in which the sixth conductive part 1006 (see FIG. 10) included in the third side wall 203 is disposed with respect to the third part 3003 of the flexible display module 30 may be substantially the same as or similar to a structure in which the fourth conductive part 1004 is disposed with respect to the third part 3003 of the flexible display module 30. In a case where the sixth conductive part 1006 is used as an antenna radiator, substantially identically to the embodiment illustrated in FIG. 24, one or more dielectrics and one or more air gaps may be implemented between the third part 3003 of the flexible display module 30 and the sixth conductive part 1006, included in the display overlapping part of the third side wall 203.

According to an embodiment, a structure (not illustrated separately) in which the seventh conductive part 1007 (see FIG. 10) included in the third side wall 203 is disposed with respect to the third part 3003 of the flexible display module 30 may be substantially the same as or similar to a structure in which the fourth conductive part 1004 is disposed with respect to the third part 3003 of the flexible display module 30. In a case where the seventh conductive part 1006 is used as an antenna radiator, substantially identically to the embodiment illustrated in FIG. 24, one or more dielectrics and one or more air gaps may be implemented between the third part 3003 of the flexible display module 30 and the seventh conductive part 1007 included in the display overlapping part of the third side wall 203.

According to various embodiments, the support sheet 3010 may not be expanded to the third part 3003 of the flexible display module 30. In this case, the support sheet 3010 may not substantially affect electromagnetic effects on an antenna radiator using the second side wall 202 or the third side wall 203.

Figure 25:
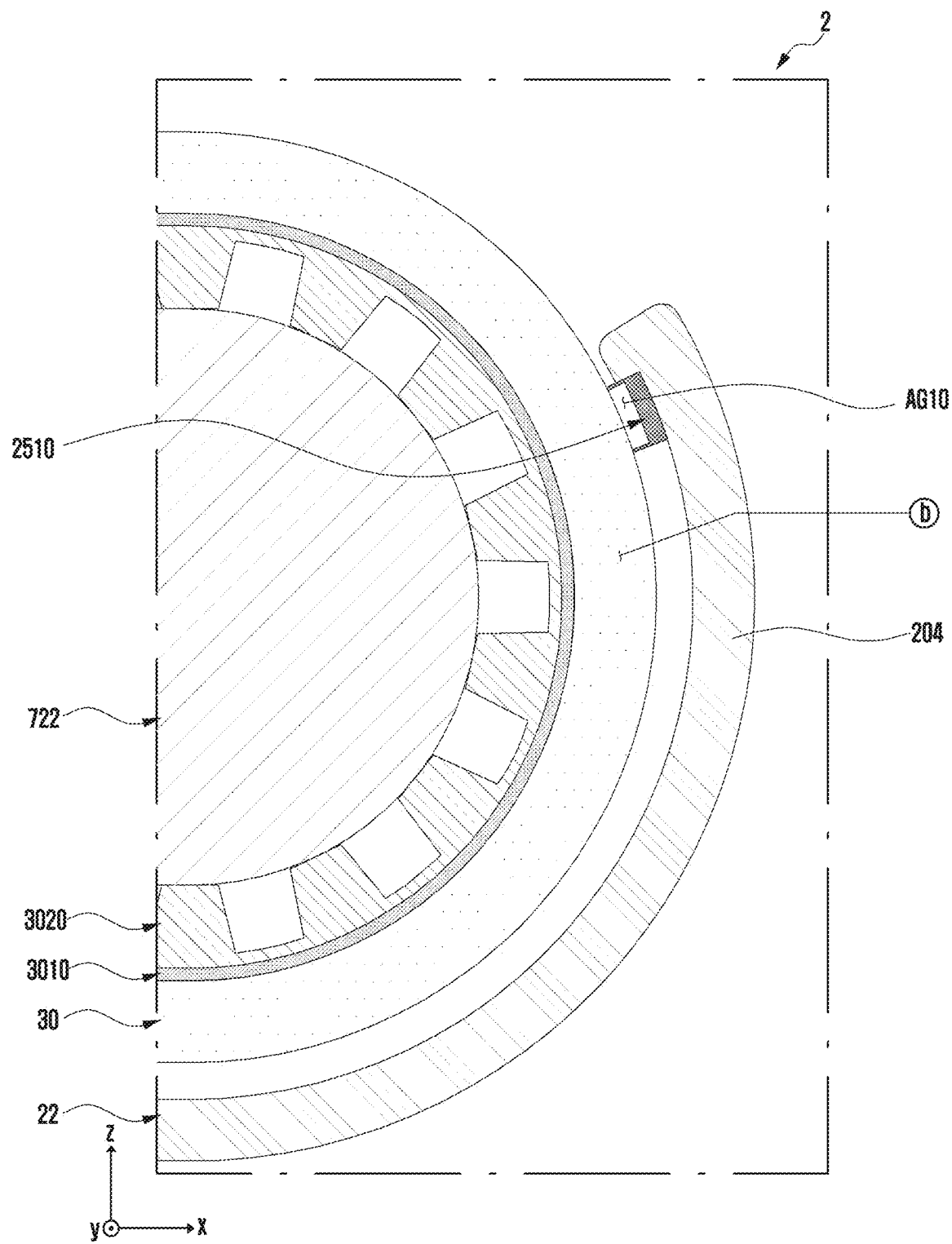
FIG. 25 is a sectional view of a slidable electronic device taken along line D-D' in FIG. 10 according to various embodiments.

FIG. 25 is a cross-sectional view of the slidable electronic device 2 taken along line D-D' in FIG. 10 according to various embodiments.

Referring to FIG. 25, in an embodiment, the slidable electronic device 2 may include the second housing 22, the first support member 722, the flexible display module 30, the support sheet 3010, the display support structure 3020, and/or a dielectric 2510.

According to an embodiment, the dielectric 2510 may be disposed on the fourth side wall 204 between the flexible display module 30 and the fourth side wall 204 of the second housing 22.

According to an embodiment, the dielectric 2510 may be coupled to the fourth side wall 204 through various materials (not illustrated separately), such as a thermoresponsive adhesive material (or a thermoresponsive bonding material), a photoresponsive adhesive material (or a photoresponsive bonding material), a normal adhesive agent (or a normal bonding agent), and/or double-sided tape. The dielectric 2510 may reduce the introduction of an external foreign material, such as dust or moisture, into the slidable electronic device 2 through the gap between the fourth side wall 204 and the flexible display module 30 by reducing the gap between the fourth side wall 204 and the flexible display module 30.

According to an embodiment, the dielectric 2510 may be implemented to have a reduced friction with the second region ⓑ of the flexible display module 30, which is moved at the time of a state change (e.g., switching between a closed state of FIG. 2 and an open state of FIG. 4) of the slidable electronic device 2. For example, a surface of the dielectric 2510, facing the flexible display module 30, may be formed by coating using various lubricating materials such as Teflon coating.

According to various embodiments (not illustrated separately), the dielectric 2510 may include a brush type, a porous type (e.g., sponge), or a mesh type. The dielectric 2510 may include various other flexible materials (not illustrated separately).

According to various embodiments, the dielectric 2510 may be electrically connected to a ground (e.g., a ground plane included in the first printed circuit board 611 of FIG. 6, 7, or 8) of the slidable electronic device 2 through an electrical path (not illustrated separately), such as a flexible printed circuit board or a cable. The dielectric 2510 may be, for example, electrically connected to the ground in FIG. 10 through an electrical path such as a flexible printed circuit board or a cable.

According to an embodiment, an air gap AG10 may be provided between the dielectric 2510 and the second region ⓑ of the flexible display module 30.

According to an embodiment, the dielectric 2510 (e.g., dielectric structure) may include a recess disposed on the surface facing the flexible display module 30, and the air gap AG10 may be substantially provided by the recess.

According to various embodiments (not illustrated separately), an air gap may be provided between the dielectric 2510 and the fourth side wall 204. The dielectric 2510 (e.g., dielectric structure) may, for example, include a recess disposed on a surface facing the fourth side wall 204, and an air gap may be substantially provided by the recess.

The slidable electronic device 2 is not limited to the illustrated embodiment, and may be implemented in various other types having one or more dielectrics and one or more air gaps between the second region ⓑ of the flexible display module 30 and the fourth side wall 204. In a case where at least a part included in the fourth side wall 204 is used as an antenna radiator, an embodiment including the air gap AG10 may ensure the antenna radiation performance of the antenna radiator by reducing the electromagnetic effect of the second region ⓑ on the antenna radiator using the at least a part included in the fourth side wall 204, compared to a comparative example (not illustrated separately) in which a member for preventing/reducing introduction of an external foreign material is interposed between the second region ⓑ and the fourth side wall 204 to implement no substantial air gap between the second region ⓑ and the fourth side wall 204.

According to an embodiment, the dielectric 2510 may have a permittivity enabling reduction of degradation of the antenna radiation performance of the antenna radiator using the at least a part included in the fourth side wall 204. The permittivity of the dielectric 2510 may be a value contributing in preventing/reducing the antenna radiation performance of the antenna radiator using the at least a part included in the fourth side wall 204 from degrading to be equal or lower than a threshold level. The permittivity of the dielectric 2510 may be a value enabling reduction of the electromagnetic effect on the antenna radiator using the at least a part included in the fourth side wall 204.

According to an embodiment, the permittivity of the dielectric 2510 may be a value (e.g., a low permittivity) which is less than the permittivity of the antenna radiator using the at least a part included in the fourth side wall 204, and has a small difference from the permittivity of the air gap AG10.

According to an embodiment, the dielectric 2510 may include a non-conductive material (e.g., Poron).

According to various embodiments, the dielectric 2510 may include a conductive material.

Figure 26:
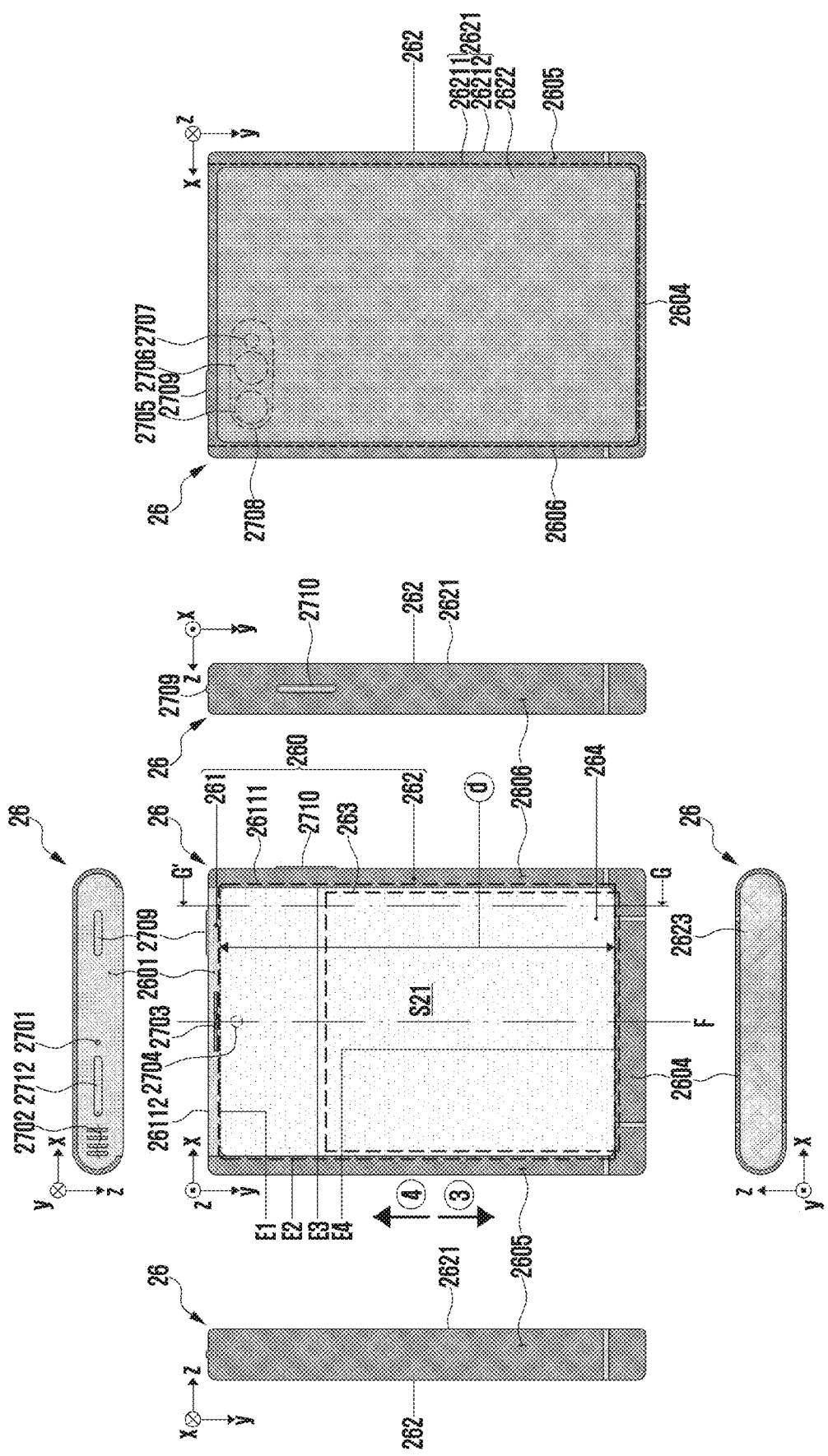
FIG. 26 is a diagram illustrating a slidable electronic device in a closed state according to various embodiments.
Figure 27:
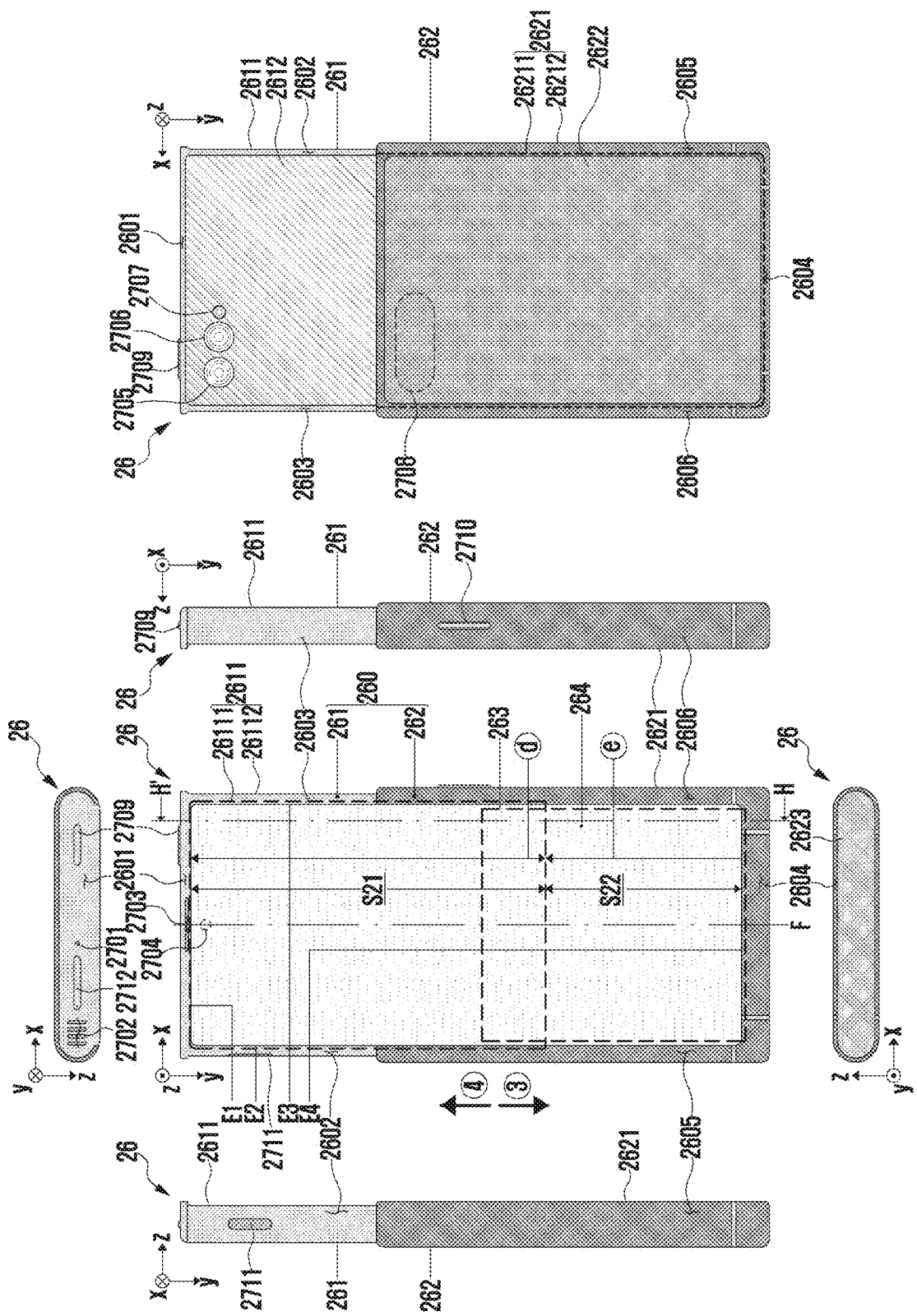
FIG. 27 is a diagram illustrating a slidable electronic device in an open state according to various embodiments.

FIG. 26 is a diagram illustrating a slidable electronic device 26 in a closed state according to various embodiments. FIG. 27 is a diagram illustrating the slidable electronic device 26 in an open state according to various embodiments.

For convenience of explanation, a direction (e.g., the +z-axis direction) in which a screen (a display region or an active region of a flexible display module 264, which is seen to the outside) is seen is interpreted and used as a direction which a front surface of the slidable electronic device 26 faces, and the opposite direction (e.g., the −z-axis direction) is interpreted and used as a direction which a rear surface of the slidable electronic device 26 faces.

Referring to FIGS. 26 and 27, the slidable electronic device 26 may include a slidable housing 260 and the flexible display module 264.

According to an embodiment, the slidable housing 260 may include a first housing (or a first housing part or a first housing structure) 261 and a second housing (or a second housing part or a second housing structure) 262. The second housing 262 may be connected to the first housing 261 to be slidable with respect to the first housing 261. Sliding of the second housing 262 with respect to the first housing 261 corresponds to a change in the relative position between the first housing 261 and the second housing 262, and may be interpreted as sliding of the first housing 261 with respect to the second housing 262 or mutual sliding between the first housing 261 and the second housing 262.

According to an embodiment, in comparison with the slidable housing 20 included in the slidable electronic device 2 of FIGS. 2, 3, 4, and 5, being implemented such that the second housing 22 is able to slide out with respect to the first housing 21 in a horizontal direction (e.g., x-axis direction), the slidable housing 260 of the slidable electronic device 26 of FIG. 26 or 27 may be implemented such that the second housing 262 is slidable with respect to the first housing 261 in a vertical direction (e.g., y-axis direction).

According to an embodiment, the flexible display module 264 may include a first region ⓓ positioned to correspond to the first housing 261, and a second region ⓔ extending from the first region ⓓ and positioned to correspond to the second housing 262. The first region ⓓ may be disposed on the first housing 261 and supported by the first housing 261. The first region ⓓ is exposed to the outside, and the slidable electronic device 26 may provide a first screen region S21 through the first region ⓓ. The second region ⓔ may be supported by the second housing 262 that is slidable with respect to the first housing 261. When the second housing 262 slides in a third direction ③ (e.g., the +y-axis direction) with respect to the first housing 261, at least a part of the second region ⓔ may be ejected from a space of the second housing 262 to the outside (e.g., a position on the slidable electronic device 26, which is seen from the outside) and then be visible. When the second housing 262 slides in a fourth direction ④ (e.g., the −y-axis direction) opposite to the third direction ③ with respect to the first housing 261, at least a part of the second region ⓔ may be introduced into the space of the second housing 262 and then be hidden. The slidable electronic device 26 may provide a screen region including a second screen region (or second display region) S22 in addition to the first screen region (or first display region) S21 through at least a part of the second region ⓔ, which has been ejected to the outside. A ratio of a part of the second region ⓔ, which is ejected to the outside, and the size of a screen corresponding thereto may be changed according to a position to which the second housing 262 is slid with respect to the first housing 261, or a distance of the sliding. FIG. 26 illustrates the slidable electronic device 26 in a state where a screen has not been expanded, and FIG. 27 illustrates the slidable electronic device 26 in a state where the screen has been expanded. The state where the screen has not been expanded is a state where the second housing 262 has not been moved with respect to the first housing 261 in the third direction ③, and may be called a "closed state" of the slidable electronic device 26. The state where the screen has been expanded is a state where the second housing 262 has been maximally moved and is thus unable to be moved any more in the third direction ③, and may be called an "open state" of the slidable electronic device 26. In various embodiments, the open state may include a completely open state (see FIG. 27) or an intermediate state (not illustrated separately). The intermediate state may indicate a state between a closed state (see FIG. 26) and the completely open state. A case where the second housing 262 is at least partially moved with respect to the first housing 261 in the third direction ③ may be called a "slide out" of the second housing 262 or the flexible display module 264. A case where the second housing 262 is at least partially moved with respect to the first housing 261 in the fourth direction ④ opposite to the third direction ③ may be called a "slide in" of the second housing 262 or the flexible display module 264.

According to an embodiment, the second region ⓔ may be disposed to have a bending part (not illustrated separately) so as to be moved in a switched direction when the second region ⓔ is ejected from the space of the second housing 262 to the outside or introduced into the space of the housing 262 from the outside at the time of sliding of the second housing 262 with respect to the first housing 261. The second region ⓔ may be called a different term such as a "bendable region (area)" or a "bendable section".

According to various embodiments, in the slidable electronic device 26 providing a screen expandable to correspond to mutual sliding between the first housing 261 and the second housing 262, the flexible display module 264 (or flexible display) may be called a different term, such as an "expandable display", a "slidable display", or a "slide-out display". The slidable electronic device 26 providing a screen expandable to correspond to mutual sliding between the first housing 261 and the second housing 262 may be called a different term, such as a "stretchable electronic device" or a "rollable electronic device".

The disclosure includes "a slide out or slide in of the second housing 262" or "sliding of the second housing 262 with respect to the first housing 261", but is not limited thereto. In various embodiments, this may also be described using a slide out or slide in of the first housing 261 with respect to the second housing 262, sliding of the first housing 261 with respect to the second housing 262, mutual sliding between the first housing 261 and the second housing 262, or a relative position change between the first housing 261 and the second housing 262.

According to an embodiment, in an open state (see FIG. 27) of the slidable electronic device 26, a screen including the first screen region S21 provided by the first region ⓓ of the flexible display module 264 and the second screen region S22 provided by the second region ⓔ of the flexible display module 264 may be substantially flat. The direction which the front surface of the slidable electronic device 26 faces may be a direction which the flat screen faces. The first region ⓓ of the flexible display module 264 may be disposed on the first housing 261 to be substantially flat, and the first region ⓓ may provide the first screen region S21 on a plane corresponding thereto.

According to an embodiment, the second region ⓔ of the flexible display module 264 may be disposed to have a bending part (not illustrated separately). The bending part may be a part of the second region ⓔ, which is disposed and maintained to be bent so that the second region ⓔ is moved in a switched direction at the time of sliding of the second housing 262 with respect to the first housing 261. The part of the second region ⓔ, which provides the bending part, may change according to a position to which the second housing 262 is slid with respect to the first housing 261, or a distance of the sliding, but the shape of the bending part may be substantially the same. The size of a part of the second region ⓔ between the bending part and the first region ⓓ may be increased at the time of a slide out of the second housing 262, and may be reduced at the time of a slide in of the second housing 262. In an open state of the slidable electronic device 26, the second screen region S22 may be provided through the part of the second region ⓔ between the bending part and the first region ⓓ. The part of the second region ⓔ between the bending part and the first region ⓓ is smoothly connected to the first region ⓓ without lifting, and may be disposed to be substantially flat. In an embodiment, the slidable electronic device 26 may include a tension device (not illustrated separately) that enables the part of the second region ⓔ between the bending part and the first region ⓓ to be disposed to be substantially flat while reducing lifting thereof caused by elasticity of the flexible display module 264 in an open state of the slidable electronic device 26.

According to an embodiment, the screen of the slidable electronic device 26 may be rectangular, and for example, may include a first edge E1, a second edge E2, a third edge E3, and a boundary E4 with the bending part of the second region ⓔ. When viewed from above the screen, the first edge E1 may be positioned to be spaced apart from the boundary E4 with the bending part in the fourth direction ④ (e.g., a slide-in direction), and may be substantially parallel to the boundary E4 with the bending part. The second edge E2 extends from one end of the first edge E1 to the boundary E4 with the bending part, and may be substantially perpendicular to the first edge E1. The third edge E3 extends from the other end of the first edge E1 to the boundary E4 with the bending part, and may be substantially parallel to the second edge E2. At the time of a slide out of the second housing 262, due to the expansion of the screen, the distance by which the boundary E4 with the bending part is spaced apart from the first edge E1 in the third direction ③ may increase, and the second edge E2 and the third edge E3 may become longer.

According to an embodiment, the first housing 261 may include a first frame 2611 (or a first frame structure, a first framework, or a first case) and/or a first cover 2612 disposed on the first frame 2611.

According to an embodiment, the first frame 2611 may include a first support part 26111 and a first side 26112 (or a first side wall part, a first bezel, a first side wall bezel, or a first side wall bezel structure) connected to the first support part 26111. In an embodiment, the first region ⓓ of the flexible display module 264 may be disposed on the first support part 26111, and the first support part 26111 may support the first region ⓓ. The first side 26112 may include a first side wall 2601, a second side wall 2602, and/or a third side wall 2603. The first side wall 2601 may be positioned to correspond to the first edge E1 of the screen. The second side wall 2602 may be positioned to correspond to the second edge E2 of the screen. The third side wall 2603 may be positioned to correspond to the third edge E3 of the screen. When viewed from above the front surface of the slidable electronic device 26, the second side wall 2602 may extend from one end of the first side wall 2601 in the third direction ③ (e.g., the slide-out direction), and the third side wall 2603 may extend from the other end of the first side wall 2601 in the third direction ③. When viewed from above the front surface of the slidable electronic device 26, the second side wall 2602 and the third side wall 2603 may be substantially parallel to each other, and may be substantially perpendicular to the first side wall 2601. The first frame 2611 may be provided as an integrated member or structure including the first support part 26111 and the first side 26112. As another example, the first support part 26111 may be provided separately from the first side 26112, and may be connected to the first side 26112 through mechanical fastening such as screw fastening (or bolt fastening) or bonding using an adhesive material (or a bonding material).

According to various embodiments, the first support part 26111 may include an element separate from the first frame 2611 or the first housing 261.

According to an embodiment, the first cover 2612 may be disposed at the rear surface of the slidable electronic device 26, and may be called a different term, such as a "first back cover" or a "first rear plate". Various electronic components, such as a printed circuit board, may be, for example, arranged on the first support part 26111 between the first support part 26111 (or the first region ⓓ of the flexible display module 264) and the first cover 2612.

According to an embodiment, the first cover 2612 may be disposed on the first side 26112. The first side 26112 may include, for example, a first cover placement region provided to correspond to a border region of the first cover 2612. The first cover placement region may be, for example, a stepped portion (not illustrated separately) provided on the first side 26112 to enable the first cover 2612 to be fitted onto and stably placed on the first side 26112. As another example, the first cover placement region may be provided as a substantial flat region (or flat part). The first cover 2612 may be disposed on the first cover placement region using screw fastening. As another example, the first cover 2612 may be disposed on the first cover placement region using snap-fit fastening (e.g., a manner of a hook being fastened to a hook fastening part). As another example, in order to dispose the first cover 2612 on the first side 26112, an adhesive material (or a bonding material) may be disposed between the first cover placement region and the border region of the first cover 2612. In various embodiments, the first cover placement region may be expanded to at least partially overlap with the first cover 2612 when viewed from above the rear surface of the slidable electronic device 26 (not illustrated separately). In various embodiments, the first cover placement region corresponding to the border region of the first cover 2612 may be provided by the first support part 26111 (not illustrated separately). A part of an outer surface of the slidable electronic device 26, which is provided by the first side 26112, may be smoothly connected to a part of the outer surface of the slidable electronic device 26, which is provided by the first cover 2612.

According to various embodiments, the first cover 2612 may be omitted, and the first frame 2611 may be provided to further include a part corresponding to the first cover 2612 (not illustrated separately).

According to various embodiments, the first cover 2612 may include an element separate from the first housing 261.

According to an embodiment, the second housing 262 may include a second frame 2621 (or a second frame structure, a second framework, or a second case), a second cover 2622 disposed on the second frame 2621, and/or a third cover 2623 disposed on the second frame 2621.

According to an embodiment, the second frame 2621 may be provided as an integrated member or structure including a second support part 26211 and a second side 26212 (or a second side wall part, a second bezel, a second side wall bezel, or a second side wall bezel structure). As another example, the second support part 26211 may be provided separately from the second side 26212, and may be connected to the second side 26212 through a manner such as screw fastening (or bolt fastening). The second side 26212 may extend from a border of the second support part 26211. Due to a combination of the second support part 26211 and the second side 26212, the second housing 262 may have a space capable of accommodating the first housing 261. The second side 26212 may include, for example, a fourth side wall 2604, a fifth side wall 2605, and/or a sixth side wall 2606. The fourth side wall 2604 may be spaced apart from the first side wall 2601 in the third direction ③ (e.g., the slide-out direction), and may be substantially parallel to the first side wall 2601. When viewed from above the front surface of the slidable electronic device 26 (e.g., when viewed in the −z-axis direction), the fifth side wall 2605 may be positioned to correspond to the second side wall 2602, and may extend from one end of the fourth side wall 2604 in the fourth direction ④ (e.g., the slide-in direction). The sixth side wall 2606 may be positioned to correspond to the third side wall 2603, and may extend from the other end of the fourth side wall 2604 in the fourth direction ④. When viewed from above the front surface of the slidable electronic device 26, the fifth side wall 2605 and the sixth side wall 2606 may be substantially parallel to each other, and may be substantially perpendicular to the fourth side wall 2604. The distance by which the fourth side wall 2604 is spaced apart from the first side wall 2601 in the third direction ③, a region by which the second side wall 2602 is covered by the fifth side wall 2605, and a region by which the third side wall 2603 is covered by the sixth side wall 2606 may increase at the time of a slide in of the second housing 262 and decrease at the time of a slide out of the second housing 262.

According to an embodiment, the second cover 2622 may be disposed at the rear surface of the slidable electronic device 26, and may be called a different term, such as a "second back cover" or a "second rear plate". The second support part 26211 may include a third surface substantially oriented toward the front surface of the slidable electronic device 26, and a fourth surface substantially oriented toward the rear surface of the slidable electronic device 26. The second cover 2622 may be disposed on the fourth surface of the second support part 26211. The fourth surface of the second support part 26211 may include a seating structure for the second cover 2622. The seating structure may include, for example, a recess enabling the second cover 2622 to be stably disposed on the second support part 26221, and the second cover 2622 may be inserted in the recess. The second cover 2622 may be coupled to the second support part 26211 through screw fastening. As another example, the second cover 2622 may be coupled to the second support part 26211 through snap-fit fastening. As another example, the second cover 2622 may be coupled to the second support part 26211 through an adhesive material (or a bonding material). A part of the outer surface of the slidable electronic device 26, which is provided by the second side 26211, may be smoothly connected to a part of the outer surface of the slidable electronic device 26, which is provided by the second cover 2622.

According to an embodiment, when viewed from above the rear surface of the slidable electronic device 26 (e.g., when viewed in the +z-axis direction), a region in which the first cover 2612 and the second cover 2622 (or the second support part 26211) overlap with each other may decrease at the time of a slide out of the second housing 262, and increase at the time of a slide in of the second housing 262.

According to various embodiments, the second cover 2622 may be omitted, and the second support part 26211 may be provided to further include a part corresponding to the second cover 2622 (not illustrated separately).

According to various embodiments, the second cover 2622 may include an element separate from the second housing 262.

According to various embodiments, the second cover 2622 may be disposed on the second side 26212. The second side 26212 may include, for example, a second cover placement region provided to correspond to a border region of the second cover 2622. The second cover placement region may be, for example, a stepped portion (not illustrated separately) provided on the second side 26212 to enable the second cover 2622 to be fitted onto and stably placed on the second side 26212. As another example, the second cover placement region may be provided as a substantial flat region (or flat part). The second cover 2622 may be disposed on the second cover placement region through screw fastening. As another example, the second cover 2622 may be disposed on the second cover placement region using snap-fit fastening. As another example, in order to dispose the second cover 2622 on the second side 26212, an adhesive material (or a bonding material) may be disposed between the second cover placement region and the border region of the second cover 2622.

According to an embodiment, the third cover 2623 may be disposed on the fourth side wall 2604 and called a "side cover". A part of the outer surface of the slidable electronic device 26, which is provided by the fourth side wall 2604, may be smoothly connected to a part of the outer surface of the slidable electronic device 26, which is provided by the third cover 2623.

According to various embodiments, the third cover 2623 may be omitted, and the second side 26212 may be provided to further include a part corresponding to the third cover 2623 (not illustrated separately).

According to an embodiment, in a closed state (see FIG. 26) of the slidable electronic device 26, a part of the outer surface of the slidable electronic device 26, which is provided by the slidable housing 260, may be provided by the first side wall 2601 and the second housing 262. For example, in a closed state of the slidable electronic device 26, a remaining part of the first housing 261 may be covered by the second housing 262 and thus not be exposed to the outside. In a closed state of the slidable electronic device 26, a part of the outer surface of the slidable electronic device 26, which is provided by the first side wall 2601, may be smoothly connected to a part of the outer surface of the slidable electronic device 26, which is provided by the second housing 262. When the slidable electronic device 26 is switched from a closed state to an open state, the part of the outer surface of the slidable electronic device 26, which is provided by the slidable housing 260, may further include an outer surface region provided by the second side wall 2602, the third side wall 2603, and the first cover 2612.

According to various embodiments, in a closed state of the slidable electronic device 26, a part of the first housing 261 may be protruded with respect to the second housing 262 in the fourth direction ④ (not illustrated separately). In this case, in a closed state of the slidable electronic device 26, the part (e.g., a part of the second side wall 2602, a part of the third side wall 2603, and a part of the first cover 2612) of the first housing 261, protruded with respect to the second housing 262 in the fourth direction ④, may provide a part of the outer surface of the slidable electronic device 26.

According to an embodiment, a combination of the first side 26112 of the first housing 261 and the second side 26212 of the second housing 262 may provide a bezel (or a bezel structure, a screen bezel, or a screen bezel structure) surrounding the screen. For example, when the slidable electronic device 26 in a closed state (see FIG. 26) is viewed from above the screen, a combination of the first side wall 2601, the fourth side wall 2604, the fifth side wall 2605, and the sixth side wall 2606 may provide a bezel surrounding the screen. For example, when the slidable electronic device 26 in an open state (see FIG. 27) is viewed from above the screen, a combination of the first side wall 2601, the second side wall 2602, the third side wall 2603, the fourth side wall 2604, the fifth side wall 2605, and the sixth side wall 2606 may provide a bezel surrounding the screen.

According to an embodiment, the slidable electronic device 26 may include a third frame 263 (or a third frame structure, a third framework, a third case, or a third support part) positioned in the space of the second housing 262. The third frame 263 may be connected to the second frame 2621 of the second housing 262. The third side 263 may be connected to, for example, the fifth side wall 2605 and the sixth side wall 2606 of the second side 26212. The third side 263 may overlap with the second support part 26211 when viewed from above the rear surface of the slidable electronic device 26 (e.g., when viewed in the +z-axis direction). A housing assembly including the second housing 262 and the third frame 263 may be slidably connected to the first housing 261. For example, mutual sliding between the first housing 261 and the second housing 262 may be interpreted as mutual sliding between the first housing 261 and the housing assembly including the second housing 262 and the third frame 263. A sliding structure (e.g., a sliding structure including a guide rail) for mutual stable sliding may be provided with respect to the first housing 261 and the second housing 262, or the first housing 261 and the third frame 263.

According to an embodiment, the first housing 261 and the third frame 263 may be connected to be mutually slidable. The second housing 262 may provide an exterior of the slidable electronic device 26 together with the first housing 261 in an operating assembly provided by a combination of the first frame 261 and the third frame 263 connected to be mutually slidable and the flexible display module 264 disposed to be drivable with respect to same. In various embodiments, the first housing 261 and the second housing 262 may include an "external housing" substantially providing the exterior of the slidable electronic device 26, and the third frame 263 may include an "internal housing" or a "third housing" positioned in the slidable electronic device 26 to correspond to the second housing 262, and thus hidden.

According to various embodiments, the third frame 263 may include a part of the second housing 262. In this case, a part of the second housing 262, including the second frame 2621, the second cover 2622, and the third cover 2623, may be called a term, such as an "exterior part", a "cover part", or an "exterior housing part", and the third frame 263 may be called a different term, such as a "support", an "internal support", a "support part", an "internal support part", a "support member", an "internal support member", a "support structure, or an "internal support structure" accommodated in the second housing 262.

According to an embodiment, the third frame 263 may include a first support surface (reference numeral "263A" in FIG. 28) oriented toward the front surface of the slidable electronic device 26, a second support surface (reference numeral "263B" in FIG. 28) corresponding to the bending part of the second region ⓔ included in the flexible display module 264, and a third support surface (reference numeral "263C" in FIG. 29) oriented toward the rear surface of the slidable electronic device 26. The first support surface and the second support surface may support the second region ⓔ of the flexible display module 264. In an embodiment, the third frame 263 is an element supporting the second region ⓔ included in the flexible display module 264, and may be called various terms, such as a "display support", a "display support member", a "display support structure", a "display support plate", or a "display support board". A part of the second region ⓔ, providing the second screen region S22 may be supported by the first support surface. The second support surface may face the bending part of the second region ⓔ, and may include a curved surface corresponding to the bending part of the second region ⓔ. The second support surface may support the bending part of the second region ⓔ. In an embodiment, various electronic components such as a battery may be disposed on the third support surface. The bending part of the second region ⓔ may be positioned between the second support surface and the fourth side wall 2604. In an embodiment, one surface of the fourth side wall 2604, facing the bending part of the second region ⓔ, may include a curved surface corresponding to the bending part of the second region ⓔ. At the time of a slide out of the second housing 262, at least a part of the second region ⓔ may be ejected to the outside (e.g., a position on the slidable electronic device 26, which is seen from the outside) from a space between the second support part 26211 of the second frame 2621 and the third frame 263 through a curved space between the fourth side wall 2604 and the second support surface. At the time of a slide in of the second housing 262, at least a part of the second region ⓔ may be introduced from the outside to the space between the second support part 26211 of the second frame 2621 and the third frame 263 through the curved space between the fourth side wall 2604 and the second support surface.

According to various embodiments, in a state where the second region ⓔ of the flexible display module 264 has been at least partially introduced in the space between the second support part 26211 of the second frame 2621 and the third frame 263 (e.g., in a closed state of FIG. 26), when viewed from above the rear surface of the slidable electronic device 26, an additional screen in which a part of the second region ⓔ is seen through the first cover 2612 of the first housing 261 may be provided. In this case, a region of the second support part 26211 of the second housing 262, corresponding to the additional screen, may be transparent or semi-transparent. In an embodiment, in a case where there is a member positioned between the second support part 26211 of the second housing 262 and at least a part of the second region ⓔ in a closed state of the slidable electronic device 26, a region of the member, corresponding to the additional screen, may include an opening or may be transparent or semi-transparent.

According to an embodiment, at least one of the first housing 261 or at least a part of the second housing 262 may include a metallic material and/or a non-metallic material. The first housing 261 or the second housing 262 may include, for example, at least one conductive structure including a metallic material and at least one non-conductive structure including a non-metallic material and connected to the at least one conductive structure. The metallic material included in the first housing 261 or the second housing 262 may be various like magnesium, magnesium alloy, aluminum, aluminum alloy, zinc alloy, copper alloy, titanium, amorphous alloy, or metal-ceramic composite material (e.g., cermet) or stainless steel. The non-metallic material included in the first housing 261 or the second housing 262 may be various like ceramic or polymer. In an embodiment, the first housing 261 and the second housing 262 may include the same metallic material or non-metallic material. In various embodiments, the first housing 261 and the second housing 262 may include different metallic materials or non-metallic materials.

According to an embodiment, at least one conductive part (or conductive region) included in the first housing 261 or the second housing 262 may be electrically connected to a wireless communication circuit (e.g., the wireless communication module 192 in FIG. 1) included in the slidable electronic device 26 and be used as an antenna radiator.

According to an embodiment, in the slidable electronic device 26, a sliding structure enabling the second housing 262 to be slid with respect to the first housing 261 may include a sliding driving unit (not illustrated separately) capable of providing a driving force for sliding of the second housing 262 with respect to the first housing 261 from an electrical signal. The sliding driving unit may include, for example, a motor and at least one gear drivingly connected to the motor. When a signal is generated via an input module included in the slidable electronic device 26, the sliding driving unit may provide a driving force enabling the slidable electronic device 26 to be switched between a closed state (see FIG. 26) and an open state (see FIG. 27). For example, when a signal is generated through a hardware button or a software button provided through the screen, the slidable electronic device 26 may be switched from a closed state to an open state, or from an open state to a closed state. As another example, when a signal is generated from various sensors, such as a pressure sensor, the slidable electronic device 26 may be switched from a closed state to an open state, or from an open state to a closed state. For example, when the slidable electronic device 26 is carried or held by the hand, a squeeze gesture indicating that a part (e.g., the palm or a finger) of a hand presses the slidable electronic device 26 within a designated section thereof may be detected via a sensor, and accordingly, the slidable electronic device 26 may be switched from a closed state to an open state or from an open state to a closed state. The sliding driving unit is not limited to the motor, and may include various actuators, such as a solenoid or a hydraulic cylinder. The solenoid may include, for example, a coil and a plunger positioned to correspond to the coil, and may generate a mechanical movement of the plunger when a current is supplied to the coil.

According to an embodiment, the slidable electronic device 26 may include at least one of one or more sound input modules (e.g., the input module 150 in FIG. 1), one or more sound output modules (e.g., the sound output module 155 in FIG. 1), one or more sensor modules (e.g., the sensor module 176 in FIG. 1), one or more camera modules (e.g., the camera module 180 in FIG. 1), one or more light emitting modules, one or more key input modules (e.g., the input module 150 in FIG. 1), and/or one or more connection terminals (e.g., the connection terminal 178). In various embodiments, the slidable electronic device 26 may omit at least one of the elements or additionally include a different element. The position or the number of elements may be various.

One of the one or more sound input modules may include, for example, a microphone (not illustrated separately) positioned in the slidable electronic device 26 to correspond to a microphone hole 2701 provided on the exterior of the slidable electronic device 26. In the illustrated example, the microphone hole 2701 may be provided on the first side wall 2601. The position or number of the microphones and the microphone holes corresponding to the microphones may be various without being limited to the illustrated example.

One of the one or more sound output modules may include, for example, a first speaker for multimedia playback (or recording playback) (not illustrated separately) positioned in the slidable electronic device 26 to correspond to a first speaker hole 2702 provided on the exterior of the slidable electronic device 26. Another one of the one or more sound output modules may include, for example, a second speaker for call (e.g., a call receiver) (not illustrated separately) positioned in the slidable electronic device 26 to correspond to a second speaker hole 2703 (e.g., a receiver hole) provided on the exterior of the slidable electronic device 26. In the illustrated example, the first speaker hole 2702 and the second speaker hole 2703 may be provided on the first side wall 2601. The position or number of the speakers and the speaker holes corresponding to the speakers may be various without being limited to the illustrated example.

According to various embodiments, the microphone hole and the speaker hole may be implemented as one hole.

According to various embodiments, the speaker hole may be omitted, and the sound output module may include a piezo speaker.

One of the one or more sensor modules may include, for example, an optical sensor positioned in an inner space of the slidable housing 260 to correspond to the screen. The optical sensor may be disposed to overlap with at least a part of the screen when viewed from above the front surface of the slidable electronic device 26 (e.g., when viewed in the −z-axis direction). In this case, a sensing function of the optical sensor may be performed without visual distinguishment (or exposure) of the optical sensor or the position of the optical sensor. The optical sensor may include, for example, a proximity sensor or an illuminance sensor.

According to an embodiment, the optical sensor may be positioned on a back surface of the first region ⓓ included in the flexible display module 264, or below the first region ⓓ, and the optical sensor or the position of the optical sensor may not be visually distinguished (or exposed).

According to various embodiments, the optical sensor may be aligned with a recess provided on the back surface of the first region ⓓ of the flexible display module 264, or may be at least partially inserted in the recess. A partial region of the first region ⓓ, at least partially overlapping with the optical sensor, may include a different pixel structure and/or wiring structure compared to the other regions. For example, the partial region of the first region ⓓ, at least partially overlapping with the optical sensor, may have a different pixel density (e.g., the number of pixels per unit area) compared to the other regions. A pixel structure and/or wiring structure provided in the partial region of the first region ⓓ, at least partially overlapping with the optical sensor, may reduce light loss between the outside and the optical sensor. As another example, the partial region of the first region ⓓ, at least partially overlapping with the optical sensor, may not include multiple pixels arranged therein.

According to various embodiments, the optical sensor may be aligned with an opening provided on the first region ⓓ of the flexible display module 264 or may be at least partially inserted in the opening. External light may arrive at the optical sensor through a transparent cover and the opening provided on the first region ⓓ. The transparent cover functions to protect the flexible display module 264 and, for example, may include a flexible film or flexible plate such as a plastic film (e.g., a polyimide film) or ultra-thin glass (UTG).

According to various embodiments, without being limited to the optical sensor such as a proximity sensor or an illuminance sensor, various other sensors may be positioned on the back surface of the first region ⓓ of the flexible display module 264 or below the first region ⓓ, or may be positioned to correspond to an opening provided on the first region ⓓ. For example, an optical-type, capacitive-type, or ultrasonic-type biometric sensor (e.g., a fingerprint sensor) may be positioned on the back surface of the first region ⓓ of the flexible display module 264 or below the first region ⓓ, or may be positioned to correspond to an opening provided on the first region ⓓ.

According to various embodiments, at least one sensor module may be included in an input module (e.g., the input module 150 in FIG. 1).

One of the one or more camera modules may include, for example, a first camera module 2704 (e.g., a front camera module) positioned to correspond to the front surface of the slidable electronic device 26. In an embodiment, the first camera module 2704 may be positioned in the inner space of the slidable housing 260 to correspond to the screen. The first camera module 2704 may be disposed to overlap with at least a part of the screen when viewed from above the front surface of the slidable electronic device 26 (e.g., when viewed in the −z-axis direction). In this case, an image capturing function of the first camera module 2704 may be performed without visual distinguishment (or exposure) of the first camera module 2704 or the position of the first camera module 2704.

According to an embodiment, the first camera module 2704 may be disposed on the back surface of the first region ⓓ included in the flexible display module 274, or below the first region ⓓ, and the first camera module 2704 or the position of the first camera module 2704 may not be visually distinguished (or exposed).

According to various embodiments, the first camera module 2704 may be aligned with a recess provided on the back surface of the first region ⓓ of the flexible display module 264, or may be at least partially inserted in the recess.

The first camera module 2704 may include, for example, a hidden display back camera (e.g., UDC).

In various embodiments, a partial region of the first region ⓓ of the flexible display module 264, at least partially overlapping with the first camera module 2704, may include a different pixel structure and/or wiring structure compared to the other regions. For example, the partial region of the first region ⓓ, at least partially overlapping with the first camera module 2704, may have a different pixel density, compared to the other regions. A pixel structure and/or wiring structure provided in the partial region of the first region ⓓ, at least partially overlapping with the first camera module 2704, may reduce light loss between the outside and the first camera module 2704. As another example, the partial region of the first region ⓓ, at least partially overlapping with the first camera module 2704, may not include multiple pixels arranged therein.

According to various embodiments, the first camera module 2704 may be aligned with an opening provided on the first region ⓓ of the flexible display module 264 or may be at least partially inserted in the opening. External light may arrive at the first camera module 2704 through a transparent cover (e.g., a polyimide film or ultra-thin glass) for protecting the flexible display module 264 from the outside and the opening provided on the first region ⓓ. The opening of the first region ⓓ aligned with or overlapping with the first camera module 2704 may be provided in a through hole type or a notch type.

According to various embodiments, the first camera module 2704 may be positioned to correspond to a camera hole (not illustrated separately) provided on the fourth side wall 2604 when viewed from above the front surface of the slidable electronic device 26.

According to various embodiments, the slidable electronic device 26 may include a light emitting module (e.g., LED, IR LED, or xenon lamp) capable of providing state information of the slidable electronic device 26 using light. In various embodiments, the light emitting module may provide a light source interworking with an operation of the first camera module 2704.

According to an embodiment, the slidable electronic device 26 may include a second camera module 2705, a third camera module 2706, and/or a light emitting module 2707 (e.g., flash) positioned in the first housing 261 to correspond to the first cover 2612. The first cover 2612 may include a first opening (e.g., a first camera hole) provided to correspond to the second camera module 2705 (e.g., a first rear camera module), a second opening (e.g., a second camera hole) provided to correspond to the third camera module 2706 (e.g., a second rear camera module), and/or a third opening (e.g., a flash hole) provided to correspond to the light emitting module 2707. The second camera module 2705 may be positioned in the first housing 261 to correspond to the first opening. The third camera module 2706 may be positioned in the first housing 261 to correspond to the second opening. The light emitting module 2707 may be positioned in the first housing 261 to correspond to the third opening.

According to an embodiment, in an open state (see FIG. 27) of the slidable electronic device 26, the second camera module 2705, the third camera module 2706, and the light emitting module 2707 may be exposed to the outside without overlapping with a part of the second housing 262, including the second support part 26211 and the second cover 2622 when viewed from above the rear surface of the slidable electronic device 26 (e.g., when viewed in the +z-axis direction).

According to an embodiment, in a closed state (see FIG. 26) of the slidable electronic device 26, the part of the second housing 262, including the second support part 26211 and the second cover 2622, may overlap with the second camera module 2705, the third camera module 2706, and the light emitting module 2707 when viewed from above the rear surface of the slidable electronic device 26. The part of the second housing 262, including the second support part 26211 and the second cover 2622, may include a light transmission region 2708 corresponding to the second camera module 2705, the third camera module 2706, and the light emitting module 2707. The light transmission region 2708 may overlap with the second camera module 2705, the third camera module 2706, and the light emitting module 2707 in a closed state of the slidable electronic device 26. In a closed state of the slidable electronic device 26, external light may arrive at the second camera module 2705 or the third camera module 2706 through the light transmission region 2708. In a closed state of the slidable electronic device 26, the light output from the light emitting module 2707 may travel to the outside of the slidable electronic device 26 through the light transmission region 2708.

According to an embodiment, the light emitting module 2707 may include a light source for the second camera module 2705 and/or the third camera module 2706. The light emitting module 2707 may include, for example, an LED or a xenon lamp.

According to various embodiments, the part of the second housing 262, including the second support part 26211 and the second cover 2622, may include a through hole-type or notch-type opening in replacement of the light transmission region 2708. The number or position of the camera modules (e.g., rear camera modules) or the light emitting modules positioned in the first housing 261 to correspond to the first cover 2612 may be various without being limited to the illustrated example. As another example, the second camera module 2705 or the third camera module 2706 may be omitted.

According to an embodiment, the second camera module 2705 and the third camera module 2706 may have different attributes (e.g., angles of view) or functions. A dual camera module is illustrated, but the disclosure is not limited thereto, and an example (e.g., a triple camera module) including more camera modules may be provided.

The second camera module 2705 or the third camera module 2706 may include, for example, a wide-angle camera module, a telephoto camera module, a color camera module, a monochrome camera module, or an infrared (IR) camera (e.g., a time-of-flight (TOF) camera, or a structured light camera) module.

According to an embodiment, the second camera module 2705 or the third camera module 2706 may have different angles of view (or lenses with different angles of view). The slidable electronic device 26 may selectively use the angle of view of the second camera module 2705 or the third camera module 2706, based on a user's selection for angle of view.

According to various embodiments, a camera module (e.g., an IR camera module) may be operated as at least a part of the sensor module.

According to an embodiment, the one or more key input modules may include a first key input module 2709 or a second key input module 2710. The first key input module 2709 may include, for example, a first key positioned on the first side wall 2601 and a key signal generator (not illustrated separately) that generates a key signal in response to a push or a touch on the first key. The second key input module 2710 may include, for example, a second key positioned on the sixth side wall 2606 and a key signal generator (not illustrated separately) that generates a key signal in response to a push or a touch on the second key. The position or number of the key input modules may be various without being limited to the illustrated example.

According to various embodiments, the slidable electronic device 26 may not include some or all of the key input modules, and a key input module not included may be implemented as a soft key using a screen.

One of the one or more connection terminals (or connector modules or interface terminal modules) may include a connector (or interface terminal) positioned inside the slidable electronic device 26 to correspond to a connector hole 2711 provided on the exterior of the slidable electronic device 26. In the illustrated example, the connector hole 2711 may be provided on the second side wall 2602. The position or number of the connectors and the connector holes corresponding to the connectors may be various without being limited to the illustrated example. The slidable electronic device 26 may transmit and/or receive power and/or data with an external electronic device electrically connected to the connector. The connector may include, for example, a USB connector or an HDMI connector.

According to various embodiments, one of one or more connection terminal modules may include an audio connector (or a headphone connector or earset connector) (not illustrated separately) positioned inside the slidable electronic device 26 to correspond to a connector hole provided on the exterior of the slidable electronic device 26.

According to various embodiments, one of the one or more connection terminal modules may include a memory card connector positioned inside the slidable electronic device 26 to correspond to a connector hole provided on the exterior of the slidable electronic device 26. In the illustrated example, the memory card connector may be positioned in the slidable electronic device 26 to correspond to the first side wall 2601, and the connector hole thereof may be covered by a detachable/attachable cover 2712.

Figure 28:
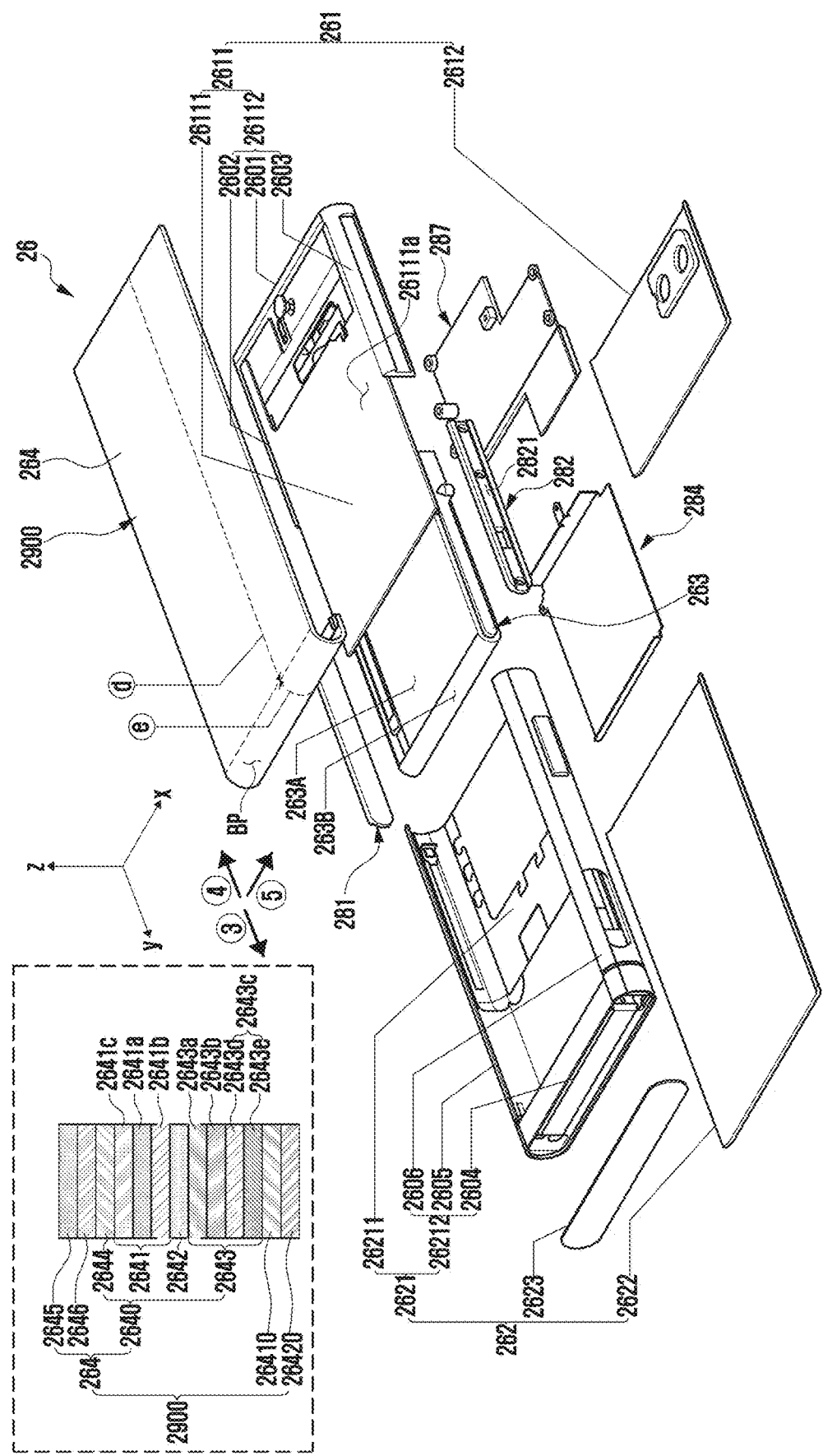
FIG. 28 and FIG. 29 are exploded perspective views of a slidable electronic device according to various embodiments.
Figure 29:
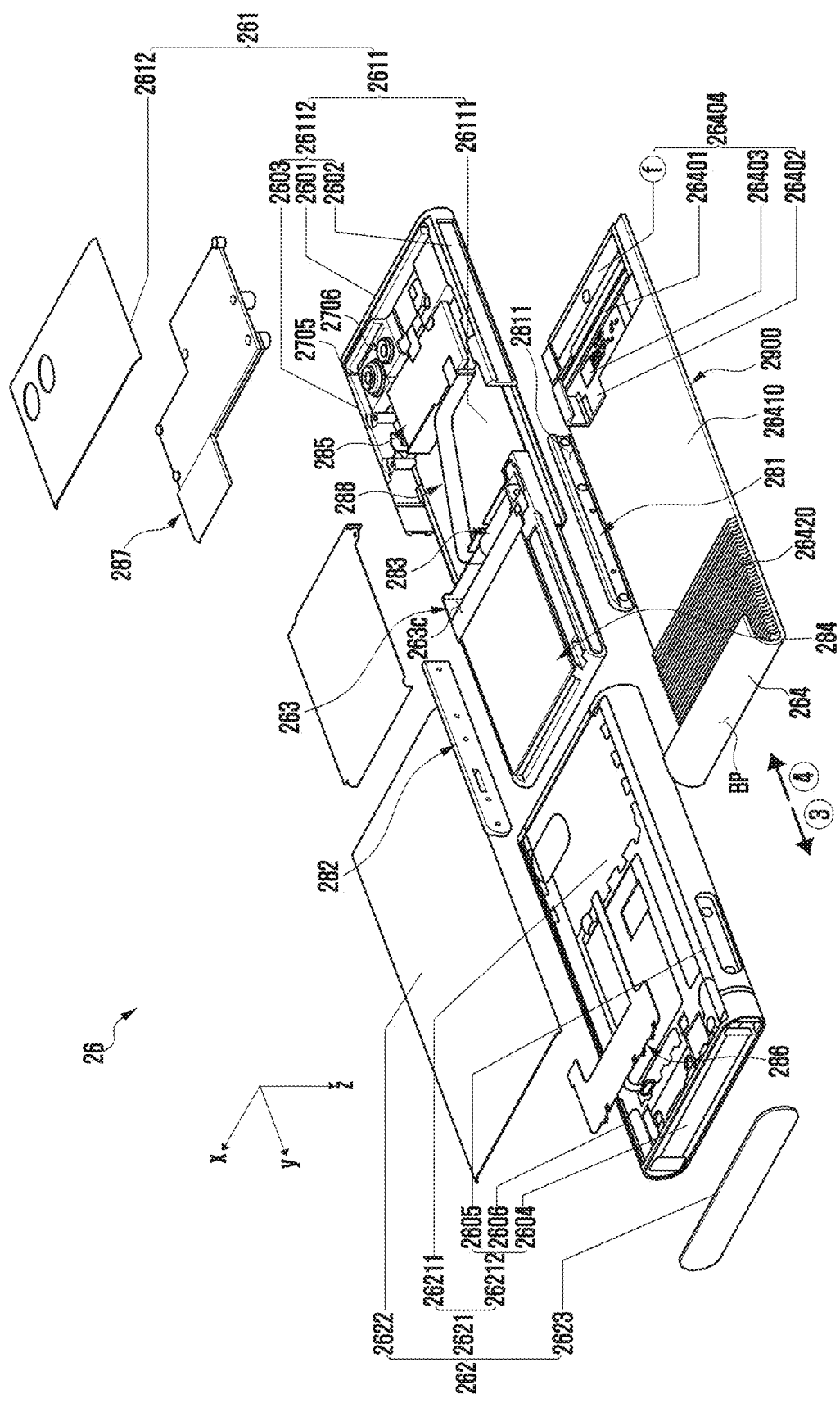
Figure 30:
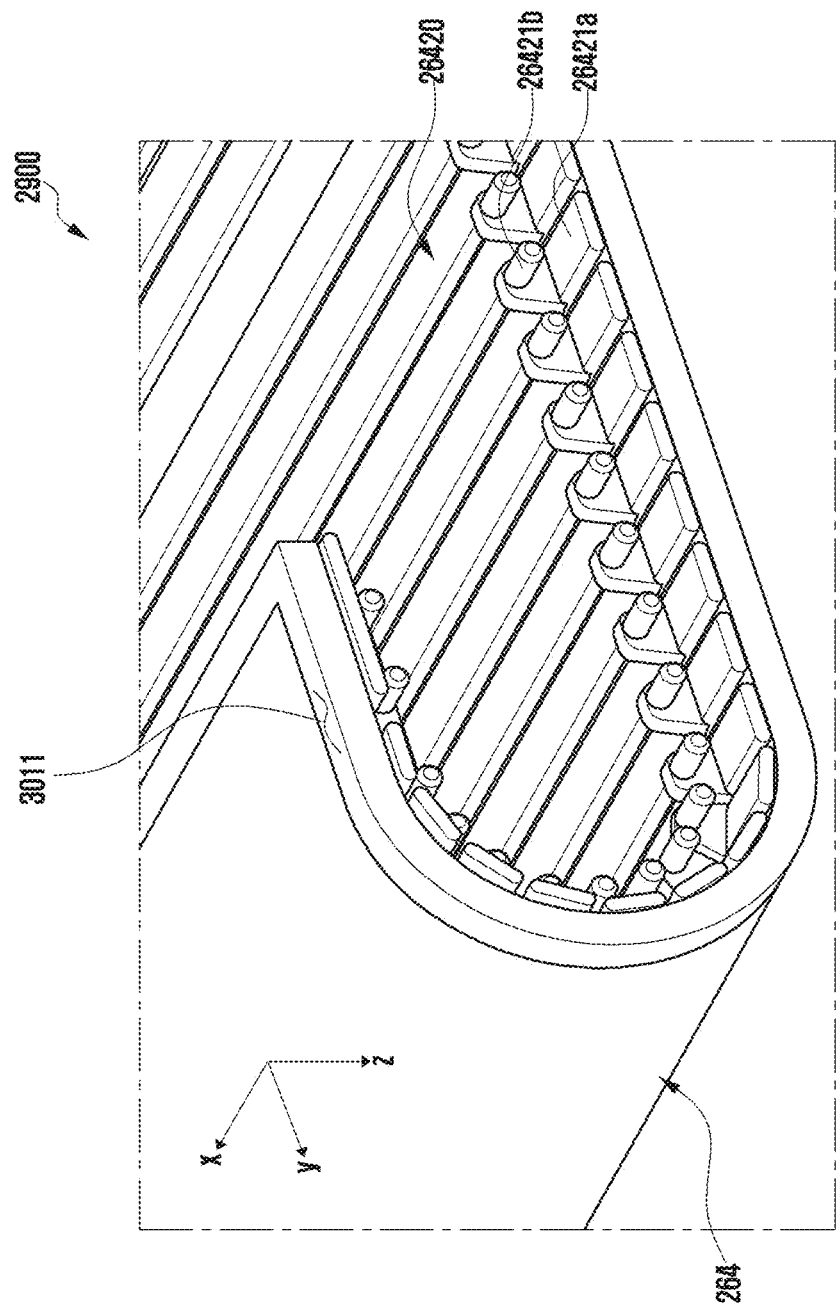
FIG. 30 is a partial perspective view of a display assembly according to various embodiments.
Figure 31:
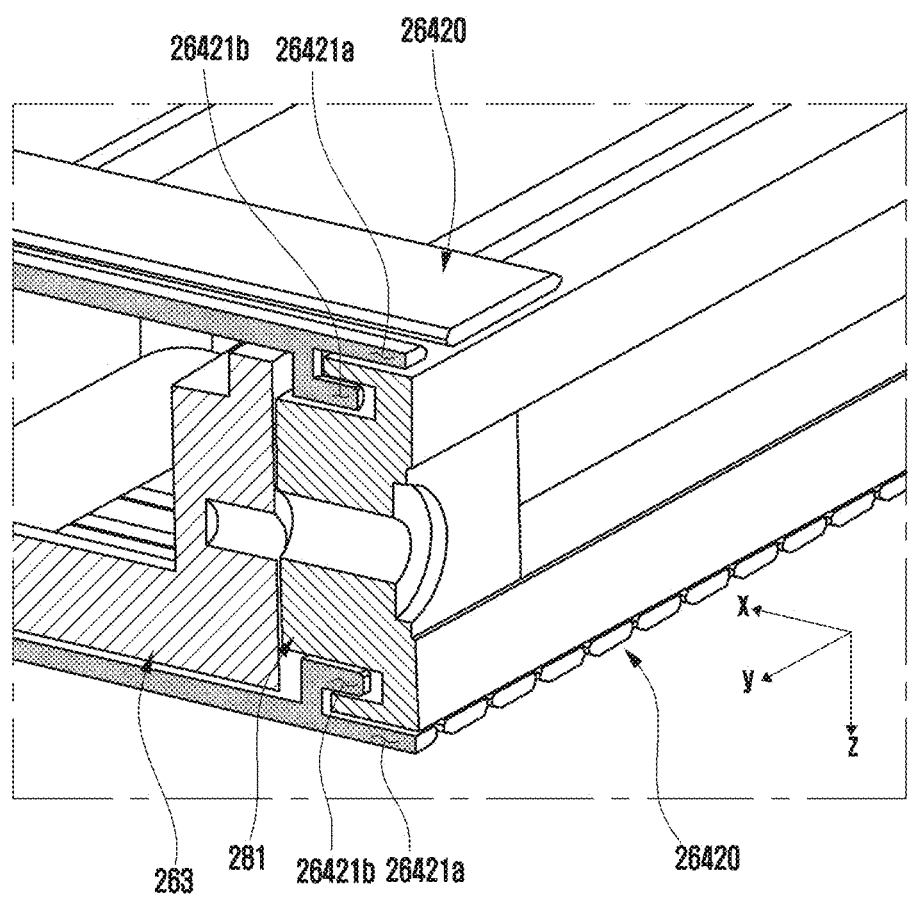
FIG. 31 is a partial sectional perspective view of a slidable electronic device according to various embodiments.
Figure 32:
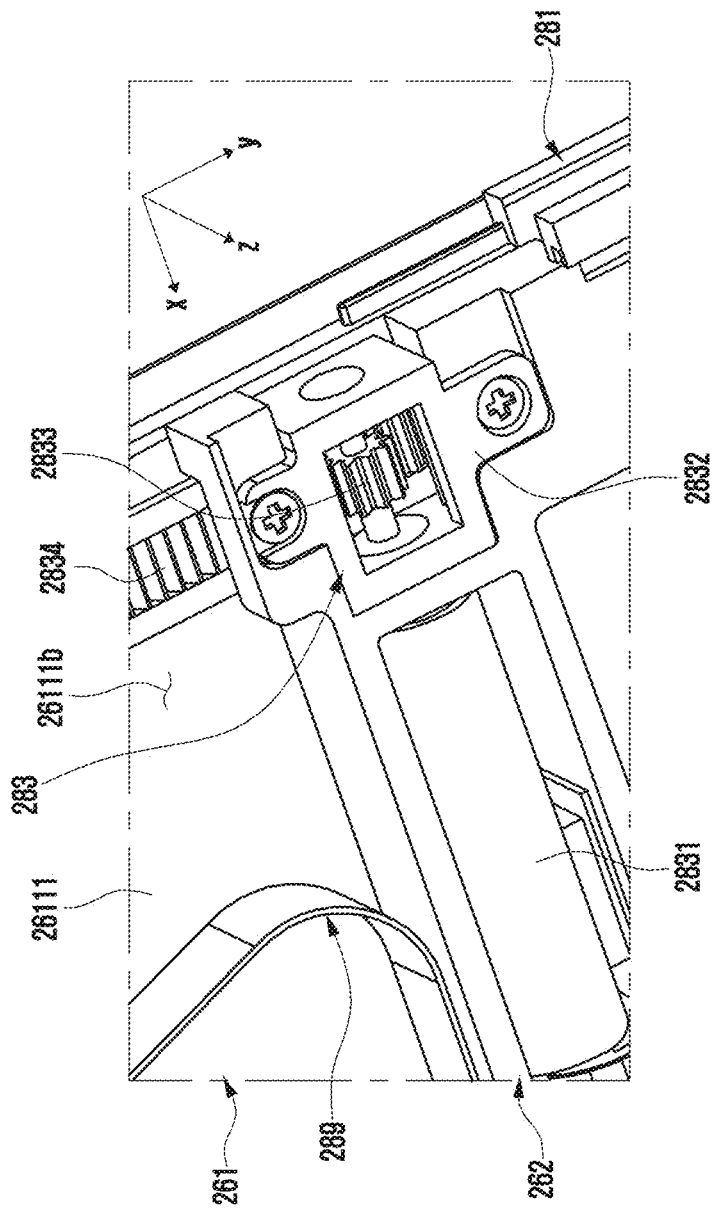
FIG. 32 is a partial perspective view illustrating a first frame of a first housing, a second housing, and a first guide rail according to various embodiments.
Figure 33:
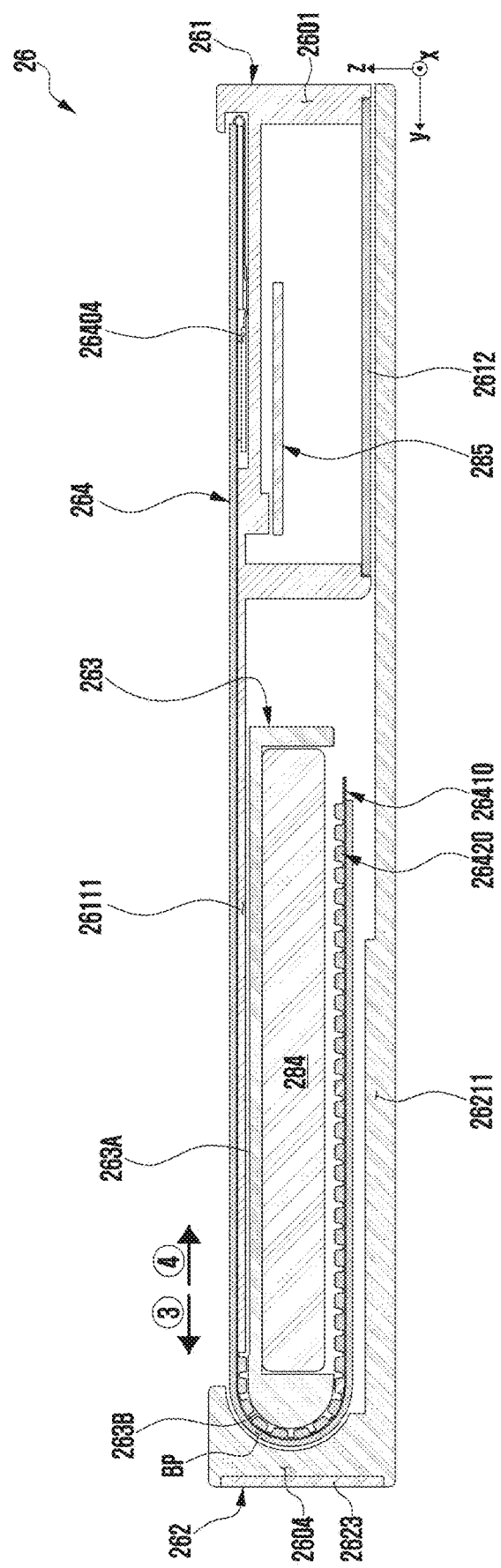
FIG. 33 is a cross-sectional view of a slidable electronic device taken along line F-F in FIG. 26 according to various embodiments.
Figure 34:
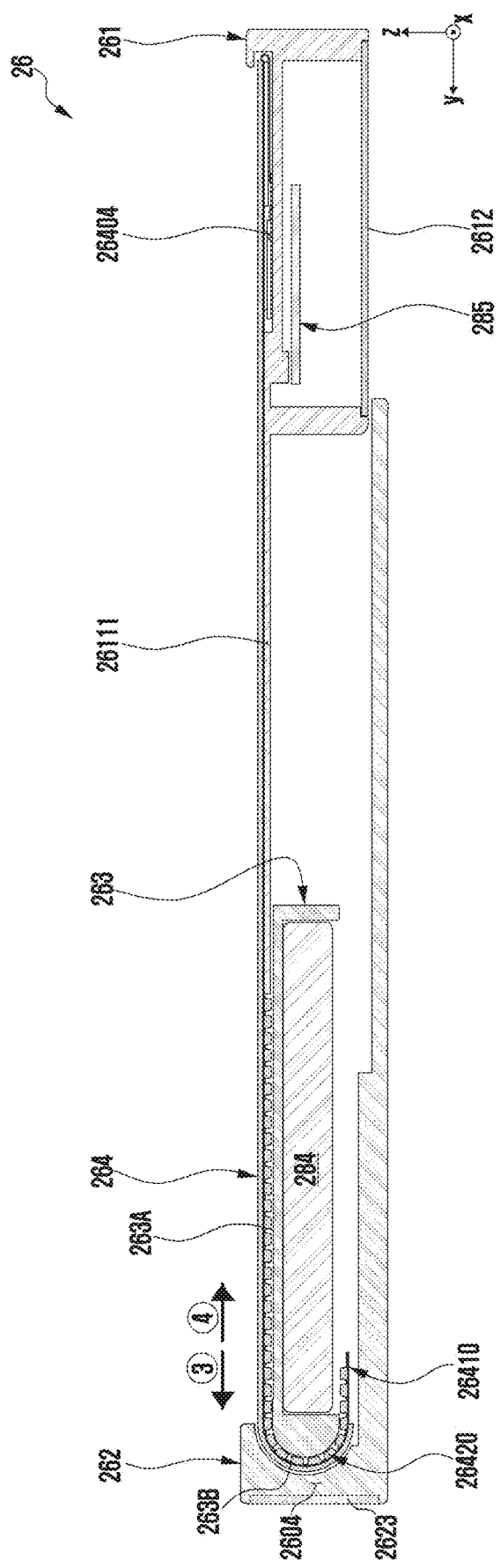
FIG. 34 is a cross-sectional view of a slidable electronic device taken along line H-H' in FIG. 27 according to various embodiments.

FIG. 28 and FIG. 29 are exploded perspective views of the slidable electronic device 26 according to various embodiments. FIG. 30 is a partial perspective view of a display assembly 2900 according to various embodiments. FIG. 31 is a partial sectional perspective view of the slidable electronic device 26 according to various embodiments. FIG. 32 is a partial perspective view illustrating the first frame 2611 of the first housing 261, the second housing 262, and a first guide rail 281 according to various embodiments. FIG. 33 is a cross-sectional view of the slidable electronic device 26 taken along line F-F in FIG. 26 according to various embodiments. FIG. 34 is a cross-sectional view of the slidable electronic device 26 taken along line H-H' in FIG. 27 according to various embodiments.

Referring to FIGS. 28, 29, 30, 31, 32, 33, and 34, the slidable electronic device 26 may include the first housing 261, the second housing 262, the third frame 263, the display assembly 2900, the first guide rail 281, a second guide rail 282, a sliding driving device 283, a battery 284, a first printed circuit board 285, a second printed circuit board 286, a support member 287, and/or a flexible printed circuit board (FPCB) 288.

According to an embodiment, the first frame 2611 of the first housing 261 may be provided as an integrated structure including the first support part 26111 and the first side 26112. The first support member 26111 of the first frame 2611 may be positioned inside the slidable electronic device 26 to correspond to the first housing 261. At least a part of the first support member 26111 may include a metallic material and/or a non-metallic material. Electronic components or various members related to the electronic components may be arranged on the first frame 2611 or supported by the first frame 2611.

According to an embodiment, the first region ⓓ of the flexible display module 264 may be disposed on the first support part 26111. The first support part 26111 may provide a first surface 26111a oriented toward the front surface of the slidable electronic device 26, and the first region ⓓ of the flexible display module 264 may be disposed on the first surface 26111a. In various embodiments, the first support part 26111 may be called various other terms, such as a "bracket", a "support", an "internal support", a "support member", a "support structure, or an "internal support structure". The first support part 26111 may include a part of the first housing 261 or an element separate from the first housing 261.

According to an embodiment, the first cover 2612 may be disposed on the first frame 2611 of the first housing 261. The first cover 2612 may be, for example, a plate including a first front surface oriented toward the front surface of the slidable electronic device 26, and a first rear surface providing at least a part of the rear surface of the slidable electronic device 26.

According to an embodiment, the third frame 263 may be drivingly connected to the first housing 261 to be slidable with respect to the first housing 261. The third frame 263 may support the second region (e) of the flexible display module 264. At least a part of the third frame 263 may include, for example, a metallic material and/or a non-metallic material.

According to an embodiment, the second housing 262 may have a space provided by a combination of the second support part 26211 and the second side 26212. The third frame 263 may be positioned in the space of the second housing 262, provided by a combination of the second support part 26211 and the second side 26212, and may be coupled to the second frame 2621. At least a part of the second housing 262 may include, for example, a metallic material and/or a non-metallic material.

According to an embodiment, the second cover 2622 and/or the third cover 2623 may be disposed on the second frame 2621. The second cover 2622 may be, for example, a plate including a second front surface oriented toward the front surface of the slidable electronic device 26, and a second rear surface providing at least a part of the rear surface of the slidable electronic device 26. The third cover 2623 may be disposed on, for example, the fourth side wall 2604 of the second frame 2621. In various embodiments, the third cover 2623 may be omitted. In this case, the second side 26212 may be provided to further include a part corresponding to the omitted third cover 2623.

According to an embodiment, when viewed from above the front surface of the slidable electronic device 26 (e.g., when viewed in the −z-axis direction), a region in which the first support part 26111 and the third frame 263 overlap with each other may decrease at the time of a slide out of the second housing 262, and increase at the time of a slide in of the second housing 262.

According to an embodiment, the first region (d) of the flexible display module 264 may be disposed on the first support part 26111 of the first housing 261. The first region (d) of the flexible display module 264 may be disposed on the first support member 26111, for example, using a thermoresponsive adhesive material (or a thermoresponsive bonding material), a photoresponsive adhesive material (or a photoresponsive bonding material), a normal adhesive agent (or a normal bonding agent), double-sided tape, or an organic adhesive material (or an organic bonding material).

According to various embodiments, the first region (d) of the flexible display module 264 may be inserted in the first frame 2611 in the third direction (3) in a sliding manner, and thus disposed in a recess provided on the first surface 26111a of the first support part 26111.

According to an embodiment, the first region (d) of the flexible display module 264 is disposed on the first housing 261, and thus at the time of a slide out of the second housing 262, the second region (e) of the flexible display module 264 may be ejected from a space between the second support part 26211 and the third frame 263 to the outside (e.g., a position on the slidable electronic device 26, which is seen from the outside).

According to an embodiment, the third frame 263 may include the first support surface 263A and the second support surface 263B supporting the second region (e) of the flexible display module 264.

According to an embodiment, the first support surface 263A of the third frame 263 may include a flat region. When viewed from above the front surface of the slidable electronic device 26 (e.g., when viewed in the −z-axis direction), a region in which the first support surface 263A faces the first support part 26111 of the first housing 261 may decrease at the time of a slide out of the second housing 262, and increase at the time of a slide in of the second housing 262. In a closed state (see FIG. 26) or an open state (see FIG. 27) of the slidable electronic device 26, or during sliding of the second housing 262 with respect to the first housing 261, at least a part of the first support surface 263A, which faces and overlaps with the first support part 26111 of the first housing 261, may support the first support part 26111 of the first housing 261. The first support surface 263A may support a part of the second region (e) of the flexible display module 264, which provides the screen in an open state of the slidable electronic device 26, or during sliding of the second housing 262 with respect to the first housing 261. At the time of a slide out of the second housing 262, an area of the first support surface 263A, which is not covered by the first support part 26111 of the first housing 261 and thus supports the second region (e) of the flexible display module 264, may be increased.

According to an embodiment, the second support surface 263B of the third frame 263 may include a curved region (or a curved support region). The second support surface 263B may be positioned to correspond to the fourth side wall 2604. The second support surface 263B may support a bending part BP of the second region (e) of the flexible display module 264. The bending part BP of the flexible display module 264 may be a part of the second region (e), which is disposed and maintained to be bent so that the second region (e) is moved in a switched direction at the time of sliding of the second housing 262 with respect to the first housing 261. For example, during a slide out of the second housing 262, at least a part of the second region (e) may be ejected from the inside of the sliding housing 26 to the outside through a curved space between the fourth side wall 2604 and the second support surface 263B due to the relative position between the first housing 261 coupled to the first region (d) and the second housing 262 corresponding to the second region (e). During a slide in of the second housing 262, at least a part of the second region (e) may be introduced to the inside of the sliding housing 26 through the curved space between the fourth side wall 2604 and the second support surface 263B due to the relative position between the first housing 261 coupled to the first region (d) and the second housing 262 corresponding to the second region (e).

According to various embodiments, a rotation member (not illustrated separately) such as a roller or pulley may be positioned in replacement of a part of the third frame 263, providing the second support surface 263B. For example, one end and the other end of a rotation shaft for the rotation member may be rotatably coupled to the second frame 2621 or the third frame 263. In various embodiments, the rotation member may be interpreted as a curved surface member, a curved surface support member, or a curved surface support structure implemented to be rotatable based on friction with a display support structure 26420 (e.g., a multi-bar structure).

According to an embodiment, the display assembly 2900 may include the flexible display module 264, a support sheet 26410, and/or the display support structure 26420. The display assembly 2900 may be implemented to be substantially identical or similar to the display assembly 600 illustrated in FIG. 6.

According to an embodiment, the flexible display module 264 (e.g., the flexible display module 30 in FIG. 6) may include a flexible display 2640 (e.g., the flexible display 300 in FIG. 6), a transparent cover 2645 (e.g., the transparent cover 305 in FIG. 6), and/or an optical transparent adhesive member 2646 (or an optical transparent bonding member) (e.g., the optical transparent adhesive member 306 in FIG. 6).

According to an embodiment, the flexible display 2640 (e.g., the flexible display 300 in FIG. 6) may include a display panel 2641 (e.g., the display panel 301 in FIG. 6), a base film 2642 (e.g., the base film 302 in FIG. 6), a lower panel 2643 (e.g., the lower panel 303 in FIG. 6), and/or an optical layer 2644 (e.g., the optical layer 304 in FIG. 6).

According to an embodiment, the display panel 2641 (e.g., the display panel 301 in FIG. 6) may include a light emitting layer 2641a (e.g., the light emitting layer 301a in FIG. 6), a TFT film (or TFT substrate) 2641b (e.g., the TFT substrate 301b in FIG. 6), and/or an encapsulation layer 2641c (e.g., TFE) (e.g., the encapsulation layer 301c in FIG. 6).

According to an embodiment, the lower panel 2643 (e.g., the lower panel 303 in FIG. 6) may include a light blocking layer 2643a (e.g., the light blocking layer 303a in FIG. 6), a buffering layer 2643b (e.g., the buffering layer 303b in FIG. 6), and/or a lower layer 2643c (e.g., the lower layer 303c in FIG. 6). In an embodiment, the lower layer 2643c may include a complex sheet 2643d (e.g., the complex sheet 303d in FIG. 6) or a copper sheet 2643e (e.g., the copper sheet 303e in FIG. 6).

According to an embodiment, the slidable electronic device 26 may include a touch sensing circuit (e.g., a touch sensor) (not illustrated separately). The touch sensing circuit may be implemented by a transparent conductive layer (or film) based on various conductive materials, such as ITO. For example, the touch sensing circuit may be disposed between the transparent cover 2645 and the optical layer 2644 (e.g., add-on type). As another example, the touch sensing circuit may be disposed between the optical layer 2644 and the display panel 2641 (e.g., on-cell type). As another example, the display panel 2641 may include a touch sensing circuit or a touch sensing function (e.g., in-cell type).

According to various embodiments, the flexible display 2640 may include a conductive pattern (not illustrated separately), such as a metal mesh (e.g., an aluminum metal mesh), as a touch sensing circuit disposed on the encapsulation layer 2641c between the encapsulation layer 2641c and the optical layer 2644. For example, the metal mesh may have a durability larger than that of a transparent conductive layer implemented by ITO, so as to correspond to bending of the flexible display 2640.

According to various embodiments, the flexible display 2640 may further include a pressure sensor (not illustrated) capable of measuring the strength (pressure) of a touch.

According to various embodiments, the display assembly 2900 or the flexible display 2640 may include an electromagnetic induction panel (e.g., a digitizer) (not illustrated separately) that detects a pen input device (e.g., an electronic pen or a stylus pen) employing a magnetic field type.

According to various embodiments, the display panel 2641 or the multiple layers included in the lower panel 2643, and the stacked structure or the stacking order thereof may be various. The flexible display 2640 may be implemented to omit some of elements or add a different element according to the provided type thereof or the trend of convergence.

According to an embodiment, the support sheet 26410 (or support plate or support layer) may be disposed on a back surface of the flexible display module 264. The support sheet 26410 may be implemented to be substantially identical or similar to the support sheet 3010 disposed on the flexible display module 30 illustrated in FIG. 6, and may substantially identically act as the support sheet 3010 of FIG. 6.

According to an embodiment, the support sheet 26410 may include a lattice structure (not illustrated separately) or a recess pattern (not illustrated separately) at least partially overlap with the second region (e) of the flexible display module 264.

According to various embodiments, the lattice structure or the recess pattern of the support sheet 26410 may be expanded to the first region (d) of the flexible display module 264.

According to an embodiment, the display support structure 26420 (or display support member) may be disposed on or coupled to the support sheet 26410. The display support structure 26420 may be implemented to be substantially identical or similar to the display support structure 3020 disposed at the flexible display module 30 illustrated in FIG. 6, and may substantially identically act as the display support structure 3020 of FIG. 6. The display support structure 26420 may have, for example, a multi-bar structure. In a case where the support sheet 26410 is omitted, the display support structure 26420 may be disposed on or coupled to the back surface of the flexible display module 264.

According to an embodiment, the display support structure 26420 may be positioned between the second region (e) of the flexible display module 264 and the first surface 26111a of the first support surface 263A of the third frame 263, to support the second region (e). At the time of a slide out of the second housing 262, an area of the first support surface 263A of the third frame 263, which is not covered by the first support member 26111 of the first housing 261 and thus supports the display support structure 26420, may be increased. At the time of a slide in of the second housing 262, an area of the first support surface 263A of the third frame 263, which is not covered by the first support member 26111 of the first housing 261 and thus supports the display support structure 26420, may be decreased. The display support structure 26420 may support the bending part BP of the flexible display module 264 between the bending part BP of the flexible display module 264 and the second support surface 263B of the third frame 263. During a slide out or a slide in of the second housing 262, the second housing 262 and the display support structure 26420 may be moved while rubbing with each other.

According to various embodiments, the display support structure 26420 may act as the support sheet 26410, and in this case, the support sheet 26410 may be omitted.

According to various embodiments, the support sheet 26410 may include a display support structure different from the display support structure 26420.

According to various embodiments, the support sheet 26410 may include a part of the display support structure 26420.

According to an embodiment, in order to reduce the frictional force between a display support surface (e.g., the first support surface 263A and the second support surface 263B) of the third frame 263 and the display support structure 26420, a lubricating agent (e.g., grease) may be disposed (e.g., applied) between the display support surface of the second housing 262 and the display support structure 26420.

According to various embodiments, in order to reduce the frictional force between the display support surface (e.g., the first support surface 263A and the second support surface 263B) of the second housing 262 and the display support structure 26420, the display support surface of the second housing 262 or a surface of the display support structure 26420 may be formed by lubricant coating (e.g., coating using various lubricating materials such as Teflon).

According to an embodiment, the display assembly 2900 or the flexible display module 264 may include a display driver circuit 26401 (e.g., the display driver circuit 810 in FIG. 6). The display driver circuit 26401 may include, for example, a DDI or a DDI chip.

According to an embodiment, the display driver circuit 26401 may be disposed on the flexible display 2640 in a COP scheme. The flexible display module 264 may include a third region (f) extending from the first region (d). The third region (f) may extend from the first region (d) of the flexible display module 264, for example, at the side of the first side wall 2601. The third region (f) may be disposed on the support sheet 26410 while being bent to be positioned between the support sheet 26410 and the first support part 26111 of the first housing 261. An adhesive material or a bonding material (not illustrated separately) may be disposed between the third region (f) and the support sheet 26410. In a case where the support sheet 26410 is not expanded to the back surface of the first region (d) or the support sheet 26410 is omitted, the third region (f) may be disposed on the lower panel 2643 of the flexible display 2640 using an adhesive material or a bonding material. The display driver circuit 26401 may be disposed on the third region (f). The third region (f) may be electrically connected to the first printed circuit board 285 through a flexible printed circuit board 26402.

According to an embodiment, the flexible printed circuit board 26402 may extend through an opening (not illustrated) provided on the first support part 26111 of the first housing 261, to be electrically connected to the first printed circuit board 285 disposed on one surface of the first support part 26111, oriented toward the rear surface of the slidable electronic device 26.

According to an embodiment, a touch sensor integrated circuit (IC) 26403 electrically connected to the touch sensing circuit included in the flexible display module 264 may be further disposed on the flexible printed circuit board 26402. The touch sensor IC 26403 may be positioned between the back surface of the first region (d) and the first surface 26111a of the first support part 26111.

According to various embodiments, the display driver circuit 26401 may be disposed on the flexible display module 264 in a COF scheme. For example, the third region (f) of the flexible display module 264 may be a flexible film substrate connecting the display panel 2641 and the flexible printed circuit board electrically connected to the first printed circuit board 285. In an embodiment, the display driver circuit 26401 may be disposed on the film substrate.

According to an embodiment, a combination of the third region (f) of the flexible display module 264, the display driver circuit 26401, the flexible printed circuit board 26402, and the touch sensor IC 26403 may include a "display circuit part 26404".

According to an embodiment, the first guide rail 281 and the second guide rail 282 may guide the movement of the display support structure 26420. The first guide rail 281 may include a first rail part at which one side of the display support structure 26420 is positioned, and which guides the movement thereof. The second guide rail 282 may include a second rail part at which the other side of the display support structure 26420 is positioned, and which guides the movement thereof. The first guide rail and the second guide rail may include, for example, a recess providing a pattern corresponding to a movement path of the display assembly 2900 at the time of sliding of the second housing 262 with respect to the first housing 261.

According to an embodiment, the first guide rail 281 may be positioned between the third frame 263 and the fifth side wall 2605, and may be disposed on the third frame 263 using a manner such as screw fastening. The second guide rail 282 may be positioned between the third frame 263 and the sixth side wall 2606, and may be disposed on the third frame 263 using a manner such as screw fastening. The first guide rail 281 may be coupled to the fifth side wall 2605 using a manner such as screw fastening. The second guide rail 282 may be coupled to the sixth side wall 2606 using a manner such as screw fastening.

In an embodiment, referring to FIGS. 30 and 31, multiple support bars included in the display support structure 26420 may each include a first support part 26421a supporting a first edge region (or a first border region) 3011 of the flexible display module 264, positioned to correspond to the first guide rail 281. The multiple support bars may each include a first pin 26421b extending from the first support part 26421a and inserted in the first rail part. The multiple support bars may each include a second support part (not illustrated separately) supporting a second edge region (or a second border region) (not illustrated separately) of the flexible display module 264, positioned to correspond to the second guide rail 281, and a second pin (not illustrated separately) extending from the second support part and inserted in the second rail part of the second guide rail 282. In various embodiments, an integrated metal member or non-metal member including the first support part 26421a and the first pin 26421b, and an integrated metal member or non-metal member including the second support part and the second pin may be separately provided, and coupled to the support bar.

According to various embodiments, the fifth side wall 2605 of the second housing 262 may be implemented to include the first guide rail, and in this case, the first guide rail 281 may be omitted. The sixth side wall 2606 of the second housing 262 may be implemented to include the second guide rail, and in this case, the second guide rail 282 may be omitted.

According to an embodiment, the sliding driving device 283 may include a motor assembly 2831, a bracket (or motor bracket) 2832, a circular gear (or round gear) 2833, and/or a linear gear (or linear gear structure) 2834.

According to an embodiment, the motor assembly 2831 may provide power (or driving force) for sliding of the second housing 262 with respect to the first housing 261. The motor assembly 2831 may be disposed on the third frame 263. The motor assembly 2831 may be, for example, disposed on one surface of the third frame 263, oriented toward the rear surface of the slidable electronic device 26. The motor assembly 2831 may provide power for sliding of the second housing 262 with respect to the first housing 261. When the third frame 263 is slid with respect to the first housing 261 due to the power provided by the motor assembly 2831, the relative position between the first guide rail 281 and one side of the display support structure 26420, positioned on the first guide rail 281, may be changed, and the relative position between the second guide rail 282 and the other side of the display support structure 26420, positioned on the second guide rail 282, may be changed. The flexible display assembly 2900 is coupled to the first support part 26111 of the first housing 261. Therefore, the relative position change between the first housing 261 and the third frame 263, the relative position change between the first guide rail 281 and one side of the display support structure 26420, and the relative position change between the second guide rail 282 and the other side of the display support structure 26420 may act as a force for movement of a part of the display support structure 26420, on which the second region ⓔ of the flexible display module 264 is disposed.

According to an embodiment, the motor assembly 2831 may include a motor and a gear structure drivingly connected to the motor. The motor may include, for example, a step motor. The motor may be implemented in various other types, and the configuration thereof is not limited. The gear structure may, for example, drivingly connect the motor and the circular gear 2833 between the motor and the circular gear 2833. The gear structure may be connected to a first rotation shaft (or a first shaft or an input shaft) of the motor. The gear structure may be connected to a second rotation shaft (or a second shaft or an output shaft) of the circular gear 2833, or may include a second rotation shaft connected to the circular gear 2833. The first rotation shaft and the second rotation shaft may be substantially parallel to a fifth direction ⑤. A rotation central line of the first rotation shaft and a rotation central line of the second rotation shaft may substantially coincide with each other. In various embodiments, the central line of the first rotation shaft and the rotation central line of the second rotation shaft may be spaced apart from each other and be parallel to each other. In various embodiments, the first rotation shaft and the second rotation shaft may be not parallel to each other, and accordingly, the position of the motor assembly 2831 may be modified to be different from the illustrated example. For example, the first rotation shaft and the second rotation shaft may be orthogonal to each other (or may cross each other), and the gear structure may be implemented to transfer power or movement from the first rotation shaft to the second rotation shaft using a conical gear (e.g., a bevel gear). In an embodiment, the gear structure may include a reduction gear. The gear structure may, for example, enable the second rotation shaft to be rotated at a slower rotation speed or a smaller rotation count, compared to the first rotation shaft. The gear structure may reduce the power of the first rotation shaft to increase the torque of the second rotation shaft. The gear structure (e.g., the reduction gear) may reduce the speed of the second rotation shaft and increase the torque thereof, compared to the first rotation shaft, so as to contribute to stable sliding of the second housing 262 with respect to the first housing 261. The power for sliding of the second housing 262 with respect to the first housing 261 is output from the second rotation shaft, and the second rotation shaft may include a rotation shaft, a driving shaft, or a power transfer shaft of the sliding driving device 283. In various embodiments, the circular gear 2833 may include a part of the gear structure. In various embodiments, the motor may be implemented in an integrated type including the gear structure. In various embodiments, the gear structure may be omitted, and in this case, the first rotation shaft of the motor may be connected to the circular gear 2833.

According to an embodiment, the motor assembly 2831 may be disposed on (or connected to) the third frame 263 using the bracket 2832. The bracket 2832 may contribute to the motor assembly 2831 to be stably positioned on the first frame 263. The bracket 2832 may contribute to the durability of the motor assembly 2831. In an embodiment, the bracket 2832 may be coupled to the gear structure of the motor assembly 2831, and may be coupled to the third frame 263 through screw fastening. For example, the circular gear 2833 may be accommodated in the bracket 2832, and the rotation shaft of the circular gear 2833 may be rotatably supported by the bracket 2832. The bracket 2832 is an element for positioning the motor assembly 2831 to be stably positioned on the first frame 263, and may be called various other terms, such as a "connection structure", a "connection member", a "motor assembly support member", a "motor assembly support structure", a "motor assembly bracket", or a "frame".

According to an embodiment, the circular gear 2833 may include a circularly cylindrical or a circular plate-type rotation body, and multiple gear tooth arranged along a circumference of the rotation body.

According to an embodiment, the linear gear 2834 may be a gear structure in which multiple gear tooth are linearly arranged in the third direction ③ (e.g., the slide-out direction). The linear gear 2834 may, for example, a plate type having one surface including multiple gear tooth and the other surface opposite to the one surface. The linear gear 2834 may be disposed on the first support part 26111 of the first housing 261. The linear gear 2834 may be disposed on the second surface 26111b of the first support part 26111 using various manners such as screw fastening or bonding.

According to an embodiment, the circular gear 2833 and the linear gear 2834 may be engaged with each other (an engaged state). The circular gear 2833 may rotate due to driving of the motor assembly 2831, and the linear gear 2834 being engaged with the circular gear 2833 may linearly move. The rotation of the circular gear 2833 is converted into the linear movement of the linear gear 2834, whereby mutual sliding between the first housing 261 coupled to the linear gear 2834 and the second housing 262 coupled to the motor assembly 2831 may be provided. When viewed from above the front surface of the slidable electronic device 26 (e.g., when viewed in the −z-axis direction), a region in which the third frame 263 covers the first support part 26111 of the first housing 261 and the linear gear 2834 disposed on the first support part 26111 may decrease at the time of a slide out of the second housing 262, and increase at the time of a slide in of the second housing 262. In various embodiments, the circular gear 2833 may be called a "pinion" or a "pinion gear", and the linear gear 2834 may be called a "rack" or a "rack gear". The circular gear 2833 and the linear gear 2834 may be made of a material (e.g., metal or engineering plastic) having a rigidity or strength preventing/reducing substantial transformation against the force applied to mutual sliding between the first housing 261 and the second housing 262.

According to various embodiments, the first support part 26111 of the first housing 261 may be integrated with the linear gear 2834.

According to an embodiment, in order to reduce loss in movement transfer or loss in power transfer, a lubricating agent (e.g., grease) may be disposed between the circular gear 2833 and the linear gear 2834 so as to ensure smooth movement between the circular gear 2833 and the linear gear 2834 and/or the durability thereof.

According to various embodiments, lubricant coating (e.g., coating using various lubricating materials such as Teflon coating) may be applied to the circular gear 2833 and/or the linear gear 2834 so as to reduce the frictional force against movement.

According to various embodiments, the motor assembly 2831 and the circular gear 2833 may be disposed on the first support part 26111 of the first housing 261 using the bracket 2832, and the linear gear 2834 may be disposed on the third frame 263.

According to an embodiment, the slidable electronic device 26 may include a motor driving circuit (e.g., a motor controller or a motor driver) (not illustrated separately) electrically connected to the motor assembly 2831. The motor driving circuit may control the motor assembly 2831, based on a control signal received from a processor (e.g., the processor 120 in FIG. 1), and the rotation direction, the rotation angle, the rotation amount, the rotation speed, the rotation acceleration, or the rotation angular speed of the circular gear 2833 drivingly connected to the motor assembly 2831 may be adjusted.

According to an embodiment, the motor driving circuit may include a motor encoder for detecting the driving state of the motor. The motor encoder may include, for example, a circular plate coupled to the rotation shaft of the motor, and a detector capable of detecting the rotation direction, the rotation angle, the rotation amount, the rotation speed, the rotation acceleration, or the rotation angular speed of the rotation shaft through electronically recognizable gradations and signs marked on the circular plate. The processor may control the motor driving circuit, based on instructions stored in a memory (e.g., the memory 130 in FIG. 1) and related to mutual sliding between the first housing 261 and the second housing 262.

When the slidable electronic device 26 is switched from a closed state (see FIG. 26) to an open state (see FIG. 27), or switched from an open state to a closed state, in a case where the speed (or movement speed) at which the second housing 262 is slid with respect to the first housing 261 is not 0 when the state switching is completed, a collision wherein the first housing 261 and the second housing 262 that relatively move, strongly interact with each other for a relatively short time may occur. The collision may make it difficult to provide soft sliding to a user, or the impact caused by the collision may damage the elements (or driving elements) included in the sliding driving device 283. In an embodiment, the slidable electronic device 26 may control the motor driving circuit to control the rotation speed of the circular gear 2833 so as to reduce the collision. For example, When the slidable electronic device 26 is switched from a closed state to an open state, or switched from an open state to a closed state, the rotation speed of the circular gear 2833 may be controlled such that the speed at which the second housing 262 is slid with respect to the first housing 261 is reduced and then the sliding is stopped when the state switching is completed.

According to various embodiment, the sliding driving device 283 included in the slidable electronic device 26 of FIG. 26 may be applied to a sliding structure between the first housing 21 and the second housing 22 or a sliding structure between the first frame 211 and the second frame 221.

According to an embodiment, the slidable electronic device 26 may include a sliding structure for stable and smooth mutual sliding between the first housing 261 and the second housing 262. The sliding structure may include, for example, a linear motion (LM) guide (not illustrated separately) connecting the first housing 261 and the second housing 262. Through the LM guide, the second housing 262 may be linearly moved with respect to the first housing 261 softly and smoothly in the third direction ③ or the fourth direction ④. The LM guide may include, for example, a rail, a block, and/or a bearing. The rail may be a bar type extending from a first end to a second end in a direction (e.g., the third direction ③) in which the second housing 262 is slid with respect to the first housing 261. The rail and the block may be mutually slidably coupled. The bearing is positioned between the rail and the block to reduce the friction between the rail and block. The bearing may include, for example, multiple bearing balls and a retainer. In various embodiments, the block may be provided to include the bearing.

According to an embodiment, the slidable electronic device 26 may include a first LM guide (not illustrated separately) and a second LM guide (not illustrated separately). A first end of a rail of the first LM guide may be coupled to the second side wall 2602 of the first housing 261, and a block of the first LM guide may be disposed on (or coupled to) one surface of the third frame 263, corresponding to the first guide rail 281. The first guide rail 281 may include a first recess 2811 provided to correspond to the rail of the first LM guide. When the third frame 263 coupled to the block of the first LM guide is slid out or slid in with respect to the first housing 261 coupled to the rail, the first recess 2811 may prevent/reduce mutual interference between the first guide rail and the rail of the first LM guide. A first end of a rail of the second LM guide may be coupled to the third side wall 2603 of the first housing 261, and a block of the second LM guide may be disposed on (or coupled to) one surface of the third frame 263, corresponding to the second guide rail 282. The first LM guide and the second LM guide may be symmetrically arranged with respect to a central line F (see FIGS. 26 and 27) of the slidable electronic device 26 when viewed from above the rear surface of the slidable electronic device 26 (e.g., when viewed in the +z-axis direction). The central line F of the slidable electronic device 26 may be a virtual straight line that may be positioned between the second edge E2 and the third edge E3 of the screen when viewed from above the screen (e.g., when viewed in the −z-axis direction), and positioned at the substantially same distance from the second edge E2 and the third edge E3. The second guide rail 282 may include a second recess 2821 provided to correspond to the rail of the second LM guide. When the third frame 263 coupled to the block of the second LM guide is slid out or slid in with respect to the first housing 261 coupled to the rail, the second recess 2821 may prevent/reduce mutual interference between the first guide rail and the rail of the second LM guide. According to the relative position between the first housing 261 and the second housing 262, the extent by which the rail of the first LM guide is positioned in the first recess 2811 of the first guide rail 281, and the extent by which the rail of the second LM guide is positioned in the second recess 2821 of the second guide rail 282 may be changed.

According to various embodiments, the rail of the LM guide may be coupled to the first support part 26111 of the first housing 261.

According to various embodiments, the rail of the LM guide may be coupled to the third frame 263, and the block of the LM guide may be coupled to the first frame 2611 of the first housing 261.

A structure for sliding smooth mutual sliding between the first housing 261 and the second housing 262 may be provided in various other manners. An inner space of the slidable electronic device 26 may be increased at the time of a slide out of the second housing 262, and may be reduced at the time of a slide in of the second housing 262. Elements accommodated in the inner space of the slidable electronic device 26 may be positioned not to interfere with mutual sliding between the first housing 261 and the second housing 262.

According to various embodiment, the LM guide included in the slidable electronic device 26 of FIG. 26 may be applied to a sliding structure between the first housing 21 and the second housing 22 or a sliding structure between the first frame 211 and the second frame 221.

According to an embodiment, the slidable electronic device 26 may include a tension device (not illustrated separately) that enables soft and smooth sliding of the second housing 262 (or the third frame 263) with respect to the first housing 261. The tension device may enable smooth transfer of the movement or force between driving elements related to sliding of the second housing 262 with respect to the first housing 261 so as to enable soft and smooth sliding. The tension device may make sliding of the slidable electronic device 26 be soft and smooth to reduce the effect of stress on the driving elements so as to reduce or prevent the damage thereof.

According to an embodiment, the battery 284 may be positioned between the third frame 263 and the second support part 26211. The battery 284 may be disposed on the third frame 263. For example, the third frame 263 may include a battery seating structure provided on one surface thereof, oriented toward the rear surface of the slidable electronic device 26. The battery seating structure may include, for example, a fitting structure or a recess structure enabling the battery 284 to be stably positioned on the third frame 263. The battery 284 is a device configured to supply power to at least one element of the slidable electronic device 26, and may include, for example, a non-rechargeable primary battery, a rechargeable secondary battery, or a fuel cell.

According to various embodiments, the slidable electronic device 26 may further include an additional battery (not illustrated separately) disposed in the first housing 261.

According to an embodiment, the first printed circuit board 285 may be positioned between the first support part 26111 of the first housing 261 and the first cover 2612. The first printed circuit board 285 may be disposed on the first support part 26111 of the first housing 261. One surface of the first support part 26111, oriented toward the rear surface of the slidable electronic device 26, may provide a substrate seating structure. The substrate seating structure may include a fitting structure or a recess structure enabling the first printed circuit board 285 to be stably positioned on the first support part 26111. The first printed circuit board 285 may be disposed in the substrate seating structure through various manners such as screw fastening. Various electronic components (e.g., some of the elements of FIG. 1) may be arranged on the first printed circuit board 285. Various elements electrically connected to the first printed circuit board 285 may be arranged in the first housing 261. For example, elements such as the second camera module 2705 or the third camera module 2706 may be disposed on the first support part 26111 between the first support part 26111 and the first cover 2612.

According to an embodiment, the second printed circuit board 286 may be positioned between the second support part 26211 of the second housing 262 and the second cover 2622. The second printed circuit board 286 may be disposed on the second support part 26211 of the second housing 262. A surface of the second support part 26211, facing the second cover 2622, may include a substrate seating structure. The substrate seating structure may include a fitting structure or a recess structure enabling the second printed circuit board 286 to be stably positioned on the second support part 26211. Various electronic components (e.g., some of the elements of FIG. 1) may be arranged on the second printed circuit board 286.

According to an embodiment, the first printed circuit board 285 or the second printed circuit board 286 may include, for example, a printed circuit board (PCB), a flexible PCB (FPCB), or a rigid-flexible PCB (RFPCB).

According to an embodiment, the second printed circuit board 286 may be electrically connected to the first printed circuit board 285 using an electrical connection member. For example, the first printed circuit board 285 may be electrically connected to the second printed circuit board 286 through the flexible printed circuit board 288.

According to an embodiment, the support member 287 may be positioned between the first support part 26111 of the first housing 261 and the first cover 2612. The support member 287 may be disposed on the first frame 2611 of the first housing 261. The support member 287 may at least partially cover and protect the first printed circuit board 285 disposed on the first support part 26111. In various embodiments, the first frame 2611 of the first housing 261 may be called a "front case", and the support member 287 may be called a "rear case".

According to various embodiments, the support member 287 may be interpreted as a part of the first housing 261.

According to an embodiment, the support member 287 may include a metallic material, and may reduce electromagnetic interference (EMI) related to an element such as the first printed circuit board 285 positioned in the first housing 261.

According to various embodiments, the support member 287 may include a non-metallic material.

According to various embodiments, a conductive pattern (not illustrated separately) used as an antenna radiator may be disposed on the non-conductive support member 287.

According to an embodiment, the flexible printed circuit board 288 may electrically connect an element positioned in the first housing 261 and an element positioned in the second housing 262. The flexible printed circuit board 288 may be disposed to be bent according to the relative position between the first housing 261 and the second housing 262.

Figure 35:
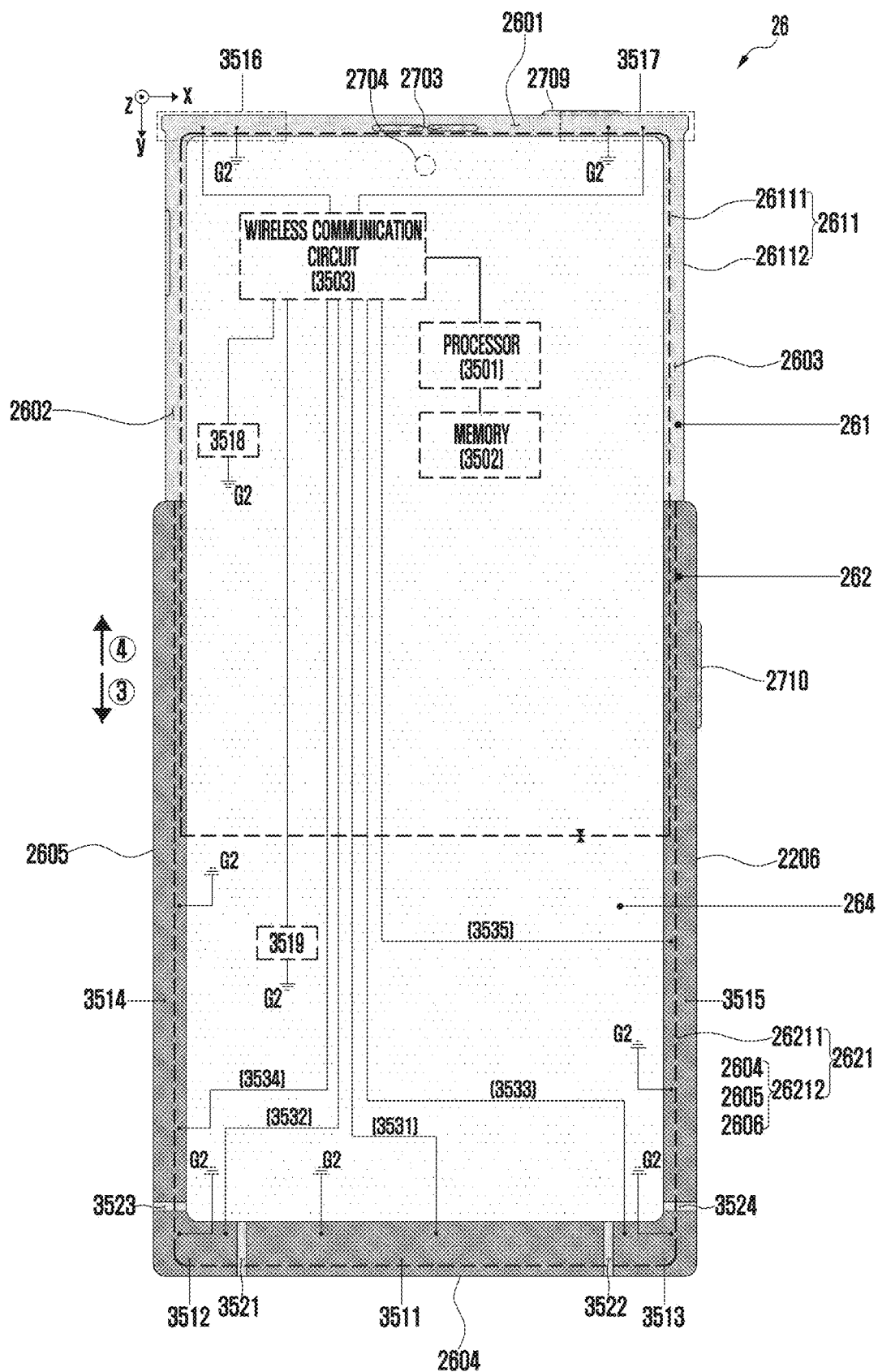
FIG. 35 is a diagram illustrating a slidable electronic device in an open state according to various embodiments.

FIG. 35 is a diagram illustrating the slidable electronic device 26 in an open state according to various embodiments.

Referring to FIG. 35, in an embodiment, the slidable electronic device 26 may include the first housing 261, the second housing 262, the flexible display module 264, a processor (e.g., including processing circuitry) 3501 (e.g., the processor 120 in FIG. 1), a memory 3502 (e.g., the memory 130 in FIG. 1), a wireless communication circuit 3503 (e.g., the wireless communication module 192 in FIG. 1), and/or a ground G2.

According to an embodiment, the first housing 261 may include the first frame 2611 providing the first support part 26111 and the first side 26112. The second housing 262 may include the second frame 2621 providing the second support part 26211 and the second side 26212.

According to an embodiment, the second side 26212 of the second frame 2621 may include a first conductive part 3511, a second conductive part 3512, a third conductive part 3513, a fourth conductive part 3514, a fifth conductive part 3515, a first insulation part 3521, a second insulation part 3522, a third insulation part 3523, and/or a fourth insulation part 3524. The first conductive part 3511 may provide a part of the fourth side wall 2604. The second conductive part 3512 may provide a first corner connecting the fourth side wall 2604 and the fifth side wall 2605, a part of the fourth side wall 2604, extending from the first corner, and/or a part of the fifth side wall 2605, extending from the first corner. The third conductive part 3513 may provide a second corner connecting the fourth side wall 2604 and the sixth side wall 2606, a part of the fourth side wall 2604, extending from the second corner, and/or a part of the sixth side wall 2606, extending from the second corner. The fourth conductive part 3514 may provide a part of the fifth side wall 2605. The fifth conductive part 3515 may provide a part of the sixth side wall 2606. The second side 26212 of the second frame 2621 may include a first partitioning part between the first conductive part 3511 and the second conductive part 3512, and the first insulation part 3521 may be disposed in the first partitioning part. The first conductive part 3511 and the second conductive part 3512 may be physically separated from each other while the first insulation part 3521 is disposed therebetween. The second side 26212 of the second frame 2621 may include a second partitioning part between the first conductive part 3511 and the third conductive part 3513, and the second insulation part 3522 may be disposed in the second partitioning part. The first conductive part 3511 and the third conductive part 3513 may be physically separated from each other while the second insulation part 3522 is disposed therebetween. The second side 26212 of the second frame 2621 may include a third partitioning part between the second conductive part 3512 and the fifth conductive part 3515, and the third insulation part 3523 may be disposed in the third partitioning part. The second conductive part 3512 and the fourth conductive part 3514 may be physically separated from each other while the third insulation part 3523 is disposed therebetween. The second side 26212 of the second frame 2621 may include a fourth partitioning part between the third conductive part 3513 and the sixth conductive part 3516, and the fourth insulation part 3524 may be disposed in the fourth partitioning part. The third conductive part 3513 and the fifth conductive part 3515 may be physically separated from each other while the fourth insulation part 3524 is disposed therebetween. The first insulation part 3521, the second insulation part 3522, the third insulation part 3523, and the fourth insulation part 3524 may provide the exterior of the slidable electronic device 26 together with the first conductive part 3511, the second conductive part 3512, the third conductive part 3513, the fourth conductive part 3514, and the fifth conductive part 3515.

According to an embodiment, the first conductive part 3511, the second conductive part 3512, the third conductive part 3513, the fourth conductive part 3514, and/or the fifth conductive part 3515 may be connected to a second conductive region (not illustrated separately) included in the second support part 26211 of the second frame 2621. The first conductive part 3511, the second conductive part 3512, the third conductive part 3513, the fourth conductive part 3514, and/or the fifth conductive part 3515 may include the same metallic material as that of the second conductive region included in the second support part 26211 of the second frame 2621. The second frame 2621 may include an integrated conductive structure (or metal structure) including the first conductive part 3511, the second conductive part 3512, the third conductive part 3513, the fourth conductive part 3514, the fifth conductive part 3515, and the second conductive region included in the second support part 3511.

According to an embodiment, the first insulation part 3521, the second insulation part 3522, the third insulation part 3523, or the fourth insulation part 3524 may be connected to a non-conductive region (or a non-conductive part) (not illustrated separately) included in the second support part 26211 of the second frame 2621. The first insulation part 3521, the second insulation part 3522, the third insulation part 3523, and/or the fourth insulation part 3524 may include, for example, the same non-metallic material (e.g., polymer) as that of the non-conductive region included in the second support part 26211 of the second frame 2621.

According to various embodiments, the number, position, or shape of the multiple conductive parts included in the second side 26212 of the second frame 2621, and the multiple insulation parts provided to correspond to the multiple conductive parts are various without being limited to the illustrated example.

According to an embodiment, the first conductive part 3511, the second conductive part 3512, the third conductive part 3513, the fourth conductive part 3514, or the fifth conductive part 3515 included in the second side 26212 of the second housing 262 may be used as at least a part of an antenna radiator or a radiation part that transmits electromagnetic waves (or an electromagnetic signal) to the outside or receives electromagnetic waves from the outside. An antenna radiator including the conductive part (e.g., the first conductive part 3511, the second conductive part 3512, the third conductive part 3513, the fourth conductive part 3514, or the fifth conductive part 3515) of the second side 3512 may be positioned at a peripheral part of the slidable electronic device 26 so as to contribute to electromagnetic isolation from other elements of the slidable electronic device 26, which may affect antenna radiation performance.

According to an embodiment, the conductive part (e.g., the first conductive part 3511, the second conductive part 3512, the third conductive part 3513, the fourth conductive part 3514, or the fifth conductive part 3515) included in the second side 26212 of the second frame 2621 may be electrically connected to the wireless communication circuit 3503. The slidable electronic device 26 may include a transmission line electrically connecting the wireless communication circuit 3503 and the conductive part of the second side 26212. The transmission line may transfer an RF signal (e.g., voltage or current).

According to an embodiment, the wireless communication circuit 3503 may provide a radiation current (or a wireless signal, an RF signal, or an electromagnetic signal) to the first conductive part 3511 through a first transmission line 3531, and at least a part of the first conductive part 3511 may operate as a first antenna radiator (or a first radiation part or a first radiation region). The wireless communication circuit 3503 may provide a radiation current to the second conductive part 3512 through a second transmission line 3532, and at least a part of the second conductive part 3512 may operate as a second antenna radiator (or a second radiation part or a second radiation region). The wireless communication circuit 3503 may provide a radiation current to the third conductive part 3513 through a third transmission line 3533, and at least a part of the third conductive part 3513 may operate as a third antenna radiator (or a third radiation part or a third radiation region). The wireless communication circuit 3503 may provide a radiation current to the fourth conductive part 3514 through a fourth transmission line 3534, and at least a part of the fourth conductive part 3514 may operate as a fourth antenna radiator (or a fourth radiation part or a fourth radiation region). The wireless communication circuit 3503 may provide a radiation current to the fifth conductive part 3515 through a fifth transmission line 3535, and at least a part of the fifth conductive part 3515 may operate as a fifth antenna radiator (or a fifth radiation part or a fifth radiation region).

According to an embodiment, the transmission line (e.g., the first transmission line 3531, the second transmission line 3532, the third transmission line 3533, the fourth transmission line 3534, or the fifth transmission line 3535) may include various types of electrical paths for electrical connection between the wireless communication circuit 3503 and the conductive part of the second side 26212. For example, the electrical path included in the transmission line may include a conductive path (e.g., a conductive path or a conductive line) (not illustrated separately) included in a flexible printed circuit board or a printed circuit board. For example, the electrical path included in the transmission line may include a cable (not illustrated separately). For example, the electrical path included in the transmission line may include a flexible conductive part (e.g., a conductive clip, a pogo pin, a spring, conductive Poron, conductive rubber, conductive tape, or a conductive connector) (not illustrated separately) that is physically in contact with the conductive part of the second side 26212 or electrically connects two partitioned parts on the transmission line. For example, the electrical path included in the transmission line may include a conductive adhesive part (not illustrated separately) made of a conductive adhesive material or a conductive bonding part (not illustrated separately) made of a conductive bonding material, which is physically in contact with the conductive part of the second side 26212 or electrically connects two partitioned parts on the transmission line. Various other electrical paths included in the transmission line may be provided.

According to an embodiment, the conductive part (e.g., the first conductive part 3511, the second conductive part 3512, the third conductive part 3513, the fourth conductive part 3514, or the fifth conductive part 3515 reference) included in the second side 26212 of the second frame 2621 may be electrically connected to the second printed circuit board 286 (see FIG. 29). The wireless communication circuit 3503 may be disposed on the first printed circuit board 285 (see FIG. 29). The wireless communication circuit 3503 may provide a radiation current (or a wireless signal, an RF signal, or an electromagnetic signal) to the conductive part of the second side 26212 through the flexible printed circuit board 288 (see FIG. 29). A signal (or a wireless signal, an RF signal, or an electromagnetic signal) transmitted or received to or from the outside of the slidable electronic device 26 through the conductive part of the second side 26212 may be provided to the wireless communication circuit 3503 through the flexible printed circuit board 288 (see FIG. 29). The flexible printed circuit board 288 (see FIG. 29) may be a part of the transmission line.

According to an embodiment, the flexible printed circuit board 288 (see FIG. 29) may be a flexible RF cable (FRC).

According to an embodiment, the first conductive part 3511 of the second side 26212 may be electrically connected to the ground G2 of the slidable electronic device 26. An electrical path for electrical connection between the first conductive part 3511 and the ground G2 may be various like the above example of the electrical path included in the transmission path. A position or a part of the first conductive part 3511, electrically connected to the first transmission line 3531, may be a feeding point (or a feeding part). A position or a part of the first conductive part 3511, electrically connected to the ground G2 may be a grounding point. When the wireless communication circuit 3503 provides (feeds) a radiation current to the feeding point, a signal path may be generated between the feeding point and the grounding point. The first conductive part 3511 may generate an electrical length (electrical path) (e.g., a length represented by a ratio of wavelength) corresponding to the signal path, and operate as a first antenna radiator having a resonance corresponding the electrical length. When a radiation current is provided (fed) from the wireless communication circuit 3503, the first conductive part 3511 may operate a radiation region having the distribution of a radiation current generating a radiation field (or electromagnetic field). The position or number of the feeding points of the first conductive part 3511, operating as antenna radiators, is not limited to the illustrated example, and may be various. The other conductive part (e.g., the second conductive part 3512, the third conductive part 3513, the fourth conductive part 3514, or the fifth conductive part 3515) included in the second side 26212 may be implemented as an antenna radiator in a manner substantially the same as or similar to that of the first conductive part 3511.

According to an embodiment, the first conductive region (not illustrated separately) included in the first support part 26111 of the first frame 2611 may be electrically connected to a first ground region (or a first ground plane) included in the first printed circuit board 285 (see FIG. 29). For example, the first conductive region included in the first support part 26111 may be electrically connected to the first ground region included in the first printed circuit board 285 (see FIG. 29) through at least one flexible conductive part (e.g., a conductive clip, a pogo pin, a spring, conductive Poron, conductive rubber, conductive tape, a conductive connector), a conductive adhesive part (e.g., a conductive adhesive material), or a conductive bonding part (e.g., a conductive bonding material) positioned between the first support part 26111 and the first printed circuit board 285 (see FIG. 29).

According to an embodiment, the second conductive region (not illustrated separately) included in the second support part 26211 of the second frame 2621 may be electrically connected to a second ground region (or a second ground plane) included in the second printed circuit board 286 (see FIG. 29). For example, the second conductive region included in the second support part 26211 may be electrically connected to the second ground region included in the second printed circuit board 286 (see FIG. 29) through at least one flexible conductive part (e.g., a conductive clip, a pogo pin, a spring, conductive Poron, conductive rubber, conductive tape, a conductive connector), a conductive adhesive part (e.g., a conductive adhesive material), or a conductive bonding part (e.g., a conductive bonding material) positioned between the second support part 26211 and the second printed circuit board 286.

According to an embodiment, the first ground region included in the first printed circuit board 285 (see FIG. 29) may be electrically connected to the second ground region included in the second printed circuit board 286 (see FIG. 29) through at least one electrical connection member (e.g., the flexible printed circuit board 288 in FIG. 29).

According to an embodiment, a combination of the first conductive region included in the first support part 26111 of the first frame 2611, the second conductive region included in the second support part 26211 of the second frame 2621, the first ground region included in the first printed circuit board 285 (see FIG. 29), and the second ground region included in the second printed circuit board 286 (see FIG. 29) may include the ground G2 (or the ground structure) of the slidable electronic device 26. In various embodiments, the ground G2 of the slidable electronic device 26 may further include various other ground regions (e.g., a conductive region included in the third frame 263 of FIG. 29)

electrically connected to the first printed circuit board 285 (see FIG. 29) or the second printed circuit board 286 (see FIG. 29).

According to an embodiment, the ground G2 of the slidable electronic device 26 may operate as an antenna ground capable of securing antenna radiation performance, securing coverage, and/or reducing electromagnetic interference (EMI) (or signal loss) with respect to multiple antenna radiators included in the slidable electronic device 26.

According to various embodiments, the at least one conductive region included in the first housing 261 may be electrically connected to the wireless communication circuit 3503 and the ground G2 and operate as an antenna radiator.

According to an embodiment, the sixth conductive part 3516 included in the first side 26112 of the first frame 2611 may operate as a sixth antenna radiator, and the seventh conductive part 3517 included in the first side 26112 may operate as a seventh antenna radiator. The sixth conductive part 3516 or the seventh conductive part 3517 may be included in the first side wall 2601. The sixth conductive part 3516 or the seventh conductive part 3517 is exposed to the outside in a closed state of the slidable electronic device 26, and thus may be advantageous to ensure antenna radiation performance compared to the other conductive parts of the first side 26112.

The shape, position, or number of the conductive parts of the first side 26112 of the first frame 2611, used as antenna radiators, is not limited to the illustrated example, and may be various. The shape, position, or number of the feeding points of a conductive part of the first side 26112 of the first frame 2611, used as an antenna radiator, or the position or number of the grounding points is not limited to the illustrated example, and may be various.

According to various embodiments (not illustrated separately), the first side 26112 of the first frame 2611 may include multiple conductive parts and multiple insulation parts in a manner substantially the same as or similar to that of the second side 26212 of the second frame 2621, and at least some of the multiple conductive parts included in the first side 26112 may be used as antenna radiators.

According to an embodiment, the slidable electronic device 26 may include an eighth conductive part 3518 positioned in an inner space of the first housing 261. The eighth conductive part 3518 may be electrically connected to the wireless communication circuit 3503 and the ground G2 and operate as an eighth antenna radiator.

According to an embodiment, the eighth conductive part 3518 may include a conductive pattern included in or disposed on the first support part 26111 of the first frame 2611, the first cover 2612 (see FIG. 29), the first printed circuit board 285 (see FIG. 29), or the support member 287 (see FIG. 29).

According to an embodiment, the slidable electronic device 26 may include a ninth conductive part 3519 positioned in the inner space of the second housing 262. The ninth conductive part 3519 may be electrically connected to the wireless communication circuit 3503 and the ground G2 and operate as a ninth antenna radiator.

According to an embodiment, the ninth conductive part 3519 may include a conductive pattern included in or disposed on the second support part 26211 of the second frame 2621, the second cover 2622 (see FIG. 29), or the second printed circuit board 286 (see FIG. 29).

According to various embodiments, the eighth conductive part 3518 or the ninth conductive part 3519 may include a conductive pattern disposed on a non-conductive member (or a non-conductive part) (not illustrated separately) in various methods such as LDS, plating, or printing.

According to various embodiments, the eighth conductive part 3518 or the ninth conductive part 3519 may be a conductive pattern included in a flexible printed circuit board implemented as an antenna structure.

According to various embodiments, the wireless communication circuit 3503 may provide a radiation current (or a wireless signal) to at least one antenna radiator (e.g., the first conductive part 3511, the second conductive part 3512, the third conductive part 3513, the fourth conductive part 3514, the fifth conductive part 3515, the sixth conductive part 3516, the seventh conductive part 3517, the eight conductive part 3518, or the ninth conductive part 3519), and the flow path and/or distribution of the radiation current in the at least one antenna radiator may transmit and/or receive a signal having at least one frequency in a corresponding frequency band. The wireless communication circuit 3503 may process a transmission signal or a reception signal through the at least one antenna radiator in at least one designated frequency band. The designated frequency band may include, for example, at least one of an LB (about 600 MHz-about 1 GHz), an MB (about 1 GHz-about 2.3 GHz), an HB (about 2.3 GHz-about 2.7 GHz), or a UHB (about 2.7 GHz-about 6 GHz). The designated frequency band may include various other frequency bands.

According to an embodiment, the processor 3501 or the wireless communication circuit 3503 may transmit or receive data through a MIMO technique using multiple antenna radiators in a communication mode (e.g., at a frequency used by an application (or program)) using a corresponding frequency band. The memory 3502 may store instructions causing the processor 3501 or the wireless communication circuit 3503 to transmit or receive data through a MIMO technique by selectively using a plurality of antenna radiators among multiple antenna radiators, based on a communication mode. The MIMO technique may, for example, include a "beamforming" scheme. For example, the MIMO technique may include a "diversity" scheme. For example, the MIMO technique may include a "multiplexing" scheme.

According to various embodiments, the processor 3501 or the wireless communication circuit 3503 may be configured to selectively use an antenna radiator according to a frequency used by an application (or program) and/or a closed state (see FIG. 26) or an open state (see FIG. 27) of the slidable electronic device 26. The memory 3502 may store instructions causing the processor 3501 or the wireless communication circuit 3503 to selectively use at least one of multiple antenna radiators, based on a frequency used by an application (or program) and/or a closed state or an open state of the slidable electronic device 26.

According to various embodiments, the processor 3501 or the wireless communication circuit 3503 may be configured to, based on instructions stored in the memory, detect a dielectric positioned close to the slidable electronic device 26, and selectively use an antenna radiator, based on the position thereof. For example, at least one antenna radiator which is spaced apart from the position held by a user's hand and thus is advantageous to ensure antenna radiation performance may be selected and operated.

According to an embodiment, the slidable electronic device 26 may include a matching circuit (e.g., a frequency adjustment circuit) (not illustrated separately) connected to a transmission line between the at least one antenna radiator and the wireless communication circuit 3503. The matching circuit may include an electrical element having a component, such as inductance, capacitance, or conductance acting on the transmission line. For example, the matching circuit may include various elements such as a lumped element or a passive element.

According to an embodiment, the matching circuit may adjust the impedance of the transmission line or the impedance of the antenna radiator, and accordingly, the impedance of the transmission line and the impedance of the antenna radiator may be matched (e.g., impedance matching). When the impedance of the transmission line and the impedance of the antenna radiator are matched, a reflection amount of a connection part between the transmission line and the antenna radiator may be reduced, and thus maximum power transfer (or minimization of power loss) or effective signal transfer through the antenna radiator may be possible.

According to various embodiments, the matching circuit may move the resonant frequency of the at least one antenna radiator to a designated frequency or by a designated amount.

According to various embodiments, the matching circuit may, in a closed state (see FIG. 26) or an open state (see FIG. 27) of the slidable electronic device 26, reduce the electromagnetic effects of surrounding elements of the slidable electronic device 26 so as to enable the at least one antenna radiator to have a designated isolation.

Figure 36:
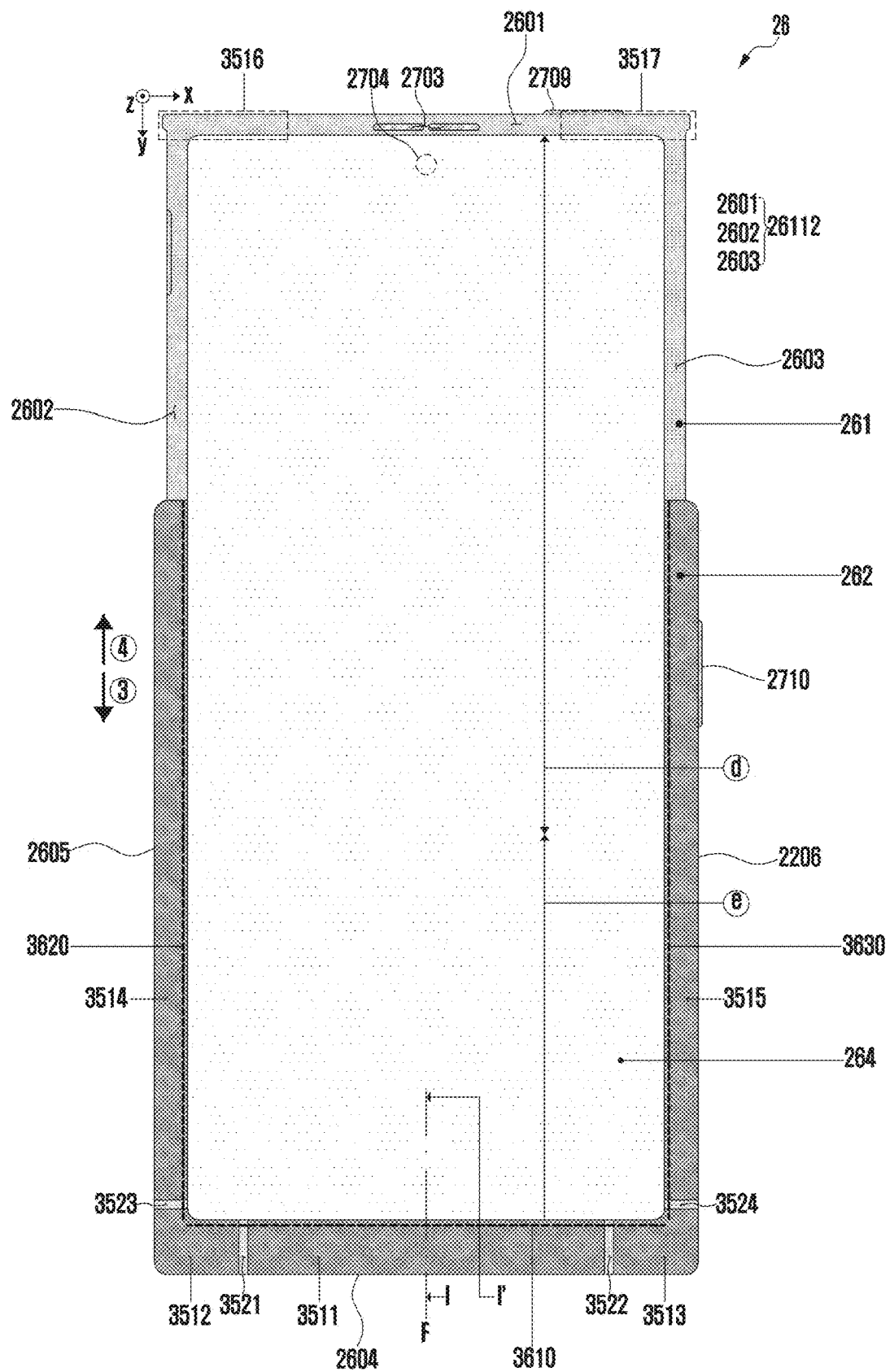
FIG. 36 is a diagram illustrating a slidable electronic device in an open state according to various embodiments.

FIG. 36 is a diagram illustrating the slidable electronic device 26 in an open state according to various embodiments.

Referring to FIG. 36, in an embodiment, the slidable electronic device 26 may include the first housing 261, the second housing 262, the flexible display module 264, at least one first dielectric 3610, at least one second dielectric 3620, and/or at least one third dielectric 3630.

According to an embodiment, the at least one first dielectric 3610 may be positioned between the fourth side wall 2604 of the second housing 262 and the second region (e) of the flexible display module 264. The slidable electronic device 26 may include one or more first air gaps (not illustrated separately) provided to correspond to the at least one first dielectric 3610. The first air gap may be included in, for example, the at least one first dielectric 3610. As another example, the first air gap may be provided between the at least one first dielectric 3610 and the fourth side wall 2604. As yet another example, the first air gap may be provided between the at least one first dielectric 3610 and the second region (e) of the flexible display module 264.

According to an embodiment, the at least one first dielectric 3610 and the one or more first air gaps corresponding to the at least one first dielectric 3610 being provided between the fourth side wall 2604 of the second housing 262 and the second region (e) of the flexible display module 264 may not only reduce or prevent the introduction of an external foreign material into the slidable electronic device 26 through the gap between the fourth side wall 2604 and the second region (e), but also reduce the degradation of the antenna radiation performance of the first conductive part 3511, the second conductive part 3512, or the third conductive part 3513 operating as an antenna radiator.

According to various embodiments, the at least one first dielectric 3610 and the one or more first air gaps corresponding to the at least one first dielectric 3610 being provided between the fourth side wall 2604 of the second housing 262 and the second region (e) of the flexible display module 264 may be implemented to be substantially identical or similar to the dielectric 2510 and the air gap AG10 corresponding to the dielectric 2510 being provided between the second region (b) of the flexible display module 30 and the fourth side wall 204 of the second housing 22 according to the embodiment of FIG. 25.

According to an embodiment, in an open state of the slidable electronic device 26, the at least one second dielectric 3620 may be positioned between the fifth side wall 2605 of the second housing 262 and the second region (e) of the flexible display module 264. The slidable electronic device 26 may include one or more second air gaps (not illustrated separately) provided to correspond to the at least one second dielectric 3620. The second air gap may be included in, for example, the at least one second dielectric 3620. As another example, the second air gap may be provided between the at least one second dielectric 3620 and the fifth side wall 2605. As yet another example, the second air gap may be provided between the at least one second dielectric 3620 and the second region (e) of the flexible display module 264.

According to an embodiment, the at least one second dielectric 3620 and the one or more second air gaps corresponding to the at least one second dielectric 3620 being provided between the fifth side wall 2605 of the second housing 262 and the second region (e) of the flexible display module 264 may not only reduce or prevent the introduction of an external foreign material into the slidable electronic device 26 through the gap between the fifth side wall 2605 and the second region (e), but also reduce the degradation of the antenna radiation performance of the second conductive part 3512 or the fourth conductive part 3514 operating as an antenna radiator.

According to various embodiments, the at least one second dielectric 3620 and the one or more second air gaps corresponding to the at least one second dielectric 3620 being provided between the fifth side wall 2605 of the second housing 262 and the second region (e) of the flexible display module 264 may be implemented to be substantially identical or similar to the dielectric 1100, the first air gap AG1, and the second air gap AG2 being provided between the second part 3002 of the flexible display module 30 and the first display-overlapping conductive region 1001a of the first housing 21 according to the embodiment of FIG. 12.

According to various embodiments, the at least one second dielectric 3620 and the one or more second air gaps corresponding to the at least one second dielectric 3620 being provided between the fifth side wall 2605 of the second housing 262 and the second region (e) of the flexible display module 264 may be implemented to be substantially identical or similar to the dielectrics 1100 and 1301, the first air gap AG1, and the second air gap AG2 being provided between the second part 3002 of the flexible display module 30 and the first display-overlapping conductive region 1001a of the first housing 21 according to the embodiment of FIG. 13.

According to an embodiment, in an open state of the slidable electronic device 26, the at least one third dielectric 3630 may be positioned between the sixth side wall 2606 of the second housing 262 and the second region (e) of the flexible display module 264. The slidable electronic device 26 may include one or more third air gaps (not illustrated separately) provided to correspond to the at least one third dielectric 3630. The third air gap may be included in, for example, the at least one third dielectric 3630. As another example, the third air gap may be provided between the at least one third dielectric 3630 and the sixth side wall 2606. As yet another example, the second air gap may be provided between the at least one third dielectric 3630 and the second region (e) of the flexible display module 264.

According to an embodiment, the at least one third dielectric 3630 and the one or more third air gaps corresponding to the at least one third dielectric 3630 being provided between the sixth side wall 2606 of the second housing 262 and the second region ⓔ of the flexible display module 264 may not only reduce or prevent the introduction of an external foreign material into the slidable electronic device 26 through the gap between the fifth side wall 2606 and the second region ⓔ, but also reduce the degradation of the antenna radiation performance of the third conductive part 3513 or the fifth conductive part 3515 operating as an antenna radiator.

According to various embodiments, the at least one third dielectric 3630 and the one or more third air gaps corresponding to the at least one second dielectric 3630 being provided between the sixth side wall 2606 of the second housing 262 and the second region ⓔ of the flexible display module 264 may be implemented to be substantially identical or similar to the dielectric 1100, the first air gap AG1, and the second air gap AG2 being provided between the second part 3002 of the flexible display module 30 and the first display-overlapping conductive region 1001a of the first housing 21 according to the embodiment of FIG. 12.

According to various embodiments, the at least one third dielectric 3630 and the one or more third air gaps corresponding to the at least one second dielectric 3630 being provided between the sixth side wall 2606 of the second housing 262 and the second region ⓔ of the flexible display module 264 may be implemented to be substantially identical or similar to the dielectrics 1100 and 1301, the first air gap AG1, and the second air gap AG2 being provided between the second part 3002 of the flexible display module 30 and the first display-overlapping conductive region 1001a of the first housing 21 according to the embodiment of FIG. 13.

According to various embodiments, an integrated dielectric (not illustrated separately) replacing the at least one first dielectric 3610 and the at least one second dielectric 3620 may be provided.

According to various embodiments, an integrated dielectric (not illustrated separately) replacing the at least one first dielectric 3610 and the at least one third dielectric 3630 may be provided.

According to various embodiments, an integrated dielectric (not illustrated separately) replacing the at least one first dielectric 3610, the at least one second dielectric 3620, and the at least one third dielectric 3630 may be provided.

According to various embodiments, at least one fourth dielectric (not illustrated separately) and one or more fourth air gaps (not illustrated separately) corresponding to the at least one fourth dielectric may be at least partially positioned between the first side 26112 of the first housing 261 and the first region ⓓ of the flexible display module 264. The at least fourth first dielectric and the one or more fourth air gaps corresponding to the at least one fourth dielectric being provided between the first side 26112 of the first housing 261 and the first region ⓓ of the flexible display module 264 may not only reduce or prevent the introduction of an external foreign material into the slidable electronic device 26 through the gap between the first side 26112 and the first region ⓓ, but also reduce the degradation of the antenna radiation performance of the antenna radiator (e.g., the sixth conductive part 3516 or the seventh conductive part 3517) included in the first side 26112.

According to various embodiments, the at least one fourth dielectric and the one or more fourth air gaps corresponding to the at least one fourth dielectric being provided between the first side 26112 of the first housing 261 and the first region ⓓ of the flexible display module 264 may be implemented to be substantially identical or similar to the dielectric 1100, the first air gap AG1, and the second air gap AG2 being provided between the second part 3002 of the flexible display module 30 and the first display-overlapping conductive region 1001a of the first housing 21 according to the embodiment of FIG. 12.

According to various embodiments, the at least one fourth dielectric and the one or more fourth air gaps corresponding to the at least one fourth dielectric being provided between the first side 26112 of the first housing 261 and the first region ⓓ of the flexible display module 264 may be implemented to be substantially identical or similar to the dielectrics 1100 and 1301, the first air gap AG1, and the second air gap AG2 being provided between the second part 3002 of the flexible display module 30 and the first display-overlapping conductive region 1001a of the first housing 21 according to the embodiment of FIG. 13.

According to various embodiments, the at least one fourth dielectric and the one or more fourth air gaps corresponding to the at least one fourth dielectric being provided between the first side 26112 of the first housing 261 and the first region ⓓ of the flexible display module 264 may be implemented to be substantially identical or similar to the dielectric 1700 and the air gap AG3 being provided between the second part 3002 of the flexible display module 30 and the first display-overlapping conductive region 1001a of the first housing 21 according to the embodiment of FIG. 16.

According to various embodiments, the at least one fourth dielectric and the one or more fourth air gaps corresponding to the at least one fourth dielectric being provided between the first side 26112 of the first housing 261 and the first region ⓓ of the flexible display module 264 may be implemented to be substantially identical or similar to the dielectric 1810 and the air gap AG4 being provided between the second part 3002 of the flexible display module 30 and the first display-overlapping conductive region 1001a of the first housing 21 according to the embodiment of FIG. 18.

According to various embodiments, the at least one fourth dielectric and the one or more fourth air gaps corresponding to the at least one fourth dielectric being provided between the first side 26112 of the first housing 261 and the first region ⓓ of the flexible display module 264 may be implemented to be substantially identical or similar to the dielectric 1910, the non-conductive member 1920, and the air gap AG5 being provided between the second part 3002 of the flexible display module 30 and the first display-overlapping conductive region 1001a of the first housing 21 according to the embodiment of FIG. 19.

According to various embodiments, the at least one fourth dielectric and the one or more fourth air gaps corresponding to the at least one fourth dielectric being provided between the first side 26112 of the first housing 261 and the first region ⓓ of the flexible display module 264 may be implemented to be substantially identical or similar to the dielectric 2010 and the air gap AG7 being provided between the second part 3002 of the flexible display module 30 and the first display-overlapping conductive region 1001a of the first housing 21 according to the embodiment of FIG. 20.

Figure 37:
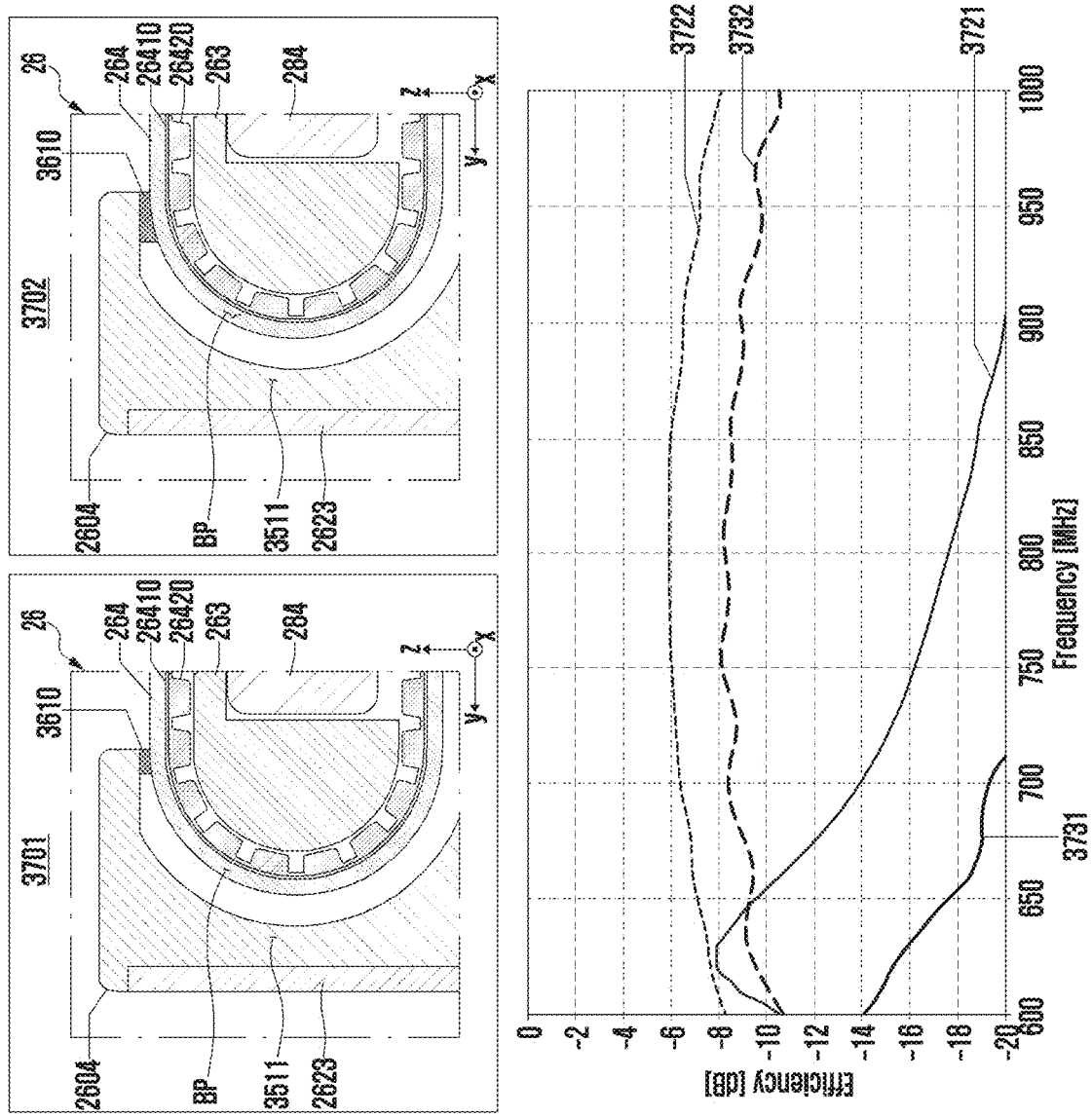
FIG. 37 includes sectional views of a slidable electronic device taken along line I-I' in FIG. 36 and graphs showing antenna radiation performance of an antenna radiator including a first conductive part according to various embodiments.

FIG. 37 includes diagrams illustrating cross-sectional views of the slidable electronic device 26 taken along line I-I' in FIG. 36 and graphs showing antenna radiation performance of an antenna radiator including the first conductive part 3511 according to various embodiments.

Referring to FIG. 37, in an embodiment, the slidable electronic device 26 may include the fourth side wall 2604, the third cover 2623, the third frame 263, the flexible display module 264, the support sheet 26410, the display support structure 26420, the battery 284, and/or the at least one first dielectric 3610.

According to an embodiment, the at least one first dielectric 3610 may be positioned between the fourth side wall 2604 and the flexible display module 264. One or more first air gaps may be provided between the fourth side wall 2604 and the flexible display module 264 to correspond to the at least one first dielectric 3610.

According to an embodiment, reference numeral "3701" indicates a sectional view of the slidable electronic device 26 in the first embodiment in which the at least one first dielectric 3610 has a first section size. Reference numeral "3721" indicates a graph showing the radio wave transmission performance of the first conductive part 3511 operating as an antenna radiator in the first embodiment. Reference numeral "3722" indicates a graph showing the radio wave reception performance of the first conductive part 3511 operating as an antenna radiator in the first embodiment.

According to an embodiment, reference numeral "3702" indicates a sectional view of the slidable electronic device 26 in the first embodiment in which the at least one first dielectric 3610 has a second section size greater than the first section size. Reference numeral "3731" indicates a graph showing the radio wave transmission performance of the first conductive part 3511 operating as an antenna radiator in the second embodiment. Reference numeral "3732" indicates a graph showing the radio wave reception performance of the first conductive part 3511 operating as an antenna radiator in the second embodiment.

According to an embodiment, the shape or volume of the one or more first air gaps may vary according to the section size of the at least one first dielectric 3610. According to the section size of the at least one first dielectric 3610, the antenna radiation performance (e.g., radio wave transmission performance and radio wave reception performance) of the first conductive part 3511 operating as an antenna radiator may vary in a selected or designated frequency band (e.g., LB).

Figure 38:
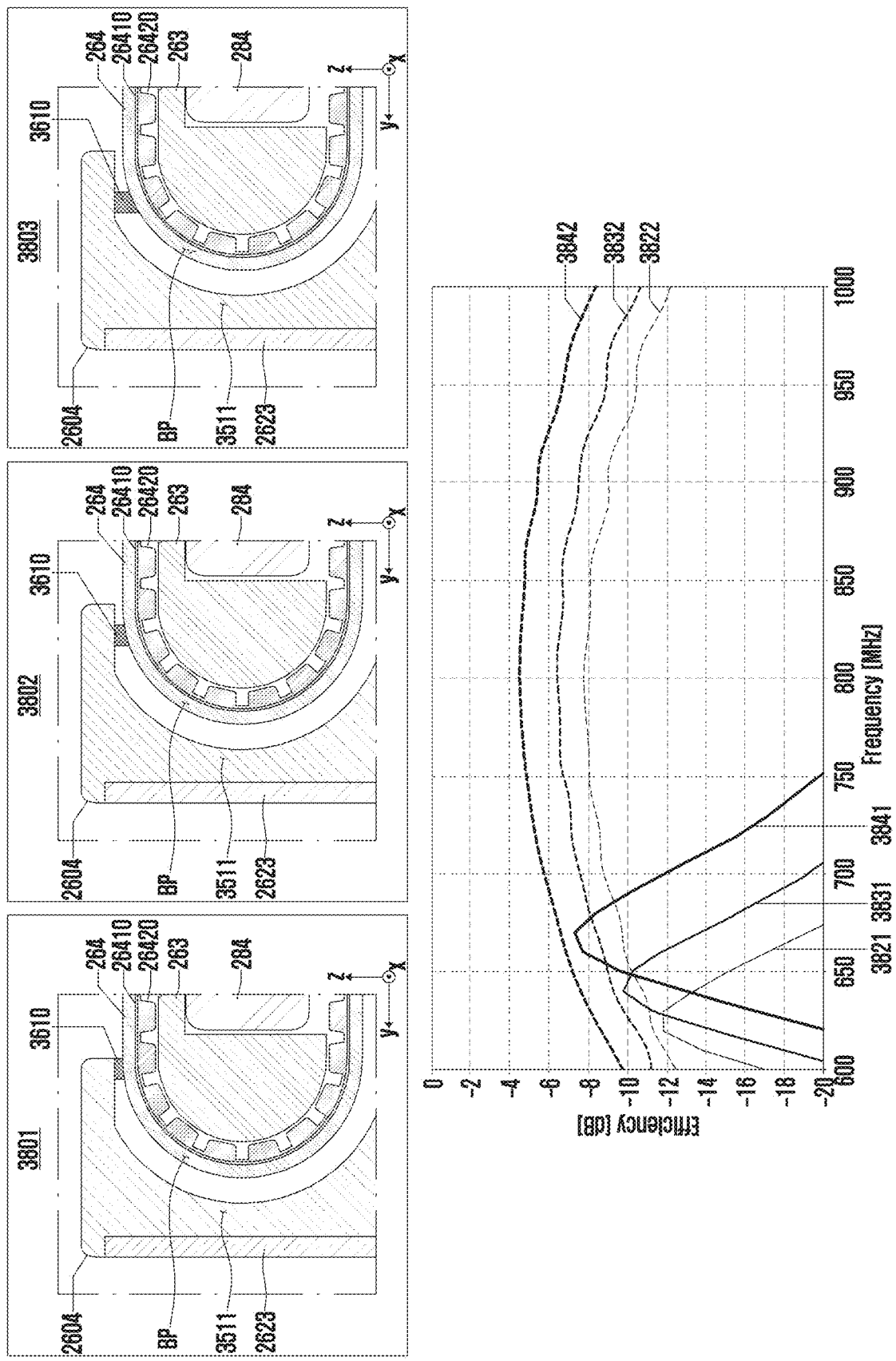
FIG. 38 includes sectional views of a slidable electronic device taken along line I-I' in FIG. 36 and graphs showing antenna radiation performance of an antenna radiator including a first conductive part according to various embodiments.

FIG. 38 includes diagrams illustrating cross-sectional views of the slidable electronic device 26 taken along line I-I' in FIG. 36 and graphs showing antenna radiation performance of an antenna radiator including the first conductive part 3511 according to various embodiments.

Referring to FIG. 38, in an embodiment, the slidable electronic device 26 may include the fourth side wall 2604, the third cover 2623, the third frame 263, the flexible display module 264, the support sheet 26410, the display support structure 26420, the battery 284, and/or the at least one first dielectric 3610.

According to an embodiment, the at least one first dielectric 3610 may be positioned between the fourth side wall 2604 and the flexible display module 264. One or more first air gaps may be provided between the fourth side wall 2604 and the flexible display module 264 to correspond to the at least one first dielectric 3610.

According to an embodiment, reference numeral "3801" indicates a sectional view of the slidable electronic device 26 in the first embodiment in which the at least one first dielectric 3610 is disposed at a first position between the fourth side wall 2604 and the flexible display module 264. Reference numeral "3821" indicates a graph showing the radio wave transmission performance of the first conductive part 3511 operating as an antenna radiator in the first embodiment. Reference numeral "3822" indicates a graph showing the radio wave reception performance of the first conductive part 3511 operating as an antenna radiator in the first embodiment.

According to an embodiment, reference numeral "3802" indicates a sectional view of the slidable electronic device 26 in the second embodiment in which the at least one first dielectric 3610 is disposed at a second position between the fourth side wall 2604 and the flexible display module 264. Reference numeral "3831" indicates a graph showing the radio wave transmission performance of the first conductive part 3511 operating as an antenna radiator in the second embodiment. Reference numeral "3832" indicates a graph showing the radio wave reception performance of the first conductive part 3511 operating as an antenna radiator in the second embodiment.

According to an embodiment, reference numeral "3803" indicates a sectional view of the slidable electronic device 26 in the third embodiment in which the at least one first dielectric 3610 is disposed at a third position between the fourth side wall 2604 and the flexible display module 264. Reference numeral "3841" indicates a graph showing the radio wave transmission performance of the first conductive part 3511 operating as an antenna radiator in the third embodiment. Reference numeral "3842" indicates a graph showing the radio wave reception performance of the first conductive part 3511 operating as an antenna radiator in the third embodiment.

According to various embodiments, depending on the position of the at least one first dielectric 3610 disposed between the fourth side wall 2604 and the flexible display module 264, the antenna radiation performance (e.g., radio wave transmission performance and radio wave reception performance) of the first conductive part 3511 operating as an antenna radiator may vary in a selected or designated frequency band (e.g., LB).

Figure 39:
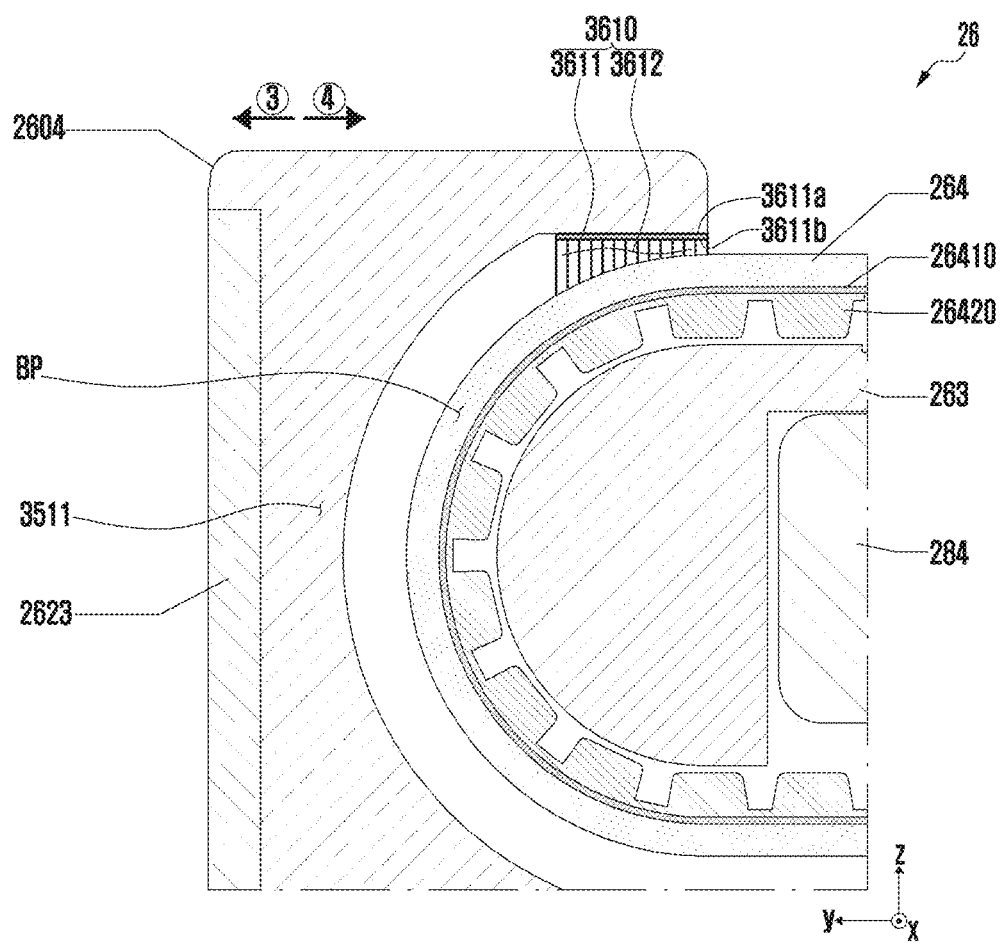
FIG. 39 is a cross-sectional view of a slidable electronic device taken along line I-r in FIG. 36 according to various embodiments.

FIG. 39 is a cross-sectional view of the slidable electronic device 26 taken along line I-I' in FIG. 36 according to various embodiments.

Referring to FIG. 39, in an embodiment, the slidable electronic device 26 may include the fourth side wall 2604, the third cover 2623, the third frame 263, the flexible display module 264, the support sheet 26410, the display support structure 26420, the battery 284, and/or the at least one first dielectric 3610.

According to an embodiment, the at least one first dielectric 3610 may be positioned between the fourth side wall 2604 and the flexible display module 264. The at least one first dielectric 3610 may be disposed on (or coupled to) the fourth side wall 2604.

According to an embodiment, the at least one first dielectric 3610 may be disposed on (coupled to) the fourth side wall 2604 through various materials (not illustrated separately), such as a thermoresponsive adhesive material (or a thermoresponsive bonding material), a photoresponsive adhesive material (or a photoresponsive bonding material), a normal adhesive agent (or a normal bonding agent), double-sided tape, or an organic adhesive material (or organic bonding material).

According to various embodiments, the at least one first dielectric 3610 may be disposed on (or coupled to) the fourth side wall 2604 by means of a screw (not illustrated separately).

According to an embodiment, the at least one first dielectric 3610 may be a brush type. The at least one first dielectric 3610 may include, for example, a support part (or a fixed part) 3611 and multiple bristles 3612 disposed on (or coupled to) the support part 3611. The support sheet 3611 may be disposed on (coupled to) the fourth side wall 2604 through an adhesive material (or a bonding material) (not illustrated separately) or by means of a screw. The multiple bristles 3612 may be flexible.

According to an embodiment, ends of one side of the multiple bristles 3612 may be inserted in and coupled to the support part 3611.

According to various embodiments, the support part 3611 may be flexible. The support part 3611 may be disposed on (or coupled to) the fourth side wall 2604 while, for example, being bent to correspond to a surface of the fourth side wall 2604.

According to an embodiment, the support part 3611 or the multiple bristles 3612 may include a non-conductive material and/or a conductive material.

According to an embodiment, the multiple bristles 3612 may include a material different from that of the support part 3611.

According to various embodiments, the support part 3611 and the multiple bristles 3612 may include the same material.

According to various embodiments, an integrated dielectric made of the same material and including the support part 3611 and the multiple bristles 3612 may be provided.

According to an embodiment, the multiple bristles 3612 may reduce or prevent the introduction of an external foreign material into the slidable electronic device 26 through the gap between the fourth side wall 2604 and the flexible display module 264. Air gaps (not illustrated separately) between the multiple bristles 3612 may reduce the degradation of antenna radiation performance of an antenna radiator (e.g., the first conductive part 3511, or the second conductive part 3512 or the third conductive part 3513 in FIG. 36).

According to an embodiment, in order to reduce or prevent the introduction of an external foreign material into the slidable electronic device 26 through the gap between the fourth side wall 2604 and the flexible display module 264, at least some of the multiple bristles 3612 may have a length enabling a contact with the flexible display module 264.

According to an embodiment, the support part 3611 may include a first surface 3611a coupled to the fourth side wall 2604, and a second surface 3611b facing a direction opposite to the direction the first surface 3611a faces. The multiple bristles 3612 may be arranged on the support part 3611 to protrude from the second surface 3611b. For example, before the at least one first dielectric 3610 is disposed in the slidable electronic device 26, when the at least one first dielectric 3610 is viewed, the multiple bristles 3612 may substantially extend in a vertical direction in which the second surface 3611b faces.

According to an embodiment, the second surface 3611b of the support part 3611 may substantially face the direction perpendicular to the third direction ③. At least some of the multiple bristles 3612 may be longer than the thickness of the space between the support part 3611 and the flexible display module 264, and thus may be bent.

According to various embodiments, at least some of the multiple bristles 3612 may have a length substantially the same as the thickness of the space between the support part 3611 and the flexible display module 264.

According to various embodiments (not illustrated separately), the second surface 3611b of the support part 3611 disposed on the fourth side wall 2604 may face a direction having an acute angle or an obtuse angle with respect to the third direction ③.

According to an embodiment, the multiple bristles 3612 may be provided to have a length or a thickness enabling smooth movement of the flexible display module 264 to be ensured at the time of a slide out or a slide in of the second housing 262 (see FIG. 36).

According to an embodiment, the multiple bristles 3612 may be arranged on the support part 3611 according to a substantially constant pattern. The pattern may be interpreted as a distance by which two adjacent bristles are spaced a part from each other in a direction.

According to various embodiments, a pattern by which some of the multiple bristles 3612 are arranged on the support part 3611 may be different from a pattern by which others of the multiple bristles 3612 are arranged on the support part 3611.

According to an embodiment, the multiple bristles 3612 may have substantially the same thickness.

According to various embodiments, the thickness of some of the multiple bristles 3612 may be different from the thickness of others of the multiple bristles 3612.

According to an embodiment, the multiple bristles 3612 may have substantially the same length.

According to various embodiments, the length of some of the multiple bristles 3612 may be different from the length of others of the multiple bristles 3612.

According to an embodiment, the multiple bristles 3612 may have substantially the same sectional shape. The sectional shape of the multiple bristles 3612 may vary such as a circle, an oval, or a polygon.

According to various embodiments, the sectional shape of some of the multiple bristles 3612 may be different from the sectional shape of others of the multiple bristles 3612.

According to an embodiment, the support part 3611 and/or the multiple bristles 3612 may have a permittivity enabling reduction of the degradation of antenna radiation performance of an antenna radiator (e.g., the first conductive part 3511, or the second conductive part 3512 or the third conductive part 3513 in FIG. 36). The permittivity of the support part 3611 and/or the permittivity of the multiple bristles 3612 may be, for example, a value contributing in preventing/reducing the antenna radiation performance of an antenna radiator (e.g., the first conductive part 3511, or the second conductive part 3512 or the third conductive part 3513 in FIG. 36) from degrading to be equal or lower than a threshold level. The permittivity of the support part 3611 and/or the permittivity of the multiple bristles 3612 may be, for example, a value enabling reduction of the electromagnetic effect on an antenna radiator (e.g., the first conductive part 3511, or the second conductive part 3512 or the third conductive part 3513 in FIG. 36).

According to an embodiment, the permittivity of the support part 3611 and/or the permittivity of the multiple bristles 3612 may be a value (e.g., a low permittivity) which is less than the permittivity of an antenna radiator (e.g., the first conductive part 3511, or the second conductive part 3512 or the third conductive part 3513 in FIG. 36), and has a small difference from the permittivity of air.

According to various embodiments, the permittivity of some of the multiple bristles 3612 and the permittivity of others of the multiple bristles 3612 may be different from each other.

Figure 40:
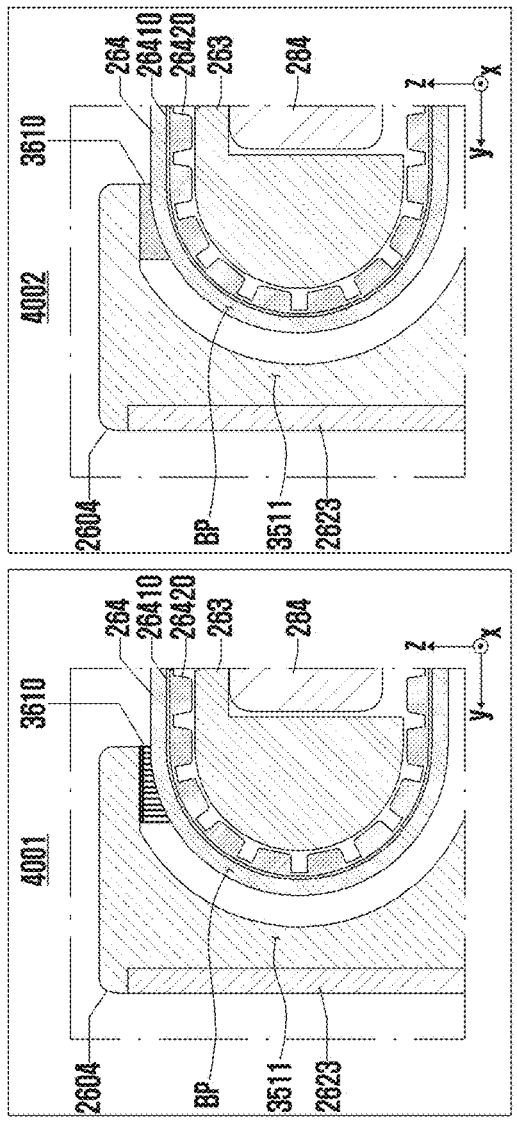
FIG. 40 includes sectional views of a slidable electronic device taken along line I-I' in FIG. 36 and graphs showing antenna radiation performance of an antenna radiator including a first conductive part according to various embodiments.
Figure 40:
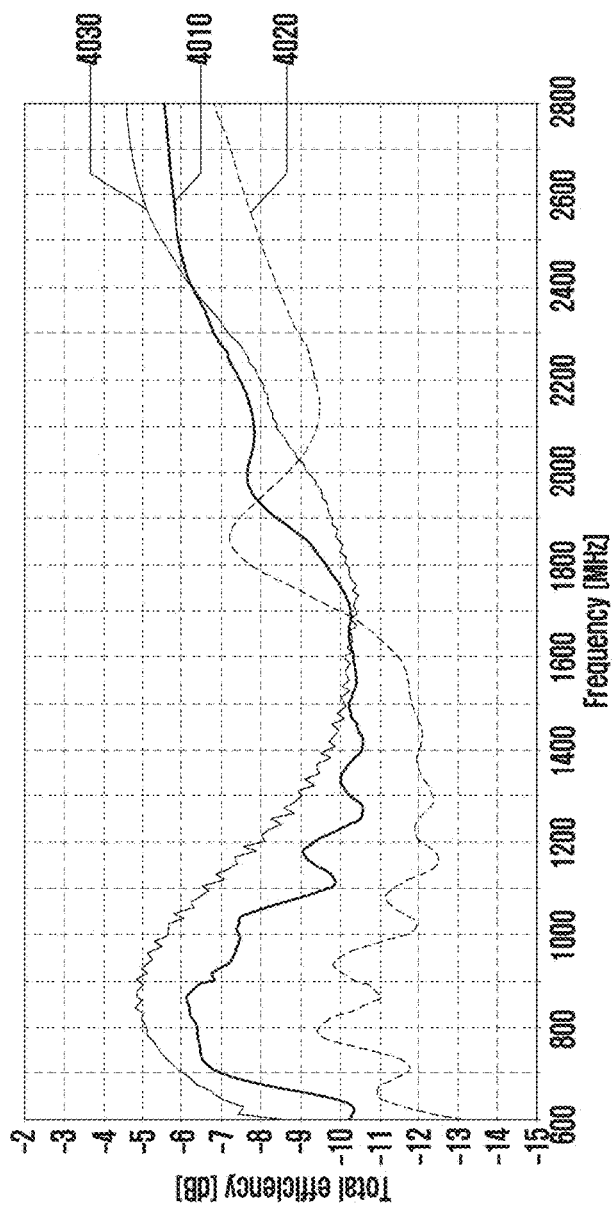
Figure 41:
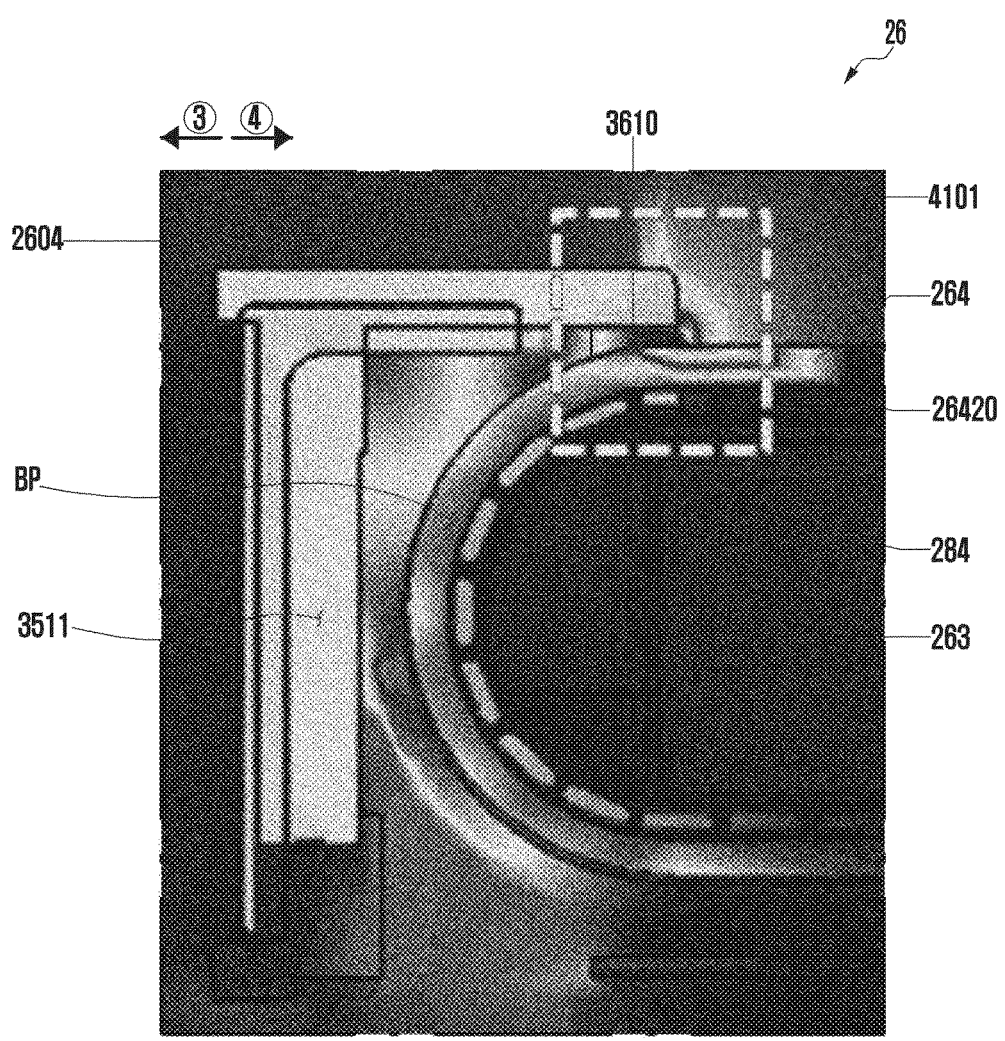
FIG. 41 is a diagram illustrating an electric field distribution when a radiation current is provided to a first conductive part in an slidable electronic device in a case where at least one first dielectric is provided in a brush type, according to various embodiments.

FIG. 40 includes cross-sectional views of the slidable electronic device 26 taken along line I-I' in FIG. 36 and graphs showing antenna radiation performance of an antenna radiator including the first conductive part 3511 according to various embodiments. FIG. 41 is a diagram illustrating an electric field distribution when a radiation current is provided to the first conductive part 3511 in the slidable electronic device 26 in a case where the at least one first dielectric 3610 is provided in a brush type, according to various embodiments.

Referring to FIG. 40, in an embodiment, the slidable electronic device 26 may include the fourth side wall 2604, the third cover 2623, the third frame 263, the flexible display module 264, the support sheet 26410, the display support structure 26420, the battery 284, and/or the at least one first dielectric 3610.

According to an embodiment, the at least one first dielectric 3610 may be positioned between the fourth side wall 2604 and the flexible display module 264. One or more first air gaps may be provided between the fourth side wall 2604 and the flexible display module 264 to correspond to the at least one first dielectric 3610.

According to an embodiment, reference numeral "4001" indicates a sectional view of the slidable electronic device 26 in the first embodiment in which the at least one first dielectric 3610 is provided in a brush type. Reference numeral "4010" indicates a graph showing the antenna radiation performance of the first conductive part 3511 operating as an antenna radiator in the first embodiment.

According to an embodiment, reference numeral "4002" indicates a sectional view of the slidable electronic device 26 in the second embodiment in which the at least one first dielectric 3610 is provided in a porous type (e.g., sponge) or in a non-porous type with a uniform permittivity. Reference numeral "4020" indicates a graph showing the antenna radiation performance of the first conductive part 3511 operating as an antenna radiator in the second embodiment.

Reference numeral "4030" indicates a graph showing the antenna radiation performance of the first conductive part 3511 operating as an antenna radiator in a comparative embodiment in which the at least one first dielectric 3610 is omitted.

According to an embodiment, the first embodiment in which the at least one first dielectric 3610 is provided in a brush type may improve (e.g., improve by about 3 dB or higher) the antenna radiation performance of the first conductive part 3511 operating as an antenna radiator in a selected or designated frequency band (e.g., LB), compared to the second embodiment in which the at least one first dielectric 3610 is provided in a porous type (e.g., sponge) or in a non-porous type with a uniform permittivity. The first embodiment may provide an antenna radiation performance closer, than to the second embodiment, to the antenna radiation performance provided in the comparative example in which the at least one first dielectric 3610 is omitted.

According to an embodiment, the first embodiment in which the at least one first dielectric 3610 is provided in a brush type may reduce coupling energy being relatively focused on a part (see reference numeral "4101" of FIG. 41) including the first conductive part 3511, the flexible display module 264, and the at least one first dielectric 3610, compared to the second embodiment in which the at least one first dielectric 3610 is provided in a porous type (e.g., sponge). For example, the at least one first dielectric 3610 provided in a brush type according to the first embodiment may reduce an effective permittivity through augmentation of air gaps, compared to the first dielectric 3610 provided in a porous type according to the second embodiment, and thus coupling energy being relatively focused on the part indicated by reference numeral "4101" of FIG. 41 may be reduced. Although not illustrated separately, the second embodiment may provide more coupling energy being focused on the part indicated by reference numeral "4101" of FIG. 41, compared to the first embodiment.

Figure 42:
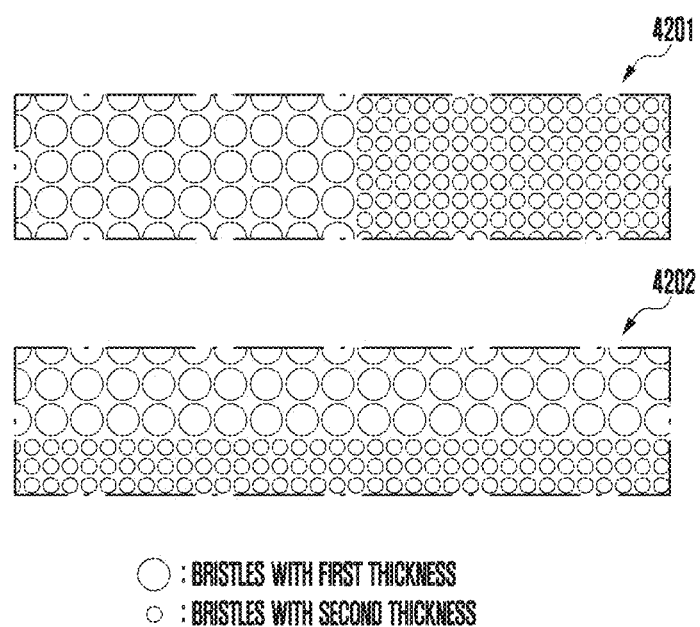
FIG. 42 includes diagrams illustrating the thickness of multiple bristles in the at least one first dielectric of FIG. 39 provided in a brush type according to various embodiments.

FIG. 42 includes diagrams 4201 and 4202 illustrating the thickness of the multiple bristles 3612 in the at least one dielectric first dielectric 3610 of FIG. 39 provided in a brush type according to various embodiments.

Referring to FIGS. 39 and 42, for example, the thickness of some of the multiple bristles 3612 may be different from the thickness of others of the multiple bristles 3612.

According to an embodiment, when a radiation current is provided to an antenna radiator (e.g., the first conductive part 3511, the second conductive part 3512, or the third conductive part in FIG. 36), an electric field may be radiated from the antenna radiator. Multiple bristles corresponding to a region having a relatively large strength in the distribution of the electric field radiated from the antenna radiator may have a first thickness, and multiple bristles corresponding to a region having a relatively small strength in the distribution of the electric field may have a second thickness less than the first thickness. The air gap between the multiple bristles having the first thickness may have a volume larger than that of the air gap between the multiple bristles having the second thickness, and thus contribute in ensuring the antenna radiation performance of the antenna radiator.

Figure 43:
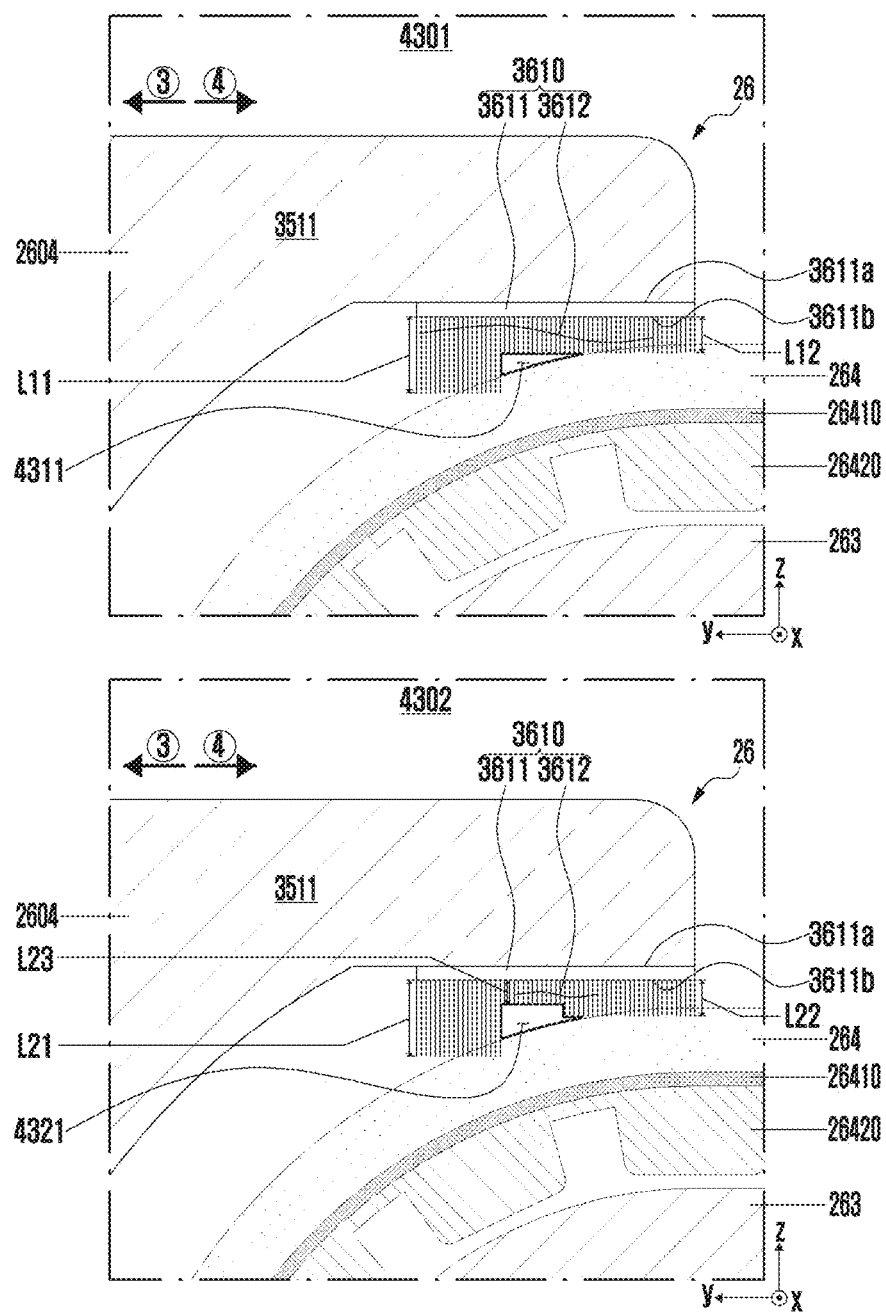
FIG. 43 includes cross-sectional views of a slidable electronic device taken along line I-r in FIG. 36 according to various embodiments.

FIG. 43 includes cross-sectional views 4301 and 4302 of the slidable electronic device 26 taken along line I-I' in FIG. 36 according to various embodiments.

Referring to FIG. 43, the slidable electronic device 26 may include the fourth side wall 2604, the at least one first dielectric 3610, the flexible display module 264, the support sheet 26410, the display support structure 26420, and/or the third frame 263.

According to an embodiment, the support part 3611 included in the at least one first dielectric 3610 may be disposed on (or coupled to) the fourth side wall 2604. The support part 3611 may include the first surface 3611a coupled to the fourth side wall 2604, and the second surface 3611b facing a direction opposite to the direction the first surface 3611a faces. The multiple bristles 3612 may be arranged on the support part 3611 to protrude from the second surface 3611b. When the at least one first dielectric 3610 separated from the slidable electronic device 26 is viewed, the multiple bristles 3612 may substantially extend in a direction in which the second surface 3611b faces.

According to an embodiment, the second surface 3611b of the support part 3611 may substantially face the direction perpendicular to the third direction ③.

According to an embodiment, the length of some of the multiple bristles 3612 may be different from the length of others of the multiple bristles 3612. For example, some of the multiple bristles 3612 may be longer than the thickness of the space between the support part 3611 and the flexible display module 264, and thus may be bent. FIG. 43 illustrates an unbent state of the multiple bristles 3612 in order to help in understanding the length of multiple bristles 3612. The others of the multiple bristles 3612 may be shorter than the thickness of the space between the support part 3611 and the flexible display module 264, and thus may be bent.

In the sectional view 4301 of the electronic device 26 according to an illustrative embodiment, some of the multiple bristles 3612 may have a first length L11, and the others of the multiple bristles 3612 may have a second length L12 shorter than the first length L11.

In the sectional view 4302 of the electronic device 26 according to another illustrative embodiment, a first group of the multiple bristles 3612 may have a first length L21, a second group of the multiple bristles 3612 may have a second length L22, and a third group of the multiple bristles 3612 may have a third length L23. The third group may be positioned between the first group and the second group. The third length L23 of the third group may be shorter than the first length L21 of the first group and the second length L22 of the second group. For example, the first length L21 of the first group and the second length L22 of the second group may be different from each other or may be substantially the same.

Although not illustrated separately, the length of the multiple bristles 3612 is not limited to the illustrated example, and may be various.

According to an embodiment, the different lengths of the multiple bristles 3612 may provide an additional air gap 4311 or 4321, compared to a comparative example in which the multiple bristles 3612 have substantially the same length, and thus may further improve the antenna radiation performance of the first conductive part 3511 operating as an antenna radiator.

According to various embodiments, the second surface 3611b of the support part 3611 disposed on the fourth side wall 2604 may face a direction having an acute angle or an obtuse angle with respect to the third direction ③.

Figure 44:
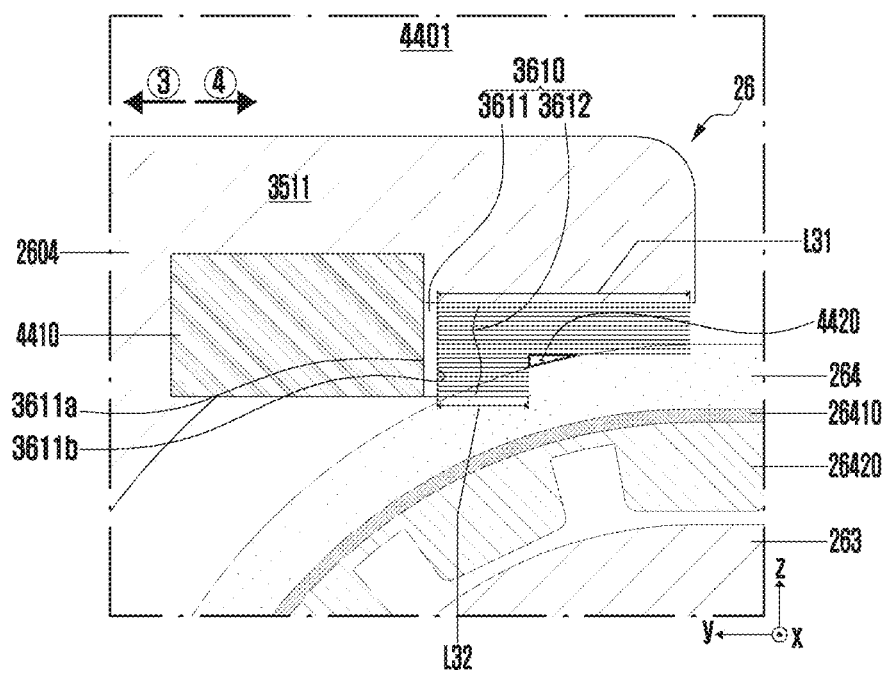
FIG. 44 is a cross-sectional view of a slidable electronic device taken along line I-r in FIG. 36 according to various embodiments.

FIG. 44 is a cross-sectional view 4401 of the slidable electronic device 26 taken along line I-I' in FIG. 36 according to various embodiments.

Referring to FIG. 44, the slidable electronic device 26 may include the fourth side wall 2604, the at least one first dielectric 3610, a support member 4410, the flexible display module 264, the support sheet 26410, the display support structure 26420, and/or the third frame 263.

According to an embodiment, the support member 4410 may be disposed on or coupled to the fourth side wall 2604. For example, the support member 4410 may be disposed on (coupled to) the fourth side wall 2604 through an adhesive material (or a bonding material) (not illustrated separately) or by means of a fastener, e.g., a screw.

According to an embodiment, the at least one dielectric 3610 may be disposed on or coupled to the support member 4410. For example, the support part 3611 of the at least one dielectric 3610 may be disposed on (coupled to) the support member 4410 through an adhesive material (or a bonding material) (not illustrated separately) or by means of a screw (not illustrated separately).

According to an embodiment, the support part 3611 may include the first surface 3611a coupled to the fourth member 4410, and the second surface 3611b facing a direction opposite to the direction the first surface 3611a faces. The multiple bristles 3612 may be arranged on the support part 3611 to protrude from the second surface 3611b. When the at least one first dielectric 3610 separated from the slidable electronic device 26 is viewed, the multiple bristles 3612 may substantially extend in a vertical direction in which the second surface 3611b faces.

According to an embodiment, the second surface 3611b of the support part 3611 may substantially face the direction parallel to the third direction ③.

According to various embodiments, the length of some of the multiple bristles 3612 may be different from the length of others of the multiple bristles 3612. FIG. 44 illustrates an unbent state of the multiple bristles 3612 in order to help in understanding the length of multiple bristles 3612. In the sectional view 4401 of the electronic device 26 according to an illustrative embodiment, some of the multiple bristles 3612 may have a first length L31, and the others of the multiple bristles 3612 may have a second length L32 shorter than the first length L31. Although not illustrated separately, the length of the multiple bristles 3612 is not limited to the illustrated example, and may be various. The different lengths of the multiple bristles 3612 may provide an additional air gap 4420, compared to a comparative example in which the multiple bristles 3612 have substantially the same length, and thus may further improve the antenna radiation performance of the first conductive part 3511 operating as an antenna radiator.

According to various embodiments (not illustrated separately), the second surface 3611b of the support part 3611 disposed on the support member 4410 may face a direction having an acute angle or an obtuse angle with respect to the third direction ③.

Figure 45:
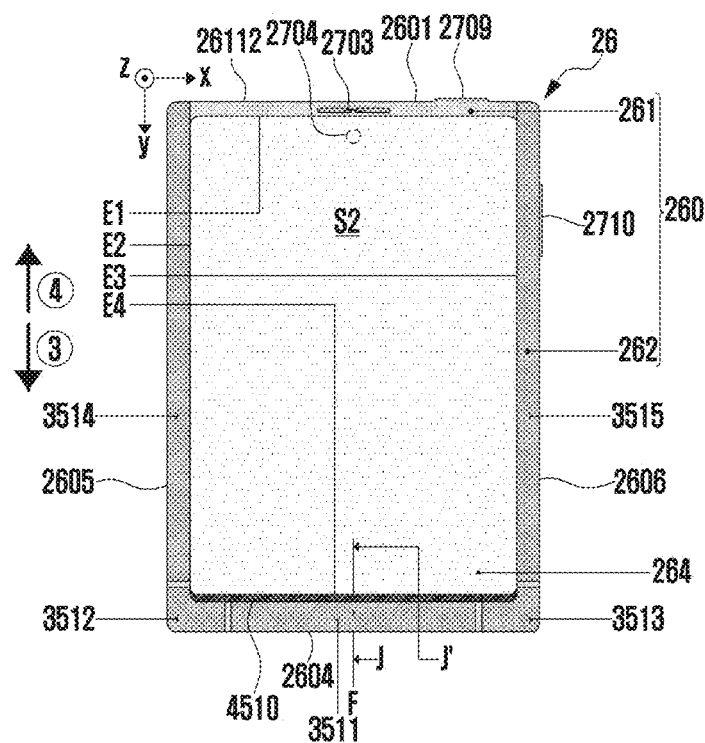
FIG. 45 is a diagram illustrating a slidable electronic device in a closed state, and a cross-sectional view of a slidable electronic device taken along line J-J' according to various embodiments.
Figure 45:
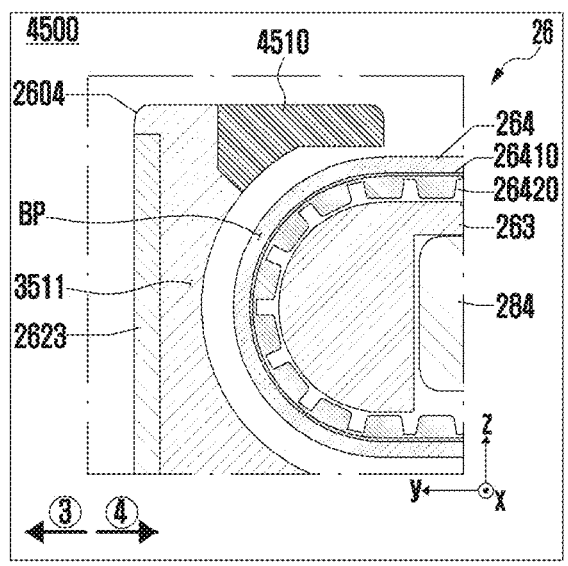

FIG. 45 is a diagram illustrating the slidable electronic device 26 in a closed state, and a sectional view 4500 of the slidable electronic device 26 taken along line J-J' according to various embodiments.

Referring to FIG. 45, in an embodiment, the slidable electronic device 26 may include the first housing 261, the second housing 262, the third frame 263, the flexible display module 264, the support sheet 26410, the display support structure 26420, and/or the battery 284.

According to an embodiment, a combination of the first housing 261 and the second housing 262 may provide a bezel (or a bezel structure, a screen bezel, or a screen bezel structure) surrounding a screen region S2 (or a screen or a display region) of the flexible display module 264, which is seen to the outside. The screen region S2 may include the first screen region S21 (see FIG. 26) in a closed state of the slidable electronic device 26, and include the first screen region S21 (see FIG. 27) and the second screen region S22 (see FIG. 27) in an open state of the slidable electronic device 26. For example, when the slidable electronic device 26 in a closed state is viewed from above the screen region S2, a combination of the first side wall 2601, the fourth side wall 2604, the fifth side wall 2605, and the sixth side wall 2606 may provide a bezel surrounding the screen region S2. For example, when the slidable electronic device 26 in an open state (see FIG. 27) is viewed from above the screen region S2, a combination of the first side wall 2601, the second side wall 2602, the third side wall 2603, the fourth side wall 2604, the fifth side wall 2605, and the sixth side wall 2606 may provide a bezel surrounding the screen region S2.

According to an embodiment, the fourth side wall 2604 may include a non-conductive region 4510 of the screen region S2, provided to adjacent to the boundary E4 with the bending part BP when viewed from above the screen region S2 (e.g., when viewed in the −z-axis direction). The non-conductive region 4510 may provide apart of the bezel surrounding the screen region S2. The non-conductive region 4510 may reduce the electromagnetic effect (e.g., degradation of antenna radiation performance) of the flexible display module 264 (or the display assembly 2900 in FIG. 28) on an antenna radiator (e.g., the first conductive part 3511, the second conductive part 3512, or the third conductive part 3513).

According to various embodiments (not illustrated separately), the non-conductive region 4510 may be expanded to the fifth side wall 2605. A part of the non-conductive region 4510, corresponding to the fifth side wall 2605, may reduce the electromagnetic effect (e.g., degradation of antenna radiation performance) of the flexible display module 264 (or the display assembly 2900 in FIG. 28) on an antenna radiator (e.g., the second conductive part 3512 or the fourth conductive part 3514).

According to various embodiments (not illustrated separately), the non-conductive region 4510 may be expanded to the sixth side wall 2606. A part of the non-conductive region 4510, corresponding to the sixth side wall 2606, may reduce the electromagnetic effect (e.g., degradation of antenna radiation performance) of the flexible display module 264 (or the display assembly 2900 in FIG. 28) on an antenna radiator (e.g., the third conductive part 3513 or the fifth conductive part 3515).

According to various embodiments, at least one dielectric (e.g., the at least one first dielectric 3610 of FIG. 36) may be disposed on or coupled to the fourth side wall 2604 between the fourth side wall 2604 and the flexible display module 264.

According to various embodiments, at least one dielectric (e.g., the at least one second dielectric 3620 of FIG. 36) may be disposed on or coupled to the fifth side wall 2605 between the fifth side wall 2605 and the flexible display module 264.

According to various embodiments, at least one dielectric (e.g., the at least one third dielectric 3630 of FIG. 36) may be disposed on or coupled to the sixth side wall 2606 between the sixth side wall 2606 and the flexible display module 264.

Figure 46:
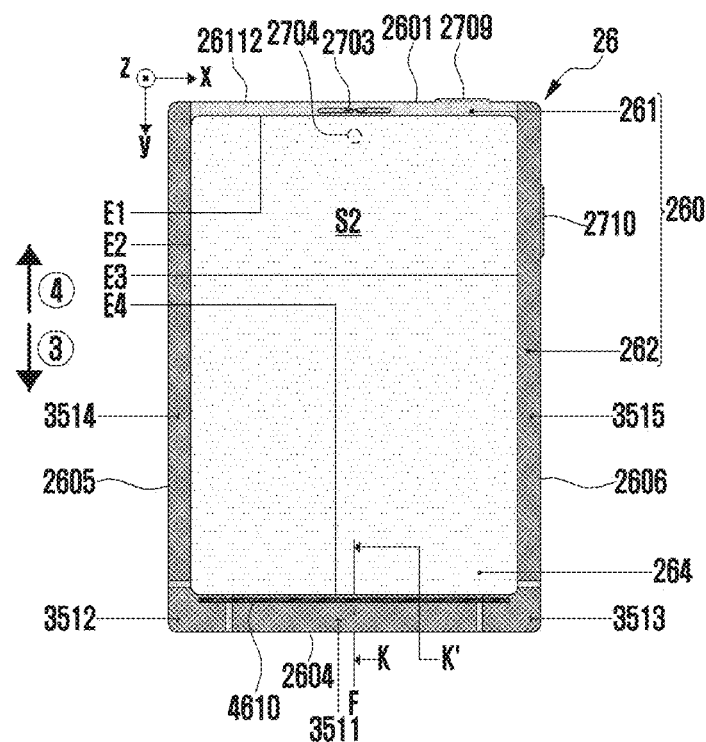
FIG. 46 is a diagram illustrating a slidable electronic device in a closed state, and a cross-sectional view of a slidable electronic device taken along line K-K' according to various embodiments.
Figure 46:
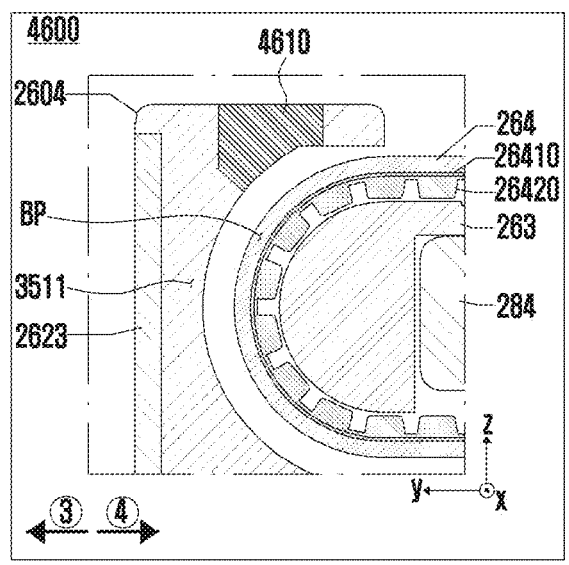

FIG. 46 is a diagram illustrating the slidable electronic device 26 in a closed state, and a cross-sectional view 4600 of the slidable electronic device 26 taken along line K-K' according to various embodiments.

Referring to FIG. 46, in an embodiment, the slidable electronic device 26 may include the first housing 261, the second housing 262, the third frame 263, the flexible display module 264, the support sheet 26410, the display support structure 26420, and/or the battery 284.

According to an embodiment, a combination of the first housing 261 and the second housing 262 may provide a bezel (or a bezel structure, a screen bezel, or a screen bezel structure) surrounding a screen region (or a screen or a display region) of the flexible display module 264, which is seen to the outside. The screen region S2 may include the first screen region S21 (see FIG. 26) in a closed state of the slidable electronic device 26, and include the first screen region S21 (see FIG. 27) and the second screen region S22 (see FIG. 27) in an open state of the slidable electronic device 26. When the slidable electronic device 26 in a closed state is viewed from above the screen region S2, a combination of the first side wall 2601, the fourth side wall 2604, the fifth side wall 2605, and the sixth side wall 2606 may provide a bezel surrounding the screen region S2. When the slidable electronic device 26 in an open state (see FIG. 27) is viewed from above the screen region S2, a combination of the first side wall 2601, the second side wall 2602, the third side wall 2603, the fourth side wall 2604, the fifth side wall 2605, and the sixth side wall 2606 may provide a bezel surrounding the screen region S2.

According to an embodiment, the fourth side wall 2604 may include a first non-conductive region 4610 of the screen region S2, spaced apart from the boundary E4 with the bending part BP when viewed from above the screen region S2 (e.g., when viewed in the −z-axis direction). The first non-conductive region 4610 may reduce the electromagnetic effect (e.g., degradation of antenna radiation performance) of the flexible display module 264 (or the display assembly 2900 in FIG. 28) on an antenna radiator (e.g., the first conductive part 3511, the second conductive part 3512, or the third conductive part 3513).

According to various embodiments, the slidable electronic device 26 may include a second non-conductive region (not illustrated separately) of the screen region S2, spaced apart from the second edge E2 when viewed from above the screen region S2 (e.g., when viewed in the −z-axis direction). The second non-conductive region may reduce the electromagnetic effect (e.g., degradation of antenna radiation performance) of the flexible display module 264 (or the display assembly 2900 in FIG. 28) on an antenna radiator (e.g., the second conductive part 3512 or the fourth conductive part 3514). In various embodiments, an integrated non-conductive region including the first non-conductive region 4610 and the second non-conductive region may be provided.

According to various embodiments, the slidable electronic device 26 may include a third non-conductive region (not illustrated separately) of the screen region S2, spaced apart from the third edge E3 when viewed from above the screen region S2 (e.g., when viewed in the −z-axis direction). The third non-conductive region may reduce the electromagnetic effect (e.g., degradation of antenna radiation performance) of the flexible display module 264 (or the display assembly 2900 in FIG. 28) on an antenna radiator (e.g., the third conductive part 3513 or the fifth conductive part 3515). In various embodiments, an integrated non-conductive region including the first non-conductive region 4610 and the third non-conductive region may be provided.

According to various embodiments, at least one dielectric (e.g., the at least one first dielectric 3610 of FIG. 36) may be disposed on or coupled to the fourth side wall 2604 between the fourth side wall 2604 and the flexible display module 264.

According to various embodiments, at least one dielectric (e.g., the at least one second dielectric 3620 of FIG. 36) may be disposed on or coupled to the fifth side wall 2605 between the fifth side wall 2605 and the flexible display module 264.

According to various embodiments, at least one dielectric (e.g., the at least one third dielectric 3630 of FIG. 36) may be disposed on or coupled to the sixth side wall 2606 between the sixth side wall 2606 and the flexible display module 264.

According to various embodiments (not illustrated separately), a structure including the at least one first dielectric 3610 provided in a brush type according to the embodiment of FIG. 39, the embodiment of FIG. 42, the embodiment of FIG. 43, or the embodiment of FIG. 44 may be applied to the slidable electronic device 2 of FIG. 2.

According to various embodiments (not illustrated separately), a structure in which a part of a lateral member (or side) includes the non-conductive region 4510 according to the embodiment of FIG. 45 may be applied to the slidable electronic device 2 of FIG. 2.

According to various embodiments (not illustrated separately), a structure in which a part of a lateral member (or side) includes the non-conductive region 4610 according to the embodiment of FIG. 46 may be applied to the slidable electronic device 2 of FIG. 2.

Various embodiments of the disclosure may be applied to various other types of electronic devices without being limited to a slidable electronic device (e.g., the slidable electronic device 2 in FIG. 2 or the slidable electronic device 26 in FIG. 26). Various electronic devices of the disclosure may be implemented as a bar type or plate type electronic device or a foldable electronic device.

Figure 47:
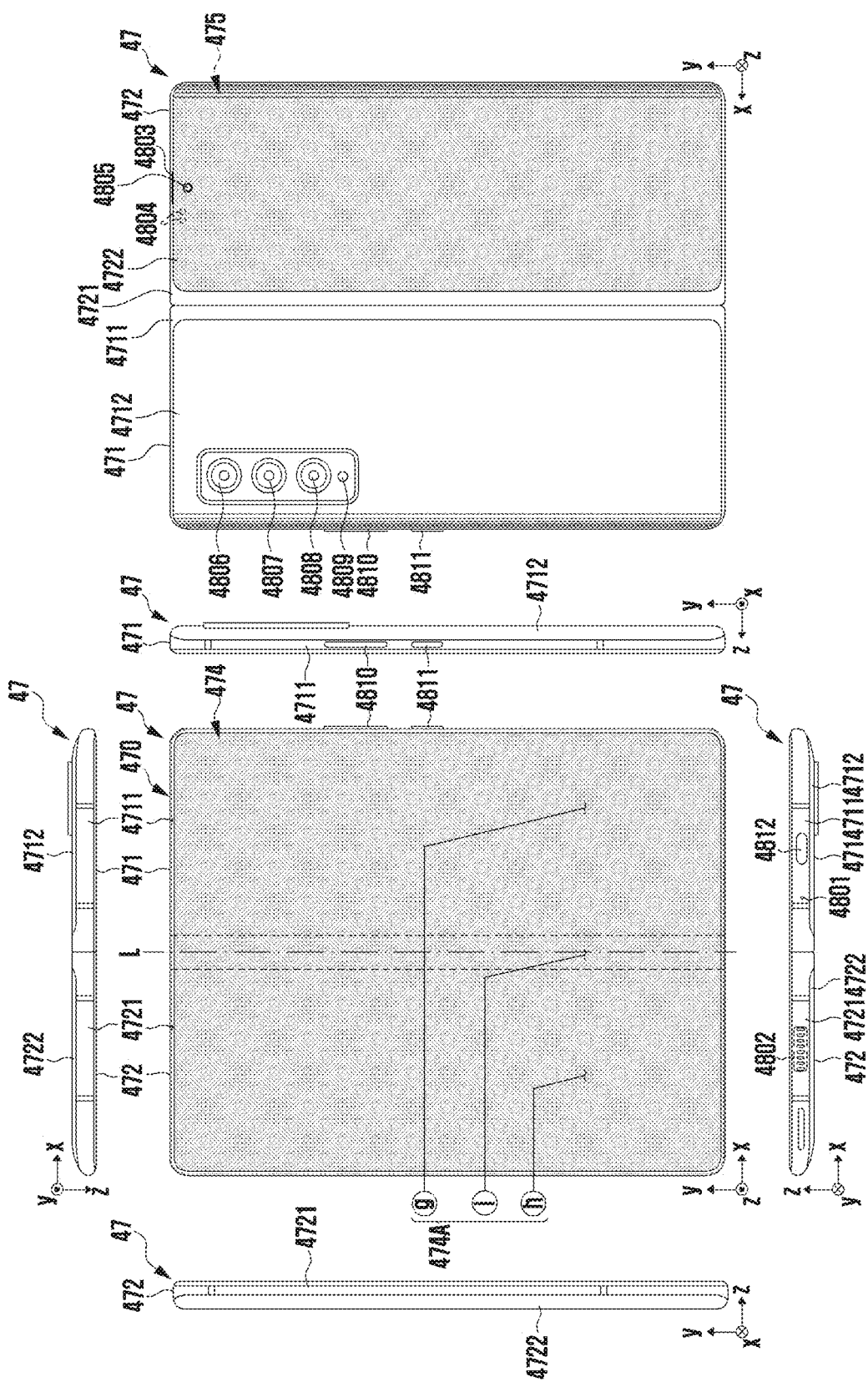
FIG. 47 is a diagram illustrating a foldable electronic device in an unfolded state according to various embodiments.
Figure 48:
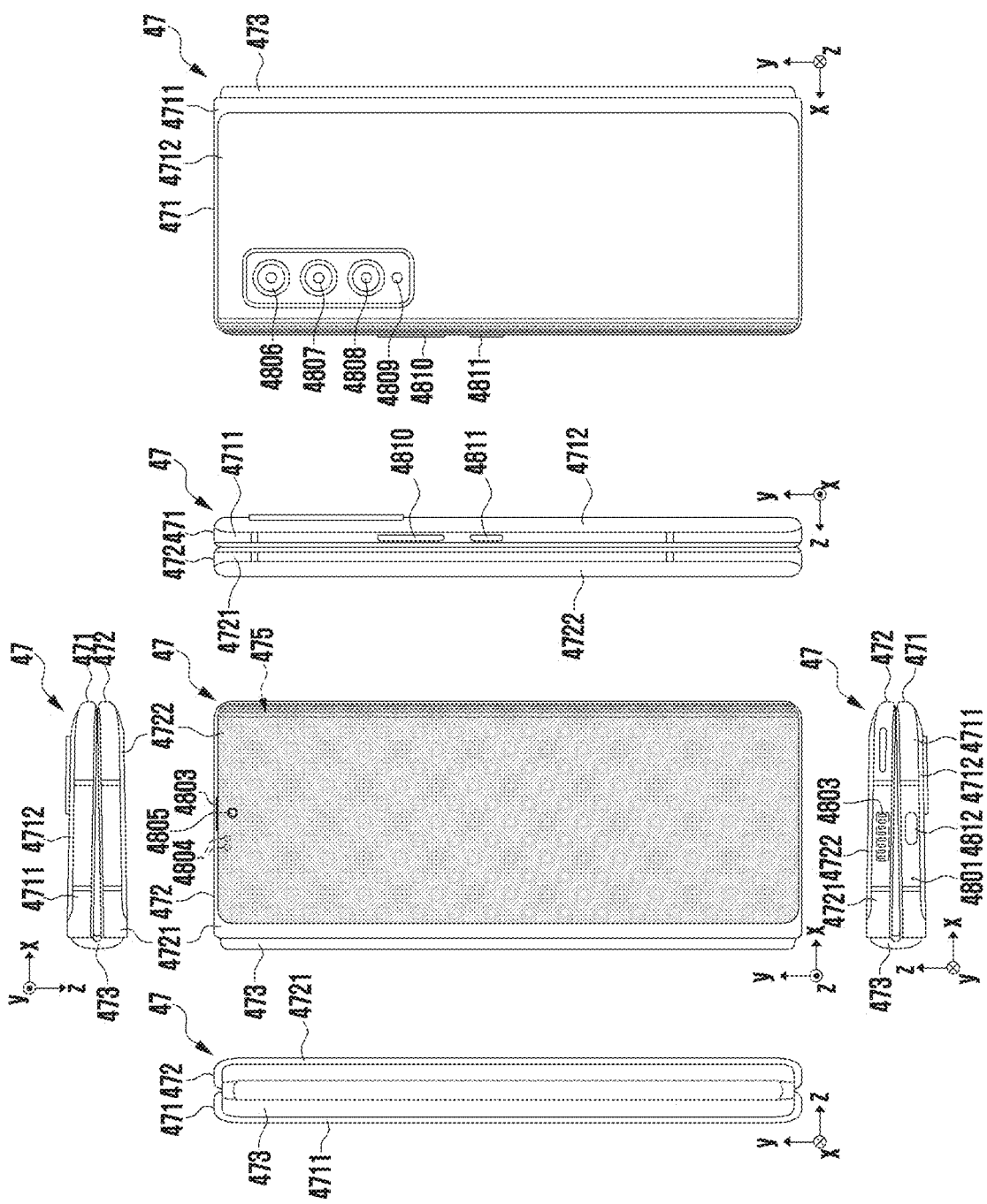
FIG. 48 is a diagram illustrating a foldable electronic device in a folded state according to various embodiments.

FIG. 47 is a diagram illustrating a foldable electronic device 47 in an unfolded state (or flat state) according to various embodiments. FIG. 48 is a diagram illustrating the foldable electronic device 47 in a folded state (or a folding state) according to various embodiments.

Referring to FIGS. 47 and 48, the foldable electronic device 47 may include a foldable housing 470, a first display module 474 (e.g., a flexible display module or a foldable display module), and/or a second display module 475. In various embodiments, the foldable electronic device 47 may be the electronic device 101 in FIG. 1.

According to an embodiment, the foldable housing 470 may include a first housing 471 (or a first housing part or a first housing structure), a second housing 472 (or a second housing part or a second housing structure), a hinge housing 473, and/or a hinge part (not illustrated separately). The first housing 471 and the second housing 472 may be connected to each other through the hinge part, and may be mutually rotatable with respect to the hinge part. The hinge part may include one or more hinge modules (or hinge assemblies) (not illustrated separately).

According to an embodiment, a display region 474A of the first display module 474 is an active region of the first display module 474, which is able to display an image, and may include a first display region ⓖ (or a first active region or a first screen region), a second display region ⓗ (or a second active region or a second screen region), and a third display region ⓘ (or a third active region or a third screen region) connecting the first display region ⓖ and the second display region ⓗ.

According to an embodiment, the first display region ⓖ may be positioned to correspond to the first housing 471. According to an embodiment, the second display region ⓗ may be positioned to correspond to the second housing 472. The third display region ⓘ may be positioned to correspond to the hinge part (not illustrated separately). The first display region ⓖ may be disposed on the first housing 471, and the shape of the first display region ⓖ may be maintained by support of the first housing 471. The second display region ⓗ may be disposed on the second housing 472, and the shape of the second display region ⓗ may be maintained by support of the second housing 472. The first display region ⓖ and the second display region ⓗ may be, for example, substantially flat. An unfolded state (see FIG. 47) of the foldable electronic device 47 may imply that the third display region ⓘ is disposed to be substantially flat. In an unfolded state of the foldable electronic device 47, the first display region ⓖ and the second display region ⓗ may make an angle of about 180 degrees, and the display region 474A may be provided (or disposed) to be substantially flat. In an unfolded state of the foldable electronic device 47, due to the relative position between the first display region ⓖ disposed on the first housing 471 and the second display region ⓗ disposed on the second housing 472, the third display region ⓘ connecting the first display region ⓖ and the second display region ⓗ may be flat. In an unfolded state of the foldable electronic device 47, the third display region ⓘ may be pulled from both sides by the first display region ⓗ and the second display region ⓗ, and the pulling force may be provided to make the third display region ⓘ be flat and reduce damage to the third display region ⓘ. The third display region ⓘ may be provided, in an unfolded state of the foldable electronic device 47, to have an extended width enabling stress reduction and flat placement when being pulled by the first display region ⓖ and the second display region ⓗ.

According to an embodiment, in an unfolded state of the foldable electronic device 47, the hinge part (not illustrated separately) may support the third display region ⓘ. In an unfolded state of the foldable electronic device 47, in a case where an external force (e.g., an external pressure such as a touch input using a user's finger or a touch input using an electronic pen) is applied to the third display region ⓘ, the hinge part may reduce sagging of the third display region ⓘ so as to contribute in keeping the third display region ⓘ flat. The hinge part may configured to, in a case where an external impact is caused by a fall in an unfolded state of the foldable electronic device 47, reduce the effect of the external impact on the third display region ⓘ. The hinge part may support the third display region ⓘ so that the third display region î is disposed to be flat without sagging in an unfolded state of the foldable electronic device 47, so as to reduce creases.

The illustrated coordinate axes have been given with respect to, for example, the first housing 471, and the +z-axis direction may be interpreted as a direction which the plane provided by the flat first display region ⓖ faces.

According to an embodiment, the foldable electronic device 47 may be provided in an infolding manner in which the display region 474A of the first display module 474 is folded inward. FIG. 48 illustrates a fully folded state of the foldable electronic device 47 in which the first housing 471 and the second housing 472 are arranged to be unable to be closer to each other any more. In a fully folded state of the foldable electronic device 47, the first display region ⓖ and the second display region ⓗ may be positioned to face each other, and the third display region ⓘ may be bent. In a fully folded state of the foldable electronic device 47, the angle (or the angle between the first display region ⓖ and the second display region ⓗ) between the first housing 471 and the second housing 472 may be about 0 degrees-about 10 degrees, and the display region 474A may not be substantially seen. Although not illustrated, an intermediate state of the foldable electronic device 47 may be between an unfolded state and a fully folded state. In a case where the angle between the first housing 471 and the second housing 472 is equal to or greater than an angle and thus indicates an intermediate state, a use environment in which a user has no substantial difficulty in using the display region 474A may be provided. Hereinafter, a "folded state of the foldable electronic device 47" mentioned in the following description may indicate a fully folded state opposite to an intermediate state of an unfolded state.

According to an embodiment, when an unfolded state (see FIG. 47) of the foldable electronic device 47 is viewed, the display region 474A of the display module 474 may be symmetrical with respect to a central line L of the foldable electronic device 47. The central line L of the foldable electronic device 47 may correspond to the center of the width of the third display region ⓘ extending from a first boundary between the first display region ⓖ and the third display region ⓘ to a second boundary between the second display region ⓗ and the third display region ⓘ, when an unfolded state of the foldable electronic device 47 is viewed.

According to an embodiment, the third display region ⓘ bent in a folded state (see FIG. 48) of the foldable electronic device 47 may be substantially symmetrical with respect to the central line L of the foldable electronic device 47. When an unfolded state of the foldable electronic device 47 is viewed, the display region 474A may be substantially rectangular.

According to an embodiment, the first housing 471 may include a first frame 4711 (or a first frame structure or a first framework) and/or a first cover 4712 disposed on the first frame 4711. The first frame 4711 may include a first side (or a first lateral part, a first lateral member, a first lateral structure, or a first lateral bezel structure) (e.g., a first side 47112 of FIG. 49). The first side may be disposed along an edge of the first display region ⓖ of the first display module 474. The first side may provide a first lateral surface of the foldable electronic device 47, corresponding to the first display region ⓖ of the foldable electronic device 47. The first frame 4711 may include a first support part (not illustrated separately) extending from the first side or connected to the first side. The first display region ⓖ may be disposed on the first support part, and the first support part may support the first display region ⓖ. The first display region ⓖ and the first cover 4712 may be positioned opposite to each other while the first support part of the first frame 4711 is interposed therebetween. The first side of the first frame 4711 may be disposed to at least partially surround the space between the first display region ⓖ and the first cover 4712. The first display region ⓖ may provide one surface of an outer surface of the foldable electronic device 47, and the first cover 4712 may provide the other surface of the outer surface of the foldable electronic device 47, which substantially faces opposite to a direction which the first display region ⓖ faces. Various electrical elements (or electronic components), such as a printed circuit board or a battery, may be disposed on the first support part between the first support part and the first cover 4712.

According to an embodiment, the second housing 472 may include a second frame 4721 (or a second frame structure or a second framework) and/or a second cover 4722 disposed on the second frame 4721. The second frame 4721 may include a second side (or a second lateral part, a second lateral member, a second lateral structure, or a second lateral bezel structure) (e.g., a second side 47212 of FIG. 49). The second side may be disposed along an edge of the second display region ⓗ of the first display module 474. The second side may provide a second lateral surface of the foldable electronic device 47, corresponding to the second display region ⓗ of the foldable electronic device 47. In a folded state (see FIG. 48) of the foldable electronic device 47, the first side of the first frame 4711 and the second side of the second frame 4721 may be aligned and overlap with each other. The second frame 4721 may include a second support part (not illustrated separately) extending from the second side or connected to the second side. The second display region ⓗ may be disposed on the second support part, and the second support part may support the second display region ⓗ. The second display region ⓗ and the second cover 4722 may be positioned opposite to each other while the second support part of the second frame 4721 is interposed therebetween. The second side of the second frame 4721 may be disposed to at least partially surround the space between the second display region ⓗ and the second cover 4722. The second display region ⓗ may provide one surface of the outer surface of the foldable electronic device 47, and the second cover 4722 may provide the other surface of the outer surface of the foldable electronic device 47, which substantially faces opposite to a direction which the second display region ⓗ faces. Various electrical elements (or electronic components), such as a printed circuit board or a battery, may be disposed on the second support part between the second support part and the second cover 4712.

According to an embodiment, the hinge housing (or hinge cover) 473 may be connected to one or more hinge modules (not illustrated separately). When the foldable electronic device 47 is switched from an unfolded state (see FIG. 47) to a folded state (see FIG. 48), due to the relative position change between the first housing 471 and the second housing 472 connected to each other through the hinge part, and the state change of the hinge part coupled to the hinge housing 473, a crack between the first housing 471 and the second housing 472 is open at the opposite side of the third display region ⓘ, and the hinge housing 473 may be exposed to the outside through the open crack. In a folded state of the foldable electronic device 47, the hinge housing 473 may be a part of an exterior, which covers the inside of the foldable electronic device 47 which may be seen through the open crack between the first housing 471 and the second housing 472. The hinge housing 473 may be more exposed in a folded state of FIG. 47 than in an intermediate state. When the foldable electronic device 47 is switched from a folded state to an unfolded state, due to the relative position change between the first housing 471 and the second housing 472 connected to each other through the hinge part, and the state change of the hinge part coupled to the hinge housing 473, a crack between the first housing 471 and the second housing 472 is closed at the opposite side of the third display region ⓘ, and the hinge housing 473 may be in an inner space of the foldable electronic device 47 caused by a combination of the first housing 471 and the second housing 472, and thus not be exposed to the outside.

According to an embodiment, the second display module 475 may be positioned between the second frame 4721 and the second cover 4722. The second cover 4722 may be substantially transparent, and the second display module 475 may be visually seen through the second cover 4722. The foldable electronic device 47 may be configured to display an image through the second display module 475 instead of the first display module 474 in a folded state.

According to various embodiments, the second display module 475 may be provided to include the second cover 4622. In this case, the second cover 4722 may be excluded from the foldable housing 470.

According to an embodiment, the foldable electronic device 47 may include at least one of one or more sound input modules (e.g., the input module 150 in FIG. 1), one or more sound output modules (e.g., the sound output module 155 in FIG. 1), one or more sensor modules (e.g., the sensor module 176 in FIG. 1), one or more camera modules (e.g., the camera module 180 in FIG. 1), one or more light emitting modules, one or more key input modules (e.g., the input module 150 in FIG. 1), and/or one or more connection terminals (e.g., the connection terminal 178 in FIG. 1). The foldable electronic device 47 may omit at least one of the elements or additionally include a different element. The position or the number of elements may be various.

One of the one or more sound input modules may include, for example, a microphone (not illustrated separately) positioned in the foldable electronic device 47 to correspond to a microphone hole 4801 provided on the exterior of the foldable electronic device 47. In the illustrated example, the microphone hole 4801 may be provided on the first side (e.g., the first side 47112 in FIG. 49) of the first housing 471. The position or number of the microphones and the microphone holes corresponding to the microphones may be various without being limited to the illustrated example.

One of the one or more sound output modules may include, for example, a first speaker for multimedia playback (or recording playback) (not illustrated separately) positioned in the foldable electronic device 47 to correspond to a first speaker hole 4802 provided on the exterior of the foldable electronic device 47. Another one of the one or more sound output modules may include, for example, a second speaker for call (e.g., a call receiver) (not illustrated separately) positioned in the foldable electronic device 47 to correspond to a second speaker hole 4803 (e.g., a receiver hole) provided on the exterior of the foldable electronic device 47. In the illustrated example, the first speaker hole 4802 may be provided on the second side (e.g., the second side 47212 in FIG. 49) of the second housing 472, and the second speaker hole 4803 may be provided on the first side (e.g., the first side 47112 in FIG. 49) of the first housing 471. The position or number of the speakers and the speaker holes corresponding to the speakers may be various without being limited to the illustrated example.

According to various embodiments, the microphone hole and the speaker hole may be implemented as one hole.

According to various embodiments, the speaker hole may be omitted, and the sound output module may include a piezo speaker.

One of the one or more sensor modules may include, for example, an optical sensor 4804 positioned in an inner space of the foldable housing 470 to correspond to the second cover 4722. The optical sensor 4804 may include, for example, a proximity sensor or an illuminance sensor.

According to an embodiment, the optical sensor 4804 may overlap with at least a part of the second display module 475 when viewed from above the second cover 4722. A sensing function of the optical sensor 4804 may be performed without visual distinguishment (or exposure) of the optical sensor 4804 or the position of the optical sensor 4804.

According to an embodiment, the optical sensor 4804 may be positioned on a back surface of the second display module 475, or below the second display module 475, and the optical sensor 4804 or the position of the optical sensor 4804 may not be visually distinguished (or exposed).

According to various embodiments, the optical sensor 4804 may be aligned with a recess (not illustrated separately) provided on the back surface of the second display module 475, or may be at least partially inserted in the recess.

According to an embodiment, a partial region of the second display module 475, at least partially overlapping with the optical sensor 4804, may include a different pixel structure and/or wiring structure compared to the other regions. For example, the partial region of the second display module 475, at least partially overlapping with the optical sensor 4804, may have a different pixel density (e.g., the number of pixels per unit area) compared to the other regions. A pixel structure and/or wiring structure provided in the partial region of the second display module 475, at least partially overlapping with the optical sensor 4804, may reduce light loss between the outside and the optical sensor 4804. As another example, the partial region of the second display module 475, at least partially overlapping with the optical sensor 4804, may not include multiple pixels arranged therein.

According to various embodiments, the optical sensor 4804 may be aligned with an opening provided on the second display module 475, or may be at least partially inserted in the opening. The optical sensor 4804 may be aligned with an opening provided on the second display module 475, or may be at least partially inserted in the opening. In relation to the optical sensor 4804, external light may arrive at the optical sensor 4804 through the second cover 4622 and the opening provided on the second display module 465. The opening of the second display module 475 aligned with or overlapping with the optical sensor 4804 may be provided in a through hole type or a notch type.

According to various embodiments, without being limited to the optical sensor 4804 such as a proximity sensor or an illuminance sensor, various other sensors may be positioned on the back surface of the second display module 475 or below the second display module 475, or may be positioned to correspond to an opening provided on the second display module 475. For example, an optical-type, capacitive-type, or ultrasonic-type biometric sensor (e.g., a fingerprint sensor) may be positioned on the back surface of the second display module 475 or below the second display module 475, or may be positioned to correspond to an opening provided on the second display module 475.

According to various embodiments, at least one sensor (not illustrated separately) may be positioned on a back surface of the first display module 474 or below the first display module 474.

According to various embodiments, at least one sensor (not illustrated separately) may be aligned with a recess provided on the back surface of the first display module 474, or may be at least partially inserted in the recess.

According to various embodiments, at least one sensor module may be included in an input module (e.g., the input module 150 in FIG. 1).

According to an embodiment, a first camera module 4805 may be positioned in the inner space of the foldable housing 470 to correspond to the second cover 4722.

According to an embodiment, the first camera module 4805 may overlap with at least a part of the second display module 475 when viewed from above the second cover 4722. An image capturing function of the first camera module 4805 may be performed without visual distinguishment (or exposure) of the first camera module 4805 or the position of the first camera module 4805. The first camera module 4805 may include, for example, a hidden display back camera (e.g., UDC).

According to an embodiment, the first camera module 4805 may be positioned on the back surface of the second display module 475, or below the second display module 475, and the first camera module 4805 or the position of the first camera module 4805 may not be visually distinguished (or exposed).

According to various embodiments, the first camera module 4805 may be aligned with a recess (not illustrated separately) provided on the back surface of the second display module 475, or may be at least partially inserted in the recess.

According to an embodiment, a partial region of the second display module 475, at least partially overlapping with the first camera module 4805, may include a different pixel structure and/or wiring structure compared to the other regions. For example, the partial region of the second display module 475, at least partially overlapping with the first camera module 4805, may have a different pixel density, compared to the other regions. A pixel structure and/or wiring structure provided in the partial region of the second display module 475, at least partially overlapping with the first camera module 4805, may reduce light loss between the outside and the optical sensor. As another example, the partial region of the second display module 475, at least partially overlapping with the first camera module 4805, may not include multiple pixels arranged therein.

According to various embodiments, the first camera module 4805 may be aligned with an opening provided on the second display module 475, or may be at least partially inserted in the opening. The first camera module 4805 may be aligned with an opening provided on the second display module 475, or may be at least partially inserted in the opening. External light may arrive at the first camera module 4805 through the second cover 4622 and the opening provided on the second display module 465. The opening of the second display module 465 aligned with or overlapping with the first camera module 4805 may be provided in a through hole type or a notch type.

According to various embodiments, the foldable electronic device 47 may include a light emitting module (e.g., LED, IR LED, or xenon lamp) (not illustrated separately) capable of providing state information of the foldable electronic device 47 using light. In various embodiments, the light emitting module may provide a light source interworking with an operation of the first camera module 4805.

According to an embodiment, the foldable electronic device 47 may include a second camera module 4806, a third camera module 4807, a fourth camera module 4808, and/or a light emitting module 4809 (e.g., flash) positioned in the first housing 471 to correspond to the first cover 4712. The first cover 4712 may include a first camera hole (or a first light transmission region) provided to correspond to the second camera module 4806, a second camera hole (or a second light transmission region) provided to correspond to the third camera module 4807, a third camera hole (or a third light transmission region) provided to correspond to the fourth camera module 4808, and/or a flash hole (or a fourth light transmission region) provided to correspond to the light emitting module 4809. The light emitting module 4809 may include a light source for the second camera module 4806, the third camera module 4807, and/or the fourth camera module 4808. The light emitting module 4809 may include, for example, an LED or a xenon lamp. The number or position of the camera modules or the light emitting modules positioned in the first housing 471 to correspond to the first cover 4712 may be various without being limited to the illustrated example.

According to an embodiment, the second camera module 4806, the third camera module 4807, or the fourth camera module 4808 may include, for example, a wide-angle camera module, a telephoto camera module, a color camera module, a monochrome camera module, or an IR camera (e.g., a TOF camera, or a structured light camera) module.

According to an embodiment, the second camera module 4806, the third camera module 4807, or the fourth camera module 4808 may have different attributes (e.g., angles of view) or functions.

According to an embodiment, the second camera module 4806, the third camera module 4807, or the fourth camera module 4808 may have different angles of view (or lenses with different angles of view). The foldable electronic device 47 may selectively use the angle of view of the second camera module 4806, the third camera module 4807, or the fourth camera module 4808, based on a user's selection for angle of view.

According to various embodiments, a camera module (e.g., an IR camera module) may be operated as at least a part of the sensor module.

According to an embodiment, the one or more key input modules may include a first key input module 4810 or a second key input module 4811. The key input module (e.g., the first key input module 4810 or the second key input module 4811) may include, for example, a key positioned on the first side (e.g., the first side 47112 of FIG. 49) of the first housing 471 and a key signal generator (not illustrated separately) that generates a key signal in response to a push or a touch on the second key. The position or number of the key input modules may be various without being limited to the illustrated example.

According to various embodiments, the foldable electronic device 47 may not include some or all of the key input modules, and a key input module not included may be implemented as a soft key using a screen.

One of the one or more connection terminals (or connector modules of interface terminal modules) may include a connector (or interface terminal) positioned inside the foldable electronic device 47 to correspond to a connector hole 4812 provided on the exterior of the foldable electronic device 47. In the illustrated example, the connector hole 4812 may be provided on the first side (e.g., the first side 47112 in FIG. 49) of the first housing 471. The position or number of the connectors and the connector holes corresponding to the connectors may be various without being limited to the illustrated example. The foldable electronic device 47 may transmit and/or receive power and/or data with an external electronic device electrically connected to the connector. The connector may include, for example, a USB connector or an HDMI connector.

According to various embodiments, one of one or more connection terminal modules may include an audio connector (e.g., a headphone connector or earset connector) (not illustrated separately) positioned inside the foldable electronic device 47 to correspond to a connector hole provided on the exterior of the foldable electronic device 47.

According to various embodiments, one of one or more connection terminal modules may include a memory card connector (not illustrated separately) positioned inside the foldable electronic device 47 to correspond to a connector hole provided on the exterior of the foldable electronic device 47.

The foldable electronic device 47 may further include various elements according to the provided type thereof. There elements may be variously modified according to the trend of convergence of the foldable electronic device 47, and thus it is impossible to list all of them. However, elements equivalent to the mentioned elements may be further included in the foldable electronic device 47. In various embodiments, particular elements of the above elements may be excluded or replaced with different elements according to the provided type thereof.

Figure 49:
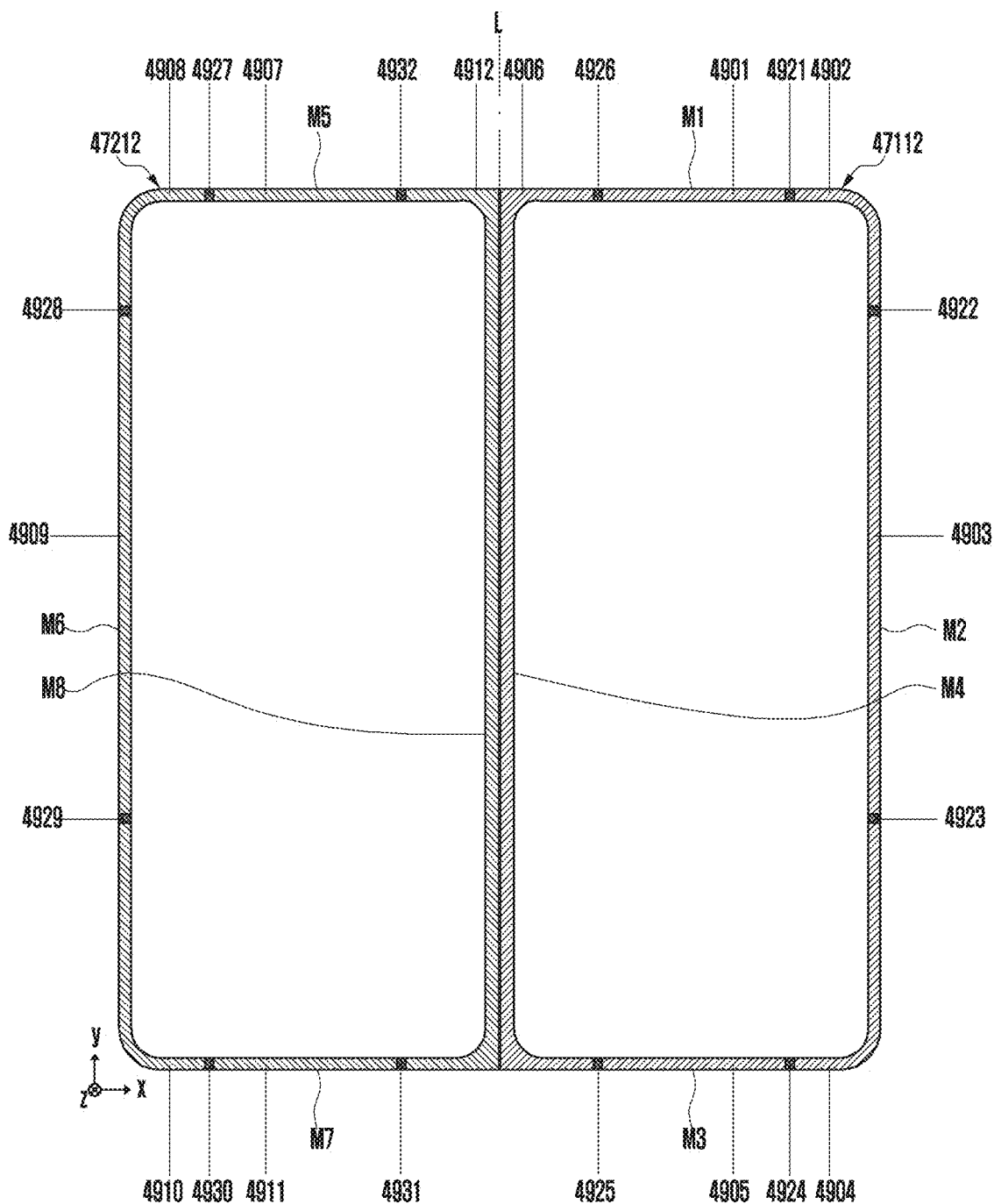
FIG. 49 is a diagram illustrating a first side and a second side included in a foldable electronic device in an unfolded state according to various embodiments.

FIG. 49 is a diagram illustrating the first side 47112 and the second side 47212 included in the foldable electronic device 47 in an unfolded state according to various embodiments.

Referring to FIG. 49, in an embodiment, the first 47112 may include a first lateral part M1, a second lateral part M2, a third lateral part M3, and/or a fourth lateral part M4. The second lateral part M2 may be substantially parallel to and spaced apart from the central line L of the foldable electronic device 47. The fourth lateral part M4 may be substantially parallel to the central line L of the foldable electronic device 47, and may be positioned closer to the central line L of the foldable electronic device 47, than to the second lateral part M2. The first lateral part M1 may connect to one end of the second lateral part M2 and one end of the fourth lateral part M4, and may be substantially perpendicular to the central line L of the foldable electronic device 47. The third lateral part M3 may connect to the other end of the second lateral part M2 and the other end of the fourth lateral part M4, and may be spaced apart from and substantially parallel to the first lateral part M1.

According to an embodiment, a first corner of the first side 47112, connecting the first lateral part M1 and the second lateral part M2, or a second corner of the first side 47112, connecting the second lateral part M2 and the third lateral part M3, may be provided to be circular or curved.

According to an embodiment, the first side 47112 may include a first conductive part 4901, a second conductive part 4902, a third conductive part 4903, a fourth conductive part 4904, a fifth conductive part 4905, a sixth conductive part 4906, a first insulation part 4921, a second insulation part 4922, a third insulation part 4923, a fourth insulation part 4924, a fifth insulation part 4925, and/or a sixth insulation part 4926. The first conductive part 4901 may provide a part of the first lateral part M1. The second conductive part 4902 may provide the first corner connecting the first lateral part M1 and the second lateral part M2, a part of the first lateral part M1, extending from the first corner, and/or a part of the second lateral part M2, extending from the first corner. The third conductive part 4903 may provide a part of the second lateral part M2. The fourth conductive part 4904 may provide the second corner connecting the second lateral part M2 and the third lateral part M3, a part of the second lateral part M2, extending from the second corner, and/or a part of the third lateral part M3, extending from the second corner. The fifth conductive part 4905 may provide a part of the third lateral part M3. The sixth conductive part 4906 may provide a third corner connecting the first lateral part M1 and the fourth lateral part M4, a part of the first lateral part M1, extending from the third corner, a fourth corner connecting the third lateral part M3 and the fourth lateral part M4, a part of the third lateral part M3, extending from the fourth corner, and the fourth lateral part M4. The first insulation part 4921 may be positioned between the first conductive part 4901 and the second conductive part 4902. The first conductive part 4901 and the second conductive part 4902 may be physically separated from each other while the first insulation part 4921 is disposed therebetween. The second insulation part 4922 may be positioned between the second conductive part 4902 and the third conductive part 4903. The second conductive part 4902 and the third conductive part 4903 may be physically separated from each other while the second insulation part 4922 is disposed therebetween. The third insulation part 4923 may be positioned between the third conductive part 4903 and the fourth conductive part 4904. The third conductive part 4903 and the fourth conductive part 4904 may be physically separated from each other while the third insulation part 4923 is disposed therebetween. The fourth insulation part 4924 may be positioned between the fourth conductive part 4904 and the fifth conductive part 4905. The fourth conductive part 4904 and the fifth conductive part 4905 may be physically separated from each other while the fourth insulation part 4924 is disposed therebetween. The fifth insulation part 4925 may be positioned between the fifth conductive part 4905 and the sixth conductive part 4906. The fifth conductive part 4905 and the sixth conductive part 4906 may be physically separated from each other while the fifth insulation part 4925 is disposed therebetween. The sixth insulation part 4926 may be positioned between the first conductive part 4901 and the sixth conductive part 4906. The first conductive part 4901 and the sixth conductive part 4906 may be physically separated from each other while the sixth insulation part 4926 is disposed therebetween.

According to an embodiment, the second side 47212 may include a fifth lateral part M5, a sixth lateral part M6, a seventh lateral part M7, and/or an eighth lateral part M8. In a folded state (see FIG. 48) of the foldable electronic device 47, the first lateral part M1 and the fifth lateral part M5, the second lateral part M2 and the sixth lateral part M6, the third lateral part M3 and the seventh lateral part M7, and the fourth lateral part M4 and the eighth lateral part M8 may be aligned and overlap with each other.

According to an embodiment, the second side 47212 may include a seventh conductive part 4907, an eighth conductive part 4908, a ninth conductive part 4909, a tenth conductive part 4910, an eleventh conductive part 4911, a twelfth conductive part 4912, a seventh insulation part 4927, an eighth insulation part 4928, a ninth insulation part 4929, a tenth insulation part 4930, an eleventh insulation part 4931, and/or a twelfth insulation part 4932. In a folded state of the foldable electronic device 47, the first insulation part 4921 and the seventh insulation part 4927, the second insulation part 4922 and the eighth insulation part 4928, the third insulation part 4923 and the ninth insulation part 4929, the fourth insulation part 4924 and the tenth insulation part 4930, the fifth insulation part 4925 and the eleventh insulation part 4931, and the sixth insulation part 4926 and the twelfth insulation part 4932 may be aligned and overlap with each other. In a folded state of the foldable electronic device 47, the first conductive part 4901 and the seventh conductive part 4907, the second conductive part 4902 and the eighth conductive part 4908, the third conductive part 4903 and the ninth conductive part 4909, the fourth conductive part 4904 and the tenth conductive part 4910, the fifth conductive part 4905 and the eleventh conductive part 4911, and the sixth conductive part 4906 and the twelfth conductive part 4912 may be aligned and overlap with each other.

According to various embodiments (not illustrated separately), the shape or number of the conductive parts or insulation parts included in the first side 47112 is not limited to the illustrated example, and may be various. The second side 47212 may include multiple conductive parts and/or insulation parts aligned with the multiple conductive parts and the multiple insulation parts of the first side 47112 in a folded state of the foldable electronic device 47.

According to an embodiment, the foldable electronic device 47 may transmit and/or receive a signal (e.g., a frequency signal) in a selected or designated frequency band through at least one conductive part (e.g., the first conductive part 4901, the second conductive part 4902, the third conductive part 4903, the fourth conductive part 4904, the fifth conductive part 4905, or the sixth conductive part 4906) included in the first side 47112.

According to an embodiment, the foldable electronic device 47 may transmit and/or receive a signal in a selected or designated frequency band through at least one conductive part (e.g., the seventh conductive part 4907, the eighth conductive part 4908, the ninth conductive part 4909, the tenth conductive part 4910, the eleventh conductive part 4911, or the twelfth conductive part 4912) included in the second side 47212.

According to an embodiment, at least one conductive part included in the first side 47112 or at least one conductive part included in the second side 47212 may be electrically connected to a wireless communication circuit (e.g., the wireless communication module 192 in FIG. 1) (or a wireless communication circuit disposed on a printed circuit board) included in a substrate assembly positioned in an inner space of the first housing 471 or the second housing 472 of FIG. 47 and may operate as an antenna radiator. The wireless communication circuit may process a transmission signal or a reception signal through the at least one radiator in at least one selected or designated frequency band. The selected or designated frequency band may include, for example, at least one of LB, MB, HB, or UHB. The designated frequency band may include various other frequency bands.

According to an embodiment, in a folded state (see FIG. 48) of the foldable electronic device 47, corresponsive alignment between the multiple insulation parts (e.g., the first insulation part 4921, the second insulation part 4922, the third insulation part 4923, the fourth insulation part 4924, the fifth insulation part 4925, and the sixth insulation part 4926) of the first side 47112, and the multiple insulation parts (e.g., the seventh insulation part 4927, the eighth insulation part 4928, the ninth insulation part 4929, the tenth insulation part 4930, the eleventh insulation part 4931, and/or the twelfth insulation part 4932) of the second side may reduce the degradation of antenna radiation performance in a case where at least one conductive part included in the first side 47112 or the second side 47212 is used as an antenna radiator.

Figure 50:
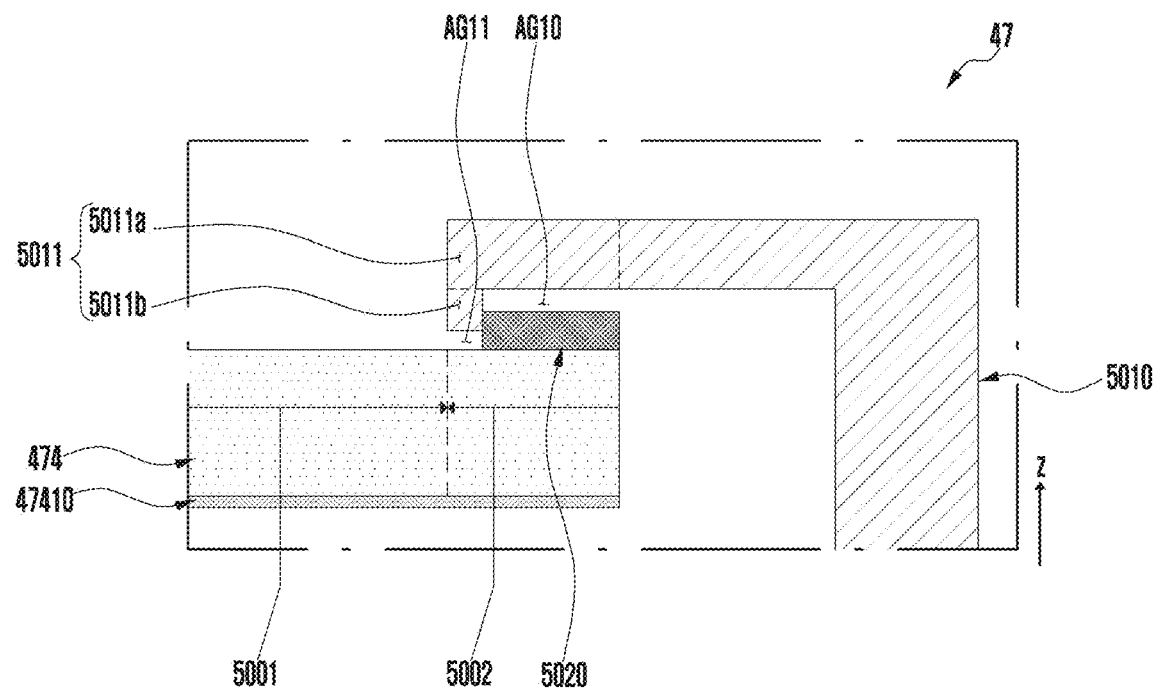
FIG. 50 is a sectional view illustrating a part of a foldable electronic device according to various embodiments.

FIG. 50 is a cross-sectional view showing a part of the foldable electronic device 47 according to various embodiments.

Referring to FIG. 50, in an embodiment, the foldable electronic device 47 may include the flexible display module 474, a support sheet 47410, a lateral member 5010, and/or a dielectric 5020.

According to an embodiment, the flexible display module 474 may include a first part 5001 and a second part 5002 extending from the first part 5001. The first part 5001 may be seen to the outside of the foldable electronic device 47. The second part 5002 may not be substantially seen to the outside of the foldable electronic device 47 by being covered by the lateral member 5010.

According to various embodiments, the flexible display module 474 may be implemented to be substantially identical or similar to the flexible display module 30 in FIG. 6.

According to an embodiment, the support sheet 47410 may be disposed on or coupled to a back surface of the flexible display module 474. For example, the support sheet 47410 may be implemented to be substantially identical or similar to the support sheet 3010 illustrated in FIG. 6. The support sheet 47410 may include, for example, a lattice structure or a recess pattern. The lattice structure or recess pattern may be included in the third display region (i) (see FIG. 47) of the flexible display module 474. In various embodiments, the lattice structure or recess pattern may be expanded to the first display region (g) (see FIG. 47) or the second display region (h) (see FIG. 47).

According to various embodiments, the support sheet 47410 may be interpreted as a part of the flexible display module 474.

According to various embodiments, the lateral member 5010 may be the first side 47112 or the second side 47212 of FIG. 49. A part 5011 of the lateral member 5010 may face and overlap with the second part 5002 of the flexible display module 474.

According to an embodiment, in a case where the lateral member 5010 is the first side 47112 of FIG. 49, a part (e.g., a display overlapping part) of the lateral member 5010, facing and overlapping with the second part 5002, may include a part of the first conductive part 4901, a part of the second conductive part 4902, a part of the third conductive part 4903, a part of the fourth conductive part 4904, a part of the fifth conductive part 4905, a part of the sixth conductive part 4906, a part of the first insulation part 4921, a part of the second insulation part 4922, a part of the third insulation part 4923, a part of the fourth insulation part 4924, a part of the fifth insulation part 4925, and/or a part of the sixth insulation part 4926.

According to an embodiment, in a case where the lateral member 5010 is the second side 47212 of FIG. 49, a part (e.g., a display overlapping part) of the lateral member 5010, facing and overlapping with the second part 5002, may include a part of the seventh conductive part 4907, a part of the eighth conductive part 4908, a part of the ninth conductive part 4909, a part of the tenth conductive part 4910, a part of the eleventh conductive part 4911, a part of the twelfth conductive part 4912, a part of the seventh insulation part 4927, a part of the eighth insulation part 4928, a part of the ninth insulation part 4929, a part of the tenth insulation part 4930, a part of the eleventh insulation part 4931, and/or a part of the twelfth insulation part 4932.

The part 5011 of a conductive part (e.g., the first conductive part 4901, the second conductive part 4902, the third conductive part 4903, the fourth conductive part 4904, the fifth conductive part 4905, the sixth conductive part 4906, the seventh conductive part 4907, the eighth conductive part 4908, the ninth conductive part 4909, the tenth conductive part 4910, the eleventh conductive part 4911, or the twelfth conductive part 4912 in FIG. 49) of the lateral member 5010, operating as an antenna radiator faces and overlaps with the second part 5002 of the flexible display module 474. Therefore, there may be a possibility that electromagnetic coupling may occur between the second part 5002 and the part 5011 (hereinafter, referred to as a "display-overlapping conductive region") of the conductive part. The display-overlapping conductive region 5011 may have a possibility of being electromagnetically coupled to a conductive material included in the second part 5002 of the flexible display module 474. For example, a conductive material (e.g., the copper sheet 303e in FIG. 6) included in a lower panel (e.g., the lower panel 3030 of FIG. 6) in the second part 5002 of the flexible display module 474 may have a possibility of being electromagnetically coupled to the display-overlapping conductive region 5011. For example, a conductive material, such as an electrode or a wire, included in a display panel (e.g., the display panel 301 of FIG. 6) in the second part 5002 of the flexible display module 474 may have a possibility of being electromagnetically coupled to the display-overlapping conductive region 5011. For example, a part of the support sheet 47410, corresponding to the second part 5002 of the flexible display module 474, may have a possibility of being electromagnetically coupled to the display-overlapping conductive region 5011.

According to various embodiments, the display-overlapping conductive region 5011 may include a part of a conductive part operating as an antenna radiator in the lateral member 5010, the part having a possibility of substantially being electromagnetically coupled to the flexible display module 474 due to a relative positional relationship with the flexible display module 474.

According to various embodiments, the display-overlapping conductive region 5011 may include a part of a conductive part operating as an antenna radiator in the lateral member 5010, the part having a possibility that a frequency characteristic may be substantially largely changed due to electromagnetic coupling with the flexible display module 474.

According to various embodiments, the display-overlapping conductive region 5011 may indicate a part having the maximum strength or a relatively large strength of an electric field when a radiation current is supplied to a conductive part included in the lateral member 5010.

Due to the electromagnetic coupling (e.g., an electromagnetic effect of the second part 4902 on a conductive part operating as an antenna radiator in the lateral member 5010) between the display-overlapping conductive region 5011 of the lateral member 5010 and the second part 5002 of the flexible display module 474, there may be a possibility of degradation of the antenna radiation performance or coverage of the antenna radiator. For example, there may be a possibility that a frequency characteristic of an antenna device using a conductive part of the lateral member 5010 may be changed due to an electromagnetic effect of the second part 5002 of the flexible display module 474. The electromagnetic effect of the second part 5002 on a conductive part operating as an antenna radiator in the lateral member 5010 may be reduced by increasing the distance by which the display-overlapping conductive region 5011 is spaced apart from the second part 5002. However, an external foreign material, such as dust or moisture, may be introduced into the foldable electronic device 47 through the gap between the display-overlapping conductive region 5011 and the second part 5002. Therefore, there may be a limitation to increasing the distance between the display-overlapping conductive region 5011 and the second part 5002. The electromagnetic effect of the second part 5002 on a conductive part operating as an antenna radiator in the lateral member 5010 may be reduced by increasing the distance by which the display-overlapping conductive region 5011 is spaced apart from the second part 5002. However, the distance increase may degrade the aesthetics of the foldable electronic device 47 or make it difficult to slim the foldable electronic device 47. Therefore, there may be a limitation to increasing the distance between the display-overlapping conductive region 5011 and the second part 5002. There may be a comparative example in which a member for preventing/reducing introduction of an external foreign material is interposed between the display-overlapping conductive region 5011 and the second part 5002 to implement no substantial air gap between the display-overlapping region 5011 and the second part 5002. However, no spacing between the display-overlapping conductive region 5011 and the second part 5002 and the permittivity of the member may make it difficult to ensure the antenna radiation performance or coverage of a conductive part operating as an antenna radiator in the lateral member 5010. An embodiment of the disclosure may be implemented, in consideration of the above limitations and comparative examples, to not only reduce degradation of the antenna radiation performance or coverage of an antenna radiator in a relative positional relationship between the flexible display module 474 and a conductive part operating as the antenna radiator in the lateral member 5010, but also reduce the introduction of an external foreign material through the gap between the flexible display module 474 and the lateral member 5010. Hereinafter, this embodiment will be described.

According to an embodiment, the dielectric 5020 may be positioned between (e.g., in an air gap between) the display-overlapping conductive region 5011 of the lateral member 5010 and the second part 5002 of the flexible display module 474. For example, the dielectric 5020 may be disposed on the second part 5002 of the flexible display module 474. The dielectric 5020 may be, for example, disposed on or coupled to the second part 5002 of the flexible display module 474 through various materials (not illustrated separately), such as a thermoresponsive adhesive material (or a thermoresponsive bonding material), a photoresponsive adhesive material (or a photoresponsive bonding material), a normal adhesive agent (or a normal bonding agent), and/or double-sided tape.

According to an embodiment, the display-overlapping conductive region 5011 of the lateral member 5010 may include a first conductive region 5011a and a second conductive region 5011b extending from the first conductive region 5011a. For example, the dielectric 5020 may be disposed on the second part 5002 of the flexible display module 474 between the first conductive region 5011a of the lateral member 5010 and the second part 5002. For example, the dielectric 5020 may not be disposed between the second conductive region 5011b and the second part 5002.

According to an embodiment, the foldable electronic device 47 may include an air gap AG10 provided between the dielectric 5020 and the first conductive region 5011a, and an air gap AG11 provided between the second conductive region 5011b and the second part 5002.

According to an embodiment, the second conductive region 5011b and the dielectric 5020 may reduce or prevent the introduction of an external foreign material, such as dust or moisture, into the foldable electronic device 47 by reducing the gap between the display-overlapping conductive region 5011 of the lateral member 5010 and the second part 5002 of the flexible display module 474. For example, the second conductive region 5011b and the dielectric 5020 may be in contact with each other, and an external foreign material, such as dust or moisture, may have difficulty in entering the foldable electronic device 47 through the gap between the display-overlapping conductive region 5011 and the second part 5002.

According to an embodiment, the dielectric 5020 may include a flexible material. The dielectric 5020 may be elastically in contact with the second conductive region 5011b of the lateral member 5010 and thus contribute to airtightness not to allow an external foreign material to enter into the foldable electronic device 47.

According to various embodiments, the dielectric 5020 may include a substantially rigid material. In an embodiment in which the air gaps AG10 and AG11 are provided between the display-overlapping conductive region 5011 of the lateral member 5010 and the second part 5002 of the flexible display module 474, the electromagnetic effect of the second part 5002 on the display-overlapping conductive region 5011 may be reduced compared to a comparative example in which a member for preventing/reducing introduction of an external foreign material is interposed between the display-overlapping conductive region 5011 and the second part 5002 to implement no substantial air gap between the display-overlapping conductive region 5011 and the second part 5002.

According to various embodiments (not illustrated separately), when viewed from above a front surface of the foldable electronic device 47 in an unfolded state (e.g., when viewed in the −z-axis direction), the second conductive region 5011b of the lateral member 5010 may partially overlap with the dielectric 5020, and one or more air gaps may be provided. The foldable electronic device 47 is not limited to the illustrated embodiment, and may be implemented in various other types having one or more dielectrics and one or more air gaps between the display-overlapping conductive region 5011 of the lateral member 5010 and the second part 5002 of the flexible display module 474.

According to an embodiment, the dielectric 5020 may have a permittivity enabling reduction of degradation of the antenna radiation performance of a conductive part operating as an antenna radiator in the lateral member 5010. The permittivity of the dielectric 5020 may be, for example, a value contributing in preventing/reducing the antenna radiation performance of a conductive part operating as an antenna radiator in the lateral member 5010 from degrading to be equal or lower than a threshold level. The permittivity of the dielectric 5020 may be a value enabling reduction of the electromagnetic effect on a conductive part operating as an antenna radiator in the lateral member 5010.

According to an embodiment, the permittivity of the dielectric 5020 may be a value (e.g., a low permittivity) which is less than the permittivity of a conductive part operating as an antenna radiator in the lateral member 5010 and has a small difference from the permittivity of the air gaps AG10 and AG11.

According to an embodiment, the dielectric 5020 may include a non-conductive material. For example, the dielectric 5020 may include Poron, but may be various without being limited thereto.

According to various embodiments, the dielectric 5020 may include a conductive material.

According to various embodiments (not illustrated separately), the embodiment of FIG. 50 may be modified to a structure including the dielectrics 1100 and 1301 according to the embodiment of FIG. 13.

According to various embodiments (not illustrated separately), the embodiment of FIG. 50 may be modified to a structure including the dielectric 1700 according to the embodiment of FIG. 16.

According to various embodiments (not illustrated separately), the embodiment of FIG. 50 may be modified to a structure including the dielectric 1810 according to the embodiment of FIG. 18.

According to various embodiments (not illustrated separately), the embodiment of FIG. 50 may be modified to a structure including the dielectric 1910 according to the embodiment of FIG. 19.

According to various embodiments (not illustrated separately), the embodiment of FIG. 50 may be modified to a structure including the dielectric 2010 according to the embodiment of FIG. 20.

According to various embodiments (not illustrated separately), the embodiment of FIG. 50 may be modified to a structure including the first side wall structure part 2110, the second side wall structure part 2120, and the third side wall structure part 2130 according to the embodiment of FIG. 21.

According to various embodiments (not illustrated separately), the embodiment of FIG. 50 may be modified to a structure including the dielectric 2210 according to the embodiment of FIG. 22.

According to various embodiments (not illustrated separately), the embodiment of FIG. 50 may be modified to a structure including the at least one first dielectric 3610 provided in a brush type according to the embodiment of FIG. 39, the embodiment of FIG. 42, the embodiment of FIG. 43, or the embodiment of FIG. 44.

According to various embodiments (not illustrated separately), the embodiment of FIG. 50 may be modified to a structure in which a part of the lateral member includes the non-conductive region 4510 according to the embodiment of FIG. 45.

According to various embodiments (not illustrated separately), the embodiment of FIG. 50 may be modified to a structure in which a part of the lateral member includes the non-conductive region 4610 according to the embodiment of FIG. 46.

According to various embodiments, various other electronic devices including a display module, such as a bar type electronic device (not illustrated separately) or a plate type electronic device (not illustrated separately), may be implemented to have a structure including the dielectric 1100 according to the embodiment of FIG. 12, a structure including the dielectrics 1100 and 1301 according to the embodiment of FIG. 13, a structure including the dielectric 1810 according to the embodiment of FIG. 18, a structure including the dielectric 1910 according to the embodiment of FIG. 19, or a structure including the dielectric 2010 according to the embodiment of FIG. 20.

According to various embodiments, various other electronic devices including a display module, such as a bar type electronic device (not illustrated separately) or a plate type electronic device (not illustrated separately), may be implemented to have a structure including the first side wall structure part 2110, the second side wall structure part 2120, and the third side wall structure part 2130 according to the embodiment of FIG. 21.

According to various embodiments, various other electronic devices including a display module, such as a bar type electronic device (not illustrated separately) or a plate type electronic device (not illustrated separately), may be implemented to have a structure including the dielectric 2210 according to the embodiment of FIG. 22.

According to various embodiments, various other electronic devices including a display module, such as a bar type electronic device (not illustrated separately) or a plate type electronic device (not illustrated separately), may be implemented to have a structure including the at least one first dielectric 3610 provided in a brush type according to the embodiment of FIG. 39, the embodiment of FIG. 42, the embodiment of FIG. 43, or the embodiment of FIG. 44.

According to various embodiments, various other electronic devices including a display module, such as a bar type electronic device (not illustrated separately) or a plate type electronic device (not illustrated separately), may be implemented to provide a structure in which a part of the lateral member includes the non-conductive region 4510 according to the embodiment of FIG. 45.

According to various embodiments, various other electronic devices including a display module, such as a bar type electronic device (not illustrated separately) or a plate type electronic device (not illustrated separately), may be implemented to have a structure in which a part of the lateral member includes the non-conductive region 4610 according to the embodiment of FIG. 46.

According to an example embodiment of the disclosure, an electronic device (e.g., the slidable electronic device 2 of FIG. 2) may include: a display module including a display (e.g., the flexible display module 30 in FIG. 12), a conductive part including a conductive material (e.g., the conductive part 1001 in FIG. 12), a wireless communication circuit (e.g., the wireless communication circuit 1060 in FIG. 10), and a dielectric (e.g., the dielectric 1100 in FIG. 12). The conductive part may be included in a housing (e.g., the slidable housing 20 in FIG. 2) configuring an exterior of the electronic device. The conductive part may include a conductive region facing and overlapping a part of a front surface of the display module and covering the part of the front surface of the display module. The wireless communication circuit may be configured to transmit and/or receive a signal in a selected or designated frequency band through the conductive part. The dielectric may be disposed between the part of the front surface of the display module and the conductive region of the conductive part. An air gap (e.g., the first air gap AG1 of FIG. 12) may be provided between the dielectric and the part of the front surface of the display module, or between the dielectric and the conductive region.

According to an example embodiment of the disclosure, the conductive region (e.g., the first display-overlapping conductive region 1001*a* in FIG. 12) may include a first conductive region (e.g., the first conductive region 1001*b* in FIG. 12) and a second conductive region (e.g., the second conductive region 1001*c* of FIG. 12). The first conductive region may face and is spaced apart from the part (e.g., the second surface 1202 in FIG. 12) of the front surface of the display module. The second conductive region may protrude from the first conductive region toward the part of the front surface of the display module. The second conductive region may be spaced apart from the part of the front surface of the display module. The second conductive region is physically in contact with the dielectric (e.g., the dielectric 1100 in FIG. 12). The dielectric may be disposed on the part of the front surface of the display module, and the air gap (e.g., the first air gap AG1 of FIG. 12) may be provided between the dielectric and the first conductive region.

According to an example embodiment of the disclosure, the dielectric (e.g., the dielectric 1100 in FIG. 13) may be disposed on the part (e.g., the second surface 1202 in FIG. 12) of the front surface of the display module. The air gap (e.g., the first air gap AG1 of FIG. 13) may be provided between the dielectric and the conductive region (e.g., the first display-overlapping conductive region 1001a in FIG. 13). The electronic device may further include a different dielectric (e.g., the different dielectric 1301 in FIG. 13) disposed on the conductive region between the part of the front surface of the display module and the conductive region. A different air gap (e.g., the second air gap AG2 in FIG. 13) may be provided between the different dielectric and the part of the front surface of the display module. The dielectric and the different dielectric may be physically in contact with each other.

According to an example embodiment of the disclosure, the dielectric (e.g., the dielectric 1700 in FIG. 17) may include a recess (e.g., the one or more recesses 1703 in FIG. 17) disposed on one surface (e.g., the fifth surface 1702 in FIG. 16) facing the conductive region (e.g., the first display-overlapping conductive region 1001a in FIG. 16). The air gap (e.g., the third air gap AG3 in FIG. 16) may be provided by the recess (e.g., the one or more recesses 1703 in FIG. 17) between the dielectric and the conductive region.

According to an example embodiment of the disclosure, the dielectric (e.g., the dielectric 1810 in FIG. 18) may include a first part (e.g., the first structure part 1810a in FIG. 18) positioned between the part (e.g., the second surface 1202 in FIG. 12) of the front surface of the display module and the conductive region (e.g., the first display-overlapping conductive region 1001a in FIG. 12), and a second part (e.g., the second structure part 1810b in FIG. 18) extending from the first part. The air gap (e.g., the fourth air gap AG4 of FIG. 18) may be provided between the dielectric and the conductive region. The second part may be fixed to a support member (e.g., the first support member 721 in FIG. 18) positioned in an inner space of the housing and supporting a back surface of the display module.

According to an example embodiment of the disclosure, the dielectric (e.g., the dielectric 2010 in FIG. 20) may include a first part (e.g., the first structure part 1810a in FIG. 20) positioned between the part (e.g., the second surface 1202 in FIG. 12) of the front surface of the display module and the conductive region (e.g., the first display-overlapping conductive region 1001a in FIG. 12), and a second part (e.g., the second structure part 1810b in FIG. 20) extending from the first part. The air gap (e.g., the fourth air gap AG4 of FIG. 20) may be provided between the dielectric and the conductive region. The second part may be fixed to the housing (e.g., the first side wall 201).

According to an example embodiment of the disclosure, the dielectric (e.g., the at least one first dielectric 3610 in FIG. 39) may include a brush including multiple bristles (e.g., the multiple bristles 3612 in FIG. 39). Some of the multiple bristles may have a thickness different from a thickness of others of the multiple bristles.

According to an example embodiment of the disclosure, the dielectric (e.g., the at least one first dielectric 3610 in FIG. 39) may include a brush including multiple bristles (e.g., the multiple bristles 3612 in FIG. 39). Some of the multiple bristles may have a length greater than a length of others of the multiple bristles.

According to an example embodiment of the disclosure, the dielectric may include a porous material (e.g., sponge).

According to an example embodiment of the disclosure, the exterior of the electronic device may include a front surface (e.g., the screen S1 in FIG. 2 or 4) on which the display module is visible, a rear surface (e.g., the rear surface B in FIG. 3 or 5) facing a direction opposite to a direction the front surface faces, and a lateral surface at least partially surrounding a space between the front surface and the rear surface. The conductive part (e.g., the first conductive part 1001 in FIG. 12) may include a part of the lateral surface.

According to an example embodiment of the disclosure, the electronic device may further include a support (e.g., the first support member 721 in FIG. 12) positioned in an inner space of the housing. The support 721 may support a back surface of the display module. The display module may be flexible. The display module may include a flat part (e.g., the first flat part S1 of the screen S1 in FIG. 2 or 4) disposed on a flat region of the support member. The display module may include a curved part (e.g., the first curved part S12 of the screen S1 in FIG. 2 or 4) extending from the flat part and disposed on a curved region of the support. The part of the front surface of the display module may be included in the flat part (see the embodiment of FIG. 24).

According to an example embodiment of the disclosure, the electronic device may further include a support (e.g., the first support member 721 in FIG. 12) positioned in an inner space of the housing. The support 721 may support a back surface of the display module. The display module may be flexible. The display module may include a flat part (e.g., the first flat part S1 of the screen S1 in FIG. 2 or 4) disposed on a flat region of the support. The display module may include a curved part (e.g., the first curved part S12 of the screen S1 in FIG. 2 or 4) extending from the flat part and disposed on a curved region of the support. The part of the front surface of the display module may be included in the curved part (e.g., the embodiment of FIG. 12, 13, 16, 18, 19, 20, 21, or 22).

According to an example embodiment of the disclosure, the display module may include an extension part (e.g., the third region ⓒ of FIG. 12) extending to be bent from a display panel included in the display module and coupled to a back surface of the display module. A display driver circuit (e.g., the display driver circuit 810 in FIG. 8) may be disposed on the extension part. The conductive part (e.g., the first conductive part 1001 in FIG. 12) may be positioned to correspond to the extension part.

According to an example embodiment of the disclosure, the display module may be flexible. The display module may be configured to be at least partially ejectable or extendable from an inner space of the housing.

According to an example embodiment of the disclosure, the housing may include a first housing (e.g., the first housing 21 in FIG. 6 or 7) and a second housing (e.g., the second housing 22 in FIG. 6 or 7) configured to be slidable with respect to the first housing. The display module may be flexible. The display module may include a first region (e.g., the first region ⓐ in FIG. 8 or 9) and a second region (e.g., the second region ⓑ in FIG. 8 or 9). The first region may include a part that is disposed on the first housing and is visible to the outside. The second region may extend from the first region, and may be ejected from an inner space of the electronic device or introduced into the inner space of the electronic device at a time of sliding of the second housing.

According to an example embodiment of the disclosure, the part (e.g., the second surface 1202 in FIG. 12) of the front surface of the display module may be included in a border region of the first region (e.g., the first region ⓐ in FIG. 2 or 4).

According to an example embodiment of the disclosure, the part of the front surface of the display module may be included in the second region (e.g., the second region ⓑ in FIG. 25).

According to an example embodiment of the disclosure, a screen (e.g., the screen S1 in FIG. 2 or 4) of the electronic device, provided by the display module, may include a flat part (e.g., the first flat part S11 in FIG. 2 or 4), a first curved part (e.g., the first curved part S12 in FIG. 2 or 4), and a second curved part (e.g., the second curved part S13 in FIG. 2 or 4). The flat part may be disposed on a flat region of the first housing in the first region (e.g., the first region ⓐ in FIG. 2 or 4). The first curved part may extend, in the first region, from the flat part and be disposed on a curved region of the first housing. The second curved part may be provided by the second region. The second curved part may extend from the flat part and is positioned opposite to the first curved part while the flat part is interposed therebetween. The part of the front surface of the display module may be included in a border region of the first region, adjacent to the flat part.

According to an example embodiment of the disclosure, a screen (e.g., the screen S1 in FIG. 2 or 4) of the electronic device, provided by the flexible display module, may include a flat part (e.g., the first flat part S11 in FIG. 2 or 4), a first curved part (e.g., the first curved part S12 in FIG. 2 or 4), and a second curved part (e.g., the second curved part S13 in FIG. 2 or 4). The flat part may be disposed on a flat region of the first housing in the first region (e.g., the first region ⓐ in FIG. 2 or 4). The first curved part may extend, in the first region, from the flat part and be disposed on a curved region of the first housing. The second curved part may be provided by the second region. The second curved part may extend from the flat part and is positioned opposite to the first curved part while the flat part is interposed therebetween. The part of the front surface of the display module may be included in a border region of the first region, adjacent to the first curved part.

According to an example embodiment of the disclosure, a screen (e.g., the screen S1 in FIG. 2 or 4) of the electronic device, provided by the display module, may include a flat part (e.g., the first flat part S1 in FIG. 2 or 4), a first curved part (e.g., the first curved part S12 in FIG. 2 or 4), and a second curved part (e.g., the second curved part S13 in FIG. 2 or 4). The flat part may be disposed on a flat region of the first housing in the first region (e.g., the first region ⓐ in FIG. 2 or 4). The first curved part may extend, in the first region, from the flat part and be disposed on a curved region of the first housing. The second curved part may be provided by the second region. The second curved part may extend from the flat part and is positioned opposite to the first curved part while the flat part is interposed therebetween. The part of the front surface of the display module may be included in a region of the second region, adjacent to the second curved part.

According to an example embodiment of the disclosure, the housing (e.g., the foldable housing 260 in FIG. 26) may provide a front surface of the electronic device, a rear surface of the electronic device, and a lateral surface of the electronic device. The display module may be flexible. The display module may be visually seen through the front surface. The housing may be configured such that the front surface of the electronic device is foldable inward or outward. The conductive part may be included in a lateral member (e.g., the first side 47112 or the second side 47212 in FIG. 49) of the housing, providing the lateral surface.

According to an example embodiment of the disclosure, the dielectric (e.g., the dielectric 1100 in FIG. 12) may include a non-conductive material having a permittivity greater than that of the air gap (e.g., the first air gap AG1 in FIG. 12) and less than that of the first conductive part (e.g., the first conductive part 1001 in FIG. 12).

According to an example embodiment of the disclosure, the dielectric (e.g., the dielectric 1100 in FIG. 12) may include Poron.

The embodiments disclosed in the disclosure and drawings merely present various examples to aid in easily describing technical contents and help the understanding of the embodiments and are not intended to limit the scope of the disclosure. Therefore, the scope of various embodiments of the disclosure should be construed to include, in addition to the embodiments disclosed herein, all changes and modifications. In other words, while the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    a display module comprising a display, the display module including a front surface and a back surface opposite to the front surface;
    a conductive part comprising a conductive material included in a housing and forming at least part of an exterior of the electronic device;
    a wireless communication circuit configured to transmit and/or receive a signal in a selected or designated frequency band through the conductive part; and
    a first dielectric, configured to reduce introduction of an external foreign material into the electronic device, disposed between a part of the front surface of the display module and a conductive region of the conductive part,
    wherein the conductive region of the conductive part faces the part of the front surface of the display module to cover the part of the front surface, and
    wherein a first air gap is provided between the first dielectric and the part of the front surface of the display module, or between the first dielectric and the conductive region of the conductive part.

2. The electronic device of claim 1, wherein the conductive region comprises:
    a first conductive region facing and spaced apart from the part of the front surface of the display module; and
    a second conductive region protruding from the first conductive region toward the part of the front surface of the display module, and spaced apart from the part of the front surface of the display module, wherein the second conductive region is physically in contact with the first dielectric, and wherein the first dielectric is disposed on the part of the front surface of the display module, and the first air gap is provided between the dielectric and the first conductive region.

3. The electronic device of claim 1, wherein the first dielectric is disposed on the part of the front surface of the display module, and the first air gap is provided between the first dielectric and the conductive region, wherein the electronic device further comprises: a second dielectric disposed on the conductive region between the part of the front surface of the display module and the conductive region, and a second air gap is provided between the second dielectric and the part of the front surface of the display module, and wherein the first dielectric and the second dielectric are physically in contact with each other.

4. The electronic device of claim 1, wherein the first dielectric comprises a recess disposed on one surface facing the conductive region, and wherein the first air gap is provided by the recess between the dielectric and the conductive region.

5. The electronic device of claim 1, wherein the first dielectric comprises a brush including multiple bristles, and wherein some of the multiple bristles have a thickness different from a thickness of others of the multiple bristles.

6. The electronic device of claim 1, wherein the first dielectric comprises a brush including multiple bristles, and wherein some of the multiple bristles have a length greater than a length of others of the multiple bristles.

7. The electronic device of claim 1, wherein the first dielectric comprises a porous material.

8. An electronic device comprising:

a display module comprising a display;

a conductive part comprising a conductive material included in a housing configuring at least part of an exterior of the electronic device, and including a conductive region facing and overlapping a part of a front surface of the display module to cover the part of the front surface;

a wireless communication circuit configured to transmit and/or receive a signal in a selected or designated frequency band through the conductive part; and a first dielectric disposed between at least the part of the front surface of the display module and the conductive region, wherein a first air gap is provided between at least the dielectric and the part of the front surface of the display module, or between at least the dielectric and the conductive region, wherein the exterior of the electronic device comprises a front surface on which the display module is visible, a rear surface facing a direction opposite to a direction in which the front surface faces, and a lateral surface at least partially surrounding a space between the front surface and the rear surface, and wherein the conductive part is a part of the lateral surface.

9. The electronic device of claim 1, further comprising a support positioned in an inner space of the housing and supporting a back surface of the display module, wherein the display module is flexible and comprises a flat part disposed on a flat region of the support, and a curved part extending from the flat part and disposed on a curved region of the support, and wherein the part of the front surface of the display module is included in the flat part.

10. The electronic device of claim 1, further comprising a support positioned in an inner space of the housing and supporting a back surface of the display module, wherein the display module is flexible and comprises a flat part disposed on a flat region of the support, and a curved part extending from the flat part and disposed on a curved region of the support, and wherein the part of the front surface of the display module is included in the curved part.

11. The electronic device of claim 1, wherein the display module comprises an extension part extending and bent from a display panel included in the display module and coupled to a back surface of the display module, wherein a display driver circuit is disposed on the extension part, and wherein the conductive part is positioned to correspond to the extension part.

12. The electronic device of claim 1, wherein the display module is flexible, and is configured to be at least partially ejectable or extendable from an inner space of the housing.

13. An electronic device comprising:

a display module comprising a display;

a conductive part comprising a conductive material included in a housing configuring at least part of an exterior of the electronic device, and including a conductive region facing and overlapping a part of a front surface of the display module to cover the part of the front surface;

a wireless communication circuit configured to transmit and/or receive a signal in a selected or designated frequency band through the conductive part; and a first dielectric disposed between at least the part of the front surface of the display module and the conductive region, wherein a first air gap is provided between at least the dielectric and the part of the front surface of the display module, or between at least the dielectric and the conductive region, wherein the housing comprises a first housing and a second housing configured to be slidable with respect to the first housing, and wherein the display module is flexible, and comprises:

a first region including a part disposed on the first housing and visible to the outside; and a second region extending from the first region, and configured to be extended from an inner space of the electronic device or received into the inner space of the electronic device based on sliding of the second housing.

14. The electronic device of claim 13, wherein the part of the front surface of the display module is included in a border region of the first region.

15. The electronic device of claim 13, wherein the part of the front surface of the display module is included in the second region.

16. The electronic device of claim 13, wherein a screen of the electronic device, provided by the display module, comprises:

a flat part disposed on a flat region of the first housing in the first region;

a first curved part extending, in the first region, from the flat part and disposed on a curved region of the first housing; and a second curved part provided by the second region, and extending from the flat part and positioned opposite to the first curved part while the flat part is interposed therebetween, and wherein the part of the front surface of the display module is included in a border region of the first region, adjacent to the flat part.

17. The electronic device of claim 13, wherein a screen of the electronic device, provided by the display module, comprises:
a flat part disposed on a flat region of the first housing in the first region;
a first curved part extending, in the first region, from the flat part and disposed on a curved region of the first housing; and
a second curved part provided by the second region, and extending from the flat part and positioned opposite to the first curved part while the flat part is interposed therebetween, and
wherein the part of the front surface of the display module is included in a border region of the first region, adjacent to the first curved part.

18. The electronic device of claim 13, wherein a screen of the electronic device, provided by the display module, comprises:
a flat part disposed on a flat region of the first housing in the first region;
a first curved part extending, in the first region, from the flat part and disposed on a curved region of the first housing; and
a second curved part provided by the second region, and extending from the flat part and positioned opposite to the first curved part while the flat part is interposed therebetween, and
wherein the part of the front surface of the display module is included in a region of the second region, adjacent to the second curved part.

19. The electronic device of claim 1, wherein the housing provides a front surface of the electronic device, a rear surface of the electronic device, and a lateral surface of the electronic device,
wherein the display module is flexible and is visible through the front surface,
wherein the housing is configured such that the front surface of the electronic device is foldable inward or outward, and
wherein the conductive part is included in a lateral portion of the housing, providing the lateral surface.

20. The electronic device of claim 1, wherein the first dielectric comprises a non-conductive material having a permittivity greater than a permittivity of the first air gap and less than a permittivity of the conductive part.

* * * * *